US006220743B1

(12) United States Patent
Campestre et al.

(10) Patent No.: US 6,220,743 B1
(45) Date of Patent: Apr. 24, 2001

(54) PROCESSES AND MATERIALS SELECTION KNOWLEDGE-BASED SYSTEM

(75) Inventors: Jean R. Campestre, Vacaville, CA (US); Alex N. Kalos, Lake Jackson, TX (US); Robert E. Cramer; John F. Braley, both of Midland, MI (US); Nathan M. Lacoff, Sugar Land, TX (US); Ranganath K. Shastri, Midland, MI (US); James H. Barron, Brazoria, TX (US)

(73) Assignee: The Dow Chemical Co., Midland, MI (US)

( * ) Notice: Subject to any disclaimer, the term of this patent is extended or adjusted under 35 U.S.C. 154(b) by 0 days.

(21) Appl. No.: 08/826,651

(22) Filed: Apr. 4, 1997

Related U.S. Application Data

(60) Provisional application No. 60/014,941, filed on Apr. 5, 1996.

(51) Int. Cl.[7] .............................. G06F 19/00; G06G 7/66

(52) U.S. Cl. ............................... 364/468.03; 364/468.04; 364/468.02; 364/468.05; 707/3; 707/10

(58) Field of Search ......................... 364/468.07, 468.02, 364/468.03, 468.04, 468.05, 513; 707/3, 10, 106, 500, 501; 395/50, 76, 650, 54, 68, 52

(56) References Cited

U.S. PATENT DOCUMENTS

| | | | |
|---|---|---|---|
| 3,560,725 | * 2/1971 | Claxton et al. | 235/184 |
| 3,626,377 | * 12/1971 | Markely et al. | 340/172.5 |
| 3,628,004 | * 12/1971 | Claxton et al. | 235/193 |
| 4,807,108 | * 2/1989 | Ben-Arich et al. | 364/148 |
| 4,827,423 | * 5/1989 | Beasley et al. | 364/468 |
| 5,241,465 | * 8/1993 | Oba et al. | 364/101 |
| 5,249,120 | * 9/1993 | Foley | 364/401 |
| 5,260,882 | * 11/1993 | Blanco et al. | 364/499 |
| 5,424,954 | * 6/1995 | Makishima | 364/473 |
| 5,463,564 | * 10/1995 | Agrafiotios et al. | 364/496 |
| 5,542,024 | * 7/1996 | Balint et al. | 395/161 |
| 5,586,039 | * 12/1996 | Hirsh et al. | 364/468.01 |
| 5,600,779 | * 2/1997 | Palmer et al. | 395/340 |
| 5,701,400 | * 12/1997 | Amado | 395/76 |

OTHER PUBLICATIONS

"ESR—Alarge Knowledge–Based Project od European Generation Industry", Expert System With Applications, vol. 5, pp. 465,477 (1993), Jovanovic et al., Sep. 1993.*

* cited by examiner

*Primary Examiner*—Paul P. Gordon
*Assistant Examiner*—Ramesh Patel
(74) *Attorney, Agent, or Firm*—J. M. Mark Gilbreth

(57) ABSTRACT

A computer implemented knowledge-based system for the selection of materials and/or fabrication processes for a durable goods application. The system consists of a graphical user interface, an expert system shell and a models and data base program. The system provides rapid, consistent and accurate techno-economic comparisons of processes and materials to select the best materials and fabrication processes for the durable goods application.

19 Claims, 103 Drawing Sheets

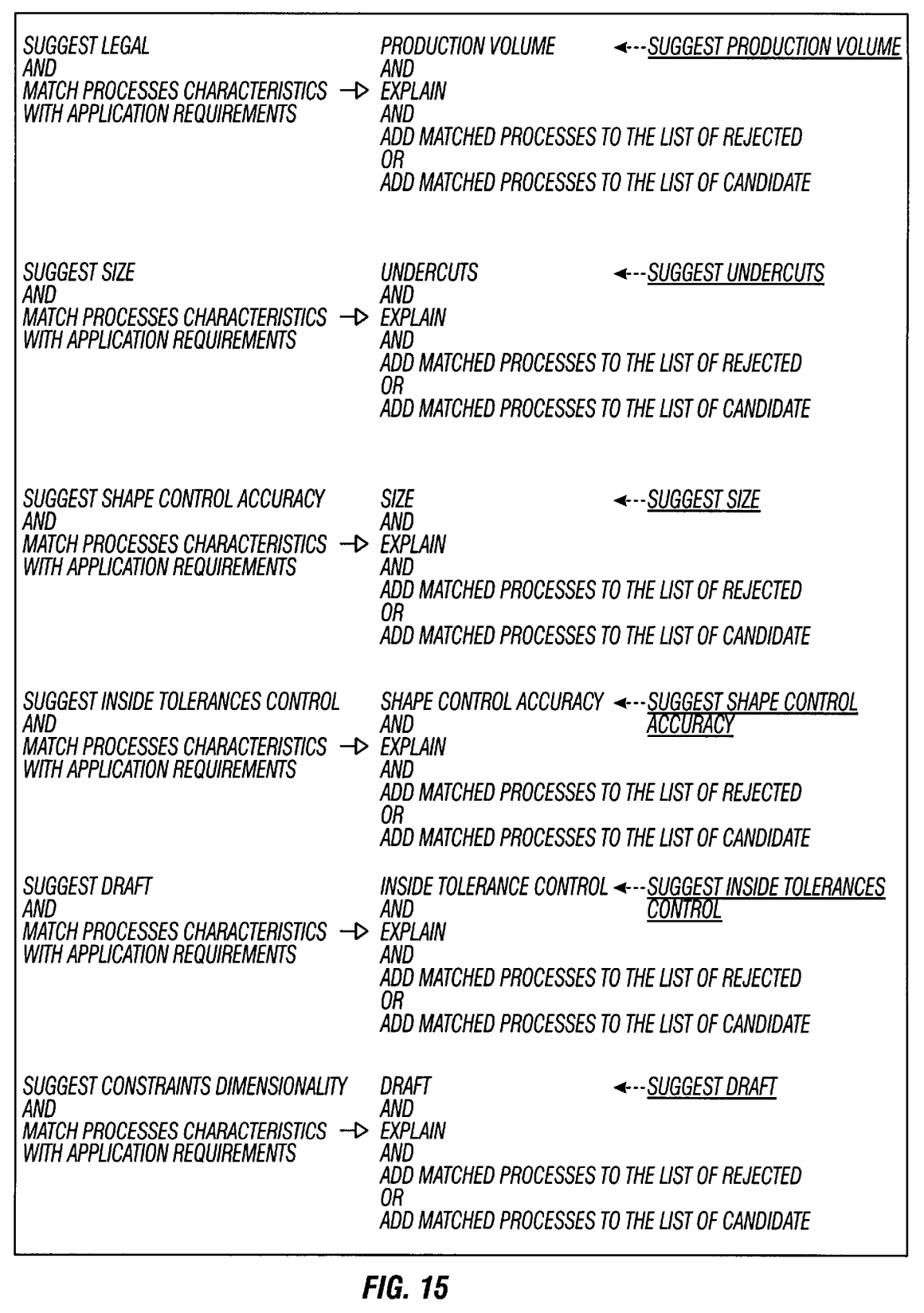

| | | | |
|---|---|---|---|
| SUGGEST LEGAL<br>AND<br>MATCH PROCESSES CHARACTERISTICS<br>WITH APPLICATION REQUIREMENTS | → | PRODUCTION VOLUME<br>AND<br>EXPLAIN<br>AND<br>ADD MATCHED PROCESSES TO THE LIST OF REJECTED<br>OR<br>ADD MATCHED PROCESSES TO THE LIST OF CANDIDATE | ◄--- SUGGEST PRODUCTION VOLUME |
| SUGGEST SIZE<br>AND<br>MATCH PROCESSES CHARACTERISTICS<br>WITH APPLICATION REQUIREMENTS | → | UNDERCUTS<br>AND<br>EXPLAIN<br>AND<br>ADD MATCHED PROCESSES TO THE LIST OF REJECTED<br>OR<br>ADD MATCHED PROCESSES TO THE LIST OF CANDIDATE | ◄--- SUGGEST UNDERCUTS |
| SUGGEST SHAPE CONTROL ACCURACY<br>AND<br>MATCH PROCESSES CHARACTERISTICS<br>WITH APPLICATION REQUIREMENTS | → | SIZE<br>AND<br>EXPLAIN<br>AND<br>ADD MATCHED PROCESSES TO THE LIST OF REJECTED<br>OR<br>ADD MATCHED PROCESSES TO THE LIST OF CANDIDATE | ◄--- SUGGEST SIZE |
| SUGGEST INSIDE TOLERANCES CONTROL<br>AND<br>MATCH PROCESSES CHARACTERISTICS<br>WITH APPLICATION REQUIREMENTS | → | SHAPE CONTROL ACCURACY<br>AND<br>EXPLAIN<br>AND<br>ADD MATCHED PROCESSES TO THE LIST OF REJECTED<br>OR<br>ADD MATCHED PROCESSES TO THE LIST OF CANDIDATE | ◄--- SUGGEST SHAPE CONTROL ACCURACY |
| SUGGEST DRAFT<br>AND<br>MATCH PROCESSES CHARACTERISTICS<br>WITH APPLICATION REQUIREMENTS | → | INSIDE TOLERANCE CONTROL<br>AND<br>EXPLAIN<br>AND<br>ADD MATCHED PROCESSES TO THE LIST OF REJECTED<br>OR<br>ADD MATCHED PROCESSES TO THE LIST OF CANDIDATE | ◄--- SUGGEST INSIDE TOLERANCES CONTROL |
| SUGGEST CONSTRAINTS DIMENSIONALITY<br>AND<br>MATCH PROCESSES CHARACTERISTICS<br>WITH APPLICATION REQUIREMENTS | → | DRAFT<br>AND<br>EXPLAIN<br>AND<br>ADD MATCHED PROCESSES TO THE LIST OF REJECTED<br>OR<br>ADD MATCHED PROCESSES TO THE LIST OF CANDIDATE | ◄--- SUGGEST DRAFT |

FIG. 15

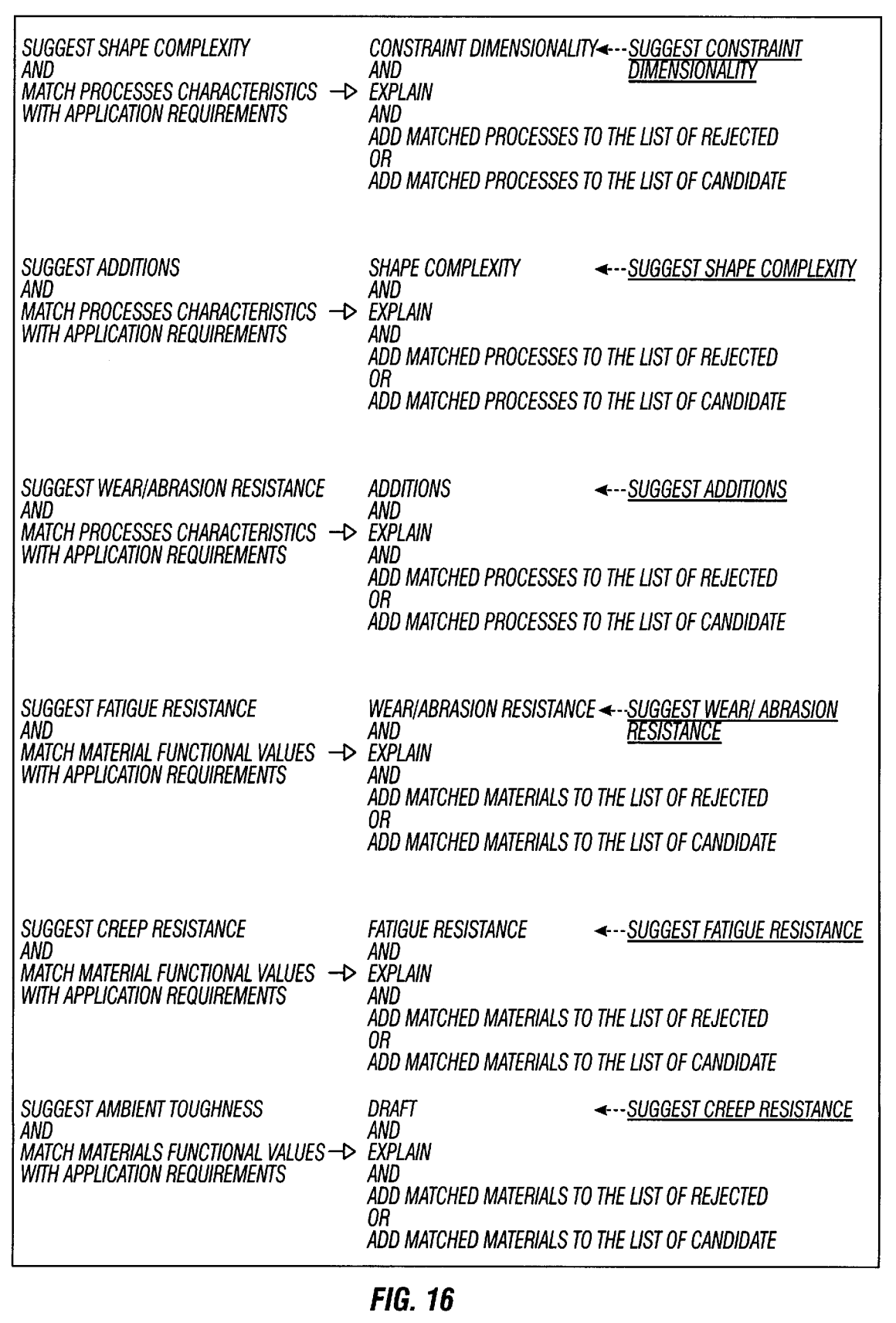

SUGGEST SHAPE COMPLEXITY
AND
MATCH PROCESSES CHARACTERISTICS
WITH APPLICATION REQUIREMENTS
→
CONSTRAINT DIMENSIONALITY ← SUGGEST CONSTRAINT DIMENSIONALITY
AND
EXPLAIN
AND
ADD MATCHED PROCESSES TO THE LIST OF REJECTED
OR
ADD MATCHED PROCESSES TO THE LIST OF CANDIDATE

SUGGEST ADDITIONS
AND
MATCH PROCESSES CHARACTERISTICS
WITH APPLICATION REQUIREMENTS
→
SHAPE COMPLEXITY ← SUGGEST SHAPE COMPLEXITY
AND
EXPLAIN
AND
ADD MATCHED PROCESSES TO THE LIST OF REJECTED
OR
ADD MATCHED PROCESSES TO THE LIST OF CANDIDATE

SUGGEST WEAR/ABRASION RESISTANCE
AND
MATCH PROCESSES CHARACTERISTICS
WITH APPLICATION REQUIREMENTS
→
ADDITIONS ← SUGGEST ADDITIONS
AND
EXPLAIN
AND
ADD MATCHED PROCESSES TO THE LIST OF REJECTED
OR
ADD MATCHED PROCESSES TO THE LIST OF CANDIDATE

SUGGEST FATIGUE RESISTANCE
AND
MATCH MATERIAL FUNCTIONAL VALUES
WITH APPLICATION REQUIREMENTS
→
WEAR/ABRASION RESISTANCE ← SUGGEST WEAR/ ABRASION RESISTANCE
AND
EXPLAIN
AND
ADD MATCHED MATERIALS TO THE LIST OF REJECTED
OR
ADD MATCHED MATERIALS TO THE LIST OF CANDIDATE

SUGGEST CREEP RESISTANCE
AND
MATCH MATERIAL FUNCTIONAL VALUES
WITH APPLICATION REQUIREMENTS
→
FATIGUE RESISTANCE ← SUGGEST FATIGUE RESISTANCE
AND
EXPLAIN
AND
ADD MATCHED MATERIALS TO THE LIST OF REJECTED
OR
ADD MATCHED MATERIALS TO THE LIST OF CANDIDATE

SUGGEST AMBIENT TOUGHNESS
AND
MATCH MATERIALS FUNCTIONAL VALUES
WITH APPLICATION REQUIREMENTS
→
DRAFT ← SUGGEST CREEP RESISTANCE
AND
EXPLAIN
AND
ADD MATCHED MATERIALS TO THE LIST OF REJECTED
OR
ADD MATCHED MATERIALS TO THE LIST OF CANDIDATE

FIG. 16

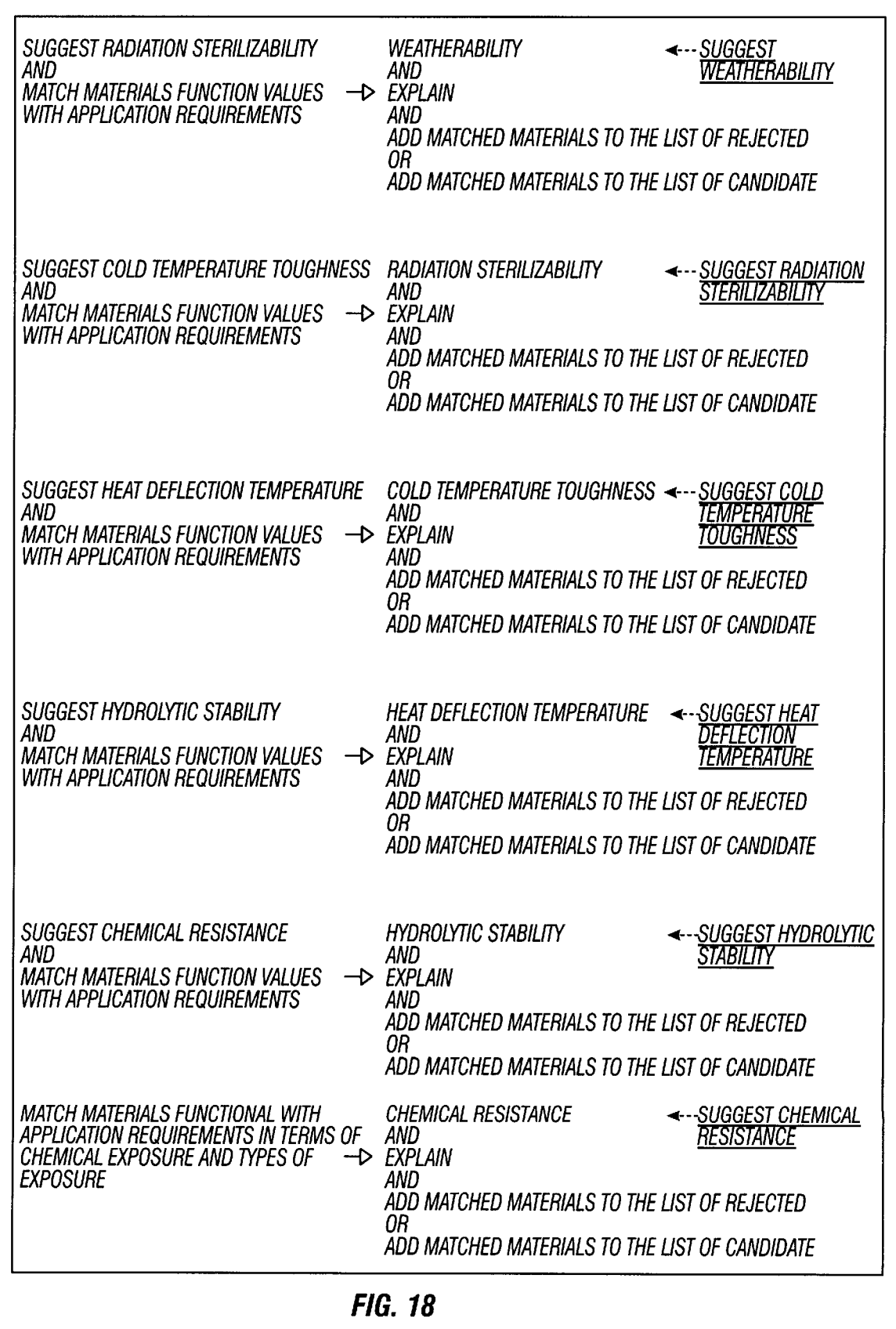

| | | |
|---|---|---|
| SUGGEST RADIATION STERILIZABILITY<br>AND<br>MATCH MATERIALS FUNCTION VALUES<br>WITH APPLICATION REQUIREMENTS → | WEATHERABILITY<br>AND<br>EXPLAIN<br>AND<br>ADD MATCHED MATERIALS TO THE LIST OF REJECTED<br>OR<br>ADD MATCHED MATERIALS TO THE LIST OF CANDIDATE | ← SUGGEST WEATHERABILITY |
| SUGGEST COLD TEMPERATURE TOUGHNESS<br>AND<br>MATCH MATERIALS FUNCTION VALUES<br>WITH APPLICATION REQUIREMENTS → | RADIATION STERILIZABILITY<br>AND<br>EXPLAIN<br>AND<br>ADD MATCHED MATERIALS TO THE LIST OF REJECTED<br>OR<br>ADD MATCHED MATERIALS TO THE LIST OF CANDIDATE | ← SUGGEST RADIATION STERILIZABILITY |
| SUGGEST HEAT DEFLECTION TEMPERATURE<br>AND<br>MATCH MATERIALS FUNCTION VALUES<br>WITH APPLICATION REQUIREMENTS → | COLD TEMPERATURE TOUGHNESS<br>AND<br>EXPLAIN<br>AND<br>ADD MATCHED MATERIALS TO THE LIST OF REJECTED<br>OR<br>ADD MATCHED MATERIALS TO THE LIST OF CANDIDATE | ← SUGGEST COLD TEMPERATURE TOUGHNESS |
| SUGGEST HYDROLYTIC STABILITY<br>AND<br>MATCH MATERIALS FUNCTION VALUES<br>WITH APPLICATION REQUIREMENTS → | HEAT DEFLECTION TEMPERATURE<br>AND<br>EXPLAIN<br>AND<br>ADD MATCHED MATERIALS TO THE LIST OF REJECTED<br>OR<br>ADD MATCHED MATERIALS TO THE LIST OF CANDIDATE | ← SUGGEST HEAT DEFLECTION TEMPERATURE |
| SUGGEST CHEMICAL RESISTANCE<br>AND<br>MATCH MATERIALS FUNCTION VALUES<br>WITH APPLICATION REQUIREMENTS → | HYDROLYTIC STABILITY<br>AND<br>EXPLAIN<br>AND<br>ADD MATCHED MATERIALS TO THE LIST OF REJECTED<br>OR<br>ADD MATCHED MATERIALS TO THE LIST OF CANDIDATE | ← SUGGEST HYDROLYTIC STABILITY |
| MATCH MATERIALS FUNCTIONAL WITH<br>APPLICATION REQUIREMENTS IN TERMS OF<br>CHEMICAL EXPOSURE AND TYPES OF<br>EXPOSURE → | CHEMICAL RESISTANCE<br>AND<br>EXPLAIN<br>AND<br>ADD MATCHED MATERIALS TO THE LIST OF REJECTED<br>OR<br>ADD MATCHED MATERIALS TO THE LIST OF CANDIDATE | ← SUGGEST CHEMICAL RESISTANCE |

FIG. 18

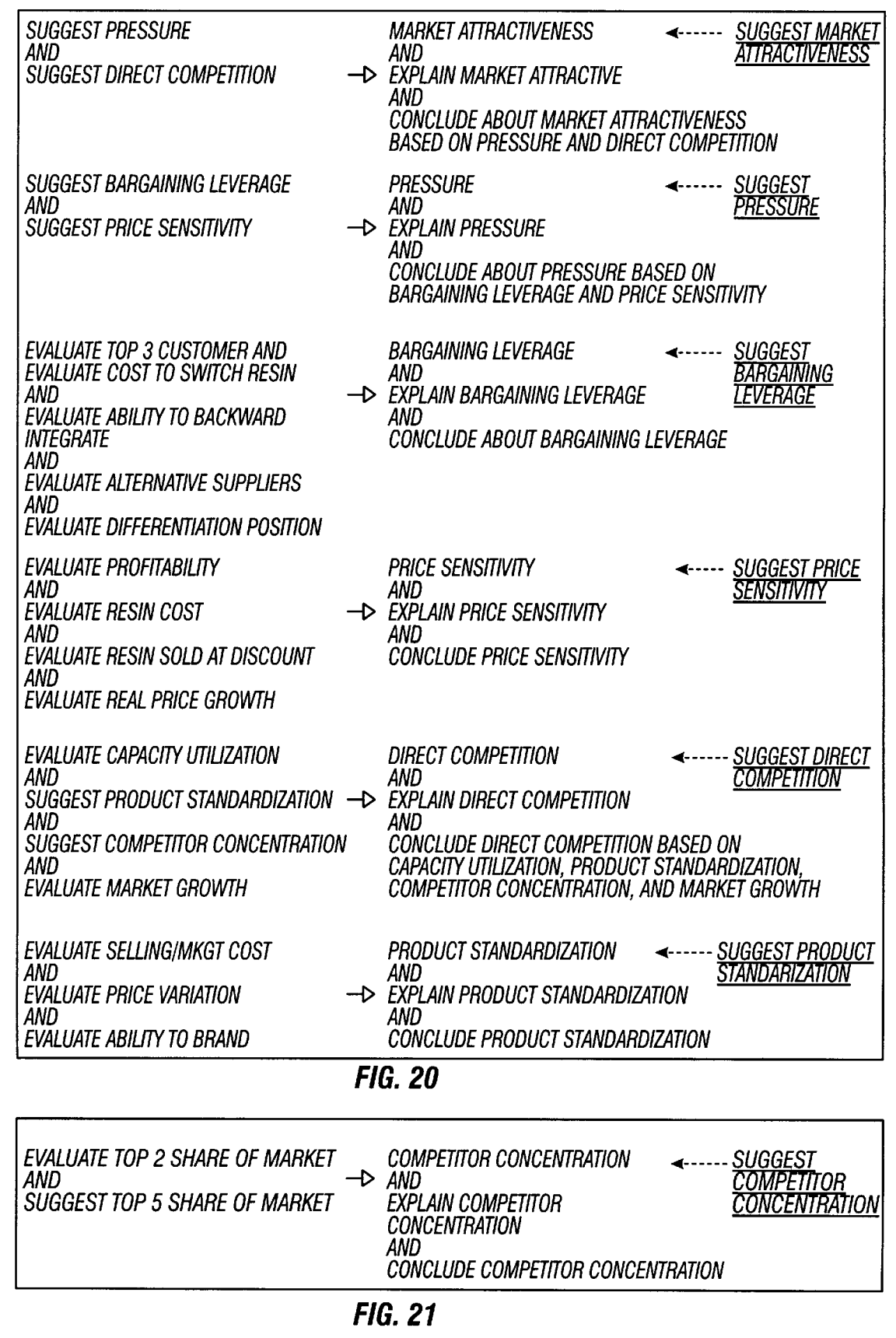

SUGGEST PRESSURE AND SUGGEST DIRECT COMPETITION → MARKET ATTRACTIVENESS AND EXPLAIN MARKET ATTRACTIVE AND CONCLUDE ABOUT MARKET ATTRACTIVENESS BASED ON PRESSURE AND DIRECT COMPETITION ←------ SUGGEST MARKET ATTRACTIVENESS

SUGGEST BARGAINING LEVERAGE AND SUGGEST PRICE SENSITIVITY → PRESSURE AND EXPLAIN PRESSURE AND CONCLUDE ABOUT PRESSURE BASED ON BARGAINING LEVERAGE AND PRICE SENSITIVITY ←------ SUGGEST PRESSURE

EVALUATE TOP 3 CUSTOMER AND EVALUATE COST TO SWITCH RESIN AND EVALUATE ABILITY TO BACKWARD INTEGRATE AND EVALUATE ALTERNATIVE SUPPLIERS AND EVALUATE DIFFERENTIATION POSITION → BARGAINING LEVERAGE AND EXPLAIN BARGAINING LEVERAGE AND CONCLUDE ABOUT BARGAINING LEVERAGE ←------ SUGGEST BARGAINING LEVERAGE

EVALUATE PROFITABILITY AND EVALUATE RESIN COST AND EVALUATE RESIN SOLD AT DISCOUNT AND EVALUATE REAL PRICE GROWTH → PRICE SENSITIVITY AND EXPLAIN PRICE SENSITIVITY AND CONCLUDE PRICE SENSITIVITY ←------ SUGGEST PRICE SENSITIVITY

EVALUATE CAPACITY UTILIZATION AND SUGGEST PRODUCT STANDARDIZATION AND SUGGEST COMPETITOR CONCENTRATION AND EVALUATE MARKET GROWTH → DIRECT COMPETITION AND EXPLAIN DIRECT COMPETITION AND CONCLUDE DIRECT COMPETITION BASED ON CAPACITY UTILIZATION, PRODUCT STANDARDIZATION, COMPETITOR CONCENTRATION, AND MARKET GROWTH ←------ SUGGEST DIRECT COMPETITION

EVALUATE SELLING/MKGT COST AND EVALUATE PRICE VARIATION AND EVALUATE ABILITY TO BRAND → PRODUCT STANDARDIZATION AND EXPLAIN PRODUCT STANDARDIZATION AND CONCLUDE PRODUCT STANDARDIZATION ←------ SUGGEST PRODUCT STANDARIZATION

FIG. 20

EVALUATE TOP 2 SHARE OF MARKET AND SUGGEST TOP 5 SHARE OF MARKET → COMPETITOR CONCENTRATION AND EXPLAIN COMPETITOR CONCENTRATION AND CONCLUDE COMPETITOR CONCENTRATION ←------ SUGGEST COMPETITOR CONCENTRATION

FIG. 21

| | | |
|---|---|---|
| 1) EXISTENCE OF OBJECTS (OR SEPARATE COMPONENTS) | TOTALLY ENCLOSED<br>PARTIALLY ENCLOSED<br>GO IN/OUT THE PART<br>NONE | ? |
| 2) ACCESS OF OBJECTS INSIDE THE PART NECESSARY DURING USE? | YES<br>NO | ? |
| 3) ORDER OF MAGNITUDE OF LARGEST OPENING COMPARED TO THE ORDER OF MAGNITUDE OF THE LONGER DIMENSION OF THE OF THE PART IS (IN A DIRECTION PERPENDICULAR TO THE OPENING) | ABOUT THE SAME<br>SMALLER | ? |
| 4) RELATION WITH A SOLID SUPPORTING SURFACE | NO CONTACT<br>PART SHAPE PROVIDES ORIENTATION<br>PART SHAPE DOES NOT PROVIDE ORIENTATION<br>ORIENTATION IS REQUIRED<br>ORIENTATION IS NOT REQUIRED | ? |
| 5) RELATION WITH OTHER OBJECT | PART SHAPE PROVIDES ORIENTATION<br>PART SHAPE DOES NOT PROVIDE ORIENTATION | ? |
| 6) AESTHETICS | NOT IMPORTANT<br>A FACTOR<br>VERY IMPORTANT | ? |
| 7) LOAD MAGNITUDE | LARGE<br>MEDIUM<br>SMALL | ? |

FIG. 81

ANALYSES RESULTS

?

| PROCESSES | FAMILIES | DEMINSION(IN) | WEIGHT(Lb) | COST/PART($) |
|---|---|---|---|---|
| STRUCTURE REACTION-INJECTION-MOLDING | SIRM-POLYURETHANE-30%GF | 0.1 | 0.09 | $3.64 |
| STRUCTURE REACTION-INJECTION-MOLDING | SIRM-POLYURETHANE-60%GF | 0.1 | 0.03 | $1.40 |
| THEROPLASTIC-INJECTION-MOLDING | ABS-18%GF | 0.1 | 0.03 | $0.38 |
| THEROPLASTIC-INJECTION-MOLDING | ABS-20%GF | 0.1 | 0.09 | $0.40 |
| THEROPLASTIC-INJECTION-MOLDING | ABS-30%GF | 0.1 | 0.1 | $0.43 |
| THEROPLASTIC-INJECTION-MOLDING | ABS-40%GF | 0.1 | 0.1 | $0.44 |
| THEROPLASTIC-INJECTION-MOLDING | ABS-HIHEAT | 0.1 | 0.03 | $4.32 |
| THEROPLASTIC-INJECTION-MOLDING | ABS-INJMOLD | 0.1 | 0.03 | $4.38 |
| THEROPLASTIC-INJECTION-MOLDING | ABS-IP | 0.1 | 0.09 | $4.34 |
| THEROPLASTIC-INJECTION-MOLDING | ABS-PLANING | 0.1 | 0.03 | N/DO |
| THEROPLASTIC-INJECTION-MOLDING | IOSPLAST-101-LGF40 | 0.1 | 0.11 | $8.56 |
| THEROPLASTIC-INJECTION-MOLDING | IOSPLAST-101-LGF60 | 0.1 | 0.12 | $8.62 |
| THEROPLASTIC-INJECTION-MOLDING | IOSPLAST-202-LGF40 | 0.1 | 0.11 | $8.65 |
| THEROPLASTIC-INJECTION-MOLDING | IOSPLAST-202-LGF60 | 0.1 | 0.12 | $8.62 |
| THEROPLASTIC-INJECTION-MOLDING | ICP-MARIGOLD | 0.1 | 0.1 | N/DO |
| THEROPLASTIC-INJECTION-MOLDING | TIPPO-MARIGOLD | 0.1 | 0.09 | $4.29 |
| THEROPLASTIC-INJECTION-MOLDING | NYLON-AMORPHOUS | 0.1 | 0.08 | N/DO |
| THEROPLASTIC-INJECTION-MOLDING | PC-ABS | 0.1 | 0.08 | $8.30 |
| THEROPLASTIC-INJECTION-MOLDING | PC-ABS-10%GF | 0.1 | 0.09 | $8.34 |
| THEROPLASTIC-INJECTION-MOLDING | PC-ABS-20%GF | 0.1 | 0.09 | $8.37 |
| THEROPLASTIC-INJECTION-MOLDING | PC-ABS-6 | 0.1 | 0.08 | $8.35 |
| THEROPLASTIC-INJECTION-MOLDING | PC-TRIPHOIDE | 0.1 | 0.03 | $8.35 |
| THEROPLASTIC-INJECTION-MOLDING | PC-06 | 0.1 | 0.09 | $8.35 |
| THEROPLASTIC-INJECTION-MOLDING | PC-SPECIAL | 0.1 | 0.09 | $8.35 |
| THEROPLASTIC-INJECTION-MOLDING | PC-BPS | 0.1 | 0.03 | N/DO |
| THEROPLASTIC-INJECTION-MOLDING | PC-PBT-10%GF | 0.1 | 0.03 | N/DO |
| THEROPLASTIC-INJECTION-MOLDING | PC-PBT-20%GF | 0.1 | 0.13 | N/DO |
| THEROPLASTIC-INJECTION-MOLDING | PC-PET | 0.1 | 0.09 | N/DO |
| THEROPLASTIC-INJECTION-MOLDING | PC-PET-10%GF | 0.1 | 0.09 | N/DO |
| THEROPLASTIC-INJECTION-MOLDING | PC-PET-20%GF | 0.1 | 0.1 | N/DO |
| THEROPLASTIC-INJECTION-MOLDING | PP-COPOLYMERS-20%GF | 0.1 | 0.07 | $0.19 |
| THEROPLASTIC-INJECTION-MOLDING | PP-COPOLYMERS-30%GF | 0.1 | 0.03 | $0.20 |
| THEROPLASTIC-INJECTION-MOLDING | PP-COPOLYMERS-40%GF | 0.1 | 0.09 | $0.31 |

*FIG. 101*

PROCESSES AND MATERIALS SELECTION KNOWLEDGE-BASED SYSTEM

This application claims priority benefit of copending U.S. Provisional Patent application No. 60/014,941, filed on Apr. 5, 1996.

BACKGROUND OF THE INVENTION

1. Field of the Invention

The present invention relates to an apparatus and methods for the design and economic analysis of new durable goods based on knowledge of the durable good of interest, the plastics materials and processes to be used, and cost, market, and market share information.

More particularly, the present invention relates to apparatus, systems and methods for computer-aided design of new durable good from knowledge of the durable good of interest, the durable good's shape and size, using a shape selection protocol, the materials and/or processes for a particular durable goods application, and information related to determining the economics thereof. In even another particular, the present invention relates to a computer software system for the selection of materials and/or processes for a particular durable goods application, and for determining the economics thereof.

2. Description of the Related Art

The identification of business opportunities and the selection of the appropriate materials and fabrication processes for a "durable goods" application require knowledge which spans various domains of expertise. Business opportunity identification requires understanding of multiple industries, various market conditions, general business environment, and technical dimensions of various applications.

Selection of suitable materials and fabrication processes involve knowledge about strengths and weaknesses of fabrication processes, materials properties, mechanical design, and the shape and size of the durable good to interest. Selection of a suitable durable goods using a selected material, manufactured by a suitable fabrication processes also requires an economic analysis to determine whether the newly developed durable good has the necessary economics to make a viable new product for the markets place.

A person possessing the knowledge and skill to accurately and quickly identify business opportunities and select the appropriate materials and fabrication processes for a "durable goods" application would indeed be an expert. While such a person may exist, it is desirable to provide an apparatus incorporating a memory, a central processing unit, a display device and an user interface incorporating a computer based intelligent system to accurately and quickly identify business opportunities and select the appropriate materials and fabrication processes for a "durable goods" application.

U.S. Pat. No. 3,626,377, issued Dec. 7, 1971 to Markley, discloses a matrix generator for use in solving feed formulation problems. As disclosed, a matrix is developed in a matrix register, which is a logic array of component storage locations or registers for holding an organization of data relating to nutrients and ingredients. The specification of nutrients and ingredients for a desired feed is registered as two columns in the matrix register, from which the system operates to complete the entire matrix with information from an ingredient storage means which contains nutrient information on various specific ingredients.

U.S. Pat. No. 3,560,725, issued Feb. 2, 1971 and U.S. Pat. No. 3,628,004, issued Dec. 14, 1971, both to Claxton et al., both disclose a special purpose analogue computer designed for optimization of the ingredient levels of a rubber compound. The physical characteristics of a particular rubber compound may be closely approximated by a general empirical model equation expressed in terms of the ingredients. By analysis of raw experimental data relating to the physical characteristics of interest, a different set of influence coefficients for the general equation terms may be determined for each physical characteristic, whereby a number of special model equations are obtained. U.S. Pat. No. 5,260,882, issued Nov. 9, 1993 to Blanco et al., discloses a process a computer driven process for the estimation of physical and chemical properties of a proposed polymeric or copolymeric substance or material. The process for estimating generally involves defining the molecular chemical composition, estimating properties of the molecular chemical composition when 3-d folded, and forming the composition into a polymeric cluster, and the estimating the physical properties of the polymeric cluster.

U.S. Pat. No. 5,424,954, issued Jun. 13, 1995 to Makishima, discloses a computer-aided glass composition design apparatus and method. The disclosed algorithm includes a memory device having stored therein glass component compound data and glass physical property data, and includes a display device for initially displaying a plurality of glass component compounds from among the glass component data. Using an input device, a glass composition is selected from among the displayed glass components. The glass physical property data is processed to approximate at least one physical property of the selected glass composition. Alternately, the glass physical properties themselves are displayed and values assigned thereto, and the component processed to obtain a glass composition having approximated physical property values in accordance with the selected physical property values.

U.S. Pat. No. 5,463,564, issued Oct. 31, 1995 to Agrafiotis et al., discloses a system and method of automatically generating chemical compounds with desired properties. The system is a computer based, iterative process for generating chemical entities with defined physical, chemical and/or bioactive properties. During each iteration of the process, (1) a directed diversity chemical library is robotically generated in accordance with robotic synthesis instructions; (2) the compounds in the directed diversity chemical library are analyzed to identify compounds with the desired properties; (3) structure-property data are used to select compounds to be synthesized in the next iteration; and (4) new robotic synthesis instructions are automatically generated to control the synthesis of the directed diversity chemical library for the next iteration.

Jovanovic et al., "ESR—A Large Knowledge-Based System Project of European Generation Industry", Expert Systems With Applications, Vol. 5, pp. 465, 477 (1993), discloses a knowledge-based system with three generic Windows applications that communicate between each other dynamically using dynamic linked library or dynamic data exchange.

However, in spite of these advancements in the prior art, none of these prior art references disclose or suggest a system for the design and economic analysis of new durable goods concepts using a computer based knowledge system that will utilizes selected processes and materials for a durable goods application, its size and shape or design and a economic set of selected economic factors. Thus, these is still a need for a system for the selection of processes and materials for a durable goods application, and that will also provide an economic analysis.

SUMMARY OF THE INVENTION

It is an object of the present invention to provide for a system for the selection of processes and materials for a durable goods application, and that will also provide an economic analysis.

The present invention further provides an apparatus including a processing unit, a memory containing types of durable goods, durable goods manufacturing materials, material properties information, processes and processing information, economic information and other relevant information, an user interface, and a set of memory based instructions for durable goods size and shape and type selection so that new durable goods can be designed and analyzed economically.

This and other objects of the present invention will become apparent to those of skill in the art upon review of this specification, including its drawings and claims.

The Processes And Materials Selection (PAMS) system of the present invention is a hybrid knowledge-based system composite requiring three main functions: (1) an expert system function; (2) a user interface function; and (3) a model and database function. It is to be understood that these three functions can be implemented utilizing any combination of one or more programs.

In a first embodiment of the invention, referred to herein as "SYS1", these three functions are implemented utilizing three software programs, Assymetrix ToolBook for the graphical user interface ("GUI"), Microsoft Excel for the model and database function, and Neuron Data Nexpert Object for the expert system function.

In a second embodiment of the present invention, referred to herein as "SYS2", the expert system function, a user interface function, and a model and database function are implemented utilizing two software programs. Again, Microsoft Excel is utilized to implement the model and database function, and ART*Enterprise is utilized to implement both the graphical user interface function and the expert system function.

The present invention also provides a method, stored in a computer memory and implemented in a computer central processing unit, for determining the shape and size criteria for a durable good so that material and processing information can be utilized with economic data to predict commercial and economic feasibility.

BRIEF DESCRIPTION OF THE DRAWINGS

FIGS. 10, and 12–18, show high level representations of the inference chains and prototypes for the Processes and Materials Selection Module, with the legend for those figures provided in FIG. 11.

FIGS. 19–38 provided a high level illustration of inference chains, events and prototypes for the Opportunity Identification Module.

FIGS. 76 and 81 illustrate the screen triggered from menu item "overall shape".

FIGS. 82 to 109 show the screen outputs for the SYS2 embodiment of the present invention.

FIG. 82 shows a screen related to applications.

FIG. 83 shows a screen related to surface, application functional requirements.

FIG. 84 shows a screen related to shape, application functional requirements.

FIG. 85 shows a screen related to miscellaneous, application functional requirements.

FIG. 86 shows a screen related to mechanical, application functional requirements.

FIG. 87 shows a screen related to environmental legal, application functional requirements.

FIG. 88 shows a screen related to environment, application functional requirements.

FIG. 89 shows a screen related to processes and materials selection, results.

FIG. 90 shows a screen to override the processes and materials selection.

FIG. 91 shows a screen related to candidate material with a compatible, candidate process manually rejected.

FIG. 92 shows a screen related to manually selected, rejected materials with no compatible, candidate processes.

FIG. 93 shows a screen related to processes and materials selection.

FIG. 94 shows a screen related to economics.

FIG. 95 shows a screen related to economics, general user input.

FIG. 96 shows a screen related to grade families compatible with a process.

FIG. 97 shows a screen related to compatible grades families for SRIM.

FIG. 98 shows a screen related to compatible grades families for TIM and SRIM.

FIG. 99 shows a screen related to process specific, user input request.

FIG. 100 shows a screen related to family specific, user input request.

FIG. 101 shows a screen related to processes economic analyses results.

FIG. 102 shows a screen related to processes economic models.

FIG. 103 shows a screen related to mechanical analyses, overall stiffness.

FIG. 104 shows a screen related to overall stiffness calculation.

FIG. 105 shows a screen related to standard shape and shell plate models.

FIG. 106 shows a screen related to GUI for the rectangular plate with edges simply supported.

FIG. 107 shows a screen related to families dimensions results.

FIG. 108 shows a screen related to overview of windowing environment for mechanical analyses.

FIG. 109 shows a screen related to mechanical models.

DETAILED DESCRIPTION OF THE INVENTION

I. Overview

Figure 1:
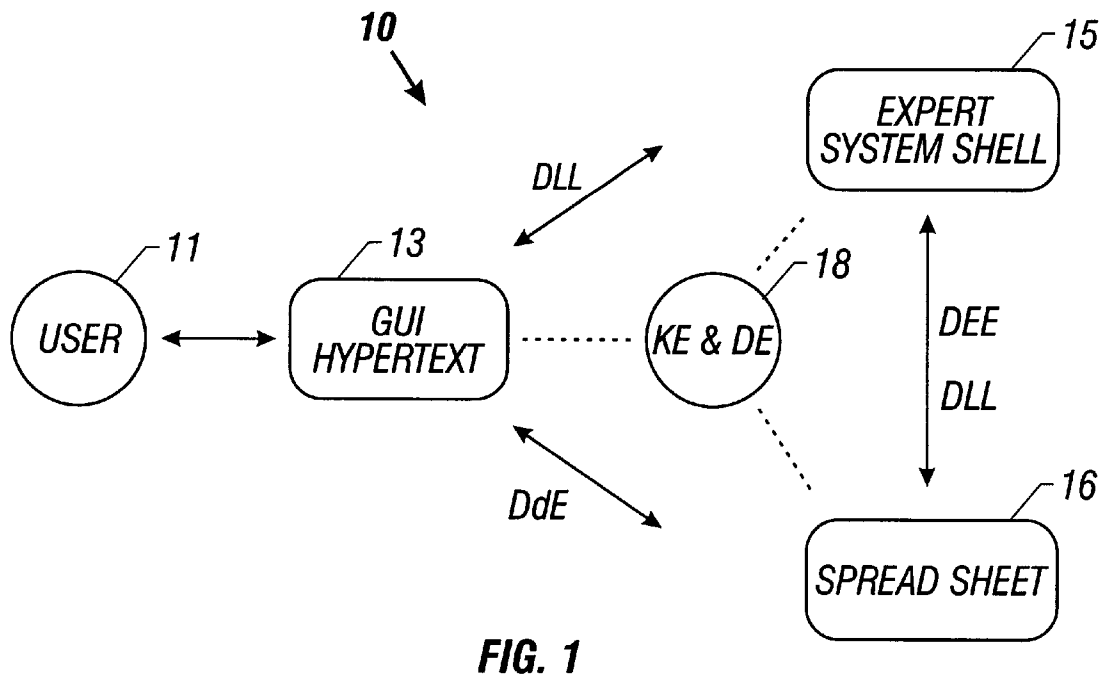
FIG. 1 is a schematic showing an overview of the communication system 10 used within the both the SYS1 SYS2 embodiments of the present invention, showing the relationship between the user 11, a graphics user interface 13, an expert system shell 15, a spreadsheet 16, a knowledge engineer (KE) and a domain expert (DE) 18.

In a durable goods application, the knowledge required to understand technical and business needs, identify business opportunities, and select the best materials and fabrication processes for a "durable goods" application, spans multiple product lines and various technologies. The different forms of knowledge include symbolic reasoning, numerical computing, and data storage and retrieval. Different programming tools are needed for modeling these various forms of knowledge and providing adequate system functions.

As a result, the Processes And Materials Selection (PAMS) system of the present invention is a hybrid knowledge-based system composite requiring three functions: (1) a user interface function (discussed in detail in section III below); (2) an expert system function (discussed in detail in section IV below); and (3) a model and database function (discussed in detail in section V below). It is to be understood that the functions of the present invention may be implemented by any combination of one or more programs, including non-commercial and commercially available programs.

In a first embodiment of the invention, referred to herein as "SYS1", these three functions are implemented utilizing three commercially available software programs, ToolBook for the graphical user interface ("GUI"), Microsoft Excel for the model and database function, and Nexpert Object for the expert system function.

Within the framework described above, the PAMS SYS1 of the present invention features: a graphical user interface; an opportunity identification sub-system; a selection procedure for selecting appropriate processes based on application requirements with an explanation of how conclusions were reached; a selection procedure for choosing adequate classes of materials based on application requirements, functional values, and application domains with an explanation of the selection process; a procedure for running several mechanical models (standard shapes) for common grades of materials; a procedure for providing IBIS Associates economic models for limited processes; and an integrated database of engineering properties of various materials.

In a second embodiment of the present invention, referred to herein as "SYS2", the expert system function, a user interface function, and a model and database function are implemented utilizing two commercially available software programs. Basically, with SYS2, the functions of SYS1 have been further refined. The opportunity analysis was not implemented in SYS2, but SYS2 provides a more robust shape selection protocol, whereas in SYS1 the user must select the shape from a limited number of predefined shapes. Again, Microsoft Excel is utilized to implement the model and database function, and ART*Enterprise is utilized to implement both the graphics user interface function and the expert system function.

PAMS-SYS2 is a later version of the SYS1 embodiment and adds: a shape selection/decomposition module to help determine the shape and the features (e.g., holes, ribs) required for an application, as well as, providing the possible decomposition of the application shape into simpler shapes; a completed and refined knowledge base related to application requirements, processes characteristics and materials functional values; shell/plates mechanical models; a completed and integrated engineering properties database with the mechanical and economic models; more IBIS Associates economic models for more processes where the models are normalized to allow for meaningful comparisons between scenarios; and an enhanced and more flexible procedure for accessing the various functions of the system; and the ability to play "what if" scenarios.

Broadly, for both embodiments, spreadsheets perform numerical computing, and store and retrieve data. The expert system shell captures the decision making process and performs symbolic computing on the indicated information; while hypertext/graphical software implements a graphical user interface.

It is preferred that the system utilized be highly modular. For example, mechanical and economic models are contained in or correspond to different spreadsheets, macro sheets, or workbooks; materials functional values and processes characteristics are stored in separate databases; the opportunity identification procedure, the selection of processes procedure and the selection of materials procedure correspond to distinct knowledge bases; and the graphical user interface is divided into meaningful sections, windows or window groups. For both embodiments, these various applications communicate between each other using dynamic data exchange (DDE) or dynamic linked libraries (DLL) or a combination thereof FIG. 1 is a schematic showing an overview of the communication system 10 used within the both the SYS1 and SYS2 embodiments of the present invention. This figure shows the relationship between the user 11, interface 13, expert system shell 15, spreadsheet 16 and the knowledge engineer and the domain expert 18. Graphic user interface 13 communicates with the expert system shell 15 utilizing dynamic linked libraries (DLL), and the with spreadsheet 16 utilizing dynamic data exchange (DDE). Communication between the expert system shell 15 and the spreadsheet 16 requires both dynamic linked libraries and dynamic data exchange.

Figure 2:
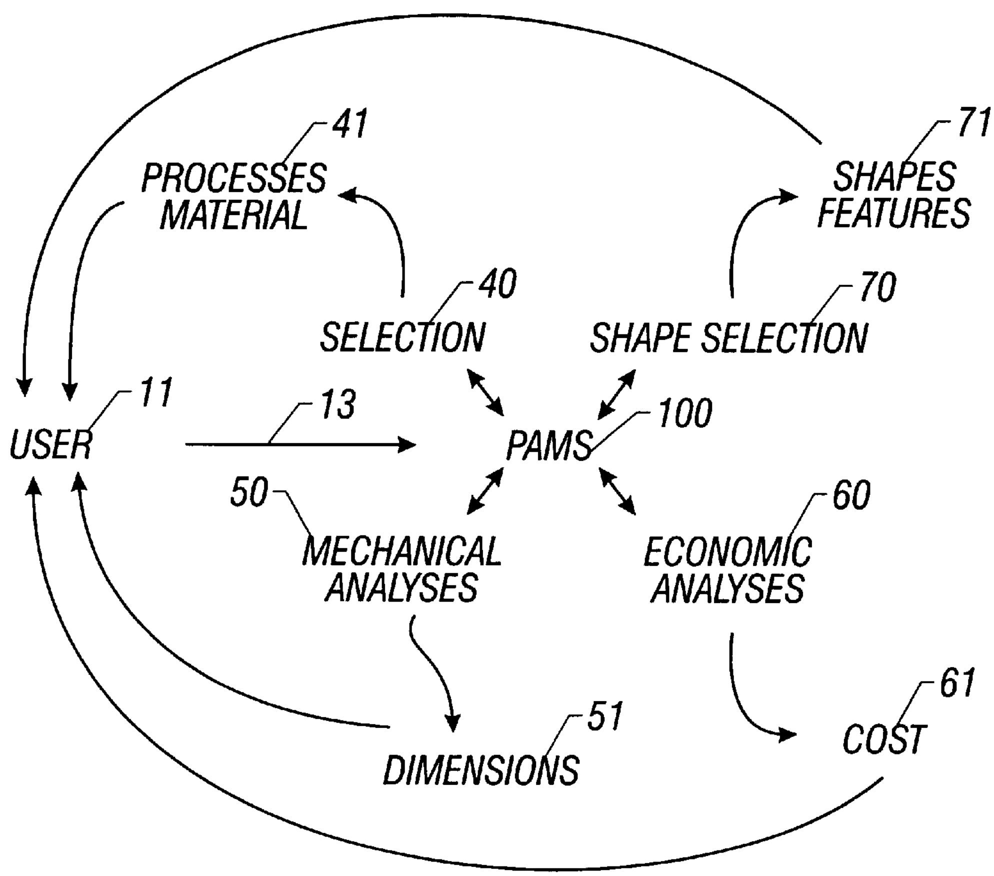
FIG. 2 is a schematic map of information flow for both the SYS1 and the SYS2 embodiment during a consultation, showing that user 11 may access the four major functions of the SYS2 embodiment 100, the selection function 40, the mechanical analysis function 50, the economic analysis function 60, or the shape selection function 70 (SYS2 only), in any order, or in any type of combination, to obtain information regarding processes or materials 41, dimensions 51, cost 61, or shapes and features 71.

FIG. 2 is a schematic map showing information flow for both the SYS1 and the SYS2 embodiment of the present invention during a consultation. As shown in FIG. 2, user 11 may access the four major functions of the PAMS system 100, the selection function 40, the mechanical analysis function 50, the economic analysis function 60, or the shape selection function 70, in any order, or in any combination, to obtain information regarding processes or materials 41, dimensions 51, costs 61, or shapes and features 71.

During a consultation session, the system state changes to take into account user input via the user interface 13 and previous conclusions or states. Conveniently, what has been done previously affects what will happen next. Of course, although graphics user interfaces are more conducive to window based applications, other type of interfaces can be used as well which do not utilize graphics.

II. System Hardware & Software

It is to be understood that the present invention may be implemented utilizing any suitable computer or computing environments, including mainframes, minicomputers, workstations, networked computers, and desktop and notebook computers of both the PC and Macintosh type, or the present invention can be implemented on a networked client server. Presently, both the SYS1 and the SYS2 embodiments developed by the inventors are implemented on a PC type desktop computer.

In the practice of the present invention, the minimum system requirements for implementation of SYS1 on a PC type computer, besides the software providing the graphical user interface function and the expert system functions, are as follows:

| | |
|---|---|
| Hardware | |
| Processor | 486 or equivalent computer |
| RAM: | 4 Mb |
| Disk Space: | 7.1 Mb (for PAMS) |
| Monitor | VGA or Super VGA (with 256-color display) |
| Software | |
| Operating System: | DOS 5.0 or later |
| Windowing System: | Microsoft Windows 3.1 |

SYS2 is a later version of SYS1, and has slightly different minimum system requirements as follows:

| | |
|---|---|
| Hardware | |
| Processor | 486 or equivalent computer |
| RAM: | 16 Mb |
| Disk Space: | 40 Mb (for PAMS) |
| Monitor | VGA or Super VGA (with 256-color display) |
| Software | |
| Operating System: | DOS 5.0 or later |
| Windowing System: | Microsoft Windows 3.1 in enhanced mode with 40 Mb permanent swap space. |
| WIN32 | (allows 32 bit applications to run under Windows 3.1) |

Table 1 provides the functions, sizes, and software for the principal files of the PAMS-SYS1 embodiment of the present system. Of course, the SYS2 system utilizes ART*Enterprise for the graphical user interface and expert systems functions, instead of both ToolBook and Nexpert Object, and some of the file sizes have grown to reflect increases in the database size.

TABLE 1

Files for PAMS SYS1

| Topics | Files | Size (b) | Software | Functions |
|---|---|---|---|---|
| GUI | SYS1.tbk | 2428943 | ToolBook | GUI |
| Reasoning | OA.ckb | 627078 | Nexpert Object | Opportiinity Analyses |
| | Selector.ckb | 492550 | | Selection of Processes and Materials |
| | Models.ckb | 39025 | | Analyses for Grades of Materials |
| Models | Inject1.xlu | 130031 | Microsoft Excel for Windows | IBIS Associates Technical Cost Models |
| | Diecast1.xlu | 139441 | | IBIS Associates Technical Cost Models |
| | Econom1.xls | 49480 | | In-house Economic Models |
| | MechSYS1.xlw | 109515 | | Mechanical Models |
| Databases | ProcSYS1.slk | 23909 | Microsoft Excel for Windows | Processes Characteristics |
| | MatSYS1.slk | 57651 | | Materials Functional Values |
| | EngSYS1.slk | 25962 | | Engineering Properties |

III. Graphical User Interface (GUI)

It is desired that the user interface be user friendly, relatively easy to operate, and be suitable to accommodate the large amount of human-computer interactions expected. Thus, it is preferred to utilize a graphical user interface with pull-down menus, that is driven by, for example, a mouse or other such pointer device, such as a roll ball, track ball, finger pad, finger stick, and the like.

Referring again to FIG. 1, the SYS1 GUI module 13 communicates with the other modules 15 and 16 through dynamic link libraries (DLL) and dynamic link exchange (DDE). It is generally desired that GUI 13 provides: (1) dynamic link libraries to bridge the expert system shell and allow for call back from the inference engine through the GUI 13; (2) a friendly and flexible, English like, object-flavored script language which includes message handlers; (3) a wide variety of graphical objects (also referred to herein as "widgets"); and (4) a mouse with control options for performing selecting and positioning tasks.

Commercial GUI programs exist, and any suitable program may be utilized. Examples of suitable GUI programs include ToolBook, Plus, Hypercard (for MAC), Supercard, and MS Visual Basic.

In the SYS1 embodiment of the present invention developed by the inventors, the GUI is implemented with a graphical, hypertext software (ToolBook 1.53) which runs under Microsoft Windows 3.1 or higher. SYS2 utilizes the expert system software ART*Enterprise having an incorporated GUI module. While SYS1 and SYS2 utilize different programs for the GUI, the screens faced by the user appear essentially identical. The GUI of the present invention will generally be explained by reference to SYS1, with important SYS2 exceptions noted where appropriate.

The SYS1 GUI developed by the inventors, is highly modular, being divided in input, output, script, and communication sections. Only the input and output sections are visible to the user. In addition, the preferred SYS1 GUI developed by the inventors is structured according to the following ToolBook objects events-driven hierarchy:

1. The book.
2. The backgrounds of the book.
3. The widgets of the backgrounds.
4. The pages of the background pages.
5. The pages of the backgrounds.
6. The widgets of background pages.
7. The book pages.
8. The widgets of the book pages.

The book level contains handlers that determine the general behavior of the SYS1 GUI (e.g., window size, menu bar, or menu items) and the implements communication with the SYS1 expert system shell Nexpert Object 2.0B, the help routines of the windowing software, Help for Microsoft Windows, and the spreadsheet program Microsoft Excel 4.0 (e.g., launching of applications, Excel Macro executions, Nexpert Object inference engine controls). In particular, it contains generic handlers for the dynamic linked library and the dynamic data exchange with Nexpert Object and Microsoft Excel, respectively.

Figure 3:
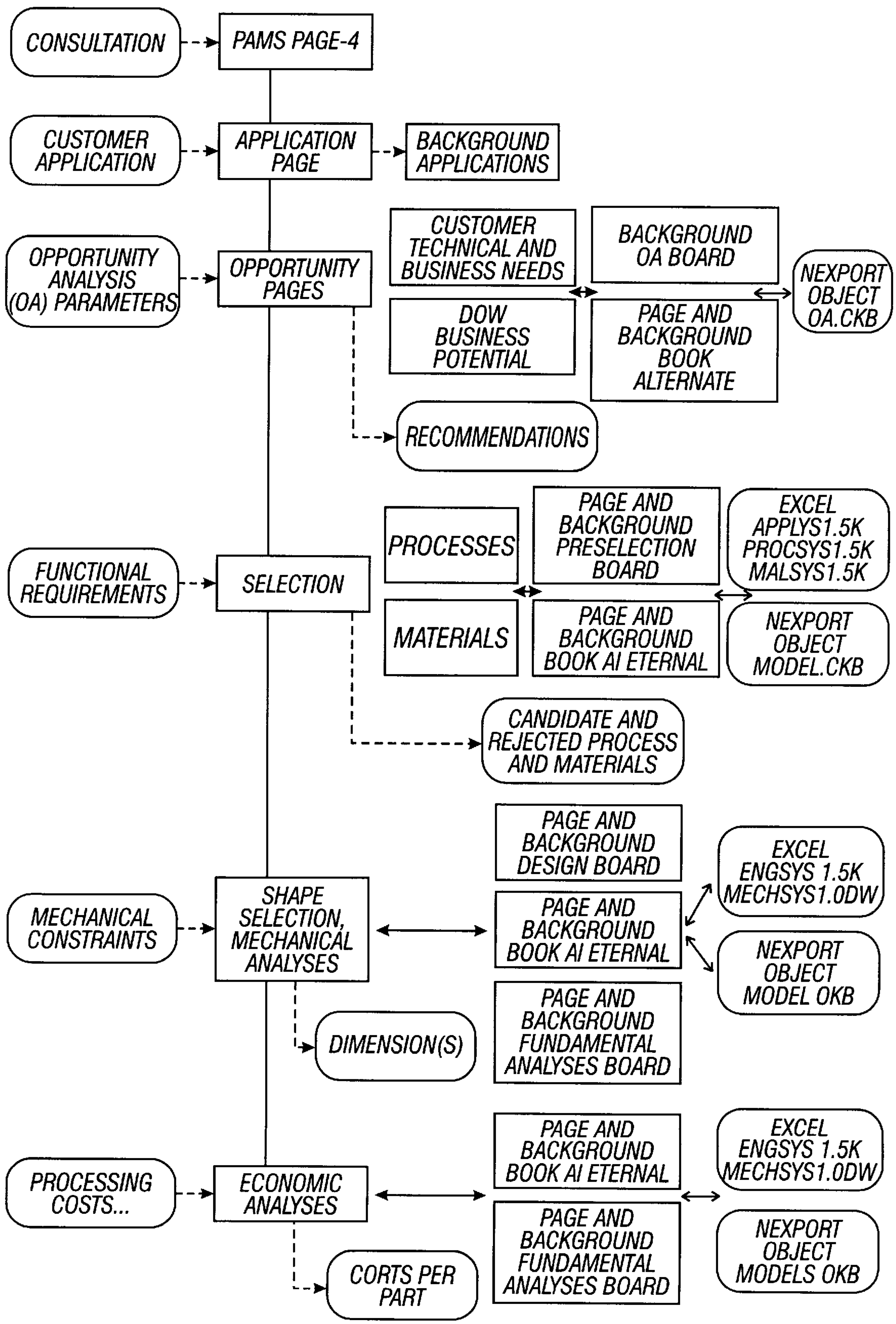
FIG. 3 represents a conceptual map of the structure and information flow for the book level of the SYS1 embodiment using the GUI 13.
Figure 4:
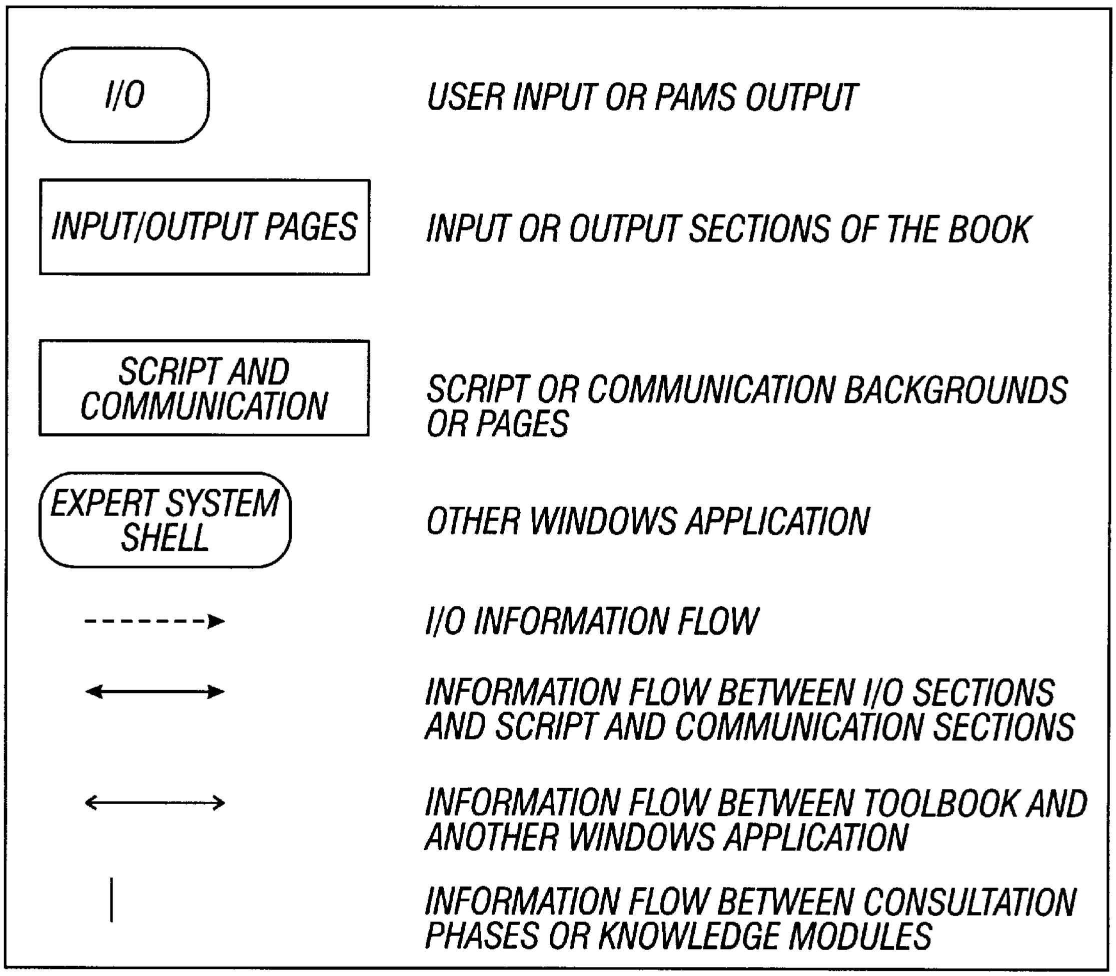
FIG. 4 provides the legend for FIG. 3.

FIG. 3 represents a conceptual map of the structure and information flow for the book level of the SYS1 embodiment GUI, with FIG. 4 providing the legend for FIG. 3. User defined handlers and functions are attached to the various objects and message-sending through the hierarchy defines the behavior of the SYS1 GUI. The following Table 2 summarizes the functions for each section of the SYS1 GUI developed by the inventors.

The inventors do note that ToolBook has somewhat limited portability to various platforms, and the serial communication between Nexpert Object and ToolBook through the dynamic linked library is somewhat inefficient. Thus, it would be preferred to port the GUI function to a multimedia tool available on multiple platforms or to move it to a graphical tool kit integrated with the expert system shell. Most preferred is a portable, integrated to the expert system shell, object-oriented graphical tool kit to reduce the implementation effort of the GUI and facilitate portability and maintenance. Many of these concerns are addressed in the SYS2 embodiment, which utilizes ART*Enterprise. Commercially available multimedia tools suitable for use in the present invention, and which have greater portability than ToolBook include OIT (open interface toolkit) from Neuron Data.

TABLE 2

Modularity

The GUI itself is highly modular. It is divided in input, output, script, and communication sections. Only the input and output section are visible to the user. Table summarizes the functions for each section of the GUI.

GUI Sections

| Types | Sections (i.e., Backgrounds) | Functionality | Pages |
|---|---|---|---|
| Input | PAMS | Welcome | 1 |
| | Applications | Select a “durable goods” application. | 1 |
| | Part Specifications | Enter part functional requirements. | 5 |
| | Design | Select shape, enter mechanical constraints. | 17 |
| | Opportunity | Provide opportunity analyses information. | 14 |
| Output | Opportunity | Give recommendations. | 3 |
| | Selection | List candidate and rejected, processes and materials. | 2 |
| | Analyses | List results of mechanical and economic analyses. | 1 |
| | Advisor | Not functional yet! | 1 |
| Script | Data | Look at the databases. | 1 |
| | Models | Look at the mechanical and economic spreadsheets. | 1 |
| | BookAlternate | Control Nexpert Object (DLL handlers) and Microsoft Excel (DDE handlers). Include functions for the explanation utility. | 1 |
| | ScriptAlternate | Contain general functions and handlers for pages and widgets. Link the I/O backgrounds to the Communication backgrounds. | 1 |
| | ApplicationsAlternate | Define levels of market cuts | 1 |
| | UtilitiesAlternate | Contain functions and message handlers for the utilities. | 1 |
| Communication | OABoard | Map I/O between ToolBook and Nexpert Object. | 1 |
| | PreSelectionBoard | Map I/O between ToolBook and Nexpert Object. Include functions for the explanation utility. | 93 |
| | DesignBoard | Map I/O between ToolBook, Nexpert Object, and Microsoft Excel. Control Microsoft Excel. | 1 |
| | FundamentalAnalysesBoard | Contain functions for mechanical and economic results. | 1 |
| | AdvisorBoard | Not functional yet! | 7 |

In the SYS1 embodiment, in order to address maintenance issues, attention has been paid to balancing modularity and granularity. The SYS1 GUI is modular, but not to the extent of being granular. The SYS1 GUI has a multi-board structure where private conversations are allowed. Each background of the communication section as listed in the above Table 2, can be used as a blackboard. Although the SYS1 GUI implements the scheduler of this multi-board architecture, not all the communication goes through the GUI and private communication between the spreadsheet and the expert system shell takes place.

Commercial programs also are available which incorporate both an expert system and a GUI. For example, besides ART*Enterprise, Level5 Object 3.0 available from Information Builders, Inc., provides an expert system with rules, forward and backward chaining logic, and very limited object oriented processing, and an integrated graphical tool kit. As another example, ART-IM 4.0, SmartElements from Neuron Data, provides an expert system with rules, forward and backward chaining, pattern matching, non monotonic reasoning, full object oriented capabilities, and an object oriented graphical tool kit, and portable scripting language capabilities.

It is desirable to design the system to make the input and output screens as user friendly as possible. Preferably, the following issues are considered in designing the screens: to (1) consistency of color, font, shape, and style; (2) specificity of meaning for widget, font, and color; (3) cleanness and clarity of display; (4) amount of information displayed directly; (5) amount of context sensitive detail; and (6) visual fitness and understanding, preferably top to down and left to right.

The following Tables 3–15 describe the important message handlers and scripts for all the sections of the SYS1 GUI as listed in Table 2, above.

TABLE 3

The Book
Book Handlers

| Handlers | Functionality |
|---|---|
| enterBook | set system variables, clear fields, reset button labels, size window<br>link Nexpert Object DLL, user defined DLL to Nexpert Object<br>link Window help DLL, ToolBook dialog box DLL<br>run Excel and load workbook |
| leaveBook | unlink DLL<br>quit Excel |
| DDEExcelRun theStr, nAtoms, theAtoms | execute Excel macro<br>DDE to Excel: get "[activate(" & quote & theStr & quote & ")]"<br>executeRemote it application Excel topic system |
| DDEExcelPoke theStr, nAtoms, theAtoms | poke the value VValue of the Nexpert Object slot (theAtoms) to Excel cell MyCell using TBK_GetAtomFromList and NXP_GetAtomInfo and continue inferencing<br>DDE to Excel: setRemote MyCell to VValue application Excel topic theTopic |
| DDEExcelRequest theStr, nAtoms, theAtoms | request the value of Excel cell MyCell, volunteer to a Nexpert Object slot, and continue inferencing using put TBK_GetAtomFromList and get NXP_Volunteer<br>DDE to Excel: getRemote MyCell application Excel topic theTopic |
| author | request a password to switch to developer mode |
| enterComments | message handler for the "Enter Comments" menu item<br>get showCommentsScreen(the name of this page,VKeepComments of this page,GCo,"EnterComments") of page UtilitiesAlternate |
| SaveAllComments | message handler for the "Save All Comments" menu item<br>get cancelCommentsScreen(the name of this page,VKeepComments of this page,GCo) of page UtilitiesAlternate |
| Questionnaire | message handler for the "Questionnaire" menu item<br>DDE to Excel to load, run, save, and close the workbook Question.XLW |
| Database | DDE to Excel to load, run, save, and close the engineering properties database |
| TestCases | message handler for the "Test Cases" menu item<br>DDE to Excel to load, run, save, and close the worksheet Verify.XLS |
| PAMS | message handler for the "PAMS" menu item<br>get theInformationDisplayed(the name of this page,"",GAbout, "&PAMS") of page UtilitiesAlternate |
| AboutPAMS | message handler for the "About PAMS" menu item<br>get theInformationDisplayed(the name of this page,"",GaboutPAMS, "&About PAMS") of page UtilitiesAlternate |
| Team | message handler for the "Team" menu item<br>get theInformationDisplayed(the name ot this page,"",GTeam, "&Team") of page UtilitiesAlternate |

TABLE 4

Book Handlers (Continued)

| Handler and Script | Functionality |
|---|---|
| Sponsors | message handler. for the "Sponsors" menu item<br>get theInformationDisplayed(the name of this page,"",GSponsors, "&Sponsors" ) of page UtilitiesAlternate |
| ReferenceManual | message handler for the "Reference Manual" menu item<br>use windows DLL winHelpIndex(sysWindowHandle, ReferenceManualFile, 3, 0) and winHelpKey(sysWindowHandle, ReferenceManualFile, 257,it) |
| UserGuide | message handler for the "User Guide" menu item<br>use windows DLL winHelpIndex(sysWindowHandle, |

TABLE 4-continued

| Book Handlers (Continued) | |
|---|---|
| Handler and Script | Functionality |
| | UserGuideFile,3,0) and winHelpKey(sysWindowHandle, UseGuideFile,257,it) |
| general | message handler for the "General Help" menu item<br>get displayHelp(the name of this page,theText, GHelp, general) of page UtilitiesAlternate |
| restartPAMSConsultation | go to first page of the book<br>restart knowledge base (Nexpert Oblect's inference engine) |
| restartPAMS | go to first page of the book<br>get UnLoadKnowledgeBase of background BookAlternate |
| ALH code, str | bring different type of dialog boxes for Nexpert Object call-back (e.g., information, end of session)<br>use message handlers to buttons BMessageHandleDiatogBoxOk, BMessageHandleDialogBoxEOS, or BMessageHandleDialogBoxCONTINUE of background UtilitiesAlternate |
| QH theAtom, theQuestion | bring different type of dialog boxes for Nexpert Object data request call-back, depending of the data type<br>use message handlers BMessageHandleDialogBoxMList and BMessageHandleDialogBoxList of background UtilitiesAlternate<br>utilize ask and request handlers |
| Generic theStr, nAtoms, theAtoms | a user-defined generic handler to transfer information from Nexpert Object to ToolBook<br>depending on theCode (last word of theStr), get:<br>explain(theText,nAtoms,theAtoms) of page BookAlternate, results(theText,nAtoms,theAtoms) of page BookAlternate, prepare TheLists(theText,nAtoms,theAtoms) of background PreSelectionBoard, theLists(theText,nAtoms,theAtoms) of background PreSelectionBoard, explanationToBoard(theText,nAtoms,theAtoms) of page PreSetectionBoard, listMechResults(theText,nAtoms,theAtoms,Materials,Analyses) of background FundamentalAnalysesBoard, listEconResults(theText,nAtoms,theAtoms,Processes,Analyses) of background FundamentalAnalysesBoard, listTheGrades(theText,nAtoms,theAtoms,Grades,Grades) of background DesignBoard |

TABLE 5

| Book Handlers (Continued) | |
|---|---|
| Handler and Script | Functionality |
| HourGlass theStr, nAtoms, theAtoms | modify the mouse cursor shape as appropriate |
| PreSelectionOfProcessesAnd Materials | message handler for the "PreSelection of Processes and Materials" menu item<br>clear appropriate fields reset menu and button captions for the new consultation<br>set system variables and update the bottom status line |
| PreSelectionAndAnalyses | message handler for the "PreSelection and Analyses" menu item<br>clear appropriate fields, reset menu and button captions for the new consultation<br>set system variables and update the bottom status line |
| OpportunityAnalyses | message handler for the "Opportunity Analyses" menu item<br>clear appropriate fields, reset menu and button captions for the new consultation<br>set system variables and update the bottom status line |
| CompleteConsultation | message handler for the "Complete Consultation" menu item<br>clear appropriate fields, reset menu and button captions for the new consultation<br>set system variables and update the bottom status line |
| EconomicModels<br>MechanicalModels | message handler for the " . . . Models" menu item<br>check menu item and go to page Model |
| EngineeringProperties | message handler for the "Engineering Properties" menu item<br>check menu item and go to page Data |
| Design | message handler for the "Design" menu item<br>clear appropriate fields, reset menu and button captions for the new consulation<br>set system variables and upate the bottom status line |
| exitPAMS | send leaveBook |

TABLE 5-continued

Book Handlers (Continued)

| Handler and Script | Functionality |
| --- | --- |
| MyInitialMenu | initialize menu bar and menu items |
| MyAddMenuItems theExplain | customize menu bar and items depend on consultation type and phase |
| Browse | message handler for the "Browse" menu item send history |
| ResetForwardString TheString | volunteer values to the Nexpert Object slot TheString to trigger the meta-slot which reset the decision tree related to TheString |
| uncheckMenuConsultations | uncheck the menu items of the menu Consultations |
| PAMSFinishSolving | DDE execute message handler with Excel Solver for the mechanical analyses |

TABLE 6

Input/Output Sections
Handlers and Scripts for the Input/Output Sections

| Section | Background and Pages | Handler and Script | Functionality |
| --- | --- | --- | --- |
| PAMS | background | handle BContinuePAMS | set menu and progression depending on the consultation |
| | page PAMS | handle enterPage | set system variables update bottom status line |
| | | handle teavePage | set system variabtes |
| | | handle idle | move group GMECCircles |
| Applications | background | handle BContinueApplications | load knowledge base |
| | | handle BBackApplications | unload knowledge base |
| | page Applications | handle enterPage, | set bottom status line and highlight selection |
| | | handle leavePage | record selection |
| Opportunity Identification | background | handle BContinueOpportunity | unload and load knowledge bases and, depending on the consultation; volunteer, suggest, and run Nexpert Object |
| | | handle BBackOpportunity | unload and load knowledge bases depending on consultation |
| | pages Opportunity to Opportunity12 | handle enterPage | set bottom status line; set the list of input variables, and highlight selection when necessary |
| | | handle leavePage | reset some system variables |
| | | handle ButtonUp (Next>>) | set bottom status line and transfer input variables values to OABoard |
| | | handle ButtonUp (<<Previous) | in general, go to the previous page |
| | | handle ButtonUp (<<Previous) | in general, go to the previous page |
| | page Opportunity13 | handle enterPage | set bottom status line; set the list of input variables, and highlight selection when necessary |
| | | handle leavePage | reset some system variables |
| | | handle ButtonUp (Next>>) | set bottom status line and menus transfer input variables values to OABoard, prepare the fields for the OA results, volunteer, and control Nexpert Object inference engine |
| | | handle ButtonUp (<<Previous) | in general, go to the previous page |
| | | handle ButtonUp (<<Previous) | in general, go to the previous page |

TABLE 7

Handlers and Scripts for the Input/Output Sections (Continued)

| Section | Background and Pages | Handler and Script | Functionality |
| --- | --- | --- | --- |
| Opportunity Identification | page Opportunity14 | handle leavePage | reset some system variables |
| | | handle ButtonUp (Next>>) | go to the next page |
| | | handTe ButtonUp (<<Previous) | reset knowledge base or choose another consultation |
| | page | handle leavePage | reset some system variables |

TABLE 7-continued

Handlers and Scripts for the Input/Output Sections (Continued)

| Section | Background and Pages | Handler and Script | Functionality |
|---|---|---|---|
| | Opportunity15 | | |
| | | handle enterPage | set status line |
| | | handle ButtonUp (Next>>) | go to the next page |
| | | handle ButtonUp (<<Previous) | go to the previous page |
| | page Opportunity16 | handle leavePage | reset some system variables |
| | | handle enterPage | set status line |
| | | handle ButtonUp (Next>>) | send BContinueOpportunity |
| | | handle ButtonUp (<<Previous) | go to the previous page |
| Part Specifications | background | handle BContinuePartSpecifications | volunteer data files names and suggest Setector.BoolVar (Nexpert) |
| | | handle BBackPartSpecifications | go back to main menu or to the Opportunity identification (unload and load knowledge base in Nexpert Object) |
| | page Part Specifications | handle enterPage | set bottom status line, set the list of input variables, display the groups on the page (depending on the application domain), and highlight the selections when necessary |
| | | handle leavepage | reset some system variables |
| | | handle ButtonUp (Continue>>) | set bottom status line and transfer input variables values to the PreSelectionBoard |
| | | handle ButtonUp (<<Opportunity Identification) | send BBackPartSpecifications |
| | pages Part Specifications1 to Part Specifications3 | handle enterPage | set bottom status line, set the list of input variabies, display the groups on the page (depending on the application domain), and highlight the selections when necessary |
| | | handle leavePage | reset some system variables |
| | | handle ButtonUp (Continue>>) | transfer input variables values to PreSelectionBoard |
| | | handle BuffonUp (<<Opportunity Identification) | go to previous page |

TABLE 8

Handles and Scripts for the Input/Output Sections (Continued)

| Section | Background and Pages | Handler and Script | Functionality |
|---|---|---|---|
| Part Specifications | page Part Specifications4 | handle enterPage | set bottom status line; set the list of input variables, display the groups on the page (depending on the application domain), and highlight the selections when necessary |
| | | handle leavePage | reset some system variables |
| | | handle ButtonUp (PreSelectionResults>>) | transfer input variables values to PreSelectionBoard, send BBackPartSpecifications, and update menu |
| | | handle ButtonUp (<<Opportunity Identification) | go to previous page |
| Selection | background | handle BContinueSelection | unload, load knowledge bases, volunteer, suggest, and control to Nexpertg Object's inference engine depending on the consultation. Set bottom status line |
| | | handle BBackSelection | send BBackPartSpecifications or BContinueOpportunity depending on consultation |
| | page Selection | handle enterPage | set bottom status line, prepare display for re-selection results |
| | | handle leavePage | reset some system variables |
| | | handle ButtonUp Rejected>>) | go to Rejected |
| | | handle ButtonUp (<<Part Specifications) | send BBackSelection |
| | page Rejected | handle enterPage | set bottom status line, prepare |

TABLE 8-continued

Handles and Scripts for the Input/Output Sections (Continued)

| Section | Background and Pages | Handler and Script | Functionality |
|---|---|---|---|
| | | | display for re-selection results |
| | | handle leavePage | reset some system variables |
| | | handle ButtonUp (Design>>) | send BContinueSelection |
| | | handle ButtonUp (<<Selected) | go to Selection |
| Design | background | handle BContinueDesign | set some system variables and place data onto the DesignBoard; volunteer, suggest, and control the Nexpert Object inference engine set the bottom status line |
| | | handle BBackDesign | unload, load, or restart knowledge base depending on the consultation |
| | page Design | handle enterPage | set the list of variables, highlight selection |
| | | handle leavePage | set some system variables and keep record of highlights |
| | | handle ButtonUp (Mech & Econ Analyses>>) | set bottom status line, place data on the DesignBoard |
| | | handle ButtonUp (<<Grades) | set bottom status line; prepare, reset some decision trees, and restart Nexpert Object inference engine |

TABLE 9

Handlers and Scripts for the Input/Output Sections (Continued)

| Section | Background and Pages | Handler and Script | Functionality |
|---|---|---|---|
| Design | page Grades | handle enterPage | set bottom status line, highlight grades selection |
| | | handle leavePage | keep record of highlights |
| | | handle ButtonUp (Continue>>) | reset some decision trees, suggest and control Nexpert Object's inference engine |
| | | handle ButtonUp (<<PreSelection) | send BBackDesign |
| | pages EqualLeggedAngle to UProfileChannel | handle enterPage | set bottom status line, highlight selection, set the list ot input variables |
| | | handle leavePage | keep record og highlights and set some system variables |
| | | handle ButtonUp (Mech & Econ Results>>) | set bottom status line, prepare display for the mechanical results, place data on the DesignBoard, and send BContinueDesign |
| | | handle ButtonUp (<<Back) | set bottom status line, go to page Design |
| Analyses | background | handle BContinueAnalyses | unload, load knowledge base (Nexpert Object) |
| | | handle BBackAnalyses | depending on the analyses to run, reset specific decision trees in Nexpert Object |
| | page Analyses | handle enterPage | prepare display of the mechanical and economic analyses |
| | | handle leavePage | set some system variables |
| | | handle ButtonUp (Advisor>>) | send BContinueAnalyses |
| | | handle ButtonUp (<<Fund. Analyses) | send BBackAnalyses |

TABLE 10

Scripts Sections

Handlers and Scripts for tha Script Sections

| Section | Background and Pages | Handler and Script | Functionality |
|---|---|---|---|
| BookAlternate | background | get LoadKnowledgeBase theKB,theHypo | call UnloadKnowledgeBase and load the knowledge base theKB (Nexpert Object) |
| | | get UnloadKnowledgeBase | unload the (KBid) knowledge base (Nexpert Object) |
| | | get VolunteerIntoToSoftware theVariable,theValue,theBoard, theSoftware | volunteer or poke value theValue to variable theVariable placed on board theBoard into sotfware theSoftware (Nexpert Object or Excel) |
| | | get startBackwardChaining theHypo | suggest hypothesis theHypo and run the inference engine (Nexpert Object) |
| | page BookAlternate | get Explain theTag,nAtoms,theAtoms | prepare the various explanation (the topic is indicated by theTag) of the reasoning for the Opportunity Identification and the Selection, and store them as properties of the background UtilitiesAlternate |
| | | get Results theTag,nAtoms,theAtoms | display the results (the topic is indicated by theTag) of the Opportunity Identification |
| ScriptAlternate | background | get clearFields theList,thePage | clear fields of the list theList and on the page thePage |
| | | get formatNumber theNumber | format number theNumber |
| | | get StripCRLF myVar | remove carriage return and line feed from the string myVar |
| | | get AddUnitToNumber TheNumber | add unit to number theNumber |
| | | get StripCRLF myVar | remove carriage return and line feed from the string myVar |
| | | get hightLight thePage,theList,theCode | highlight or record the selections of the items of the list theList when entering (theCode) or leaving the page thePage |
| | | get HChangeTableYesNoColors theCell | change colors for the cell theCell of horizontal mutli or single-select list boxes |
| | | get FieldFormat theField,theFillColor, theFont, theStroke, theSize,theFontType | format the field theField |

TABLE 11

Handlers and Scripts for the Script Sections (Continued)

| Section | Background and Pages | Handler and Script | Functionality |
|---|---|---|---|
| SciptAlternate | Background | get populateListBox theList,theLine,theField,theFill Color, theFont, theStroke, theSize,theFontType | populate a vertical list box with the appropriate items and format |
| | | get ChangeNumber theField, UpperLimit, LowerLimit, Direction, Delta | increment or decrement by Delta the integer value contained in field theField according to UpperLimit LowerLimit, and Direction |
| | | get stripPercentageXY theValue | remove special characters such as %, x, y from theValue |
| | | get scanColors RowNumber,NumberOfColumns, thePresentPage | highlight selection tor horizontal multi-select list box |
| | | get synchScrolling thepage,theField,theOtherField | synchronize scrolling between fields theField and theOtherField of the page thePage |
| | | get MyParseSpace TheStr | substitute " " or "&" by "_" in the string TheStr |
| | | get getRidOfSpecialCharacters | remove " ", "&" or "/" from the string TheStr |

TABLE 11-continued

| Handlers and Scripts for the Script Sections (Continued) | | | |
|---|---|---|---|
| Section | Background and Pages | Handler and Script | Functionality |
| | | TheStr | |
| | | get MyParseUnderscoreToSpace TheStr | replace "_" by " " in string TheStr |
| | | get MyParseUnderscoreToAmpersand TheStr | replace "_" by "&" in string TheStr |
| | | get extractNameFromSlot MyName | return object name from Nexpert Object slot |
| | | get substituteSpaceForComa theString | substitute space for coma in string theString |
| | page ScriptAlternate | get PutInformationIntoTheBoard theBoard, thePresentPage,theSoftware | place information of the page thePresentPage onto the board TheBoard, and call VolunteerIntoToSoftware to transfer it to theSoftware (Nexpert Object or Excel) |
| Applications Alternate | background | get theApplication | return the application selected by the user |
| | | get makeTheList thisField | display the lists ot applications to choose trom (levels 35 to 55) |
| | page Applications Alternate | get displayLevel65 | display level 65 of market cut |
| Data | page Data | handle enterPage | set bottom status line |
| | | handle leavePage | set some system variables |
| Models | page Models | handle enterPage | set bottom status line |
| | | handle leavePage | set some system variables |

TABLE 12

| Handlers and Scripts for the Script Sections (Continued) | | | |
|---|---|---|---|
| Section | Background and Pages | Handler and Script | Functionality |
| Utilities Alternate | background | handle buttonUp theText (MessageHandlerDialogBoxOK) | bring a dialog box with an "OK" button and display a text thelext |
| | | handle buttonUp theText (MessageHandlerDialogBoxContinue) | bring a dialog box with a "Continue" button and display a text theText; "Continue" reruns the Nexpert Object inference engine |
| | | handle buttonUp (MessageHandlerDialogBoxList) | bring a dialog box with a "Continue" button, display a question, and a single-select list box; "Continue" volunteers the selection to Nexpert Object and reruns the inference engine |
| | | handle buttonUp (MessageHandlerDialogBoxMList) | bring a dialog box with a "Continue" button display a question, and a multi-select list box; "Continue" volunteers the selection to Nexpert Object and reruns the inference engine |
| | | handle buttonUp theText (MessageHanderDialogBoxEOS | bring a dialog box with an "OK" button and display a text theText "OK" displays the end of consultation screen |
| | | handle buttonUp theText (HelpExplain) | bring a dialog box with "OK" and "Print" buttons and display an explanation text theText; "OK" calls cancelHelp() and "Print" calls get cancelHelp() and get printExplain(theText,the name of this background) of page UtilitiesAlternate |
| | | handle buttonUp theText (Comments) | bring a dialog box with "OK", "Save", "Save All", and "Print" buttons. The buttons call different script of page UtilitiesAlternate |

TABLE 13

Handlers and Scripts for the Script Sections (Continued)

| Section | Background and Pages | Handler and Script | Functionality |
|---|---|---|---|
| Utilities Alternate | page Utilities Alternate | get theInformationDisplayed thePreviousPage, theText, theObject, theMenuItem | display information and check menu item |
| | | get theInformationGone thePreviousPage, theText, theObject, theMenuItem | remove information and uncheck menu item |
| | | get displayHelp thePreviousPage, theText, theObject,theIndex | display general help for each page thePreviousPage of the book |
| | | get cancelHelp thePreviousPage, theText, theObject | cancel general help for each page of the book |
| | | get showCommentsScreen thePreviousPage,theText,the Object,theMenuItem | show the dialog box for entering comments and check menu |
| | | get saveCommentsScreen thePreviousPage,theText,the Object | save comments for the page thePreviousPage |
| | | get saveAllCommentsScreen | save comments for all the pages of the book |
| | | get DisplayEndOfSession | display the end of consultation screen |
| | | get displayExplain thePreviousPage,theText,the Object,theIndex,theMenuItem | bring the dialog box for displaying the explanation for the major elements of opportunity identitication and Selection, and check menu |
| | | get cancelExplain thePreviousPage, theText, theObject | uncheck menu items when cancelling explain |
| | | get uncheckMenuItemsForUtilities | uncheck all the menu items |
| | | get printExplain theText,theBackground | print explanation |

TABLE 14

Communication Sections
Handlers and Scripts for the Board Sections

| Section | Background and Pages | Handler and Script | Functionality |
|---|---|---|---|
| OABoard | background | get MatrixToNXP theVariable,theValue Object slots | map input variables (theVariable) for the Opportunity Identification to Nexpert |
| PreSelection Board | background | get MatrixToNXP theVariable,theValue | map input variables (theVariable) for the Selection to Nexpert Object slots |
| | | get prepareTheLists theText,nAtoms,theAtoms | set the lists of groups to display for the Part Specifications pages depending on the application domains |
| | | get MapApplicationToGroup thePage | set the position of the different groups on the page thePage |
| | | get groupHeights theGroup | determine the group theGroup heights |
| | | get theLists theTag, nAtoms, theAtoms | list and sort candidate and rejected materials and processes |
| | Page PreSelection Board | get explanationToBoard theTag,nAtoms,theAtoms | store expianation for each rejected or accepted process and material in properties of pages |
| | | get modifyLists theText,theLines,theLine, thePage,theField | keep track ot the appropriate lists of processes and materials for further analyses aner user interaction |
| | | get correspondanceMaterialsToObjects theMaterial | map long materials names to short names |
| | | get correspondanceProcessesTo Objects theProcess | map long processes names to short names |
| DesignBoard | background | get MatrixToExcel theVariable,theValue | map input variables to Excel worksheets cells |
| | | get MatrixToNXP theVariable,theValue | map variables to Nexpert Object slots |
| | | get listTheGrades | list the grades of materials (theAtoms) |

TABLE 14-continued

Communication Sections
Handlers and Scripts for the Board Sections

| Section | Background and Pages | Handler and Script | Functionality |
|---|---|---|---|
| | | theText,nAtoms,theAtoms,the Field,thePage | in field theField on page thePage |
| | page DesignBoard | get runModel thePage | run the Excel Solver for a particular shape, specific constraints, and a given grade |
| | | get LengthToDepth Shape,thePage | set message for length to depth test |
| | | get modifyLists theText,theLines,theLine, thePage,theField | keep track of the appropriate grades list for further analyses after user interaction |

TABLE 15

Table 15 Handlers and Scripts for the Board Sections (Continued)

| Section | Background and Pages | Handler and Script | Functionality |
|---|---|---|---|
| Fundamental Analyses Board | background | get listMechResults theText,nAtoms,theAtoms,the Field,thePage | list the results of the mechanical anaiyses for all considered grades (theAtoms) in field theField on page thePage |
| | | get listEconResults theText,nAtoms,theAtoms,the Field,thePage | list the results ot the mechanical analyses for all considered grades and their associated processes in field theField on page thePage |

IV. Expert System Shell

A. Overview

Several criteria were developed to select the expert system shell. The expert system shell must accommodate the integration of various forms of knowledge, the portability to several platforms, and the link to a graphical user interface (GUI) tool.

Any suitable commercial expert system shell may be utilized in the present invention. Examples of suitable commercially available programs include Art*Interprise, ART-IM,, Level5 Object, Nexpert Object of the Smart Elements. Level5 Object 3.0 available from Information Builders, Inc., provides an expert system with rules, forward and backward chaining logic, and very limited object oriented processing, and an integrated graphical tool kit.

As another example, Art*Enterprise available from Inference Corporation, provides an expert system with rules, forward and backward chaining, pattern matching, non monotonic reasoning, full object oriented case-based reasoning, and an object oriented graphical tool kit.

Finally, Nexpert objects of the Smart Elements Suite available from Neuron Data, provides an expert system with rules, mainly backward and forward chaining, and object oriented reasoning, and GUI scripting language.

Although ART-IM 4.0 paradigms for representing knowledge were more sophisticated than Nexpert Object 2.0b, and Level5 Object had a rudimentary integrated graphical tool kit, Nexpert Object 2.0b was selected for implementation of the SYS1 embodiment because it had a better integration to databases. ART*Enterprise was selected for use with SYS2.

In the SYS1 embodiment of the present invention developed by the inventors, the Reasoning/Strategy/Problem Solving module of the expert shell system comprises: (1) a Processes and Materials Selection Module; and (2) an Opportunity Identification Module. SYS2 extends problem solving strategies to include shape selection module. Implementation of these modules in SYS1 and SYS2 is organized according to the View of the World (VOW) concept explained below.

Classes, objects, and methods implement the declarative and procedural knowledge, and rules capture the search strategies. The rules, correspond to "rules of thumb" elicited from experts during the knowledge acquisition process.

B. View of a World (VOW)

Declarative knowledge and search strategies are two corner stones of problem solving. The declarative knowledge and the search strategies which solve a specific problem about a world, represent a particular commitment, perspective, or view of this world. The set of ontological commitments which focus on a particular perspective of a world for solving a specific problem can be called a "View Of a World" (VOW).

The different forms of knowledge in the present invention include symbolic reasoning, numerical computing, and data storage and retrieval. In general, events happen which involve objects of a particular universe. Reasoning strategies and plans determine why and when events (e.g., decision, actions) occur.

In order for a computer system to solve a problem about a particular universe (world), the declarative knowledge as well as the intelligent search strategies need to be represented and implemented. Such a description in terms of objects and events for a particular world also constitutes a VOW.

The understanding and the descriptions of these objects, events, and their relationships are necessary to simulate or emulate, to a given level of complexity and intelligence, these situations or worlds.

In the practice of the present invention, the reasoning strategies are encapsulated in units of knowledge called rules. A network of rules corresponds to intelligent search paths, decision trees, and lines of reasoning (inference chains). This View Of the World concept is further illustrated in the following FIGs.

Figure 5:
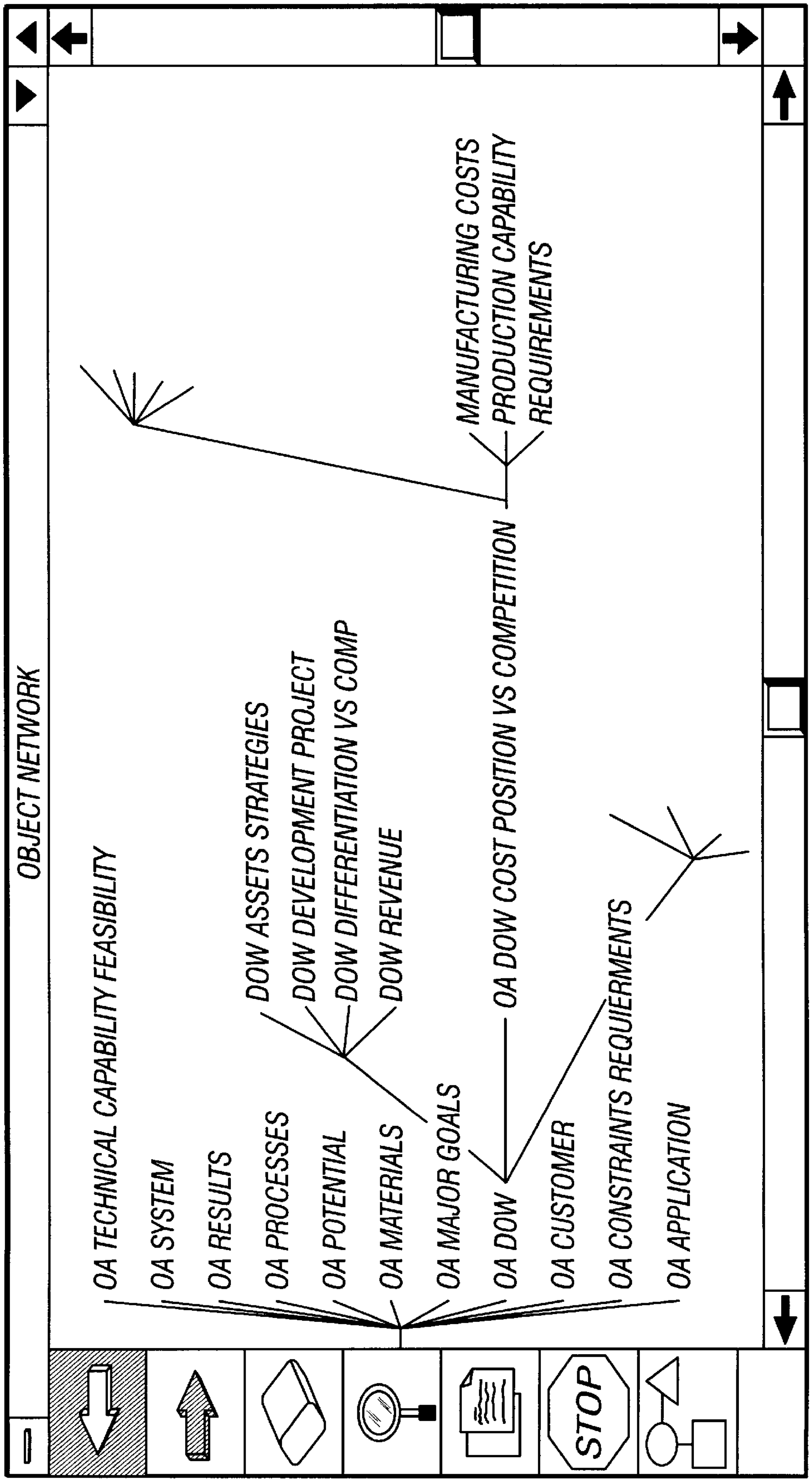
FIGS. 5 and 6 represent the opportunity identification (e.g., an expert perspective for doing opportunity identification) and picture hierarchies of concepts, which include semantic and inheritance of characteristics of behaviors, and provide the "what" and the "how" for the program.
Figure 6:
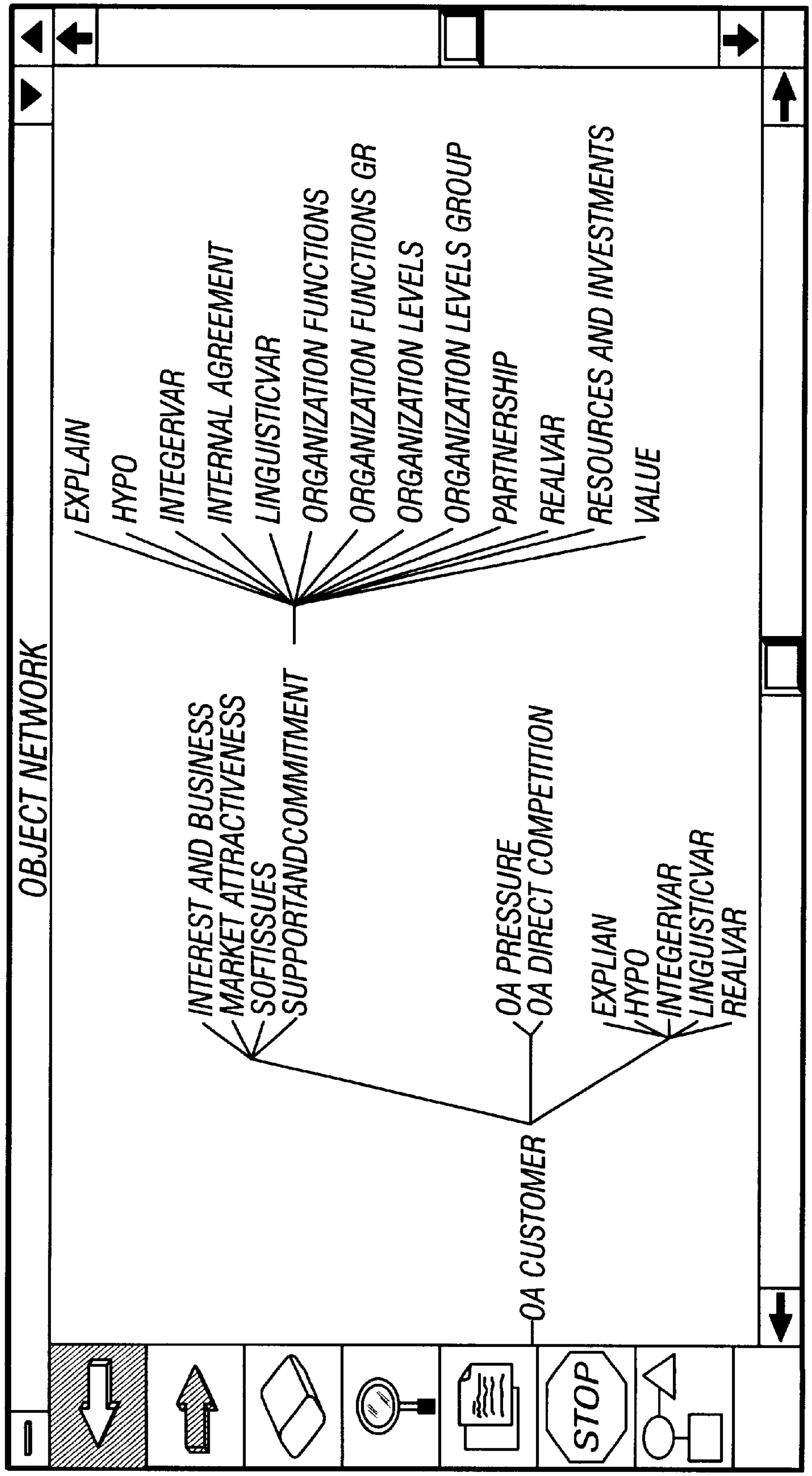

Referring now to FIGS. 5 and 6 there is shown a representation of part of the SYS1 VOW for the opportunity identification module (e.g., an expert perspective for doing opportunity identification) picturing hierarchies of concepts. The hierarchies, which include semantic and inheritance of characteristics and behaviors, provide the "What" and the "How" (the "Who") for the VOW.

Figure 7:
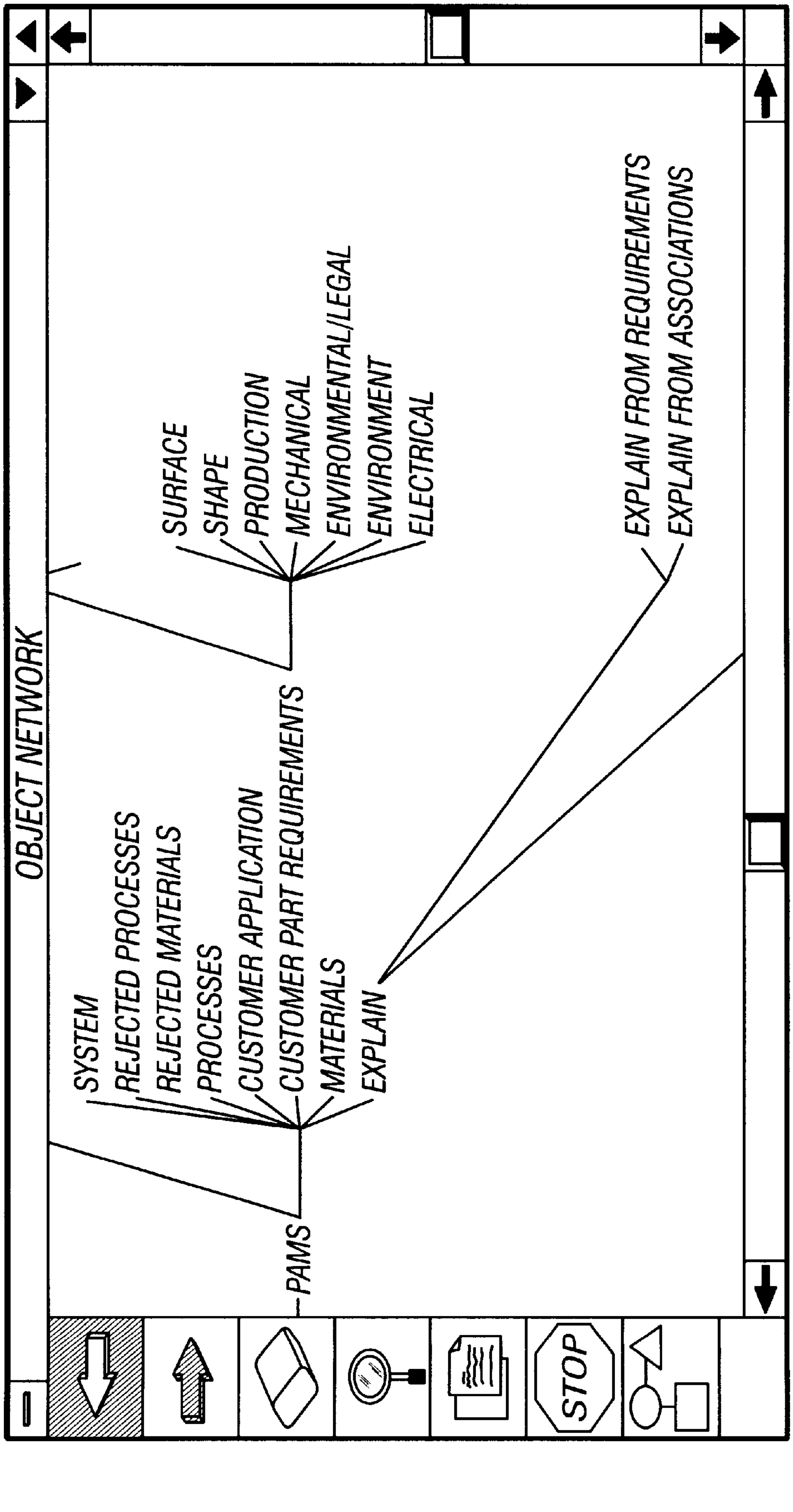
FIG. 7 represents the selection of processes and materials and pictures a hierarchy of concepts.

Referring now to FIG. 7 there is shown a representation of part of the VOW for the selection of processes and materials picturing a hierarchy of concepts for both SYS1 and SYS2. This hierarchy provides context and inheritance of characteristics in terms of attributes and behaviors.

Figure 8:
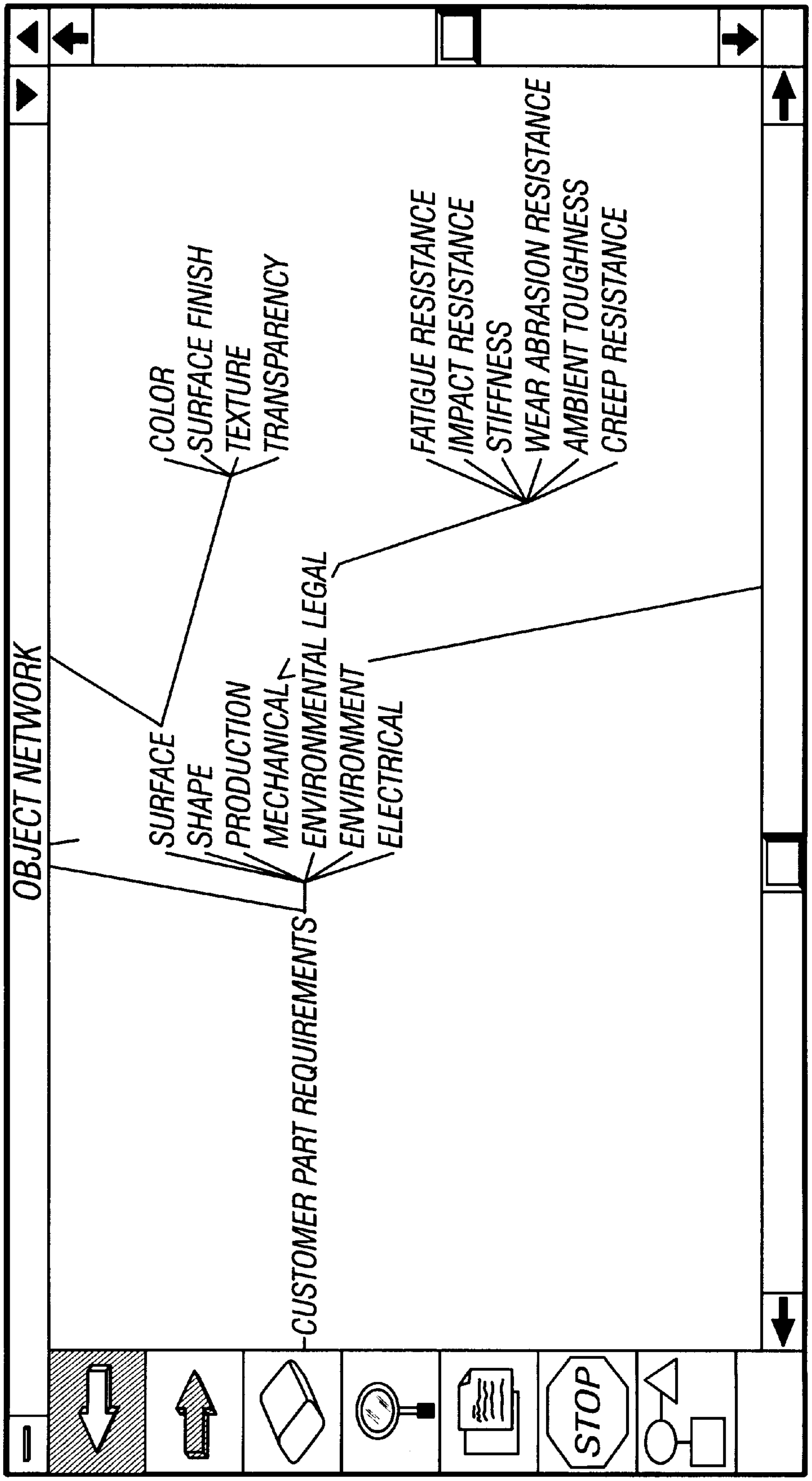
FIG. 8 shows a representation of part of the program for the selection of processes and materials.

Referring now to FIG. 8, there is shown a representation of part of the VOW for the selection of processes and materials. Some of the main concepts (i.e., Mechanical, and Surface characteristics) are expanded to include more concepts (e.g., Stiffness). The leaf nodes of such hierarchies can represent facts, physical objects, and variables (e.g., Ambient Toughness).

Figure 9:
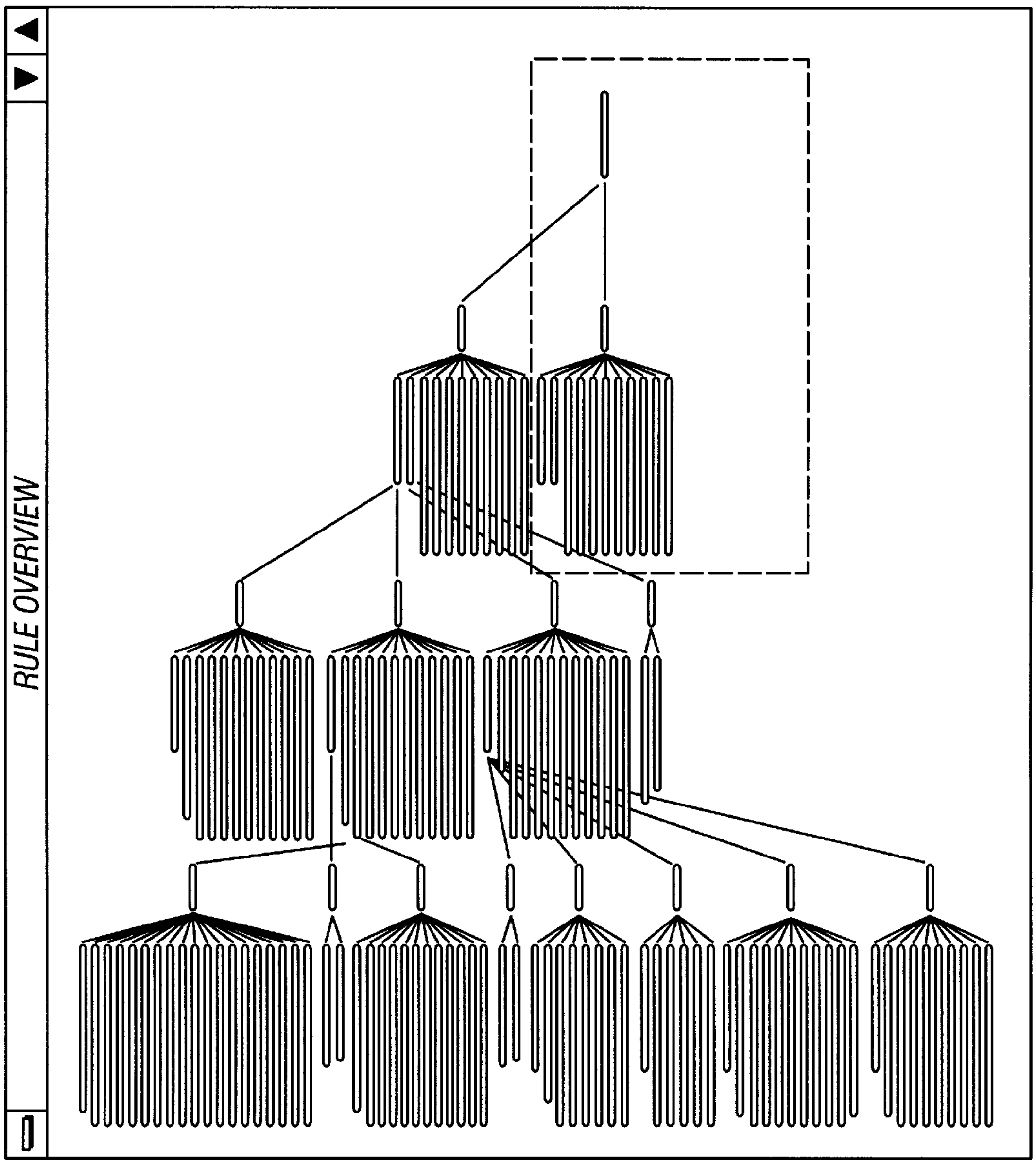
FIG. 9 shows a small decision tree, with each packet of this tree represents a rule.

Referring now to FIG. 9 there is shown a small decision tree. Each packet of this tree represents a rule (such as the one inside the dotted line rectangle). A rule is a unit of knowledge that captures some of the strategies to minimize search effort and optimize solutions: a rule corresponds to a "whenever some facts are true about the world then take some actions and/or assert other facts".

C. Processes and Materials Selection Module

1. Overview

This module of the SYS1 and SYS2 embodiments contains knowledge that helps in selecting the most appropriate classes of materials and fabrication processes for a particular "durable goods" application. The selection process is based on material functional values and on process characteristics which is sometimes referred to as an application domain.

Materials and fabrication processes can rapidly be selected or rejected for a particular "durable goods" application based on materials functional values and processes characteristics. The application must meet certain criteria and perform definite functions, and, therefore, materials and fabrication processes are selected that meet the criteria and functional limitations of the particular "durable goods" application of interest. Shape complexity, part toughness, and transparency are instances of such criteria. Such criteria and functions are used in the section process.

Examples of the materials and fabrication processes selection process are as follows:

1. An application that requires a high shape complexity (e.g., a housing for a camcorder) cannot be fabricated using, for instance, Filament Winding, Pultrusion, In Line Thermoforming, or Drape Forming.
2. High part toughness is required in applications such as bumper beams.
3. Part toughness depends on both material toughness and part shape.
4. Average toughness materials can be retained when high shape complexity processes are selected and are economically feasible. In this case, the selection depends on materials properties, processes characteristics, part design, and fabrication economics.

The criteria for both SYS1 and SYS2 are grouped in terms of the major elements of the analysis: Environment, Surface, Electrical, Mechanical, Environmental & Legal, Shape, and Production Volume. Tables 16, 17, 18, 19 and 20, presented and described in more detail below, reflect these groups and list all the functional values, including possible values, definitions, and contexts.

Experts' knowledge is used to match application requirements with materials properties and fabrication characteristics. The output is expressed in terms of candidate or rejected processes and materials along with an explanation of how each of the conclusions are reached.

The number of discrete values for the output variables is finite because of the limited number of classes of materials and fabrication processes. For example, Table 21 lists these output variables, including possible values, definitions, and contexts, for SYS1. Similar variables were utilized in SYS2 with some deletions and additions to reflect changes in the program.

TABLE 21

Processes and Materials

| Elements of Analyses | Output Variables | Values |
|---|---|---|
| Candidate | Processes | Resin Transfer Molding, Structural Reacticn Injection Molding, Reaction Injection Molding, Hand LayUp, SprayUp, Filament Winding, Purtrusion, Thermoplastic Injection Molding, In Line Thermoforming, Single Station Thermoforming, Vacuum Thermoforming, Drape Forming, Vacuum Plug Assisted Thermoforming, Pressure Forming, Pressure Vacuum Forming, Matched Mold Forming, Twin Sheet Forming, Extrusion Blow Molding, Low Pressure Structural Foam, Gas Counter Pressure Structural Foam, High Pressure Structural Foam, Injection Blow Molding, Gas Assisted Injection Molding, Rotational Molding, Sheet Molding Compound, Bulk Molding Compound, Compression Molding, Die Casting |
| | Materials | ULDPE, LDPE, LLDPE, HDPE, PC, GPPS, HIPS, ISOPLAST Opaque, ISCPLAST Clear, ISOPLAST Long Glass Reinforced, SAN, Mass ABS, Emulsion ABS, Hybrid ABS, PC ABS, PP CoPolymers, PP HomoPolymers, Epoxy Novolacs, Epoxy Resins, Electronic Grade Resins, Advanced Electronic Resins, VinylEster, RIM PolyUrethane, PolyUrea, SRIM PolyUrethane, PolyCyanate, PolyEster, PET, PBT, PCT, PETG, PolyCaprolactone PolyTetraMethyleneGlycolEther Resin, PolyAdipate, Automotive Resin, Health Care Resin, Specialty Resin, PC PolyEster, |

TABLE 21-continued

| Processes and Materials | | |
|---|---|---|
| Elements of Analyses | Output Variables | Values |
| | | PMP, PVC, Acrylics SMA, ASA, PolyArylate, LCP, Nylon6, Nylon66, Amorphous Nylon, PPA, PPS, Acetals CoPolymer, Acetals HomoPolymer, PEEK, PSO, PAS, PEI, PAI, PVDF, ABS TPU, mPPO, Aluminium, Zinc, Magnesium |
| Rejected | Processes Materials | Same as above |

2. Algorithm of Processes and Materials

The reasoning implemented in the PAMS embodiments for the selection of processes and materials can be represented by the following scheme:

1. Choose the application domain which determines the selection criteria and their respective importance.
2. Consider processes or materials classes as long as they meet the application functional requirements and keep track of why they are selected.
3. Reject a material or material class or a process as soon as it does not meet one of the application functional criterion and record the reason why it is eliminated.
4. At any time, check if there are processes left to process each candidate material. If not, then eliminate the material.
5. At any time, check if there are materials left to be processed by each candidate process. If not, then eliminate the process.

Event 1 happens first whereas events 2 and 3 happen sequentially according to the search determined by the application domain. Events 4 and 5 are asynchronous and can occur at regular intervals or at any time during the selection process.

The search sequence for SYS1 for a particular application domain corresponds to a subset of the following sequence of criteria, with criteria for SYS2 being essentially the same with some minor modifications:

chemical types, chemical resistance, hydrolytic stability, heat deflection temperature, cold temperature toughness, radiation sterilizability, weatherability, color, surface finish, texture, transparency, dielectric, ambient toughness, creep resistance, fatigue resistance, wear and abrasion resistance, additions, complexity, constraints, draft, inside tolerances control, shape control accuracy, size, undercuts, production volume, impact resistance, stiffness, ignition resistance, environmental impact, legal, recyclability, emissions.

For each solution meeting the material functional values and on process characteristics of a chosen application domain, the user is provided with an explanation of how the system reaches its conclusions or selected that particular solution to the material functional values and on process characteristics. The explanation is delivered in terms of the major groups of functional values and characteristics including explanations as to individual processes, materials and classes of materials.

Figure 10:
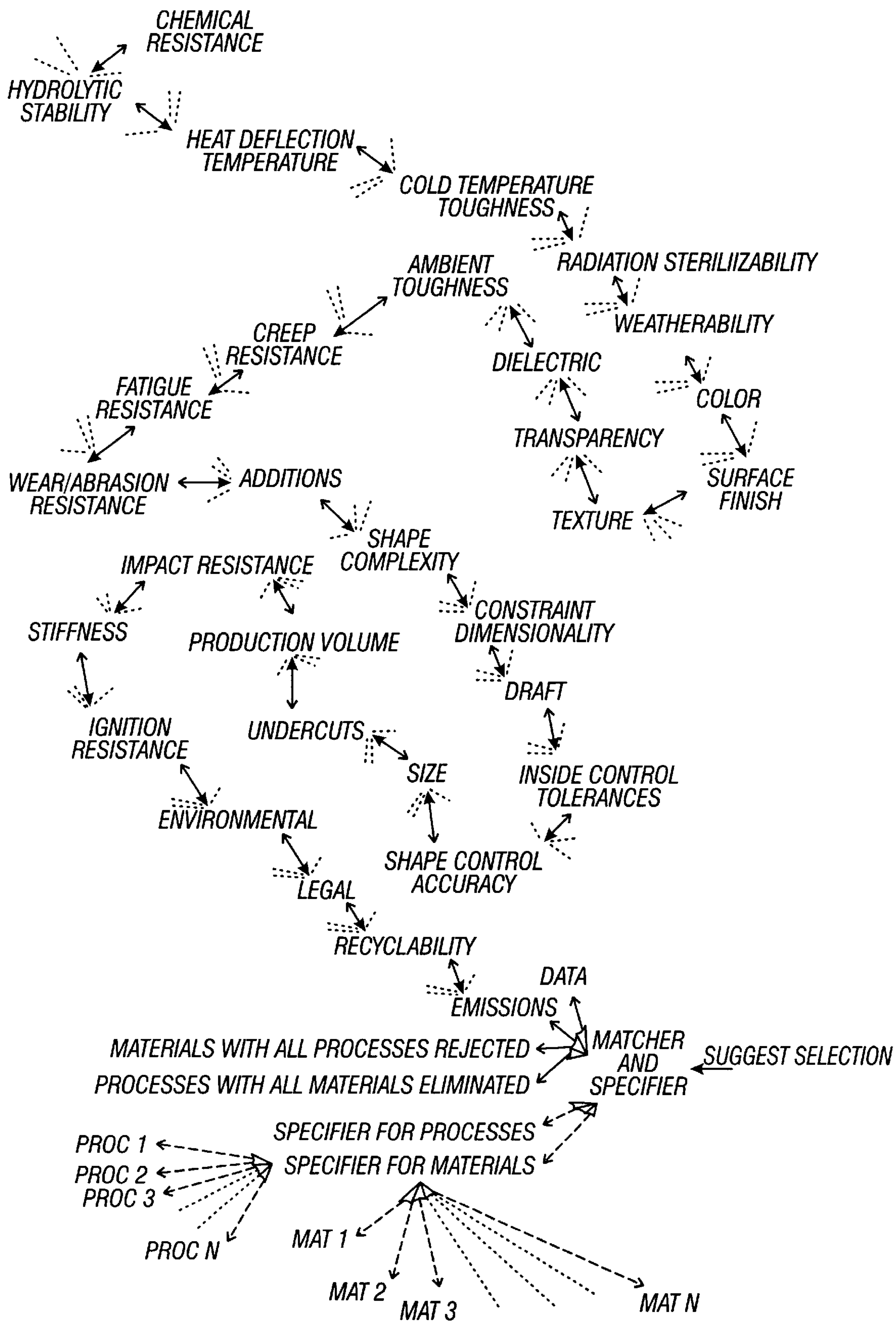
Figure 11:
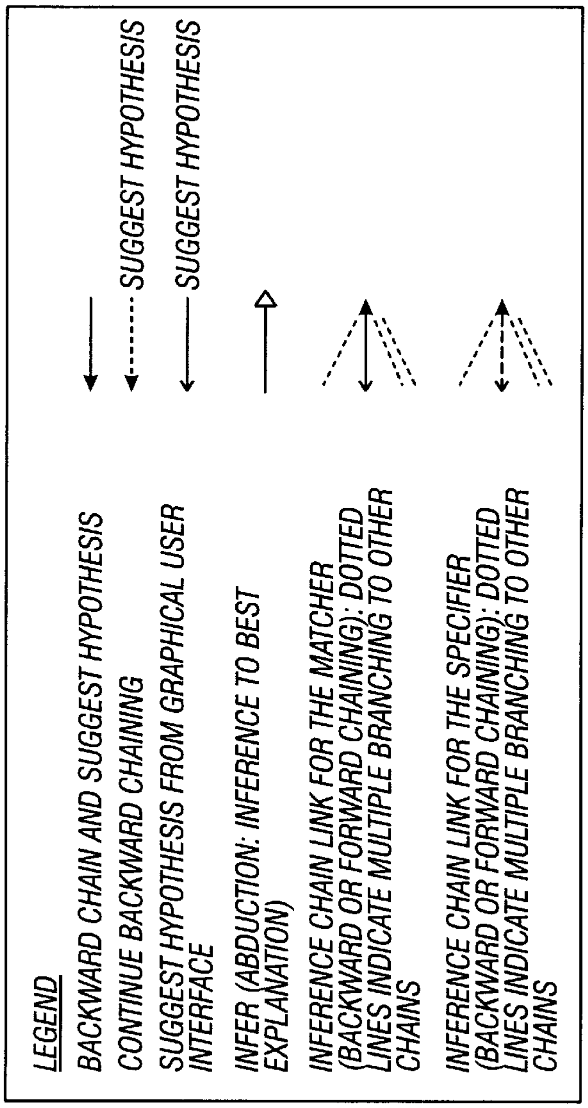

Referring now to FIGS. 10, and 12–18, there are shown high level representations of the inference chains and prototypes for the Processes and Materials Selection Module, with the legend for those figures provided in FIG. 11. Specifically, FIG. 10 shows inference chains for the Processes and Materials Selection Module as implemented in SYS1.

In this FIG. 10, three groups of inference chains have been represented with dotted lines suggesting multiple links to other chains: (1) the Application Domains inference chain; (2) the Matcher inference chain; and (3) the Specifier inference chains.

The Specifier has performs the task of focusing attention on features unique to a particular process or given class of materials during selection processing. The function of the Matcher is to compare the application functional requirements with various materials functional values and processes characteristics.

Figure 12:
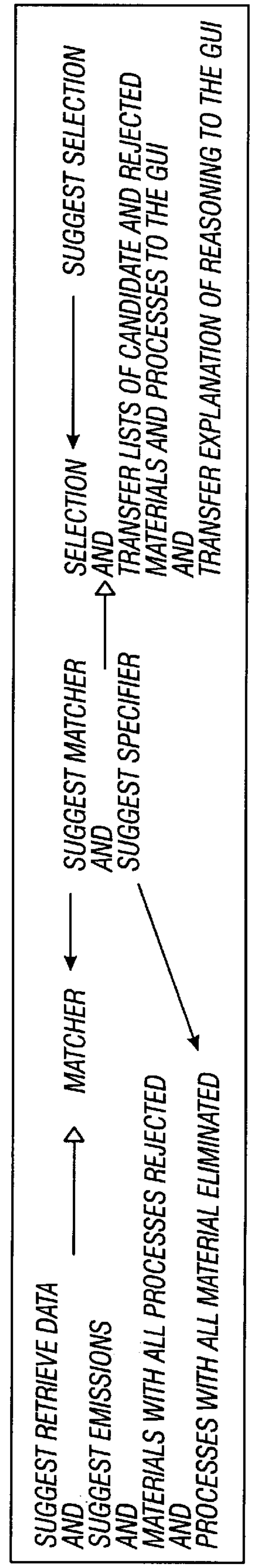
Figure 13:
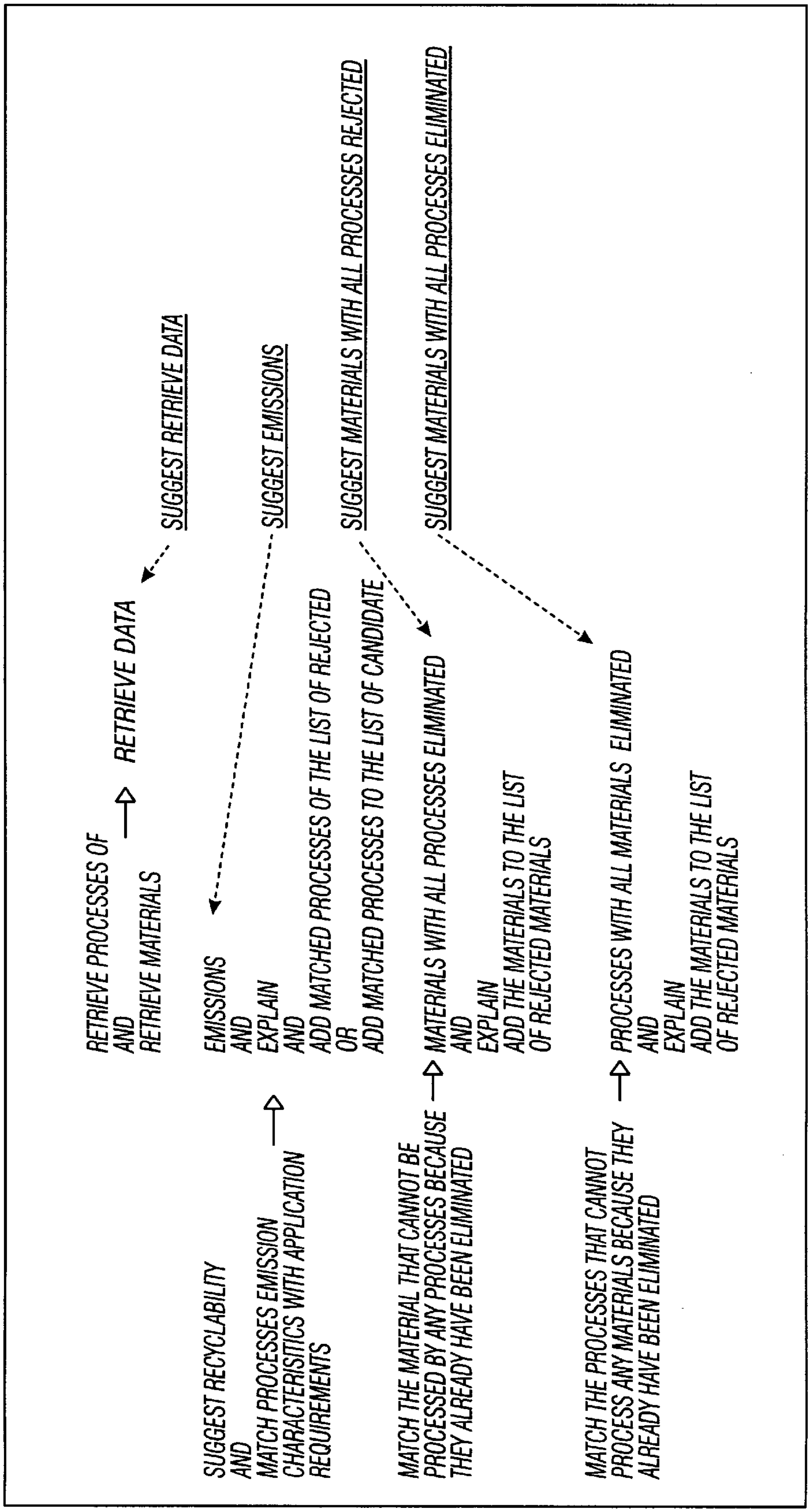
Figure 14:
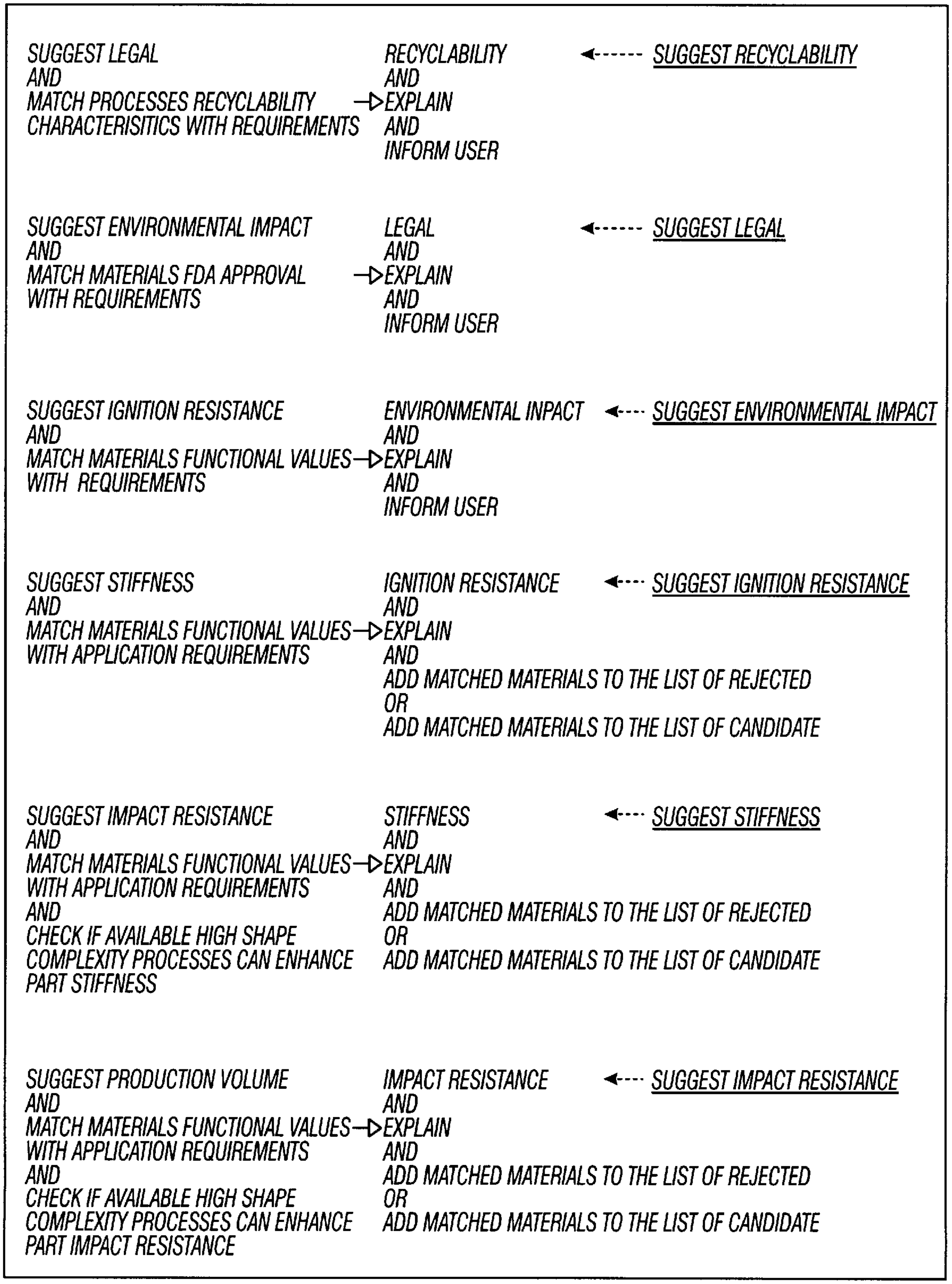
Figure 17:
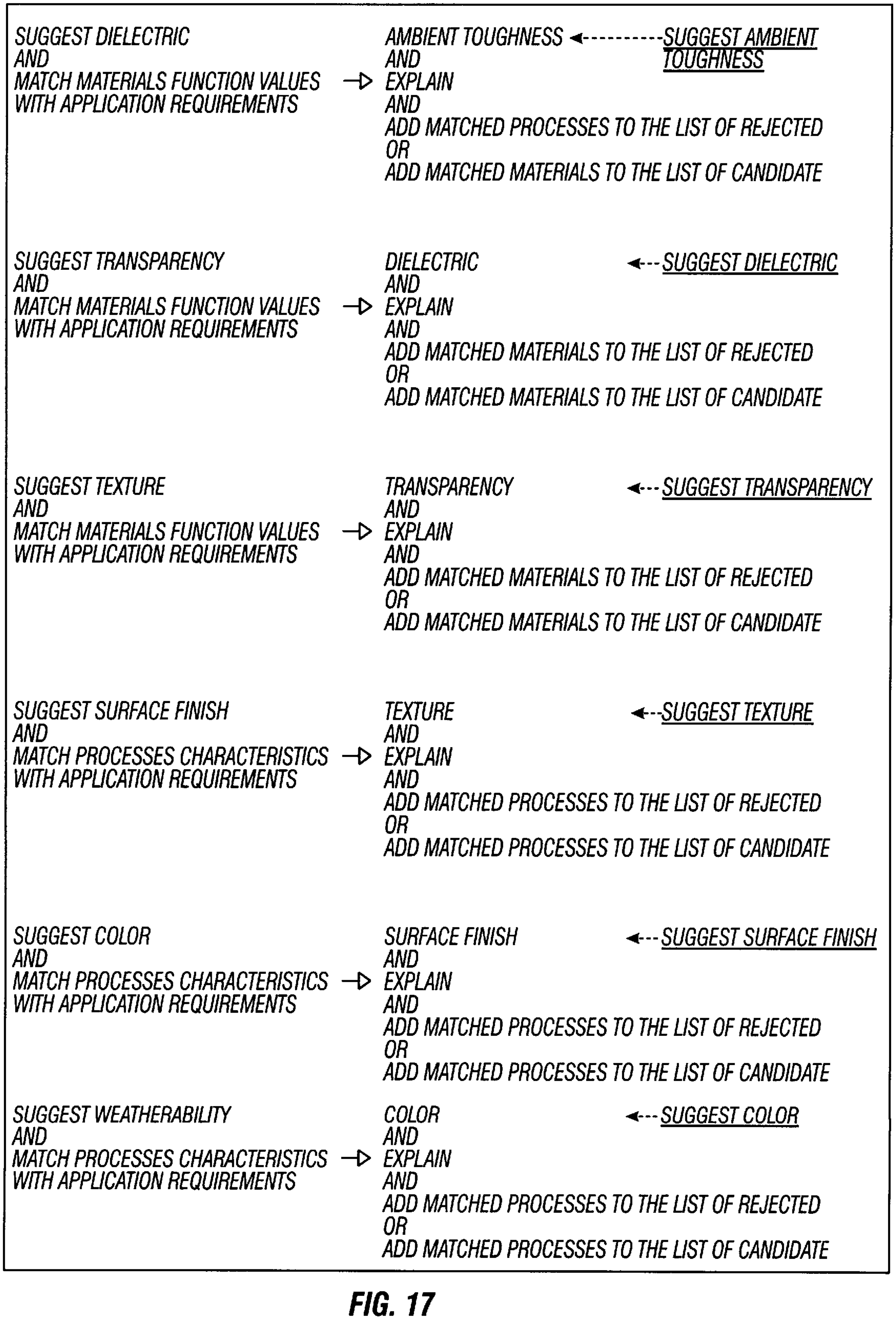

FIGS. 12–18 illustrate prototypes for the Matcher. Specifically, FIG. 12 shows root prototypes for the basic logical functioning of the Matcher; FIG. 13 shows data and cleaning processes and materials prototypes (i.e., reviewing the retrieved data to determine whether process can be eliminated because no materials match the process or whether a material can be eliminated because no process is left to process the material); FIG. 14 shows recyclability, legal considerations, environmental impact, ignition resistance, stiffness and impact resistance prototypes; FIG. 15 shows production volume, undercuts, size, shape control accuracy, inside tolerances control, and draft prototypes; FIG. 16 shows constraints dimensionality, shape complexity, additions, wear/abrasion resistance, fatigue resistance, and creep resistance prototypes; FIG. 17 shows ambient toughness, dielectric, transparency, texture, surface finish and color prototypes; and FIG. 18 shows weatherability, radiation sterilizability, cold temperature toughness, heat deflection temperature, hydrolytic stability, and chemical resistance prototypes.

Both PAMS embodiments developed by the inventors include a dynamic explanation of reasoning for each selection made and for each solution finally suggested. The module explains how it reaches its conclusions and provides information about the inference chains if used to derive the conclusions. The module has the capability to explain why a particular material or process is eliminated or selected for further analyses. Also, it details what happens to materials and processes during inferencing for each group of functional requirements.

The module contains two separate, similar, structures to implement these two modes of explanation. Each of these two structures features: (1) the encapsulation of meaning and context within rules; (2) the use of necessary containers (attributes, objects, and classes); and (3) the tracking of the firing of rules.

The following Table 22A illustrates the control for the Selection Module of the PAMS system of the present invention. The topics of the Matcher and their order depend on the application domain. The Proc I and Mat I of the Specifier, and their order depend on the results of the Matcher and on the inference engine.

TABLE 22A

| Control Agenda for the Selection Module | |
|---|---|
| Hypotheses | Control |
| 1. Customer Application | Suggested by the user from the GUI |
| 2. Selection | |
| 3. Matcher | Left to Inference Engine |
| 3.1 Topic I | |
| 3.2 . . . | |
| 4. Specifier | |
| 4.1 Specific Processes | |
| 4.11 Proc I | |
| 4.12 . . . | |
| 4.2 Specific Materials | |
| 4.21 Mat I | |
| 4.21 . . . | |

3. Input Data for Processes and Materials

Tables 16–20, describe the input data needed for the processes and materials modules. Tables 16 shows the input data relating to the parts specifications environment. For instance, the application might be required to retain most of its properties when exposed to chemicals in a manufacturing environment, to heat in an automotive environment, to water and sunlight in outdoor environment, or to cold as part of a refrigeration system.

Some functional values can take several of the values listed, e.g., the value for “Chemical Types” can be “Alcohols, Gasoline, Brake Fluid”. Other values correspond to exclusive choices, e.g., the value for “Ignition Resistance” is “High” or “Low” (exclusive). Other inputs are numeric, e.g., the value for “HDT” is a number between 40 to 500. Input variables include chemical exposure, chemical types, hydrolytic stability, heat deflection temperature (HDT), cold temperature toughness, ignition resistance, radiation sterilizability and weatherability.

TABLE 16

Parts Specifications Environment

| Elements of Analyses | Input Variables (Functional Values) | Values | Contexts |
|---|---|---|---|
| Environment | Chemical Exposure | Continuous Exposure Required<br>Intermittent Exposure Required<br>No Exposure Expected | |
| | Chemical Types | Adds Inorganic Weak<br>Acids Inorganic Strong<br>Acids Organic Weak<br>Acids Organic Strong<br>Alcohols<br>Amines Aliphatic<br>Amines Aromatic<br>Bases Concentrated<br>Bases Diluted<br>Brake Fluid<br>Esters<br>Fats Oils Waxes<br>Gasoline<br>Glycols<br>Hydrocarbons Aliphatic<br>Hydrocarbons Aromatic<br>Hydrocarbons Halogenated<br>Ketones<br>Motor Oil<br>Ozone<br>Phenols<br>Salt Solutions | If the exposure mode is No Exposure Expected then NO materials will be eliminated even if several chemicals are selected. |
| | Hydrolytic Stability | Not Important (low)<br>Important (medium)<br>Determining Factor (high) | Hydrolytic stability describes the resistance of the material to water.<br>A HIGH hydrotytic stability is such that the material does NOT loss more than 5% of its properties when exposed to water for 28 days at room temperature.<br>A MEDIUM hydroiytic stability is such that the material does NOT lose more than 20% of its properties when exposed to water for 28 days at room temperature.<br>A LOW hydrolytic stability is such that the material does lose mare than 20% of its properties when exposed to water for 28 days at room temperature. |
| | HDT | 40 to 500 F. | The part deflection must be less than a given (maximum) amount when the material is heated at the HDT at 264 psi. Intuitively: The part must keep good mechanical performance up to 360 F. (oven), or it needs to perform well on the dash board of a car in full sun (180 F.). |
| | Cold Temperature | Low, | HIGH: The material sustains 200 in-lb of total energy |

TABLE 16-continued

| Parts Specifications Environment | | | |
|---|---|---|---|
| Elements of Analyses | Input Variables (Functional Values) | Values | Contexts |
| | Toughness | High | at −20 C. (Instrumented Dart Impact test).<br>MEDIUM: The material sustains between 50 to 200 in-lb of total energy at −20 C.<br>LOW: The material sustains less than 50 in-lb of total energy at −20 C. |
| | Ignition Resistance | | HIGH: material inherently meets UL 94 V-O flammability rating.<br>LOW: material inherently meets UL 94 HB (horizontal burn test) flammability rating.<br>Materials with low inherent ignition resistance often can be modified with additives to have a high ignition resistance |
| | Radiation Sterilizability | Not Important<br>Average<br>High | HIGH: The material does NOT lose 10% of its properties (tensile, impact) when exposed to a 10 MRad radiation.<br>MEDIUM: The matarial loses more tham 10% of its properties when exposed to a 10 MRad radiation and less than 10% of its properties when exposed to a 2.5 MRad or less radiation.<br>LOW: The material loses more than 50% of its properties when exposed to a 2.5 MRad or less radiation. |
| | Weatherability | | HIGH: The material does NOT lose more than 10% its properties (tensile, impact) under a xenon arc (65 C. black panel temperature) for a 1000 hours.<br>LOW: The matarial loses more than 50% of its properties under the same conditions. |

Table 17 shows the part specification input data relating to surface and electrical properties showing the elements of analysis for the surface and electrical properties. Input data for the surface aspect of the input module includes surface finish, color, texture, and transparency; while input data for electrical properties comprise the dielectric property desired.

TABLE 17

| Part Specifications Surface & Electrical | | | |
|---|---|---|---|
| Elements of Analyses | Input Variables (Functional Values) | Values | Contexts |
| Surface | Surface Finish | Class A Required<br>Class A Not Necessary | Class A is an automotive definition. A part has a class A surface when the low incidence tight reflected by its surface does not show undulations from sink marks, gates, and others. |
| | Color | IMC<br>Paint<br>None | The color can be obtained directly from the process or in a second operation. The choices are:<br>1) IMC (In Mold Coating), or<br>2) Painting. |
| | Texture | Not Important<br>Average<br>Fine | High pressure processes can deliver fine texture parts depending on the material; fine texture means that the process replicates well the tool texture in the part.<br>FINE: Fine and delicate prints and patterns are desired (e.g., computer monitor).<br>AVERAGE: Fairly smooth surface (e.g., 'non show' part like a load floor). |
| | Transparency | 0% to 100% | Transparency can be obtained with amorphous materials. In general, amorphous thermoplastics are transparent. The transparency is expressed in terms of % of light transmitted through a sample of given thickness. As such, 100% corresponds to a totally transparent material. |
| Electrical | Dielectric Properties | Not Important<br>Important | HIGH: The material relative dielectric constant is >=5.<br>LOW: The material relative dielectric constant is <3. |

Table 18 shows part specifications input data relating to mechanical and environment and legal criteria showing elements of analysis for the two criteria. The input data for mechanical include ambient toughness, creep resistance, fatigue resistance, part toughness, part stiffness, and wear/abrasion resistance. The input data for environmental and legal include emissions, environmental impact, legal and recyclability.

Note that processes and materials are not selected or eliminated based on their Environmental and Legal criteria, but rather, the system informs the user (if desired to be informed) about the processes emissions and recyclability characteristics, and the materials environmental and legal issues in the form of appropriated warnings or warning messages.

TABLE 18

Part Specifications Mechanical, Environmental & Legal

| Elements of Analyses | Input Variables (Functional Values) | Values | Contexts |
|---|---|---|---|
| Mechanical | Ambient Toughness | Low<br>Medium<br>High | HIGH: The material sustains >= 300 in-lb of total energy at 23 C. (Instrumented Dart Impact test).<br>MEDIUM: The material sustains between 300 to 50 in-lb of total energy.<br>LOW: The material sustains less than 50 in-lb of total energy. |
| | Creep Resistance | Low<br>High | HIGH: The material does not deform more than 0.5% at 50% of yield strength (1000 hours and 23 C.). |
| | Fatigue Resistance | Low<br>Medium<br>High | HIGH: The endurance limit of the material is at least 1000000 cycles (30 Hz) at 3000 psi.<br>MEDIUM: The endurance limit of the material is between 10000 and 1000000 cycles (30 Hz) at 3000 psi.<br>LOW: The endurance limit or the material is less than 10000 cycles (30 Hz) at 3000 psi. |
| | Part Toughness | | High Part Toughness 5 requirod for parts such as bumper beams. The Part Toughness depends both on materials and shape (e.g., a process that allows for a more complex shape can give the same Part Toughness with a material with a lower toughness).<br>High Part Toughness: e.g., Automobile knee bolster<br>Medum Part Toughness: e.g., Vacuum cleaner housing.<br>Low Part Toughness: e.g., Printer cover. |
| | Part Stiffness | | The stiffness of the part is related to the tensile strength (or tensile modulus) or the material as well as to its moment of Inertia. The stiffness depends both on materials and shape.<br>A process that allows for a more complex shape can give the same stiffness with a material with a lower tensile modulus.<br>High Part Stiffness: e.g., Automobile cross member or riding lawnmower chassis (High material stiffness: Tensile Modulus >1 Msi (1 Msi = 10 6 psi).<br>Medium Part Stiffness: e.g., Room air conditioner housing or can opener housing (Medium material stiffness: Tensile Modulus <= 1 Msi and >0.3 Msi).<br>Low Part Stiffness: e.g., Computer montior bezel (Low material stiffness: Tensile Modulus 0.3 Msi). |
| | Wear/Abrasion Resistance | Low<br>High | HIGH: The weight loss of a sample is less than 10 mf after 1000 cycles. |
| Environmental & Legal | Emissions | No Warning<br>Warning | Warning: to be informed when prooesses involve handling harmful emissions or hazardous chemicals |
| | Environmental Impact | | Warning: to be informed when materials have environmental problems potential. |
| | Legal | | Warning: to be informed when materials require FDA compliance. |
| | Recyclability | | Warning: to be informed about processes recyclability. |

Table 19 shows part specifications input data relating to shape and production volume. Input variables for shape include structural additions needed to part such as attachments, inserts or holes, complexity of shape, constraints and dimensionality, degrees of draft, inside tolerances control, shape control accuracy, size and undercuts and for production volume comprises the production volume.

TABLE 19

Part Specifications Shape

| Elements of Analyses | Input Variables (Functional Values) | Values | Contexts |
|---|---|---|---|
| Shape | Additions | Attachments, Inserts<br>Holes<br>None | Depending on the appliation the part might incorporate holes, inserts, and other features. |
| | Complexity | Low<br>Medium<br>High | Some processes such as extrusion blow molding cannot handle complex shapes whereas others such as thermoplastic injection molding can make complex parts. High Complexity: housing for Camcorder. Medium Complexity: computer monitor. Low Complexity: bottle. |
| | Constraints | Cut of Cylinder | 2-D is equivalent to: 2-D NO Ribs |
| | Dimensionality | 2 D<br>3 D Not Closed<br>3 D Closed<br>None<br>Straight Constant Cross Section | 3-D not closed means the same as: 2-D + Ribs or no box<br>3-D closed means that the object has a closed shape (like a bottle for instance) or is equivalent to box. |
| | Draft | 0 to 8 degrees | Some processes can be eliminated because they cannot make part with a small draft. |
| | Inside Tolerances Control | Not Important<br>Important | How important is it to have a good control of the part inside tolerances? |
| | Shape Control Accuracy | | How important is it to have a good control of the outside shape? |
| Shape | Size | Small<br>Medium<br>Large | Large: part weight > or = to 100 lb<br>Medium: 10 lb < part weight < 100 lb<br>Small: part weight < or = to 10 lb |
| | Undercuts | Not Necessary<br>Required | Does the part require undercuts? |
| Production Volume | Volume | number of units/year | Estimated number of parts produced or to be produced per year. How big is the market; how many parts per year does the customer want to produce? |

D. Opportunity Identification Module

1. Overview

Opportunity identification is available only in the SYS1 embodiment, and is based on the evaluation of a large number of variables and their interdependencies. Experts' knowledge is used to process the information, explore alternatives, weigh importance, make judgments, and reach conclusions. The outcome takes the form of detailed sets of recommendations and explanation of the customer's technical and business needs, and of users's business potential. Like the Processes and Materials Selection Module, the Opportunity Identification module is also organized based upon the VOW concept discussed above.

2. Algorithm of Opportunity Module

Figure 38:
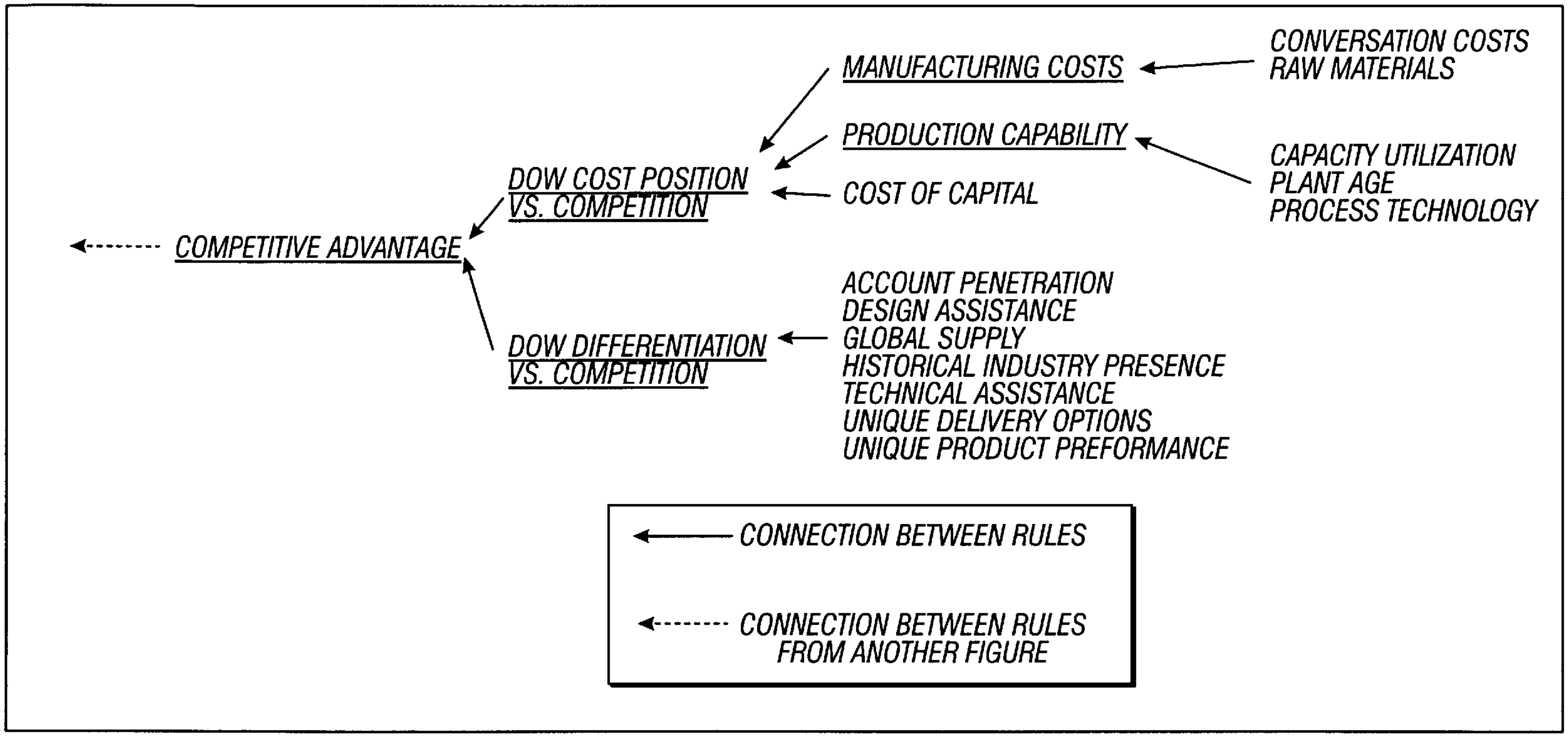
Figure 39:
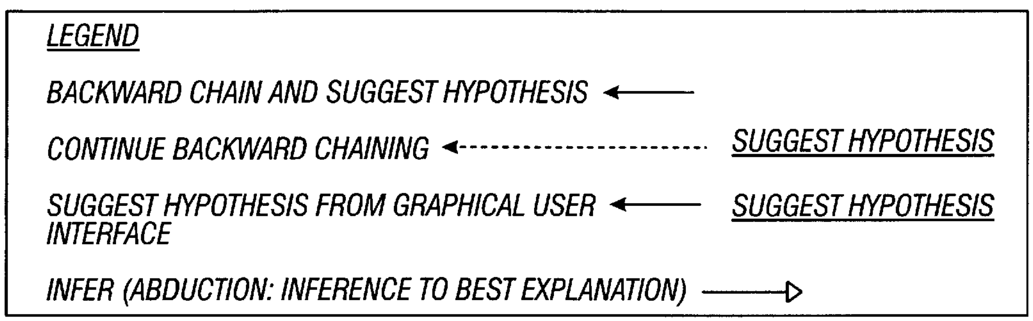
FIG. 39 provides a legend for FIGS. 19–38.

Referring now to FIGS. 19–38 there are provided a high level description of inference chains, events and prototypes for the Opportunity Identification Module, while FIG. 39 provides a legend for FIGS. 19–38. FIGS. 19–38 depict expanded views of the topics (nodes) of the inference chains of the Opportunity Identification Module. Each topic is represented by a prototype which corresponds to a series of deductions or abductions (i.e., rules).

Figure 19:
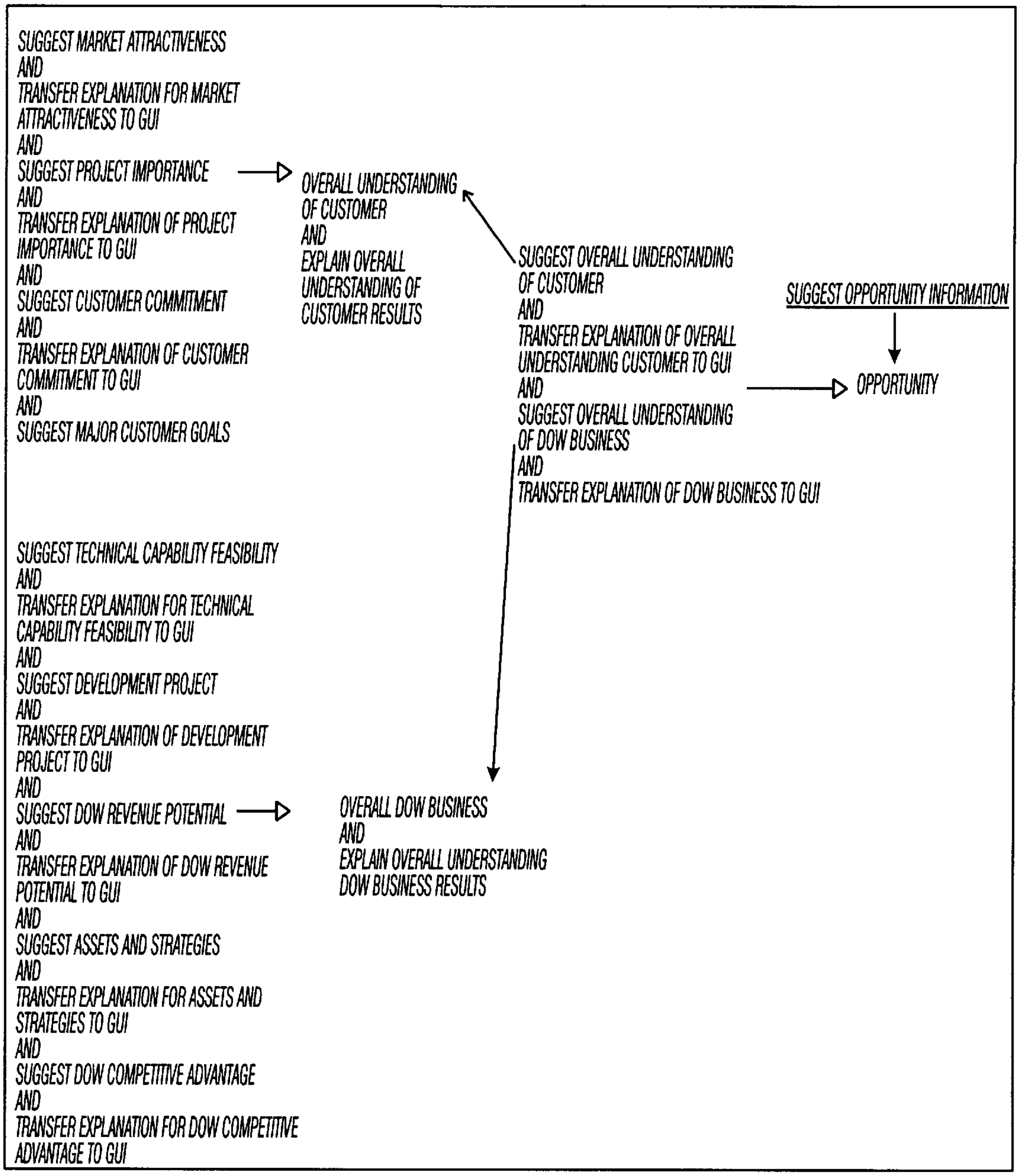
Figure 22:
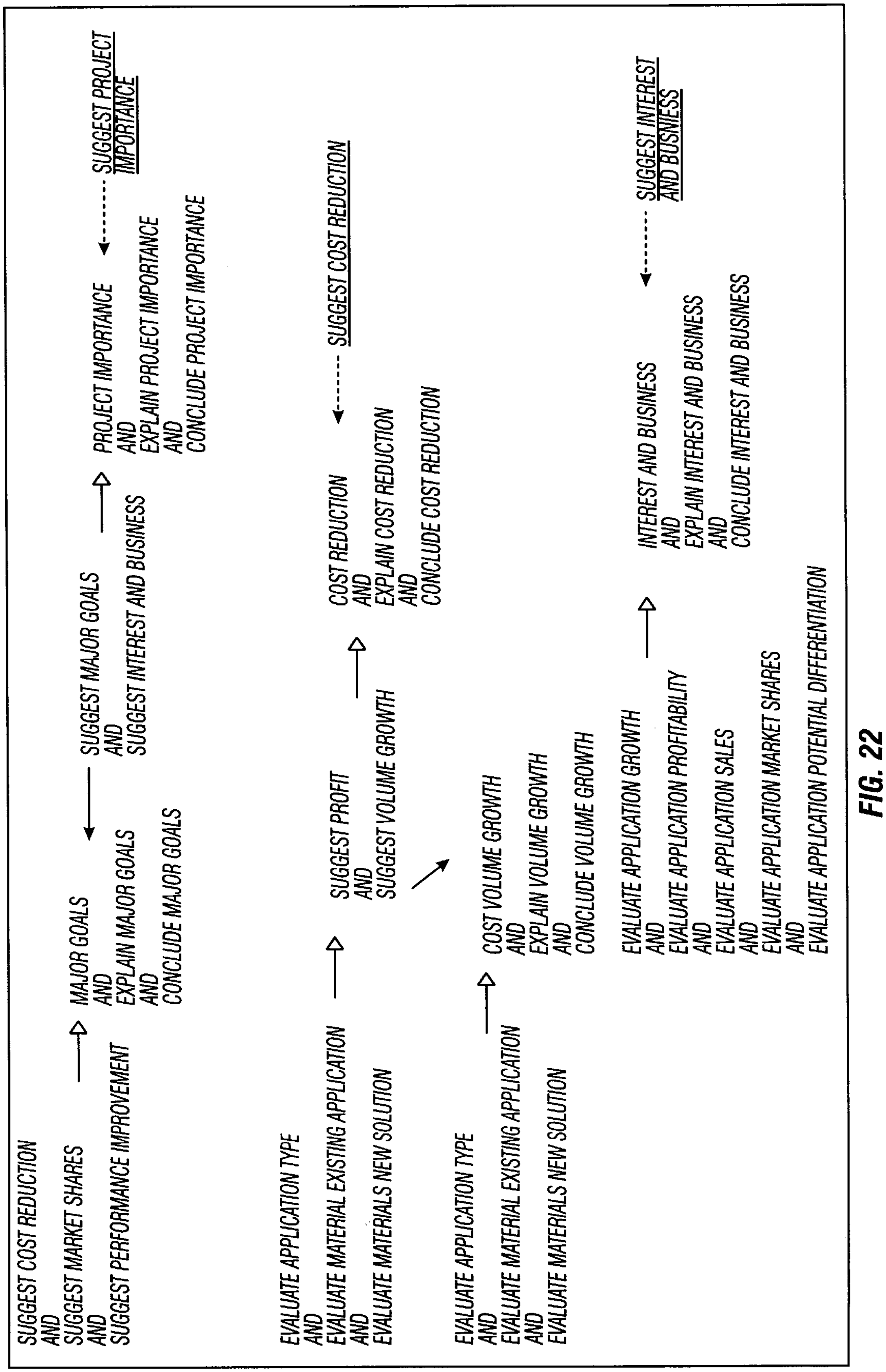
Figure 23:
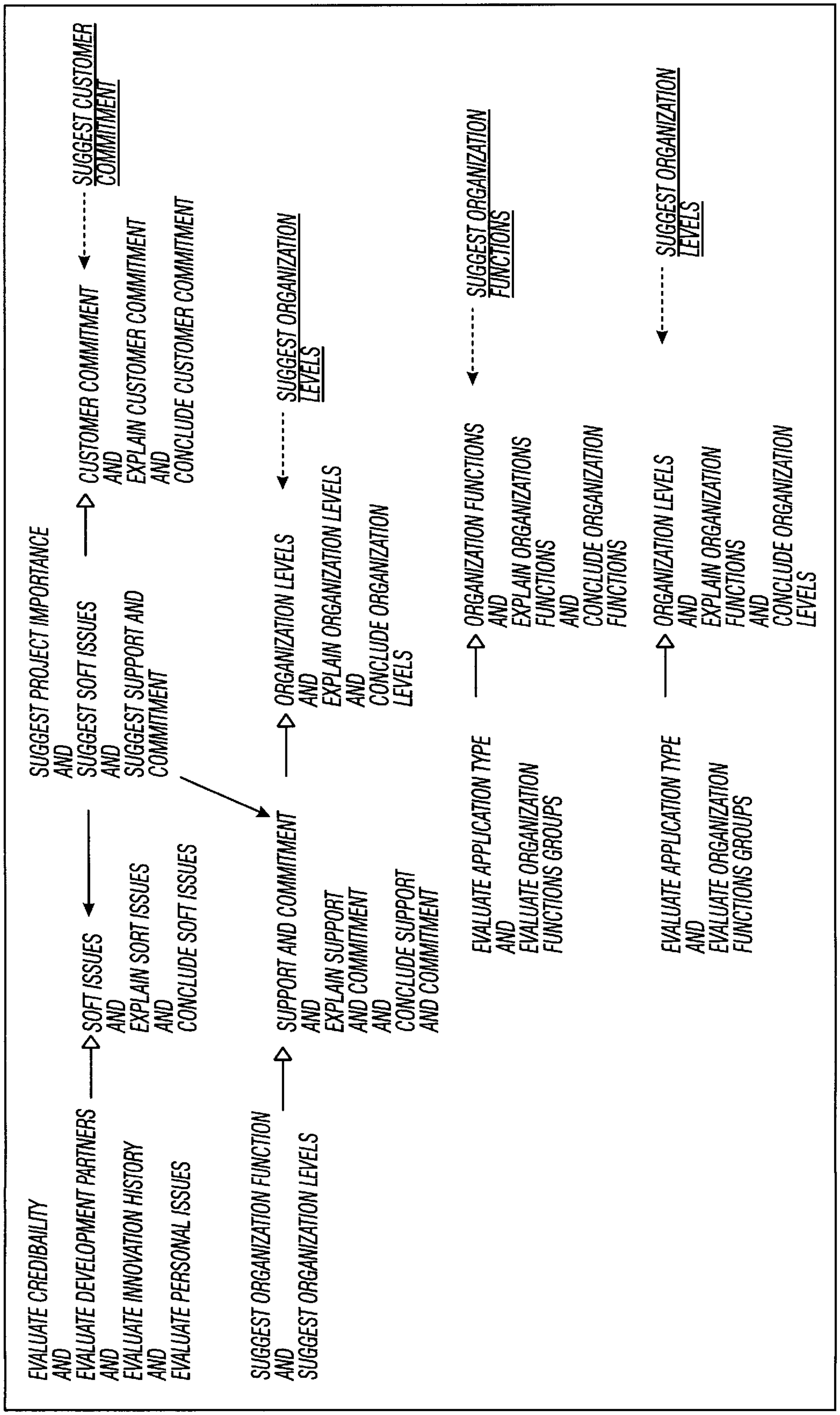
Figure 24:
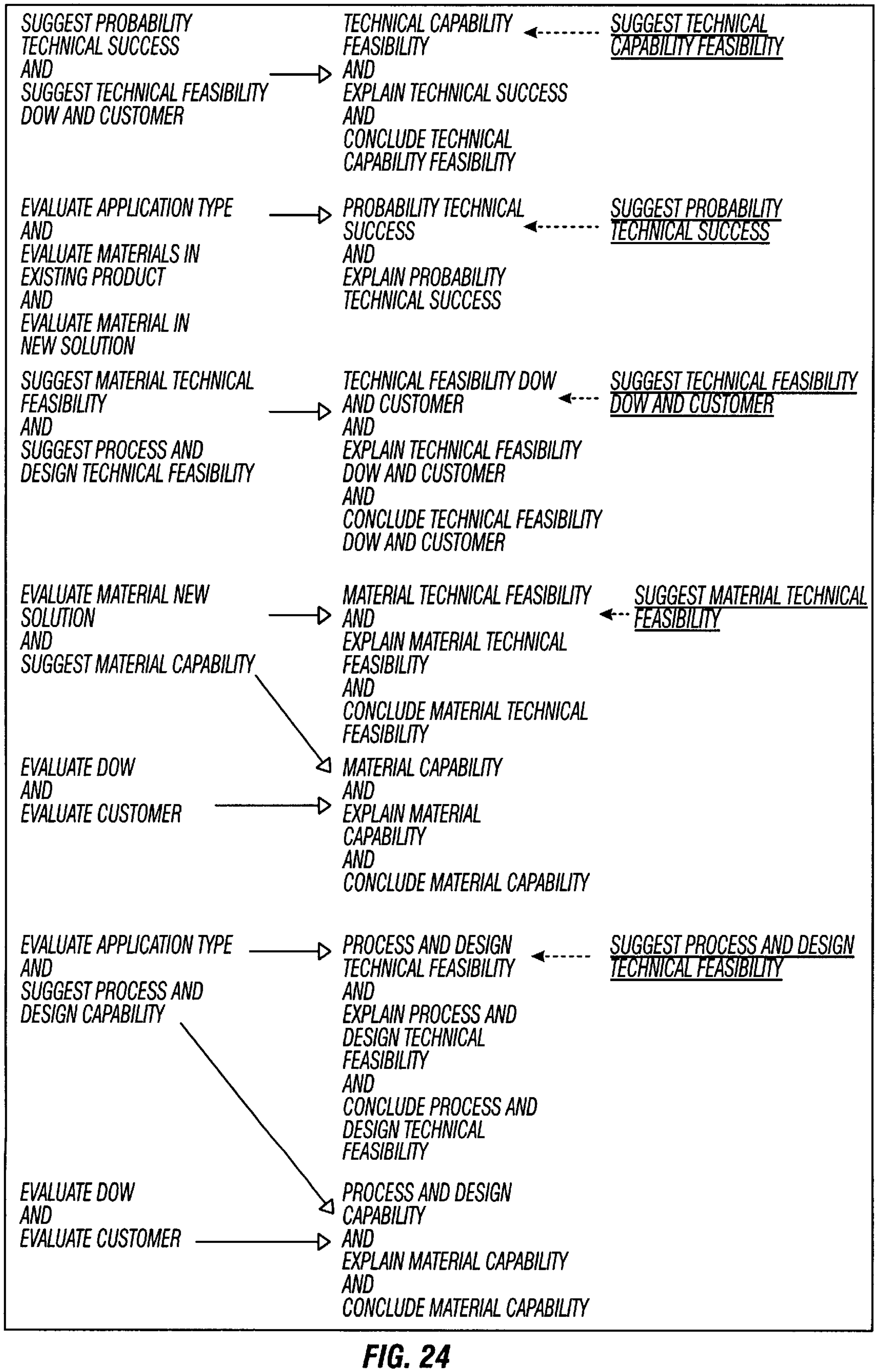
Figure 25:
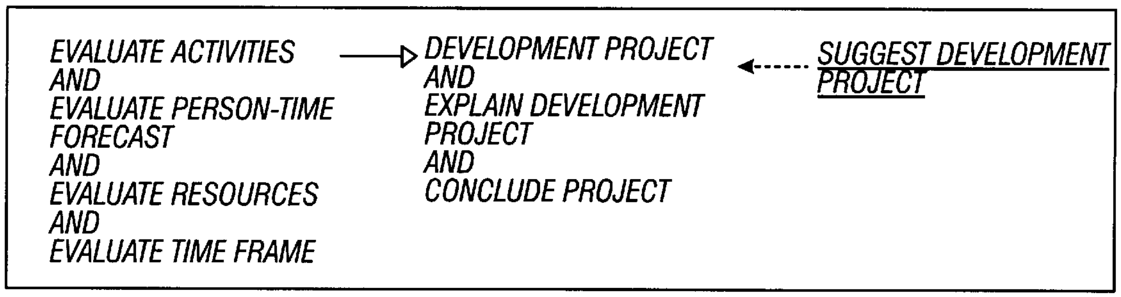
Figure 26:
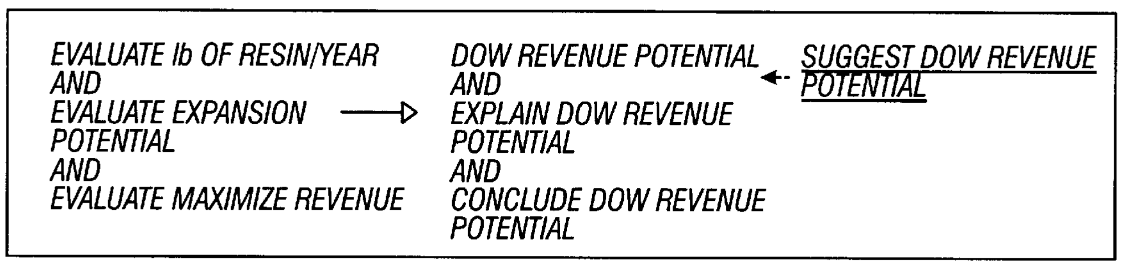
Figure 27:
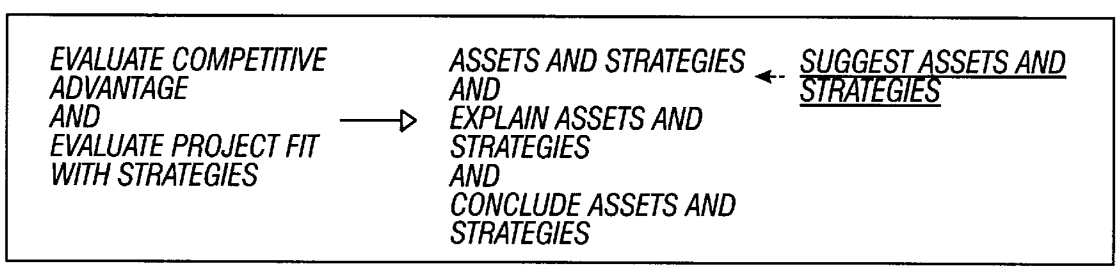
Figure 28:
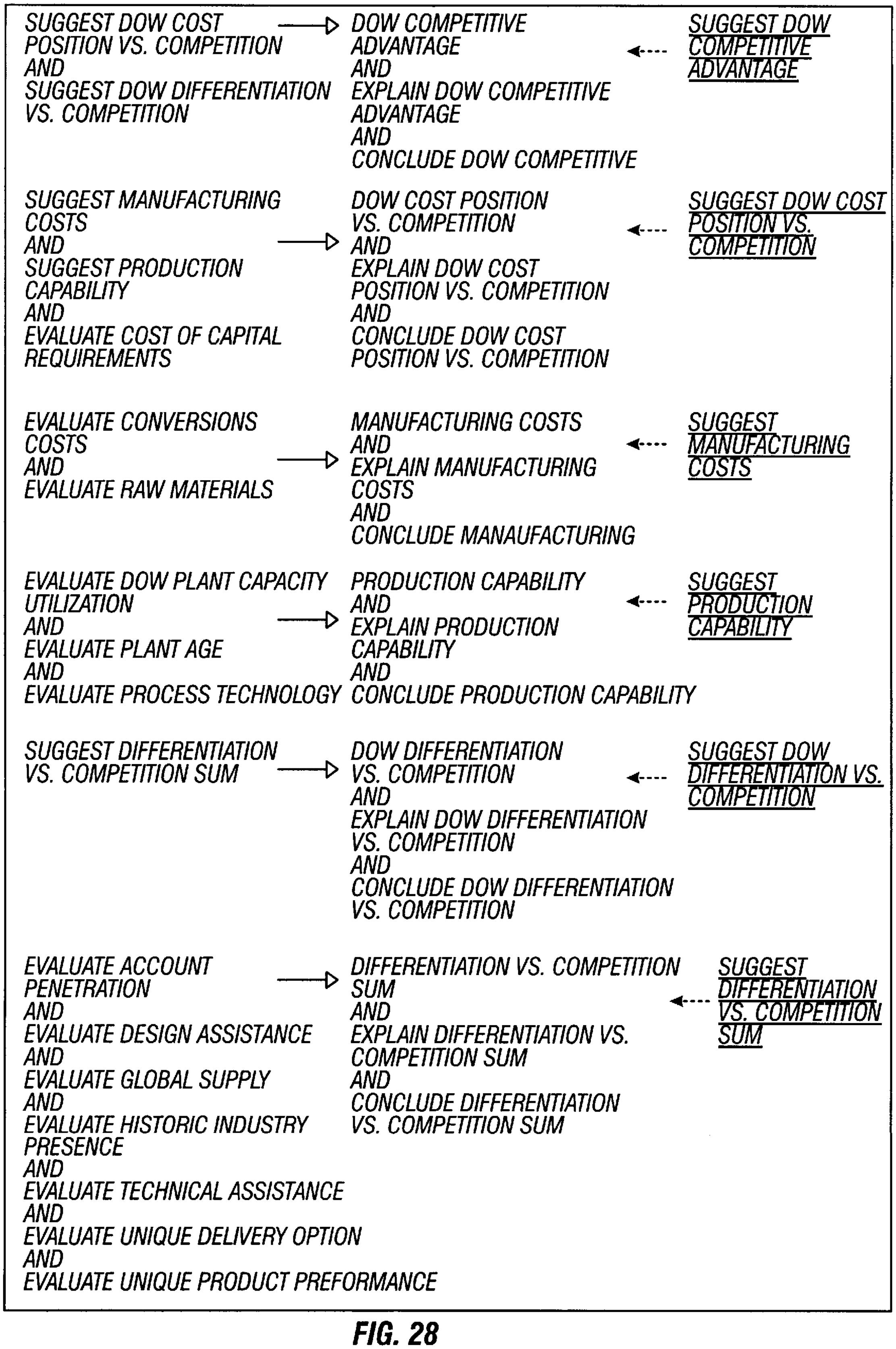

Specifically, FIG. 19 shows the Opportunity Identification root prototypes; FIGS. 20 and 21 show the market attractiveness prototypes including prototypes for market attractiveness, pressure, bargaining leverage, price sensitivity, direct competition, product standardization, and competitor concentration; FIG. 22 shows project importance and major goals prototypes including prototypes for project importance, cost reduction and interest and business; FIG. 23 shows customer commitment prototypes including prototypes for customer commitment, organization levels, organization functions and organization levels; FIG. 24 shows technical capability feasibility prototypes including prototypes for technical capability feasibility, probability technical success, technical feasibility Dow and customer, material technical feasibility, and process and design technical feasibility; FIG. 25 shows development project prototypes including prototypes for development project; FIG. 26 shows revenue potential prototypes including prototypes for Dow revenue potential; FIG. 27 shows assets and strategies prototypes including prototypes for assets and strategies; and FIG. 28 shows competitive advantage prototypes including prototypes for Dow competitive advantage, Dow cost position competition vs. competition, manufacturing costs, production capability, Dow differentiation vs. competition, and differentiation vs. competition sum.

Figure 29:
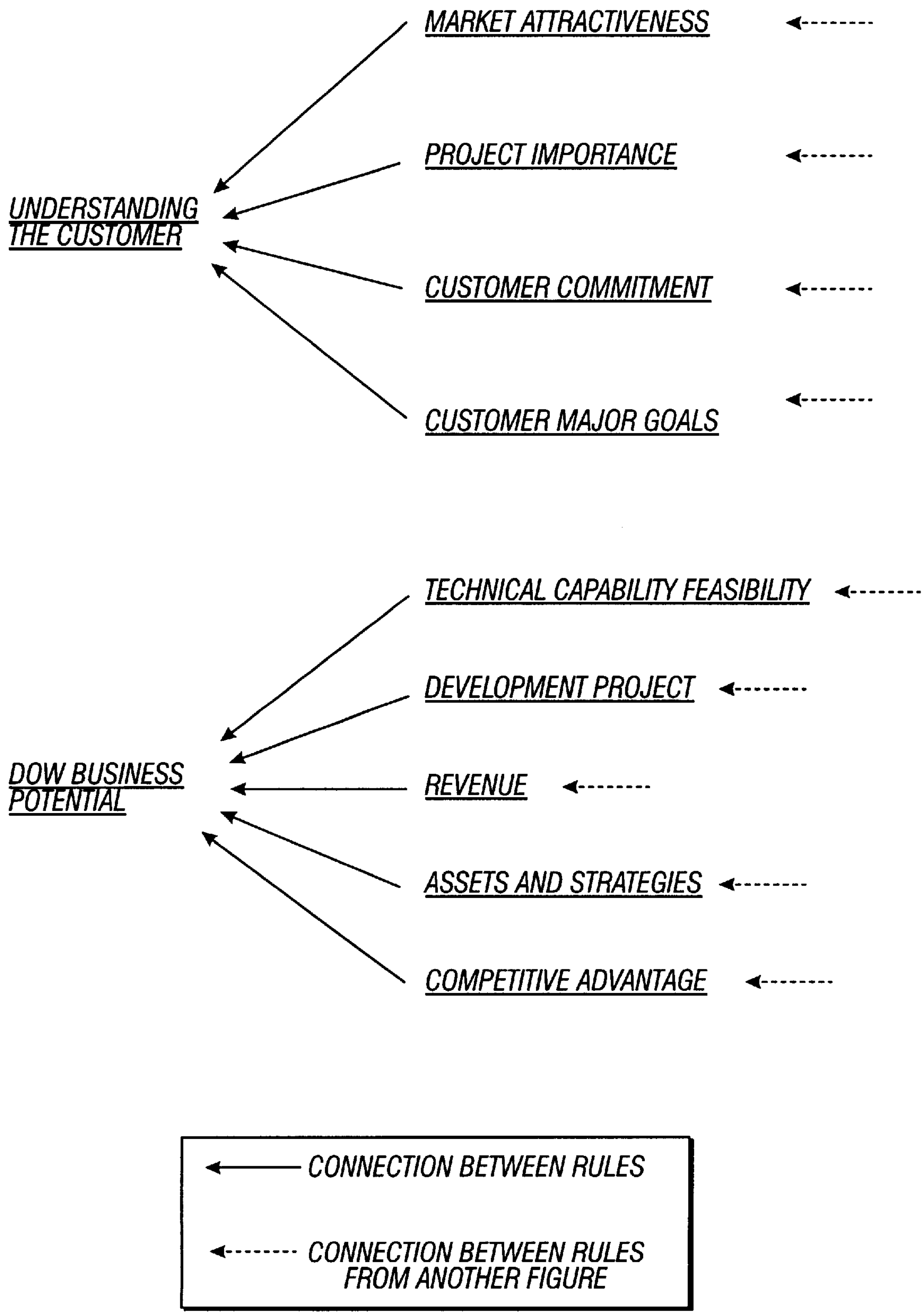
Figure 30:
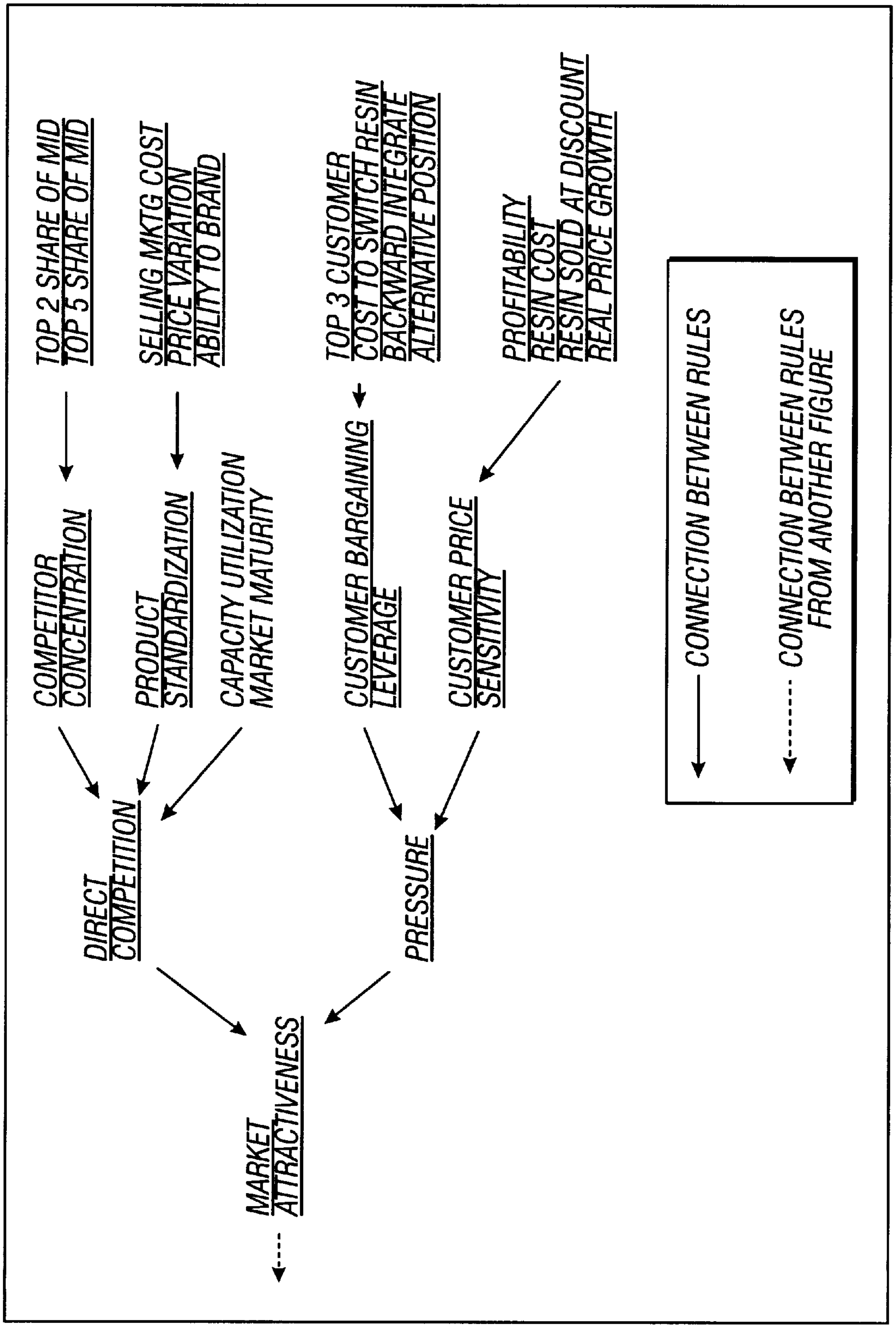
Figure 31:
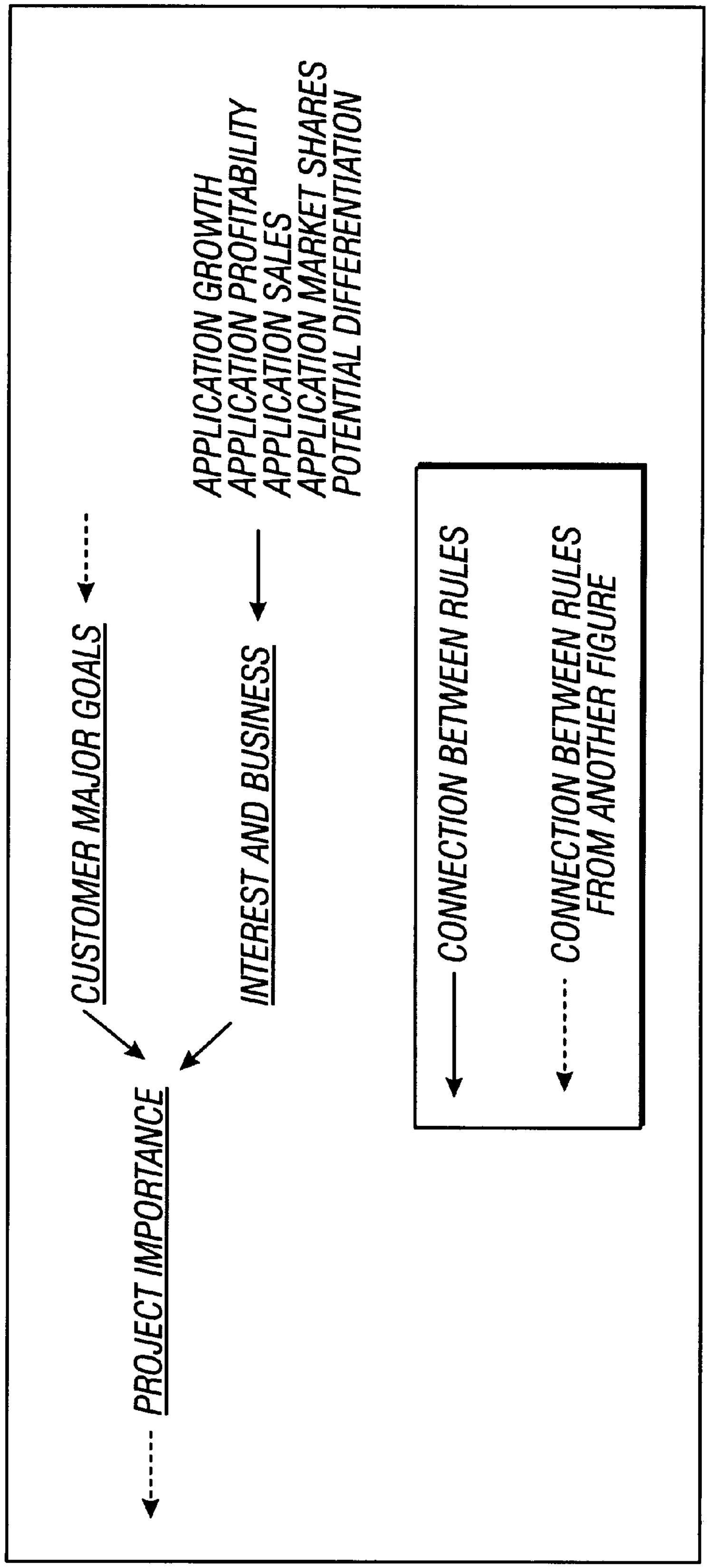
Figure 32:
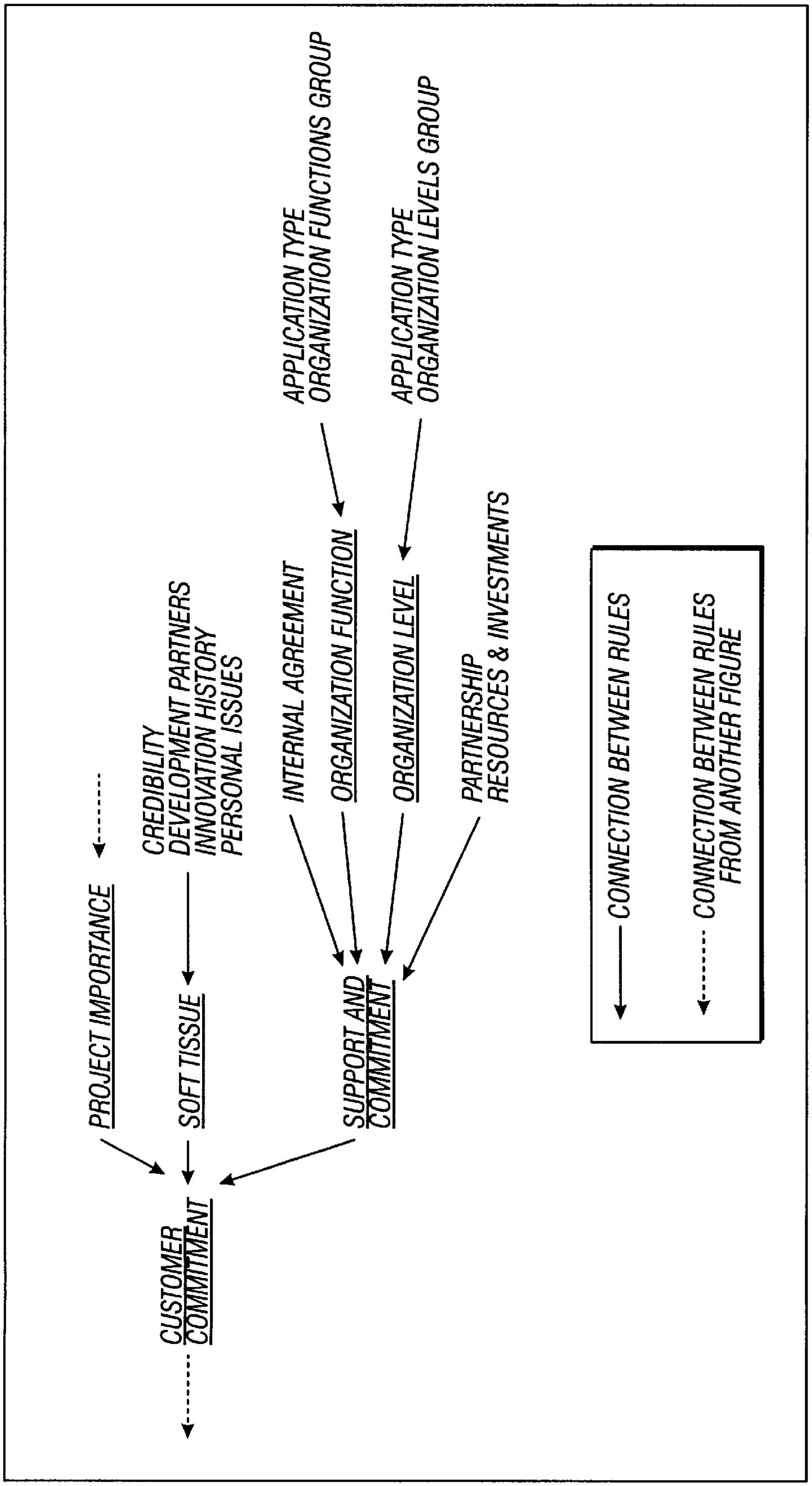
Figure 33:
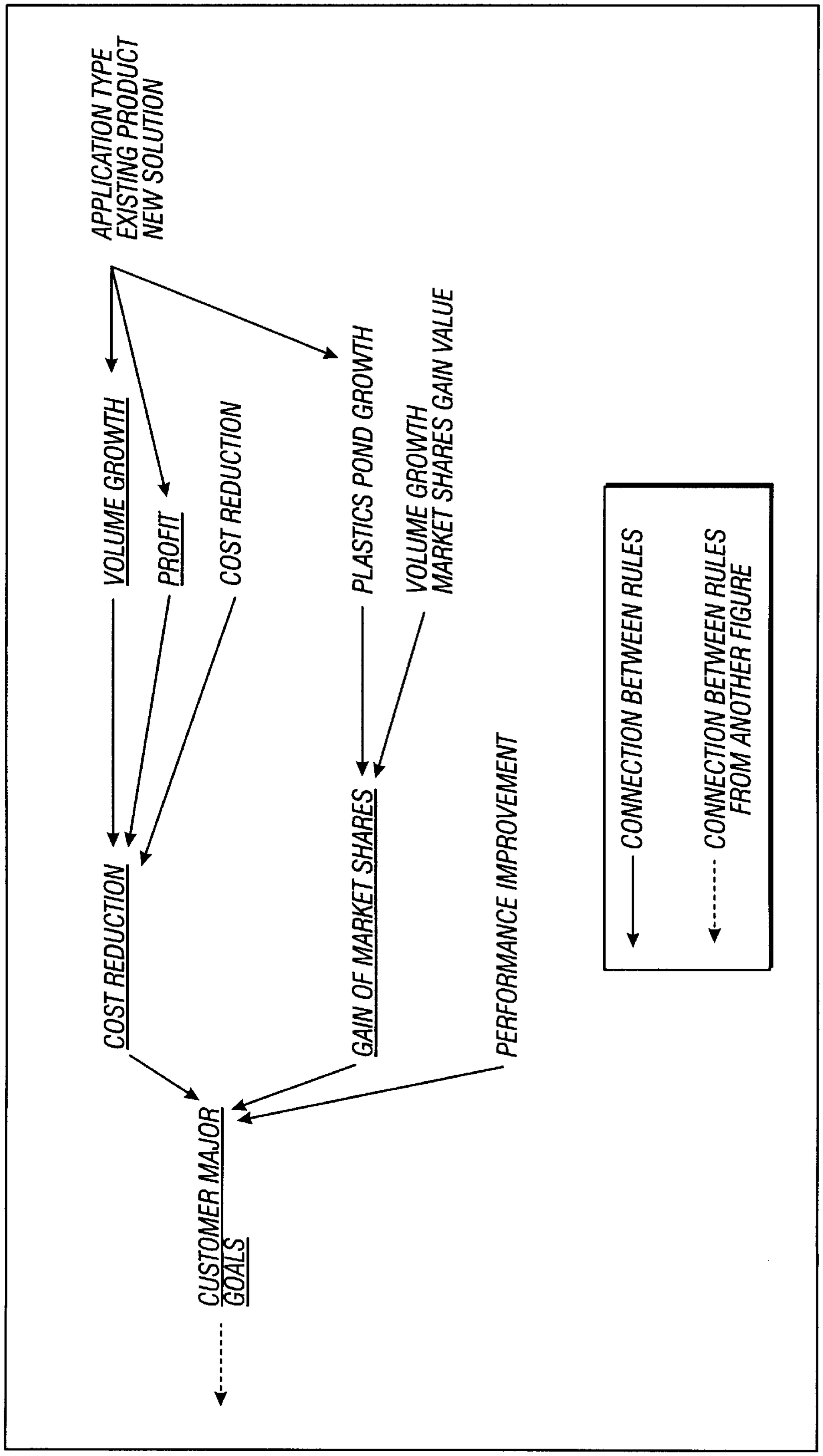
Figure 34:
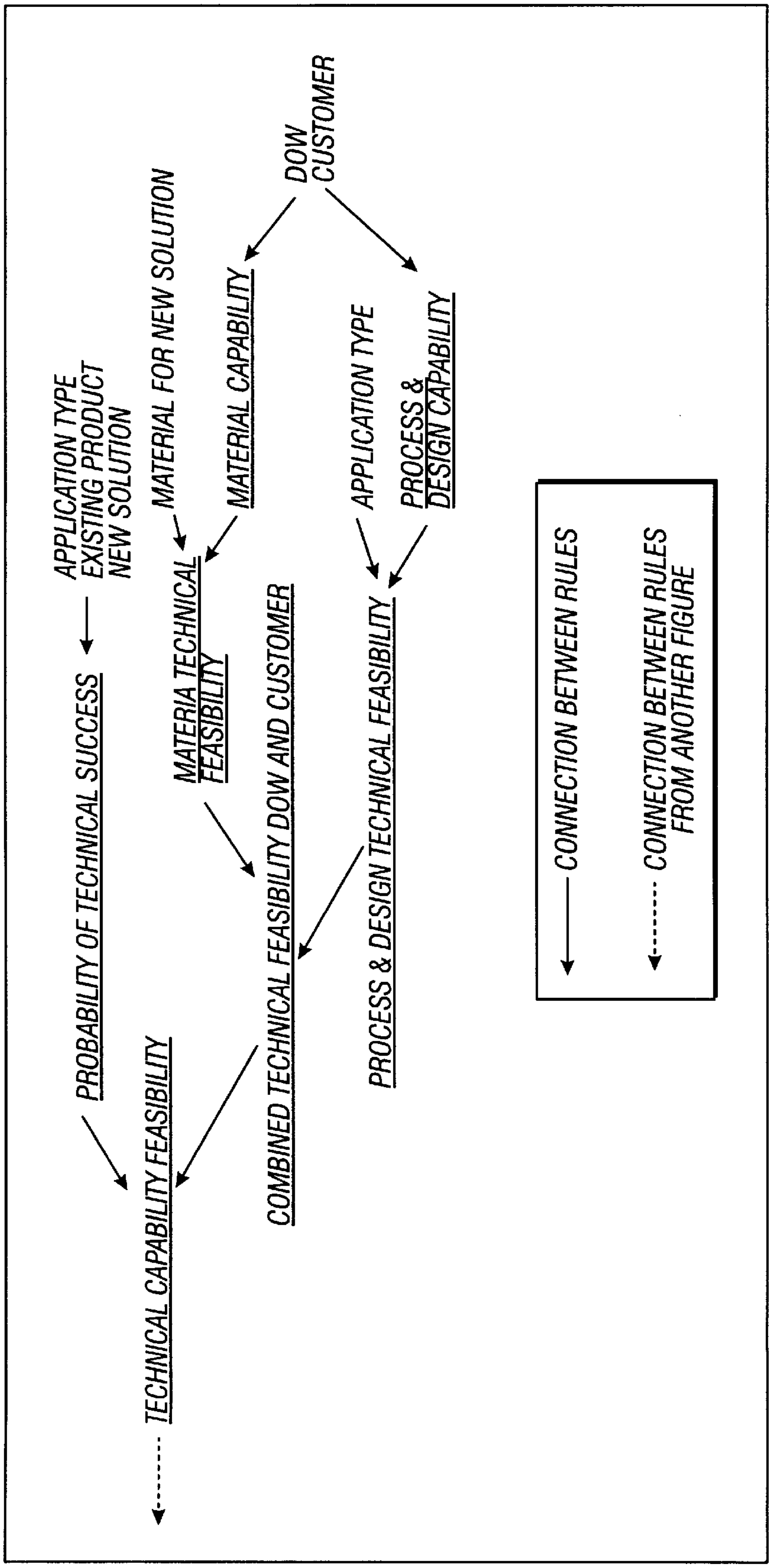
Figure 35:
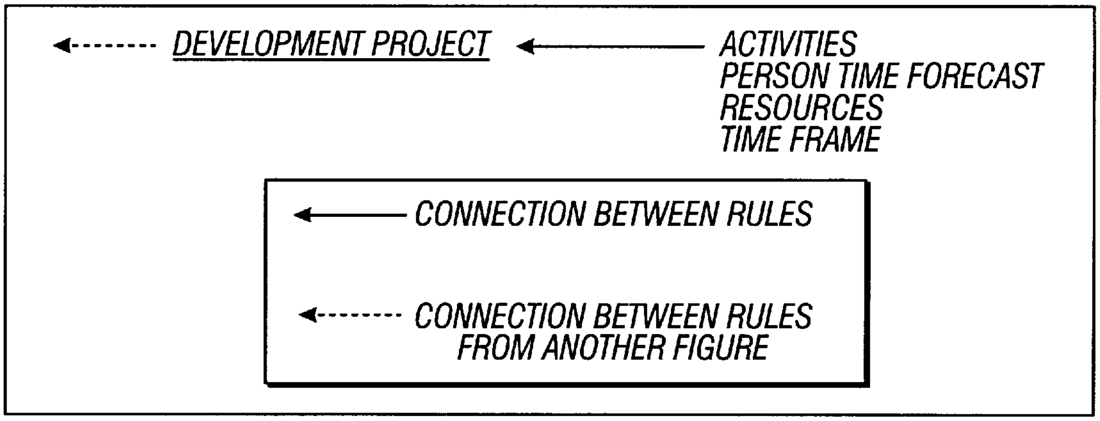
Figure 36:
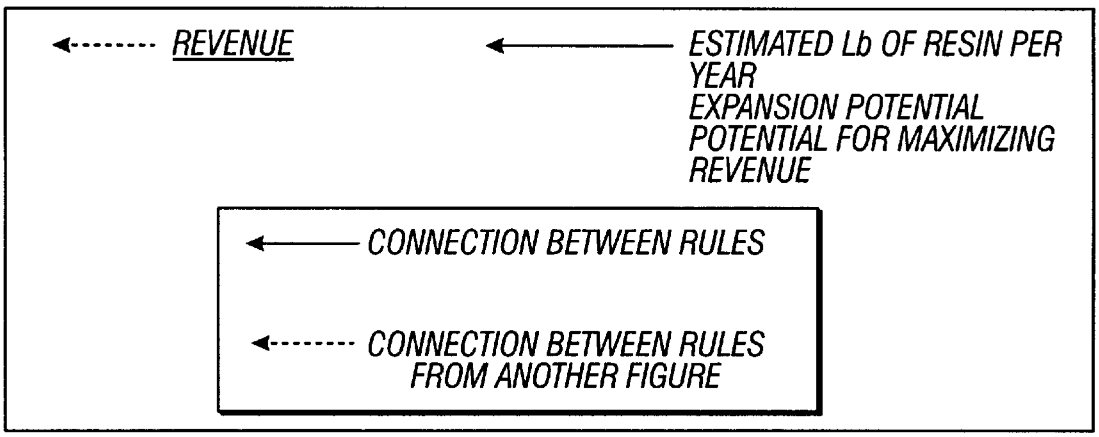
Figure 37:
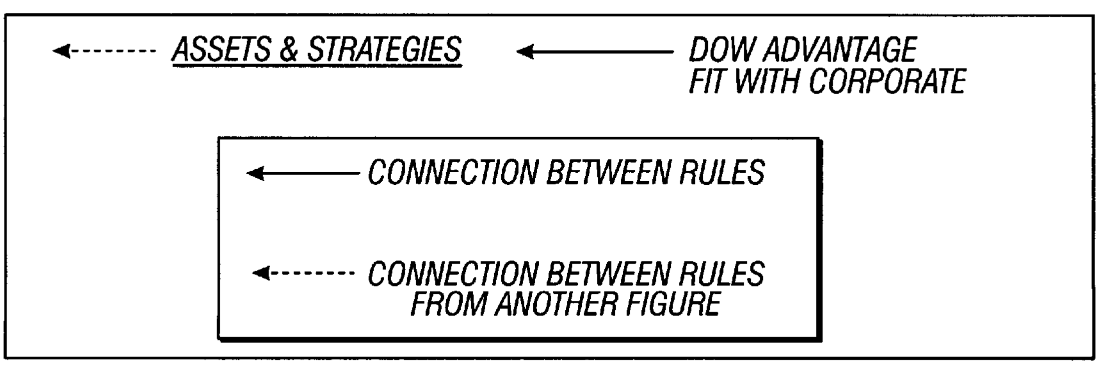

Additionally, FIG. 29 shows lines of reasoning for understanding the customer and user business; FIG. 30 shows lines of reasoning for market attractiveness; FIG. 31 shows line of reasoning for project importance; FIG. 32 shows lines of reasoning for customer commitment; FIG. 33 shows lines of reasoning for customer major goals; FIG. 34 shows lines of reasoning for technical capability feasibility; FIG. 35 shows lines of reasoning for development project; FIG. 36 shows lines of reasoning for revenue; FIG. 37 shows lines of reasoning for assets and strategies; and FIG. 38 shows lines of reasoning for competitive advantage.

As with the Processes and Materials Selection Module, the Opportunity Identification knowledge base module includes a dynamic explanation of reasoning. The system explains how it reaches conclusions and provides information on the inference chains used to arrive at any particular conclusion. In order to supply the user with such explanatory information, the module has been designed so that: (1) relevant context and meaning have been encapsulated in rules; (2) the necessary containers (classes, objects, and attributes) have been defined; and (3) a record of rules firing has been kept.

In the SYS1 embodiment of the present invention developed by the inventors, system control is essentially left to the Nexpert Object inference engine as follows: (1) the inference engine is stopped while all the input variable values are volunteered by the user through the GUI; (2) the Opportunity Identification hypothesis is suggested by the GUI; and (3) the inference engine processes the information until the end of session is reached.

3. Input Data for Opportunity Module

The Opportunity Identification Module of the PAMS system contains a body of knowledge that helps in understanding customers' needs and identifying business opportunities for "durable goods" applications. This opportunity identification function in the realm of "durable goods" applications is based on the evaluation of over 100 variables, each of them with several possible soft or hard values, and their interdependencies. Soft values refers to linguistic values such as "high", "medium" or "low", whereas hard values refer to numeric or quantitative values.

The input variables are grouped in terms of the major elements of the analysis: Technical; Customer Business; and User Business. The following Tables 22B–37 reflect these groups and list all the input variables, including possible values, definitions, and contexts for each group of elements used by the Opportunity Identification module to analyze a give durable goods scenario. The contexts form part of the explanation of the solutions derived by the inference engines for the input data selection made the user.

Tables 22B and 23 below show data relating to technical restraints and requirements, including aesthetics, durability, ergonomics, environmental, mechanical, reliability and weight. For aesthetics, the user determines importance of the finish, color, shape and texture, rating them from 1 to 5 for both an existing product and new solution. For environmental, the user determines the importance of chemical resistance, corrosion resistance, temperature resistance, and radiation resistance, for both the existing product and the new solution. For mechanical, the user determines the importance of cycles, duration, impact load and magnitude, rating them from 1 to 5 for both the existing product and the new solution.

TABLE 22B

Technical Constraints & Requirments

| Elements of Analyses | Input Variables | Values | Contexts |
|---|---|---|---|
| Aesthetics | Class A Finish | 1 to 5 | What is the importance of the feature in the existing product? How important is it to keep, improve, or change that feature in the new or improved product? |
| | Color<br>Shape<br>Texture | | |
| Durability | | same as above | same as above |
| Ergonomics | | same as above | same as above |
| Environmental | Chemical Resistance<br>Resistance<br>Radiation Resistance | same as | same as above |

TABLE 23

Technical Constraints & Requirments (Continued)

| Elements of Analyses | Input Variables | Values | Contexts |
|---|---|---|---|
| Mechanical | Cycles (Fatigue) | 1 to 5 | What is lhe importance of the feature in the existing product? How important is it to keep, improve, or change that feature in the new or improved product? |
| | Duration<br>Impact Load<br>Magnitude | | |
| Reliability | | same as above | same as above |
| Weight | | same as above | same as above |

Table 24 below shows the input data relating to the analysis for comparing an existing product versus a new product where the elements of analysis are the existing product and new solution(s). The input data for these elements of analysis include material used and process types for the existing product element and user's material (Dow material in the table) and application type for the new solution(s) element.

TABLE 24

Technical Existing vs. New Products

| Elements of Analyses | Input Variables | Values | Contexts |
|---|---|---|---|
| Existing Product | Material Used | Plastic | The application is completely or partially in plastic. |
| | | Traditional | The application is completely in traditional materials (such as wood, metal, or glass . . . ); it may be possible to consolidate parts and substitute the traditional material with plastic materials. |
| | Process Type | Reform + Assembly | Processes which produce standard shapes that are assembled, soldered, welded, or bolted together. |
| | | Near Net Shape | Prccesses which give: either all the shapes that are needed on one side (inside or outside) of the part (e.g., blow molding, thermoforming, glass blowing); or, dimensions that can be held inside and outside but with a Iot of flash or poor surtace finish (e.g., die casting, sand casting) so that there is a need for primihg and painting or machining. |
| | | Net Shape | Processes for which the desired shapes come directly out of the mold (e.q., injection molding). |
| New Solution(s) | Dow Material | Current | A current Dow material will be used in the new or improved application. |
| | | Modified | A modified Dow material will be used in the new or improved application. |
| | | New | A new Dow material will be used in the new or improved application. |
| | Application Type | Current | The application is currently in production. |
| | | Minor Modification | The new product involves minimal redesign of the existing application and will still use in-place manufacturing. |
| | | Major Modification | The new product includes major new model introduction, new platform, new production protocol, and new design approach. |
| | | New-to-the-World | The application is truly new-on-scene product. |

Table 25 below shows the input data relating to technical capacity including the analysis elements material, process and design. Input data for each element are customer and user (Dow in the table).

TABLE 25

Technical Capability

| Elements of Analyses | Input Variables | Values | Contexts |
|---|---|---|---|
| Material | Customer | Strong, Weak | What is the strength of the customer's expertise in materials? |
| | Dow | | What is the strength of Dow's expertise in materials? |
| Process | Customer | Strong, Weak | What is the strength of the customer's understanding in fabrication processes? |
| | Dow | | What is the strength of Dow's understanding in fabrication processes? |
| Design | Customer | Strong, Weak | What is the strength of the customer in design? |
| | Dow | | What is the strength of Dow in design? |

Table 26 shows the input data relating to the business customer's major goals element of analysis. Major goal element input data includes cost reduction value (%), importance of cost reduction, market share (%), importance of market share gain, and performance improvement.

TABLE 26

Business Customers Major Goals

| Elements of Analyses | Input Variables | Values | Contexts |
|---|---|---|---|
| Customer Major Goals | Cost Reduction | 0% to 80% | How much does the customer want to reduce the cost of the application in % of the existing cost (for the application or a similar competitor's application)? The target cost is usually provided by the client: i.e. 10% reduction of the current cost. |
| | Cost Reduction Importance | 1 to 5 | |
| | Gain of Market Shares | 0% to 100% | How much of the market share does the customer want to gain? In other words enter the additional market share that the customer wants to gain in % of total market share. |
| | Gain of Market Shares Importance | 1 to 5 | |
| | Performance Improvement | | How important is the performance improvement required by the custcmer? |

Tables 27 and 28 below show the input data relating to customer interest and business analysis elements including interest and business, excess industry capacity, and product standardization. Input variables for these analysis elements include application growth, profitability, sales, market share, potential for product differentiation, capacity utilization, selling/marketing cost, price variation, and ability to brand.

TABLE 27

Customer Interest & Business

| Elements of Analyses | Input Variables | Values | Contexts |
|---|---|---|---|
| Interest & Business | Application Growth | 0 to 5 times | The application growth is compared to the customer's total company growth: e.g., the application growth is 3.5 times the total company growth. |
| | Application Profitability | 0% to 100% | The application profitability corresponds to the return on sales of the application. It is the profit as a % of sales for the application. |
| | Application Sales | 0% to 100% | The application sales is expressed in terms of a % of the total company sales. |
| | Application Market Share | 0% to 100% | The application Market Share, expressed in % of total market shares, represents the customer's shares of the total market shares for the application. |
| | Potential Differentiation | Low<br>Average<br>Significant | The Potential Differentiation represents the customer's product potential to differentiate itself in the market place. |

TABLE 28

Customer Interest & Business (Continued)

| Elements of Analyses | Input Variables | Values |
|---|---|---|
| Excess Industry Capacity | Capacity Utilization | 0% to 150% |
| Product Standardization | Selling/Mktg. Cost | 0% to 40% |
| | Price Variation of Average | 0% to 30% |

TABLE 28-continued

Customer Interest & Business (Continued)

| Elements of Analyses | Input Variables | Values |
|---|---|---|
| | Ability to Brand | Low<br>Average<br>High |

Table 29 below show the input data relating to customer direct competition and pressure analysis elements including competitor concentration, market maturity, and customer bargaining leverage. Input variables for these analysis elements include: top 2 and 5 share of market for competitor concentration analysis; market growth for market maturity analysis; and top 3 customers, cost to switch to plastics, backward integrate, alternative suppliers and differentiation position for the customer bargaining leverage analysis.

TABLE 29

Customer Direct Competition and Pressure

| Elements of Analyses | Input Variables | Values | Contexts |
|---|---|---|---|
| Competitor Concentration | Top 2 Share of Market | 0% to 100% | Market share of the 2 top suppliers in the market. |
| | Top 5 Share of Market | 0% to 100% | Market share of the 5 top suppliers in the market. |
| Market Maturity | Market Growth | −10% to 50% | This corresponds to the market growth for the application. |
| Customer Bargaining Leverage | Top 3 Customer | 0% to 100% | The Top 3 Customer corresponds the % of the total market controlled by the top 3 players in the business (if the top 3 customers represent a majority of the market, they really control price). |
| | Cost to Switch Plastic | Low High | The cost to switch plastic is low when: the customer has the ability to switch plastic easily. the customer has the technology and the resources to be able to switch back and forth between plastic suppliers: they control pricing. |
| | Backward Integrate | Low High | The customer has the ability to make the material as opposed to buy it from a supplier; in that scenario, there is competition against production economics. |
| | Alternative Suppliers | Few Many | The customer has the choice to purchase plastic from many or few suppliers. |
| | Differentiation Position | None High | This element corresponds to the product contribution to the customer's differentiation position; it is subjective and difficult to evaluate. |

Tables 30 and 31 below show input data related to customer pressure and soft issues elements of analysis: customer price sensitivity and soft issues. Customer price sensitivity input variables include customer profitability, plastic cost, plastic sold at discount, and real price growth. Soft issues input variables include credibility history of customer to develop products, innovation history of customer, and any personal issues.

TABLE 30

Customer Pressure and Soft Issues

| Elements of Analyses | Input Variables | Values | Contexts |
|---|---|---|---|
| Customer Price Sensitivity | Customer Profitability | −10% to 25% | A profitable customer will not pressure too much into lower pricing. The ROC (Return On Capital or Profitability) can be obtained from the customer Annual Report for a publicly traded company; the division of the company in which the plastic is used matters really, but the ROC for a division is difficult to obtain from an Annual Report. |
| | Plastic Cost | 0% to 80% | The plastic cost is meant as a % of the total application cost. |
| | Plastic Sold at Discount | 0% to 80% | This element represents the % of plastic of the application which is obtained at discount; It Indicates the customer pricing options for the plastic. |
| | Real Price Growth | −10% to 20% | The real customer price growth corresponds to the customer's history of price growth; It is the history of price sensitivity. |

TABLE 31

Customer Pressure and Soft Issues (Continued)

| Elements of Analyses | Input Variables | Values | Contexts |
|---|---|---|---|
| Soft Issues | Credibility | Low Average High | Credibility or lack of credibility? Do we have any reason to believe everything the customer tells us? |
| | Development Partners History | | Has the Customer developed its last 2 or 3 products with the competitors or with us? Select: |
| | | None | None if the Customer has not yet developed a product with Dow; |
| | | Recent | Recent if the Customer has developed its most recent products with Dow; |
| | | Long | Long if the Customer has developed its last products with Dow. |

TABLE 31-continued

Customer Pressure and Soft Issues (Continued)

| Elements of Analyses | Input Variables | Values | Contexts |
|---|---|---|---|
| | Innovation History | Follower<br>Average<br>Leader | Is the customer recognized as an innovative technology leader? |
| | Personal Issues | Against<br>Neutral<br>In Favor | Is there any knowledge about relationships, people and personal issues that can strongly affect the decision process? |

Table 32 below shows input data relating to customer support and commitment elements, including input variables: internal agreement, organization functions, organization levels, partnership (%), and resources and investments (%).

TABLE 32

Customer Support & Commitment

| Elements of Analyses | Input Variables | Values | Contexts |
|---|---|---|---|
| Support & Commitment | Internal Agreement | Somewhat<br>Reasonably<br>Definitely | Does it look like the various functions involved in the decision process as well as the different levels of the Customer's organization are in agreement regarding the project? |
| | Organization Functions | Application Development Engineering<br>Corporate Management<br>Manufacturing<br>Marketing<br>Research & Development<br>Sales<br>Technical Services | Are the necessary Customer's organization functions (e.g., R&D) involved in the decision process? |
| | Organization Levels | Low Levels<br>Middle Levels<br>Upper Levels | Does it look like the proper levels of the Customer's organization are Involved in the process? (e.g., Is upper management involved?) |
| | Partnership | 0% to 80% | What is the balance between what the Customer (the Original Equipment Manufacturer) is going to supply and what Dow is going to provide? Indicate the Customer contribution to the development project in % of the total project cost. |
| | Resources & Investments | 0% to 20% | What percentage of the potential sales of the application does the Customer seem to be ready to commit to the development project? |

Table 33 below shows input data relating to the User's (illustrated as Dow in the table) revenue element. Input variables for this element include volume of units, pounds of plastic per unit, application lifetime, expansion potential, and options to maximize revenue.

TABLE 33

Dow Revenue

| Elements of Analyses | Input Variables | Values |
|---|---|---|
| Dow Revenue | Volume | Units/year |
| | Lb Plastic/Unit | Lb |
| | Application Lifetime | Years |
| | Expansion Potential | $ |
| | (Options to) Maximize Revenue | Development Agreement<br>Exclusive Rights to the Technology<br>Part Fabrication |

TABLE 33-continued

Dow Revenue

| Elements of Analyses | Input Variables | Values |
|---|---|---|
| | | Rename Plastic<br>Resin Compounding/Filling/Coloring<br>Tiered Pricing<br>Volume Commitment |

Table 34 below shows input data relating to the User's (illustrated as Dow in the table) assets/strategies element. Input variables for this element include user's (Dow in the table) competitive advantage and project fit with the user's (Dow) strategies.

TABLE 34

Dow Assets/Strategies

| Elements of Analyses | Input Variables | Values | Contexts |
|---|---|---|---|
| Assets Strategies | Dow Competitive Advantage | Availability/Delivery: Lead Times<br>Availability/Delivery: Meet Delivery Dates<br>Availability/Delivery: Packaging/Shipping<br>Business Contacts: Industry Knowledge<br>Business Contacts: Product Knowledge<br>Pricing: Fairness<br>Pricing: Responsiveness<br>Problem Handling: Attitude<br>Problem Handling: Communications<br>Problem Handling: Responsiveness<br>Problem Handling: Return Policy<br>Products: Consistency<br>Products: Processibility<br>Products: Product Lines<br>Products: Purity<br>Technical Support: Accessibility<br>Technical Support: Application Development<br>Technical Support: Product Development<br>Technical Support: Responsiveness<br>Technical Support: Technical Expertise | What applies the most to the present business situation? |
| | Project Fit with Dow Strategies | Somewhat<br>Reasonably<br>Definitely | How does the project fit with the Corporate Strategies & Visions? Are we going after markets or products that we want to emphasize? |

Table 35 below shows input data relating to the User's (illustrated as Dow in the table) differentiation element. Input variables for this element include account penetration, design assistance, global supply, historical industry presence, technical assistance, unique delivery options, and unique product performance.

TABLE 35

Dow Differentiation

| Elements of Analyses | Input Variables | Values |
|---|---|---|
| Dimensions | Account Penetration | Competitor Advantage<br>Neutral<br>Dow Advantage |
| | Design Assistance | |
| | Global Supply | |
| | Historical Industry Presence | |
| | Technical Assistance | |
| | Unique Delivery Options | |
| | Unique Product Performance | |

Table 36 below shows input data relating to the User's (illustrated as Dow in the table) cost position including the elements of analysis manufacturing costs, production capability and requirements. Input variables for these elements include conversion costs and raw materials for the manufacturing costs element; capacity utilization, plant age, and process technology for the production capability element; and cost of capital for the requirements element.

TABLE 36

Dow Cost Position

| Elements of Analyses | Input Variables | Values | Contexts |
|---|---|---|---|
| Manufacturing Costs | Conversion Costs | Higher<br>Lower | Are Dow conversion costs lower than the competition? |
| | Raw Materials | | Are Dow raw materials costs lower than the competition? |
| Production Capability | Capacity Utilization | | Is Dow's capacity of utilization higher than the competition? |
| | Plant Age | Older<br>Newer | Is Dow's plant newer than the competition's? |

TABLE 36-continued

Dow Cost Position

| Elements of Analyses | Input Variables | Values | Contexts |
|---|---|---|---|
| | Process Technology | Easily Copied<br>Unique | Is Dow process technology unique compared to the competitors? |
| Requirements | Cost of Capital | Higher<br>Lower | Is Dow's cost of capital lower than the competition? |

Table 37 below shows input data relating to the User's (illustrated as Dow in the table) development project including the analysis elements development project. Input variables for this element include activities, person-time forecast, resources, and time frame.

TABLE 37

Dow Development Project

| Elements of Analyses | Input Variables | Values | Contexts |
|---|---|---|---|
| Development Project | Activities | Consulting & Concepts<br>Engineering Design<br>Materials<br>Processes & Tooling<br>Prototyping<br>Sampling<br>Trials | The activities that will probably need to be done by Dow during the project, e.g.:<br>Tooling;<br>FEA;<br>Mold Flow;<br>Trials;<br>Samples, and others.<br>Prototype. |
| | Person-Time Forecast | Person-years | Several elements need to be taken into the picture when evaluating the person-time necessary to complete the project, such as:<br>the department(s) that will be involved<br>the number of people that will have to be committed.<br>the approximate time that these people will spend. |
| | Resources | Difficult<br>Feasible<br>Easy | For Dow, the resources for the project may depend on many factors such as, but not exclusive to:<br>the number and the type of departments<br>the number of people. |
| | Time Frame | | What is the Customer time frame? Is it feasible to meet the Customer time frame? The customer's goal is to beat the competitors and deliver first. The distribution of resources is an important element and should be carefully planned: typically, being 6 months late means a 50% loss in profit potential for the application (lifetime)! |

4. Output Data

In the practice of the present invention, experts' knowledge is used to process the information, explore alternatives, weight importance, make judgments, and reach conclusions. The outcome of the opportunity identification module takes the form of detailed sets of recommendations in terms of two cornerstones:

(1) the customer's technical and business needs which include:
- Market Attractiveness,
- Project Importance,
- Customer Commitment, and
- Technical Feasibility.

and, (2) the User's business potential which includes:
- Development Project Management,
- User's Revenue and Business,
- User's Corporate Strategies,
- User's Competitive Advantage.

Tables 38–40 reflect these sets analysis elements and list all the output variables, including possible values, definitions, and contexts associated with each analysis element. Table 38 below shows information relating to opportunity analysis (OA) results for understanding the customer. Output variables include market attractiveness, project importance, customer commitment, and technical feasibility.

TABLE 38

OA Results: Understanding the Customer

| Elements of Analyses | Output Variables | Values |
|---|---|---|
| Understanding Customer's Technical and Business | Market Attractiveness | Due to the complexity of the problem and the large number of input parameters, the |

TABLE 38-continued

OA Results: Understanding the Customer

| Elements of Analyses | Output Variables | Values |
|---|---|---|
| Needs | | number of soft values for the output variables is large. |
| | Project Importance Customer Commitment Technical Feasibility | |

Table 39 below shows information relating to opportunity analysis (OA) results for the user's (illustrated as Dow in the table)business. Output variables include development and project management, revenue and business, corporate strategies, and competitive advantage.

TABLE 39

OA Results: Dow Business

| Elements of Analyses | Output Variables | Values |
|---|---|---|
| Dow Business | Development Project Management | Due to the complexity of the problem and the large number of input parameters, the number of soft values for the output variables is large. |
| | Dow Revenue & Business Dow Corporate Strategies Dow Competitive Advantage | |

Table 40 below shows information relating to the overall opportunity analysis (OA) results. Output variables include understanding of the customer, and user business potential.

TABLE 40

OA Overall Results

| Elements of Analyses | Output Variables | Values | Contexts |
|---|---|---|---|
| Overall | Understanding of the Customer | Due to the complexity of the problem and the large number of input parameters, the number of soft values for these output variables is large. | These output variables are an attempt to summarize the results for the two corner stones of the opportunity identification analyses. |
| | Dow Business Potential | | |

V. Models and Database

A. Overview

Most applications with traditional materials involve fabrication by "reform and assembly" processes. These processes produce standard shapes that are assembled, soldered, welded, or bolted together. The assembly phase is costly and eventually can be eliminated with plastic materials when the product is fabricated with "net shape" or "near net shape" processes.

In the "durable goods" market, one of the challenges resides in finding the competitive design which addresses the required mechanical properties, meets or exceeds the other functional requirements, and is compatible with a "near net shape" to "net shape" fabrication process. As such, plastic materials can offer competitive solutions over traditional materials. The results of the mechanical and economic analyses include part costs and weights for the selected grades and corresponding chosen processes. Fundamental mechanical models provide the amount of material require to make the application depending on the shape, the mechanical constraints, and the material grade strength.

The fundamental models utilized in the PAMS system are adequately expressed, implemented and used in spreadsheets. For the PAMS system of the present invention, third party and in-house applications software were integrated into spreadsheet format, and normalized to allow for meaningful comparisons between scenarios. As a result, the numerical processing was left to the Microsoft Excel for Windows spreadsheet components.

B. Models

1. Mechanical Models

For the SYS1 embodiment of the present invention, mechanical models were included for the following standard shapes: equal-legged angle, thin annular, hollow circular, solid circular, symmetric hat, hollow rectangular, solid rectangular, I profile, L profile, hollow square rotated 45°, solid square, diamond, tee, and U profile. In addition to the SYS1 models, the SYS2 embodiment of the present invention included the following shell/plate models: (1) solid circular plate all-edges fixed; (2) solid circular plate simply supported; (3) rectangular plate fixed; (4) rectangular plate simply supported; and (5) triangular plate. The models solve only for part thickness based on other required dimensions and the Young Modulus.

In addition, the following four mechanical models were simplified in SYS2 so that they calculate a uniform part thickness rather than multiple part thicknesses: (1) Hollow Rectangle cross section; (2) TEE cross section; (3) Channel cross section; and (4) I-Profile cross section.

The mechanical models can be used either stand-alone or as part of the selection process to derive a part dimension based on other known dimensions, maximum part deflection under load, and the material Young Modulus. Primarily, the mechanical models coupled with a database containing the Young Modulus for each grade allow users to compare the required thicknesses for various selected materials. Also, in the PAMS embodiment, part thickness, surface area, projected area and volume derived in the mechanical models are used as a primary input into the economic models for determining cost per part.

The present models assume a bending mode with elastic response, two fixed points boundary conditions and constant wall thickness. They include validity checks for the length to depth ratio and the beam slope.

The input variables for the mechanical models include: (1) list of the grades of materials and their tensile modulus; (2) shape; (3) beam span; (4) load; (5) axis about which the load is applied; and (6) maximum deflection, and beam dimensions, with one dimension to solve for.

The fundamental models utilized in the system are as follows where Equations (1), (2), and (3) are solved for one of the dimensions $X_i$ and where the moment of inertia I depends on the beam shape.

$$I=I(L_i X_i) \tag{1}$$

The value for the moment of inertia I is obtained from equation (2) where E is the tensile modulus of the material.

$$I = \frac{OverallStiffness}{E} \tag{2}$$

The overall stiffness is calculated using equation (3) and assumes bending mode with elastic response, two fixed points boundary conditions and constant wall thickness. Q is the load applied to the beam, L the beam span, and D the maximum beam deflection.

$$OverallStiffness = \frac{Q \times L^3}{192D} \tag{3}$$

The model validity check is provided by the beam slope and the length to depth ratio. Equation (4) gives the beam slope in radians.

$$\frac{Q \times L2}{64I \times E} < 0.277 \tag{4}$$

The normalized length to depth ratio is expressed by equation (5) where α and Depth are factors depending on the beam shape.

$$\frac{L}{\alpha \times Depth} \geq I \tag{5}$$

The moment of inertia I, the Depth and α factors for each shape are calculated in the mechanical models spreadsheet.

2. Economic Models

The economic models of the PAMS systems of the present invention provide a "first pass" approximation that will allow users to compare the cost per part of various combinations of materials and processes. The SYS1 embodiment utilized selected commercially available IBIS Associates, thermoplastics processes economic models and an in-house economic model for SRIM (structural reaction injection molding) processes.

The SYS2 embodiment utilizes economic models that are scaled down versions of the comprehensive process cost models provided by IBIS Associates. The models include: thermoplastic injection molding; extrusion blow molding; structural reaction injection molding (SRIM); reaction injection molding (RIM); extrusion thermoforming; gas assisted injection molding; and die casting.

Each economic model supplied by IBIS Associates is self-contained in individual Excel 4.0 worksheets. A simplified version of the models was created for use in the present embodiment. In this version, default values have been substituted for some of the user inputs required by the full models in order to provide a good "first-pass" cost per part estimation. For the SYS2 embodiment, all the models, tables, and model inputs were combined into a single Excel 4.0 workbook. This workbook has the following worksheets:

a. Model Spreadsheets

Economic models for each process are contained in individual spreadsheets. Material information originally contained in each model was moved to a single common table called the "Engineering Properties Table."

b. Engineering Properties Table

The Engineering Properties Table is used as a "look-up" table for each material specified by the embodiments of the present invention for a certain process. The look-up table includes information about cost per pound, scrap cost per pound, Young Modulus and other process relevant properties for each generic grade of material. The Engineering Properties Table contains only the appropriate information required to determine the material cost per pound for compatible processes for the specified material grade. Consequently, some blow molding grades most likely may not contain the necessary information for determining a cost per part in the injection molding model.

c. Additives Properties Table

Figure 40:
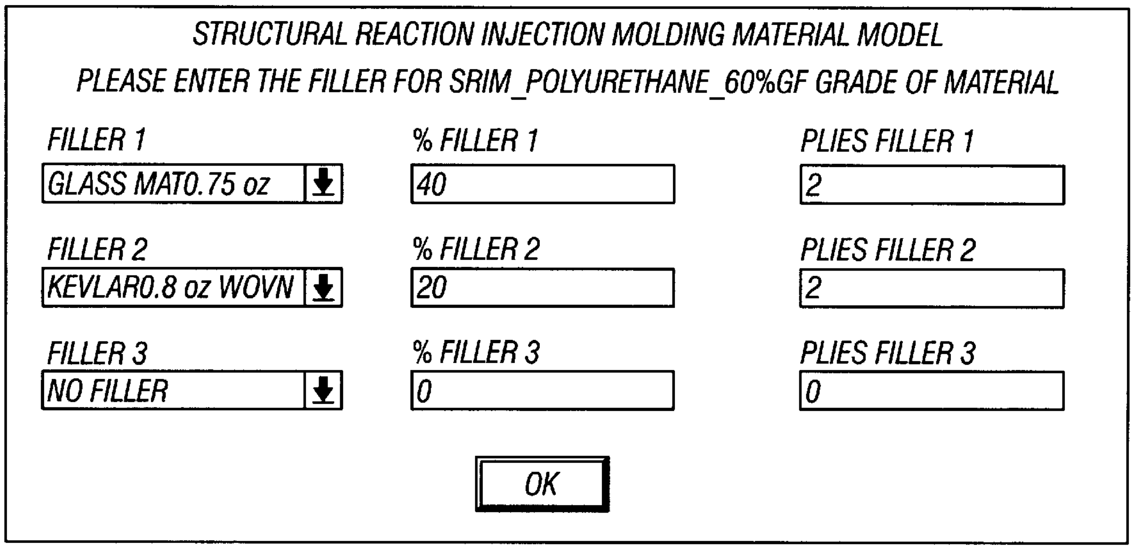
FIG. 40 shows an example of a material specific entry screen for the economic models of the present invention.

The additives property table contains information about additives used in the SRIM and RIM processes. Because there is a large possibility of combination of filled thermoset resins for these processes, users are queried via an Excel dialog box for the appropriate filler type, percentage composition and layers. See FIG. 40 for an example of a material specific entry screen for the economic models of the present invention. Based on information about filler density and cost/pound contained in the additives property table, the system can calculate adjusted weights and cost per part used by the SRIM and RIM models.

d. Input Sheet

Figure 41:
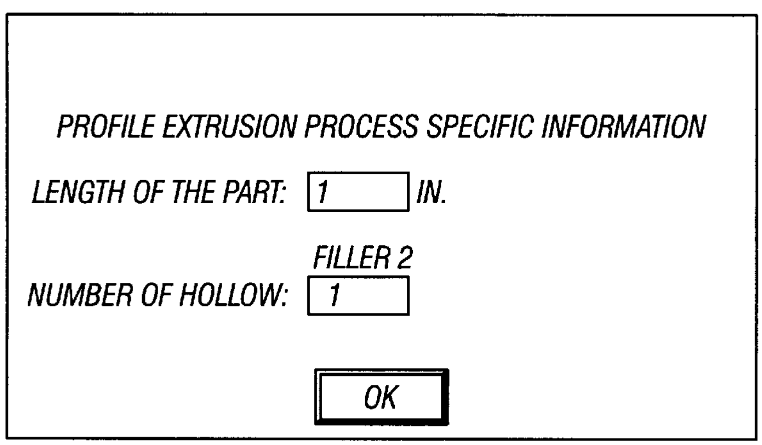
FIG. 41 shows an example of a process specific information screen.

The input sheet provides a common data source for all the economic models, see Table 41. Part thickness, volume, surface area, projected area, production volume and product life are provided to the models by the system and/or through user input. For any other processing dimensions specific to a process model (i.e., length, width, height, etc.) the user is required to enter the information via a dialog box in Excel, see FIG. 41. The system uses the information to determine the appropriate weights and thus the approximate cost per part.

TABLE 41

Input Table for All Economic Models

| Description | Value | Name | Units | Model |
|---|---|---|---|---|
| Model | Reaction Injection Molding | MODEL | | N/A |
| Family Name | RIM_PolyUrethane | Family | | ALL |
| Average Wall Thickness | 0.25 | THKAIN | in. | ALL |

TABLE 41-continued

Input Table for All Economic Models

| Description | Value | Name | Units | Model |
|---|---|---|---|---|
| Surface Area | 200 | SAREASQIN | sq in. | Die Casting, Injection Molding,RIM,SRIM,SMC |
| Projected Area | 100 | PAREASQIN | sq in. | Die Casting, Injection Molding,RIM,SRIM,SMC |
| Part Volume | 200 | PARTVOL | cu in. | |
| Product Life | 5 | PRODLIFE | Years | ALL |
| Production Volume | 200 | PRODVOL | Thousand/Year | ALL |
| Contained Volume | 5 | CONTVOL | cu in. | |
| Length | 1 | LEN | in. | Profile Extrusion,SRIM,RIM, Extrusion Thermoforming |
| Width | 1 | WID | in. | SRIM,RIM |
| Depth | 1 | DEP | in. | Extrusion Thermofirming |
| Number of Hollows | 1 | HOL | | Profile Extrusion |
| In-Mold Coating | 1 | IMCOAT | | SMC |
| Mat 1 | RIM_Calcium Carbonate_Precip. | MAT1 | | SRIM,RRIM |
| Piles 1 | | PLI1 | | SRIM |
| WT % 1 | 20% | MATWT1 | Percentage | SRIM,RRIM |
| Mat2 | | MAT2 | | SRIM |
| Piles 2 | | PLI2 | | SRIM |
| WT %2 | | MATWT2 | Percentage | SRIM |
| Mat 3 | | MAT3 | | SRIM |
| Piles 3 | | PLI3 | | SRIM |
| WT %3 | | MATWT3 | Percentage | SRIM |
| GA Injection Molding Wt Reduction | 5% | GAIMWTPT | Percentage | Gas Assisted Injection Molding |
| Cross Sectional Area | 200 | XAREASQIN | sq in. | Profile Extrusion, Extrusion Thermoforming |
| Cost/Part | $6.48 | COST | Per Part | ALL |
| Weight | 2.65 | WGTLBS | Pounds | ALL |
| Model Exists | FALSE | MODELEXIST | | |
| Data Complete | | Data Complete | | |

C. Shape Selection/Decomposition Module

Figure 76:
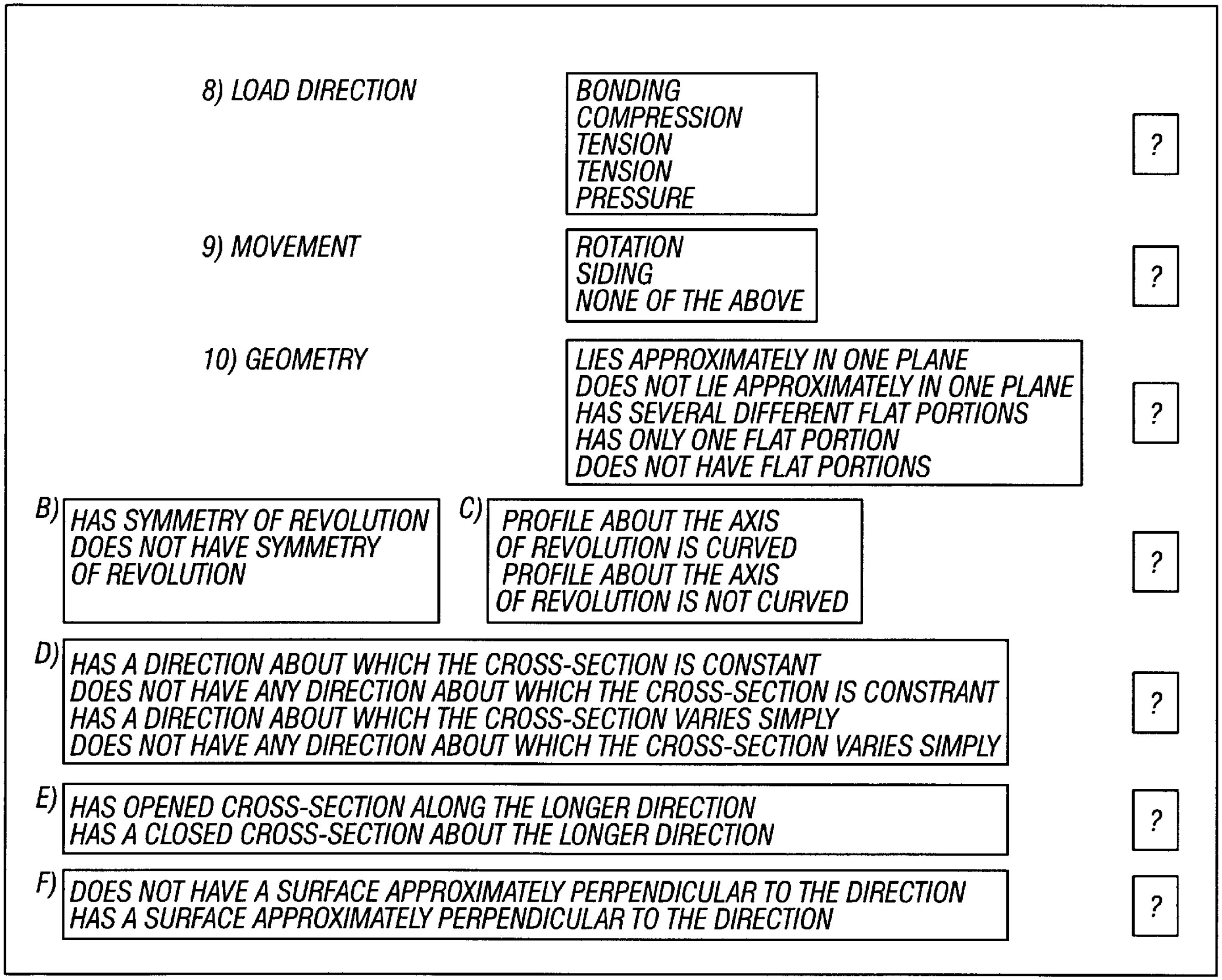
Figure 77:
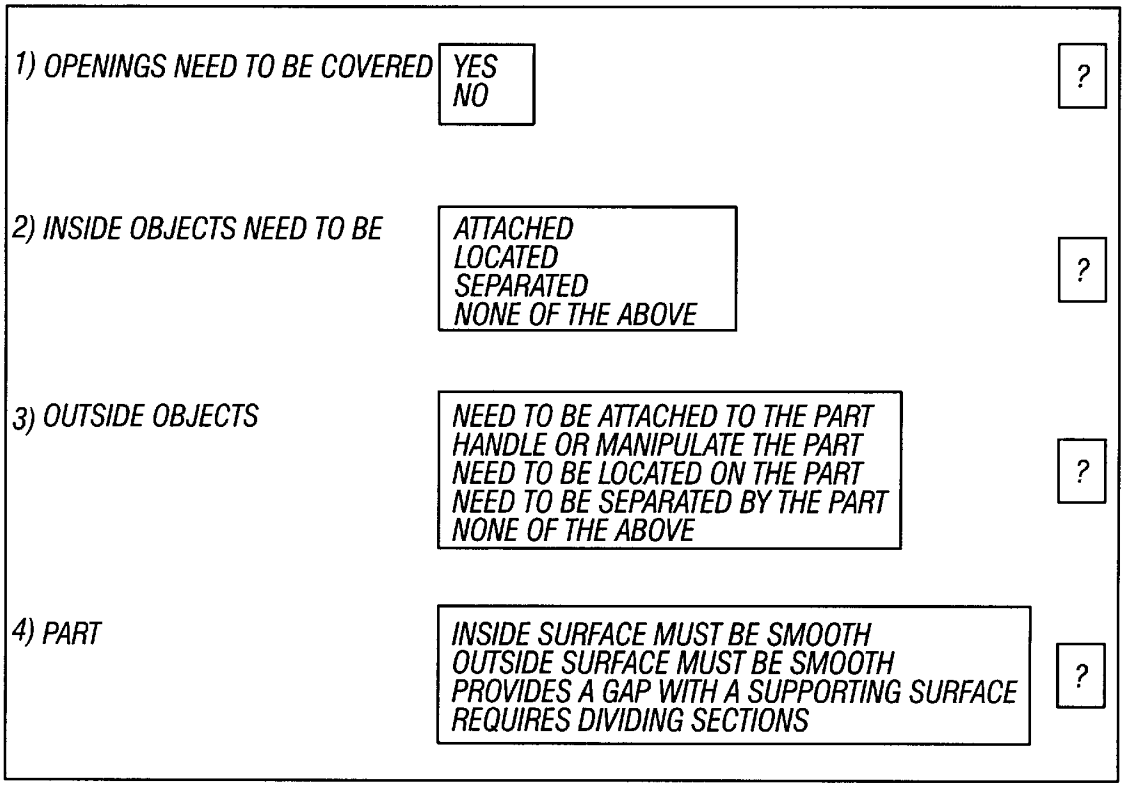
FIG. 77 illustrates the screen triggered from menu item "additions".
Figure 78:
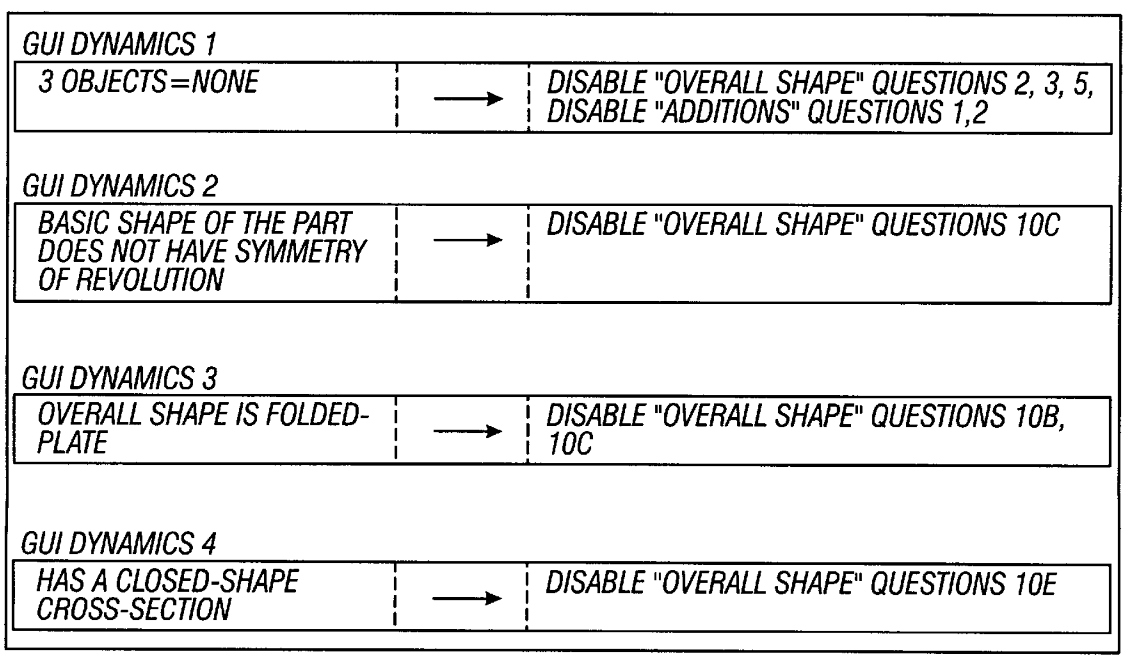
FIG. 78 shows GUI input dynamics logic.
Figure 79:
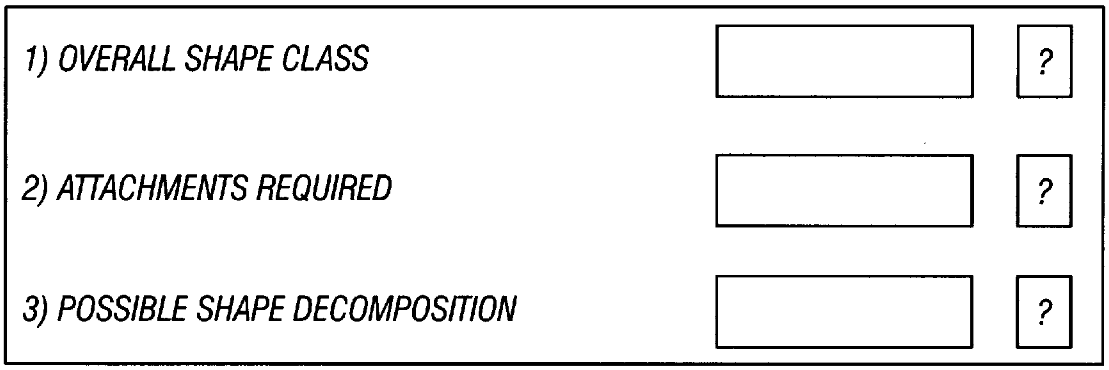
FIG. 79 shows the shape selection/decomposition screen output, with legend provided in FIG. 80.
Figure 80:
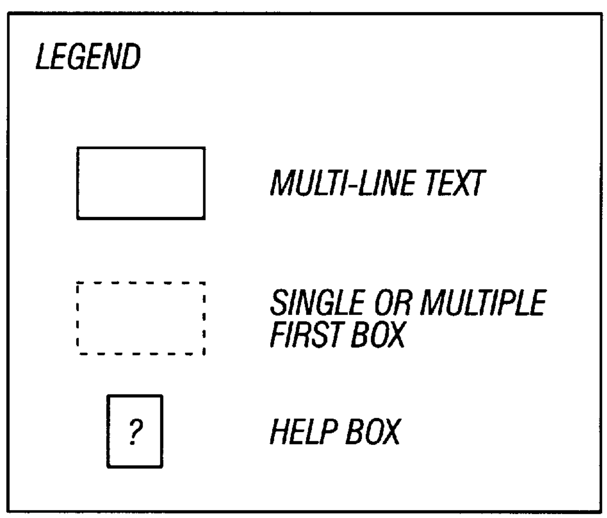
Figure 82:
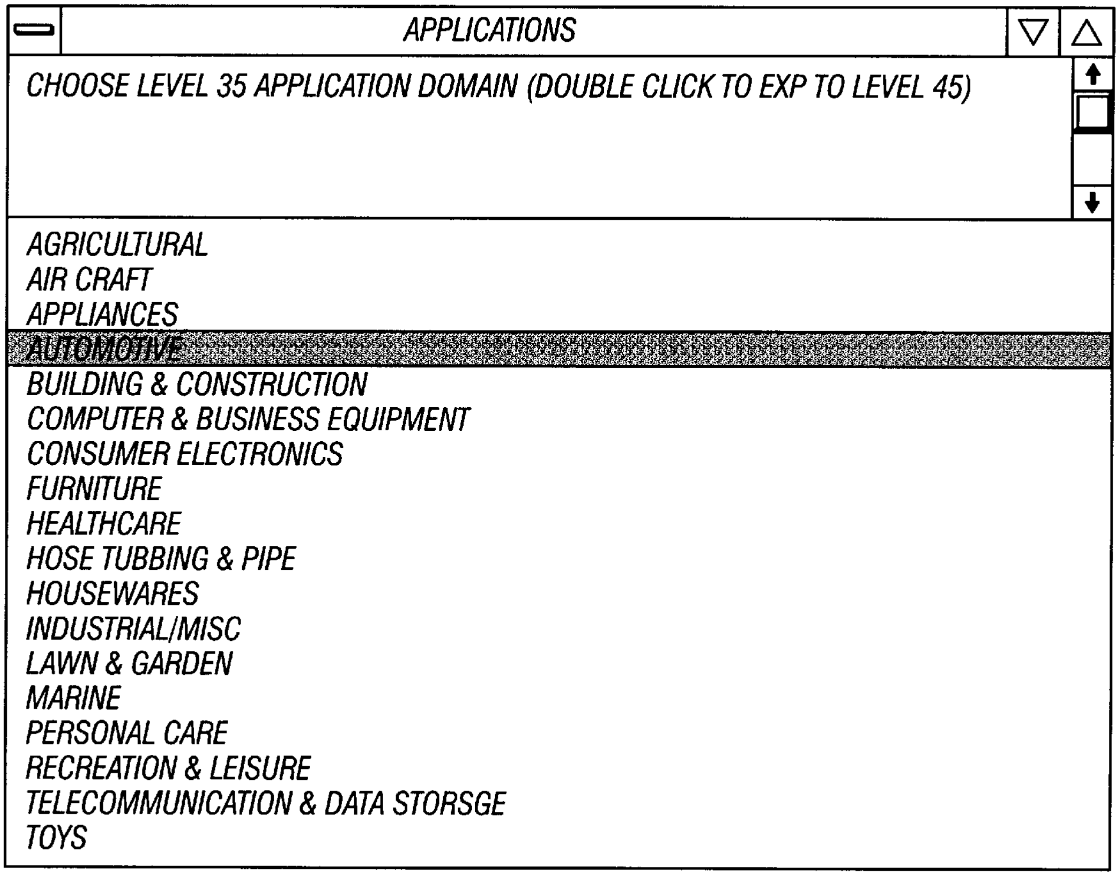
Figure 83:
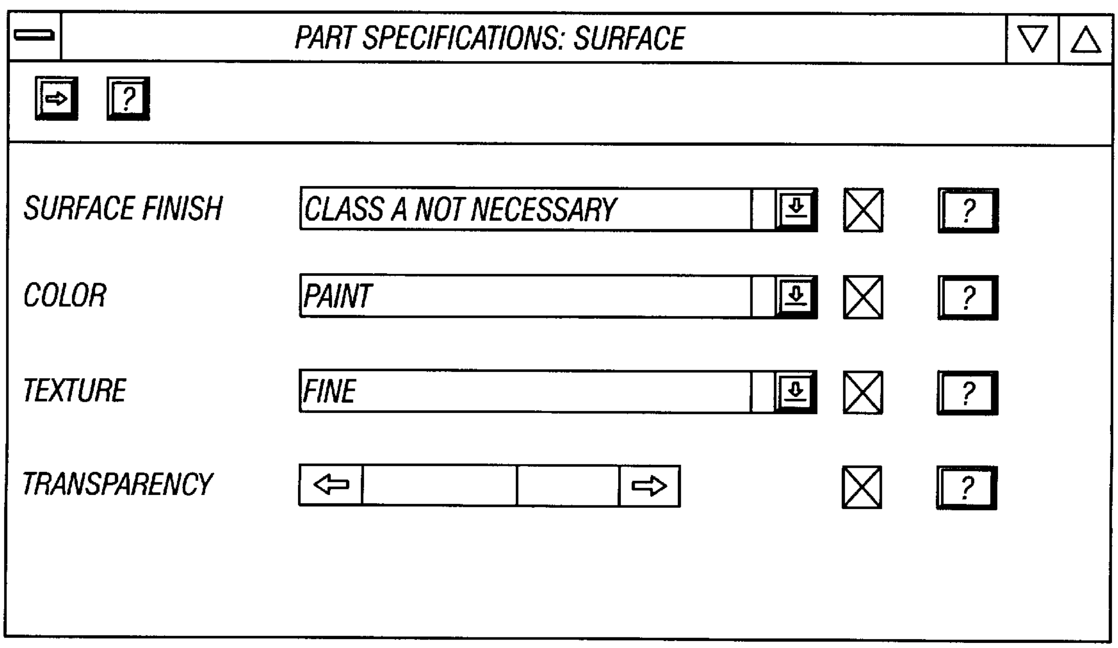
Figure 84:
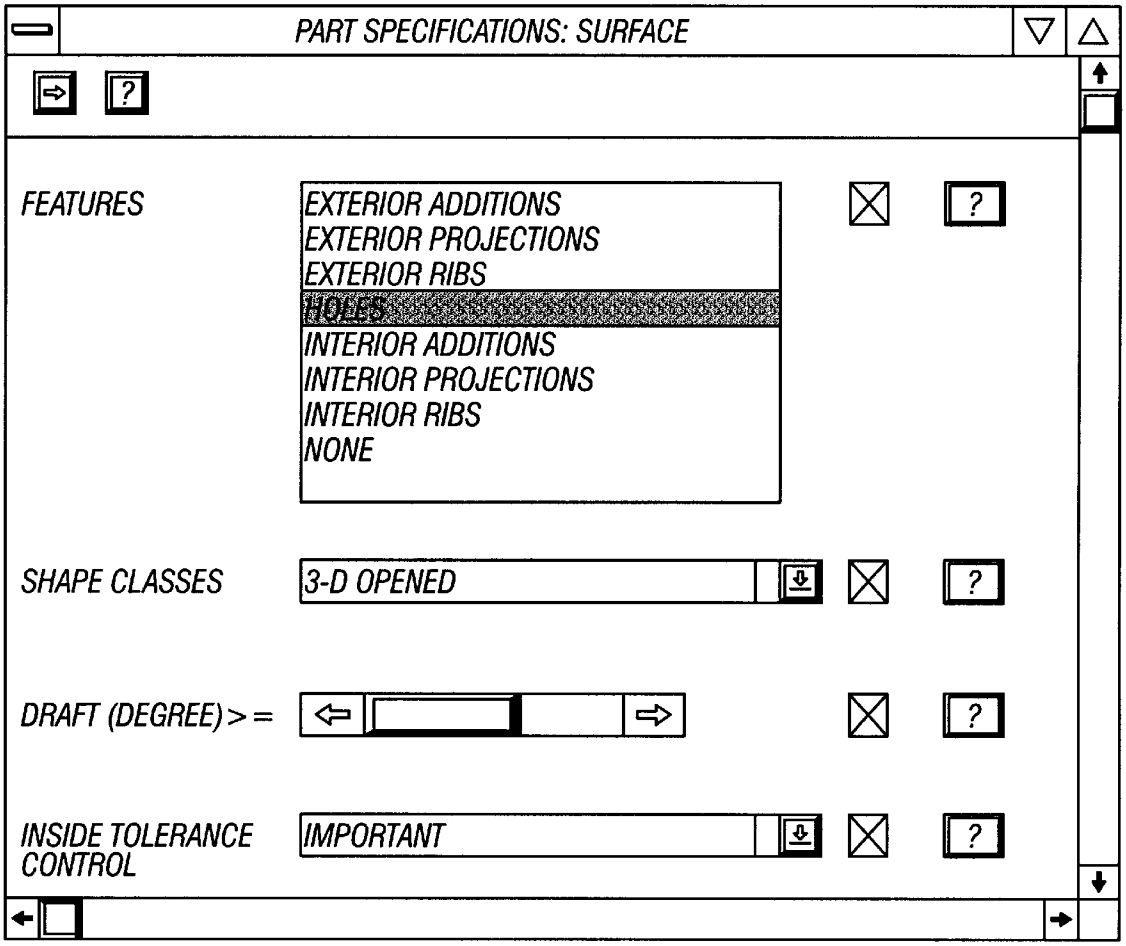
Figure 85:
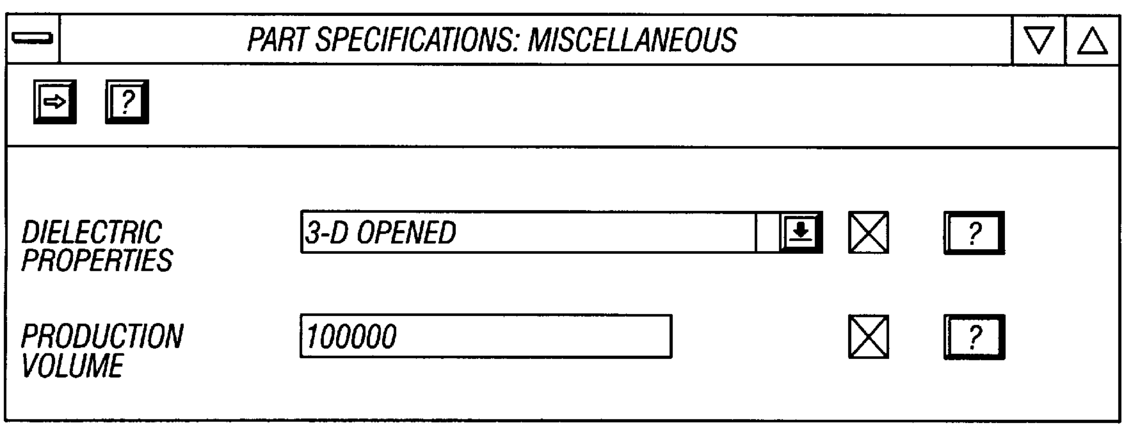
Figure 86:
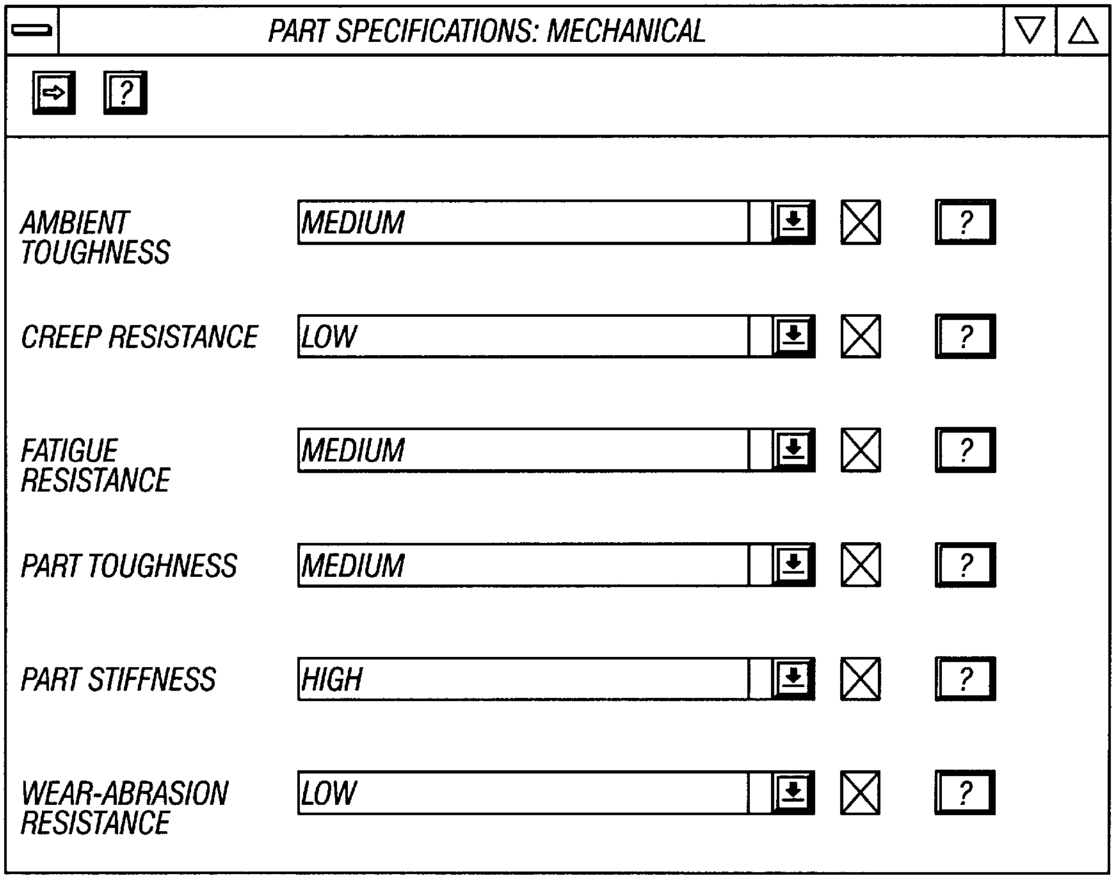
Figure 87:
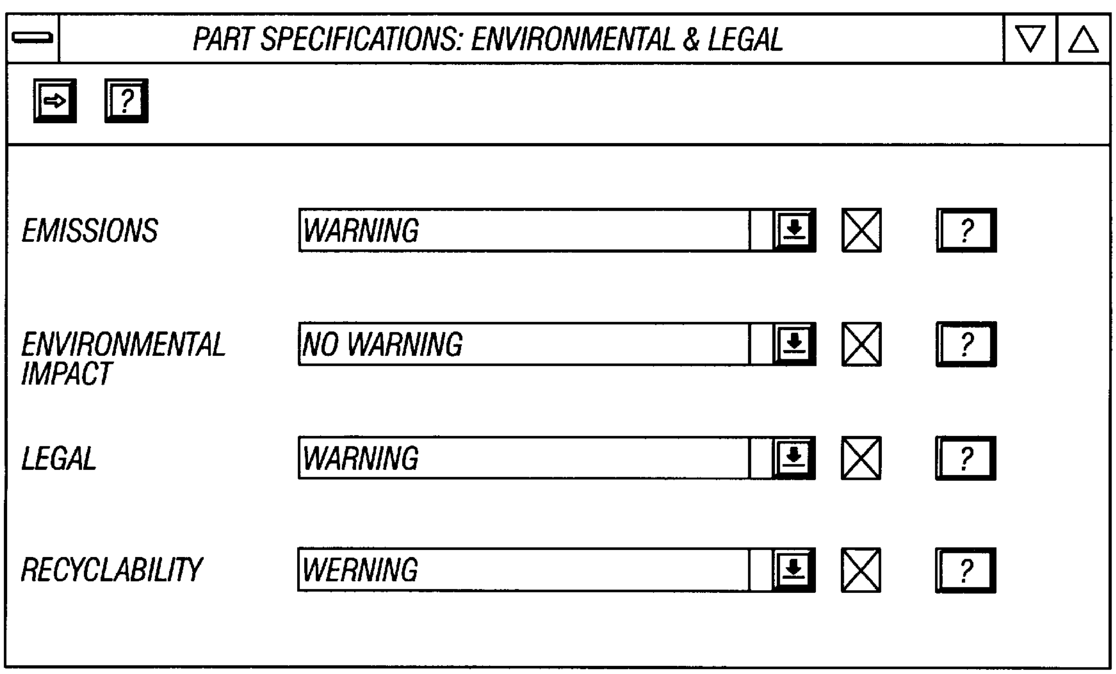
Figure 88:
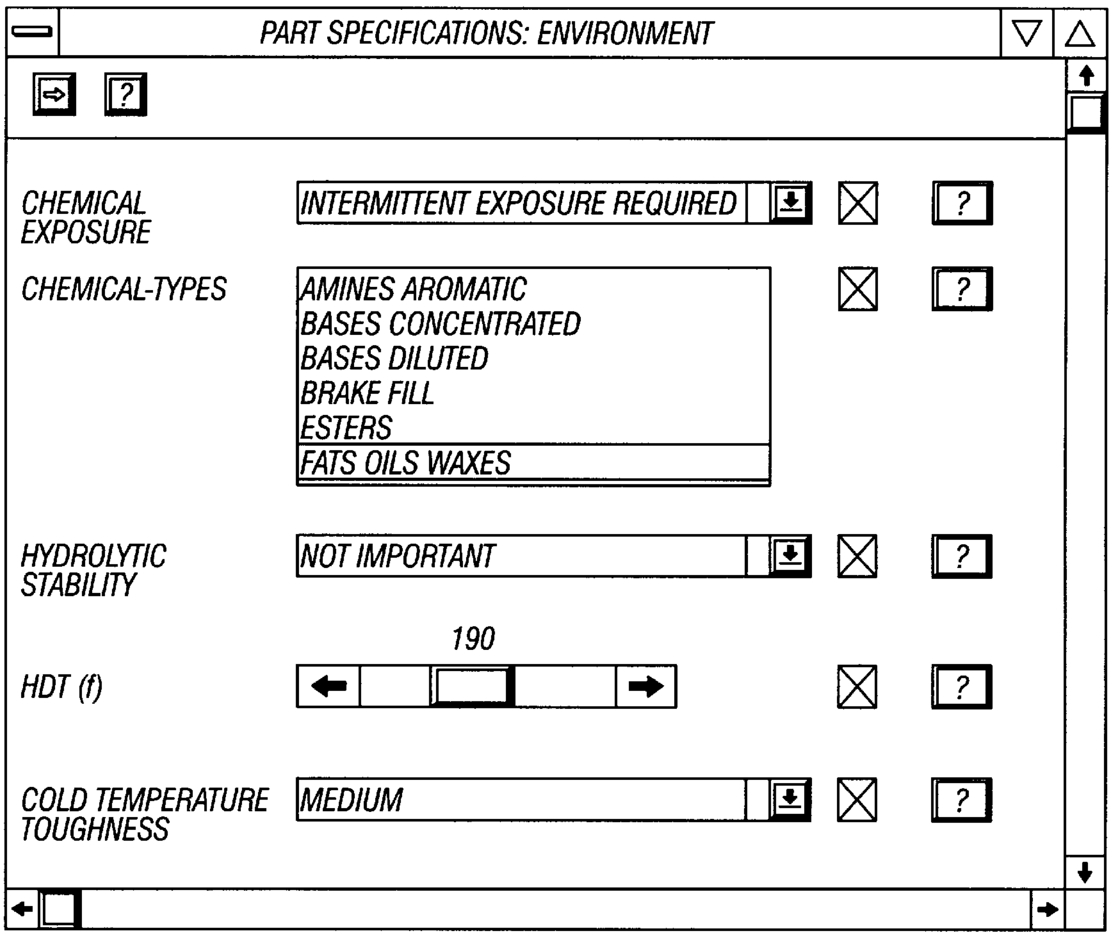
Figure 89A:
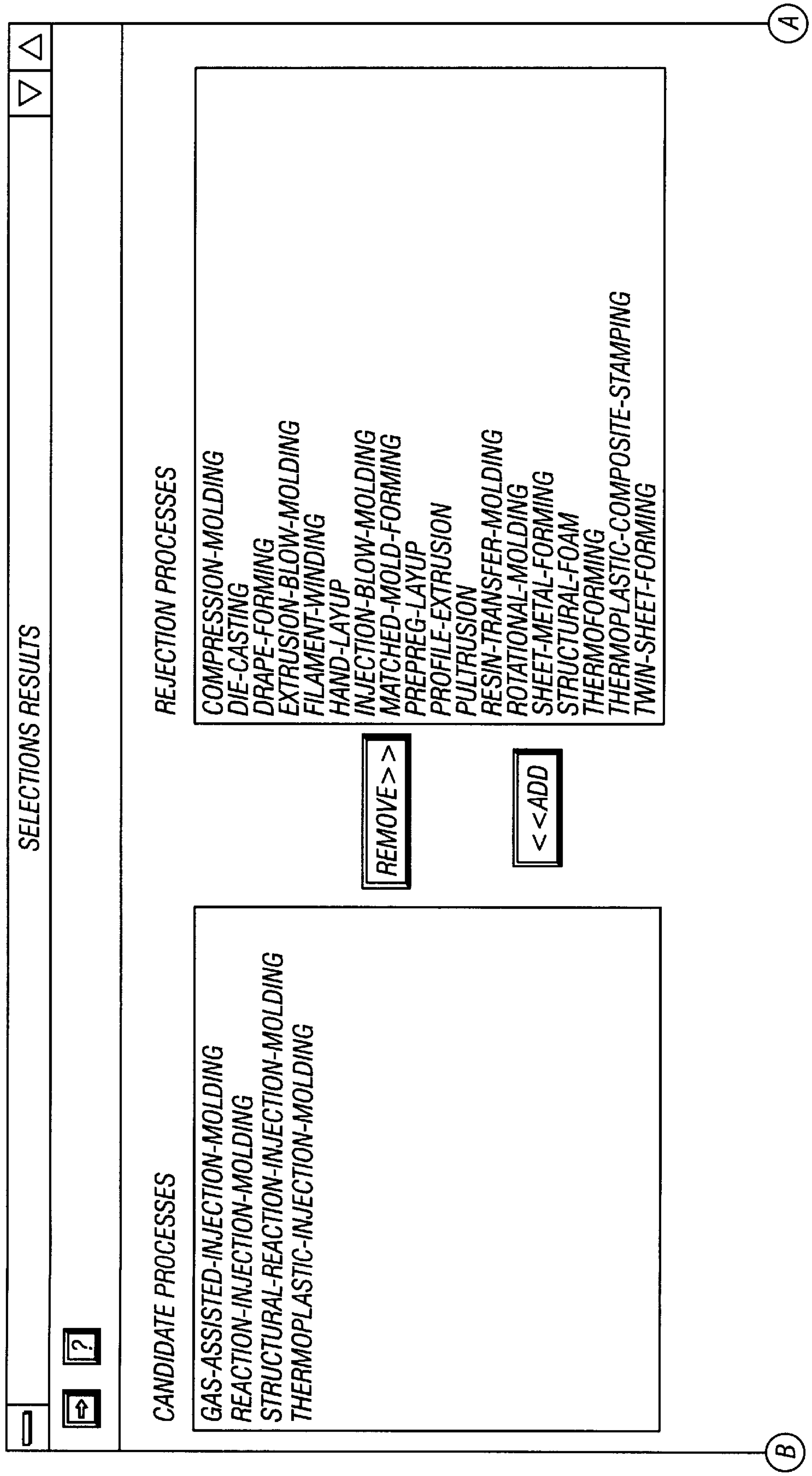
Figure 89B:
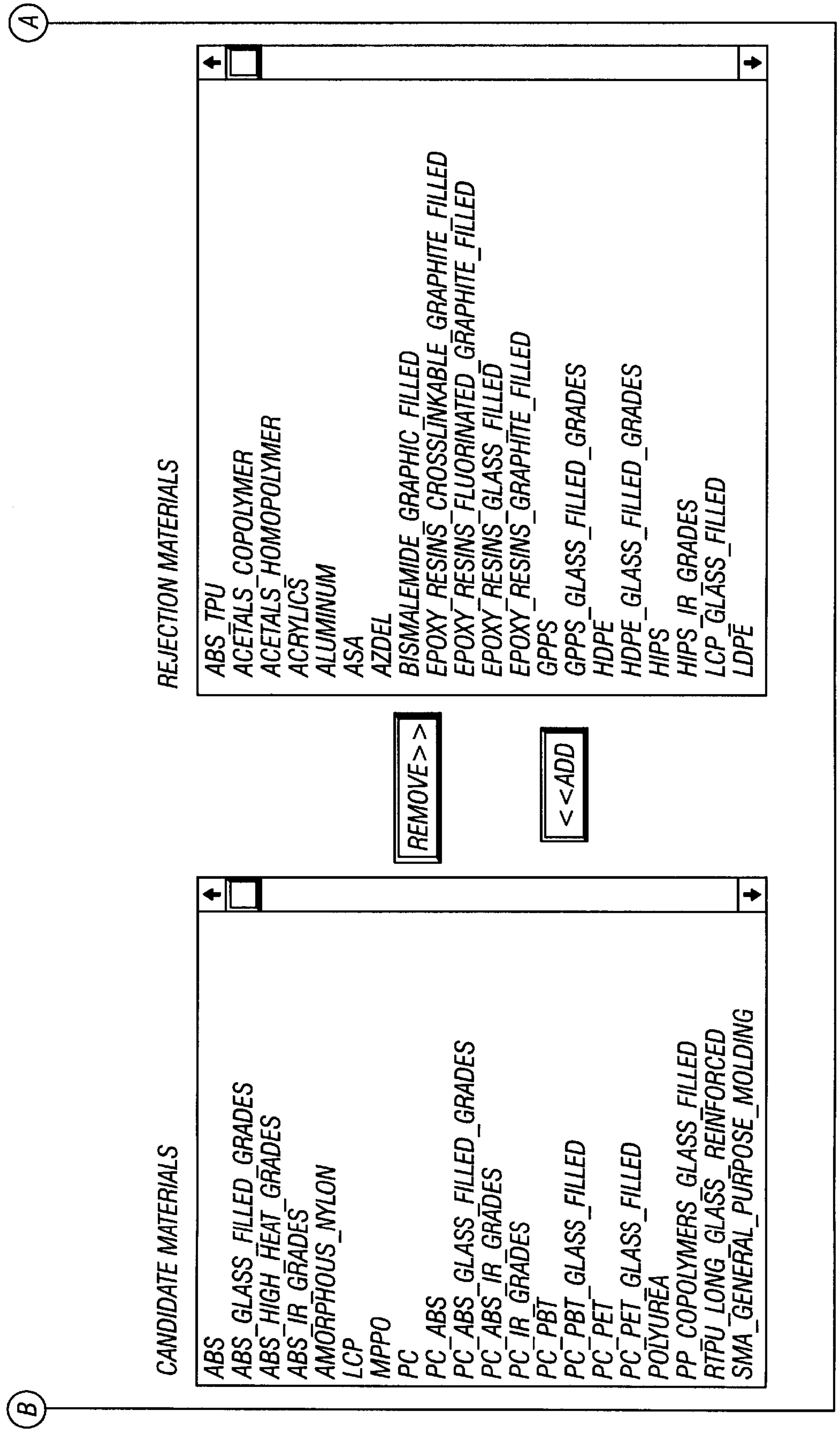
Figure 90A:
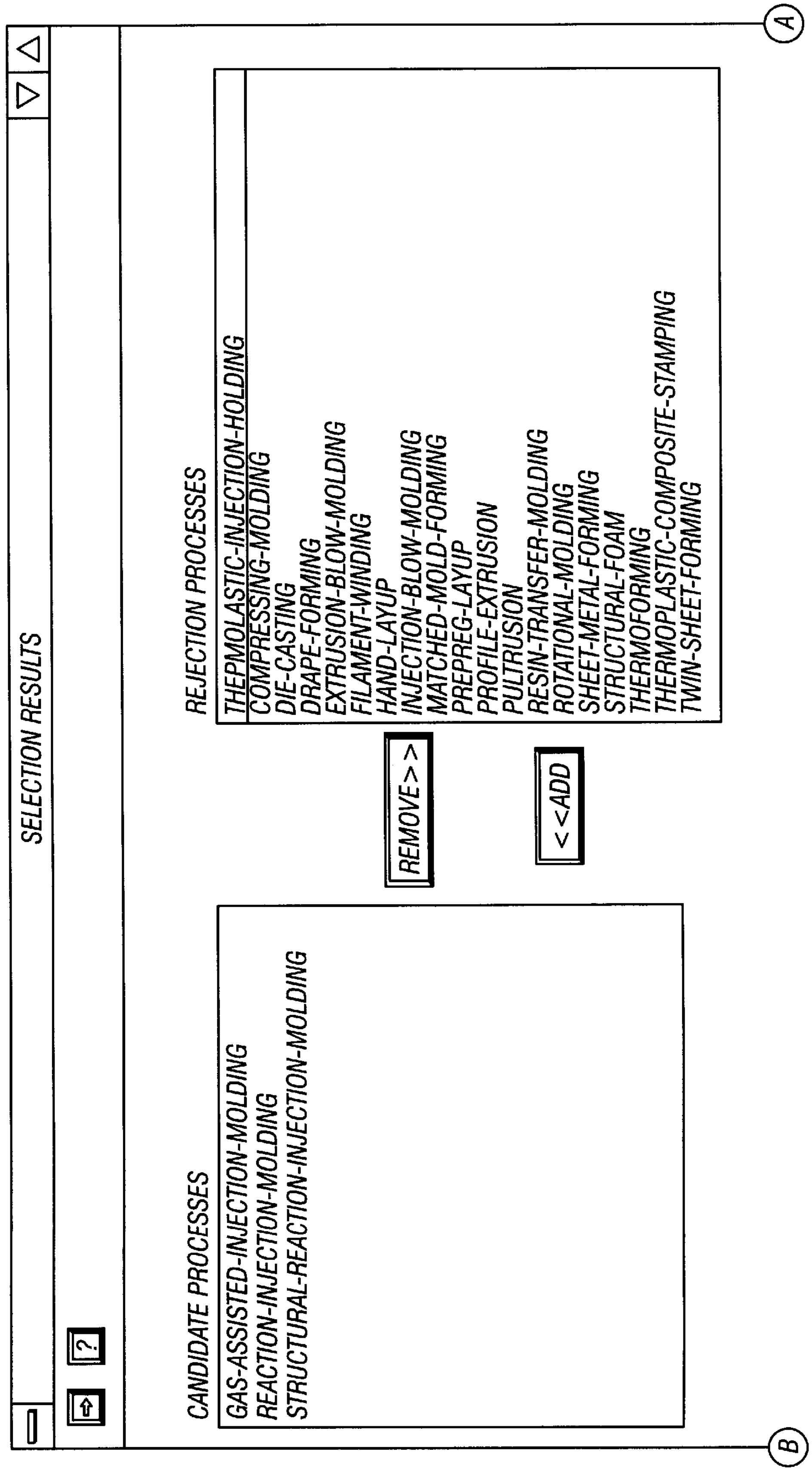
Figure 90B:
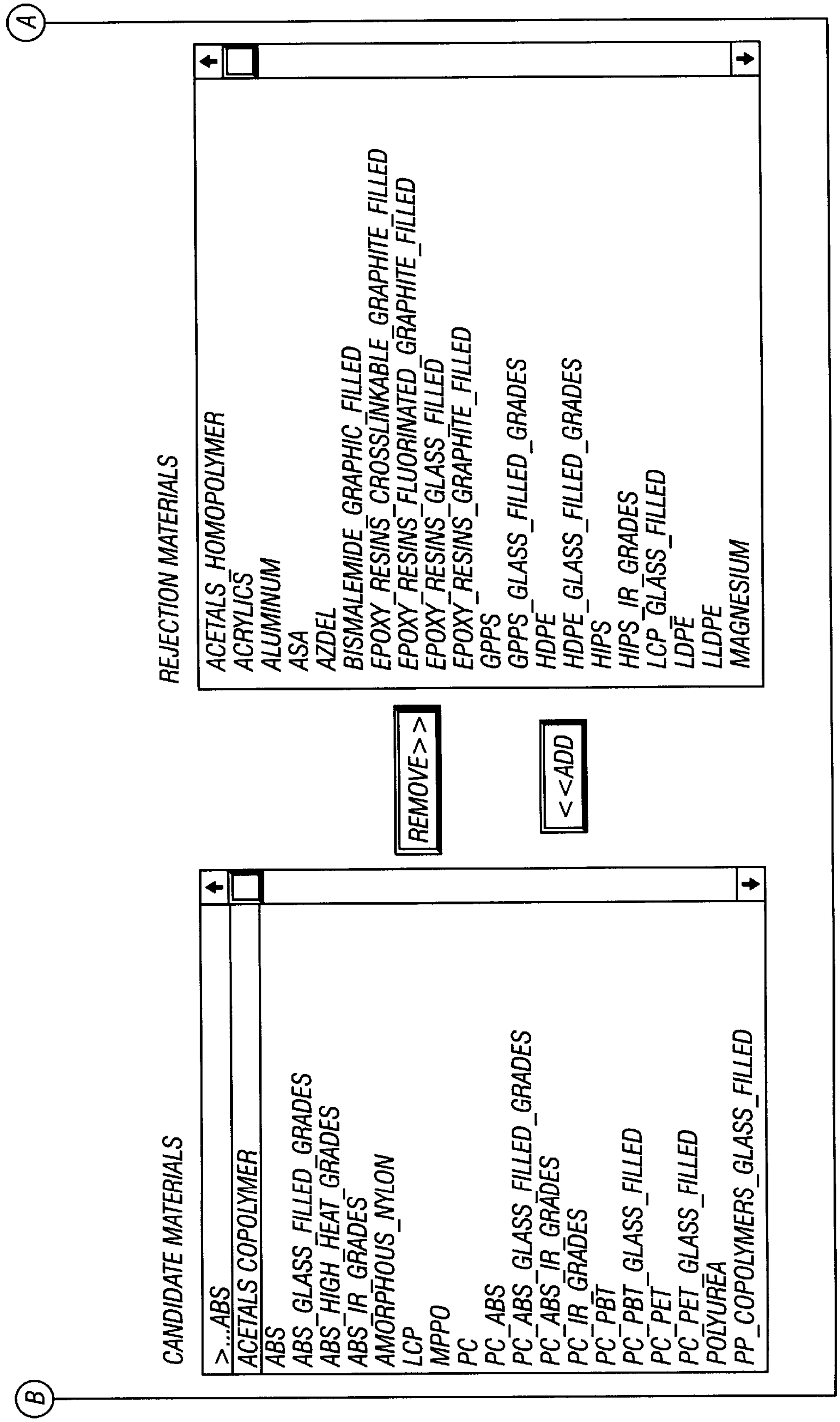
Figure 91:
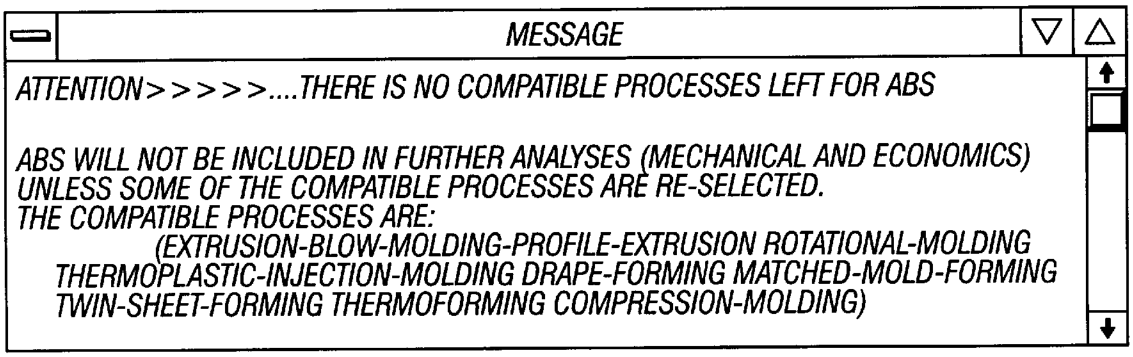
Figure 92:
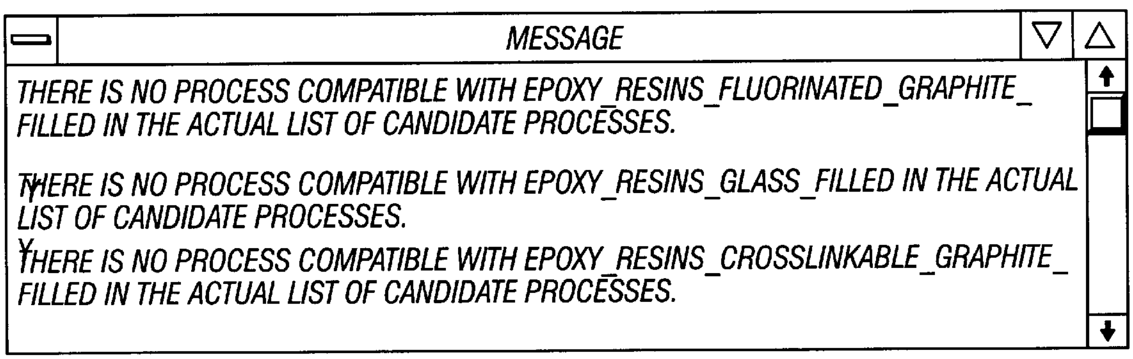
Figure 93:
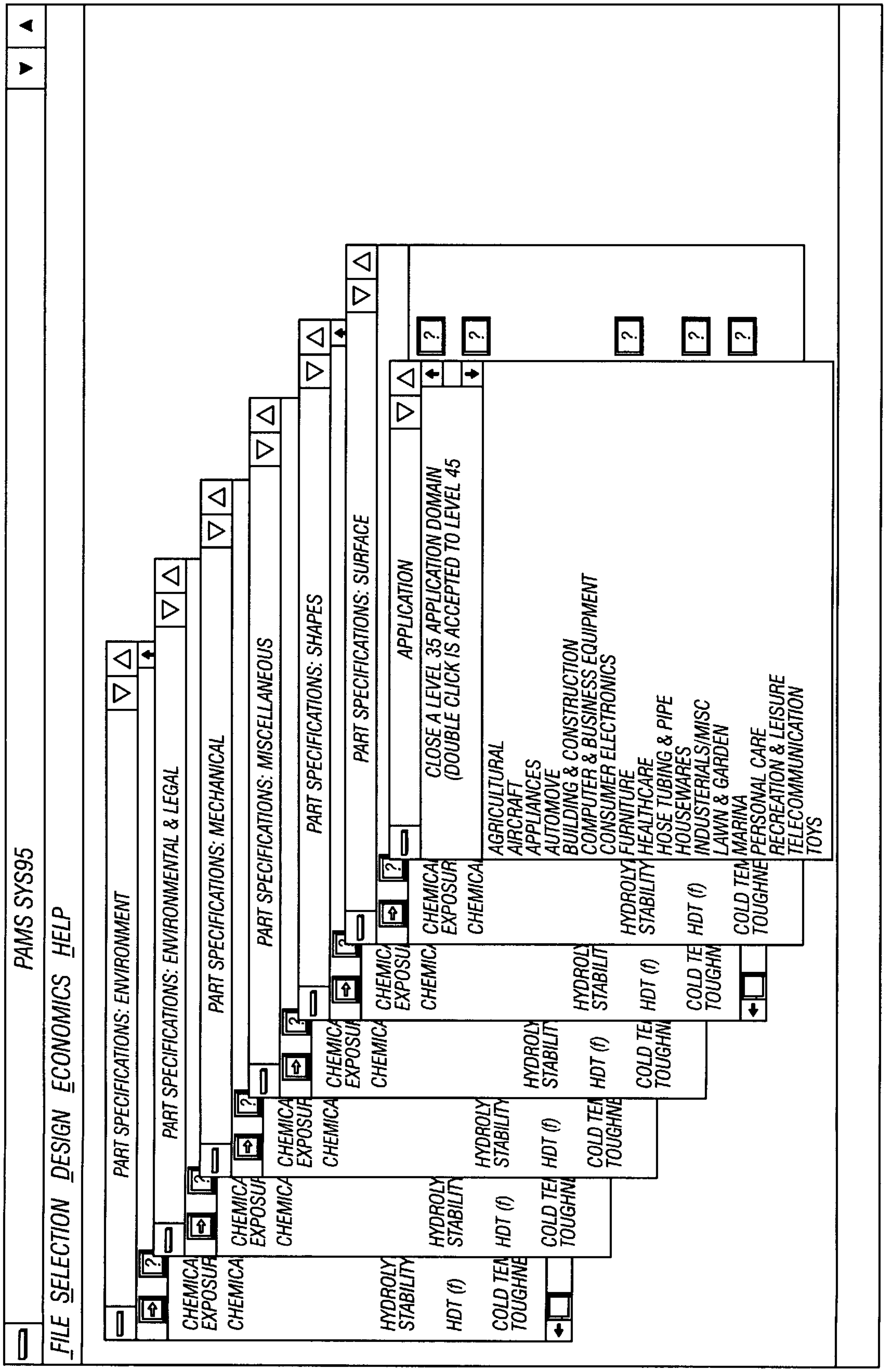
Figure 94:
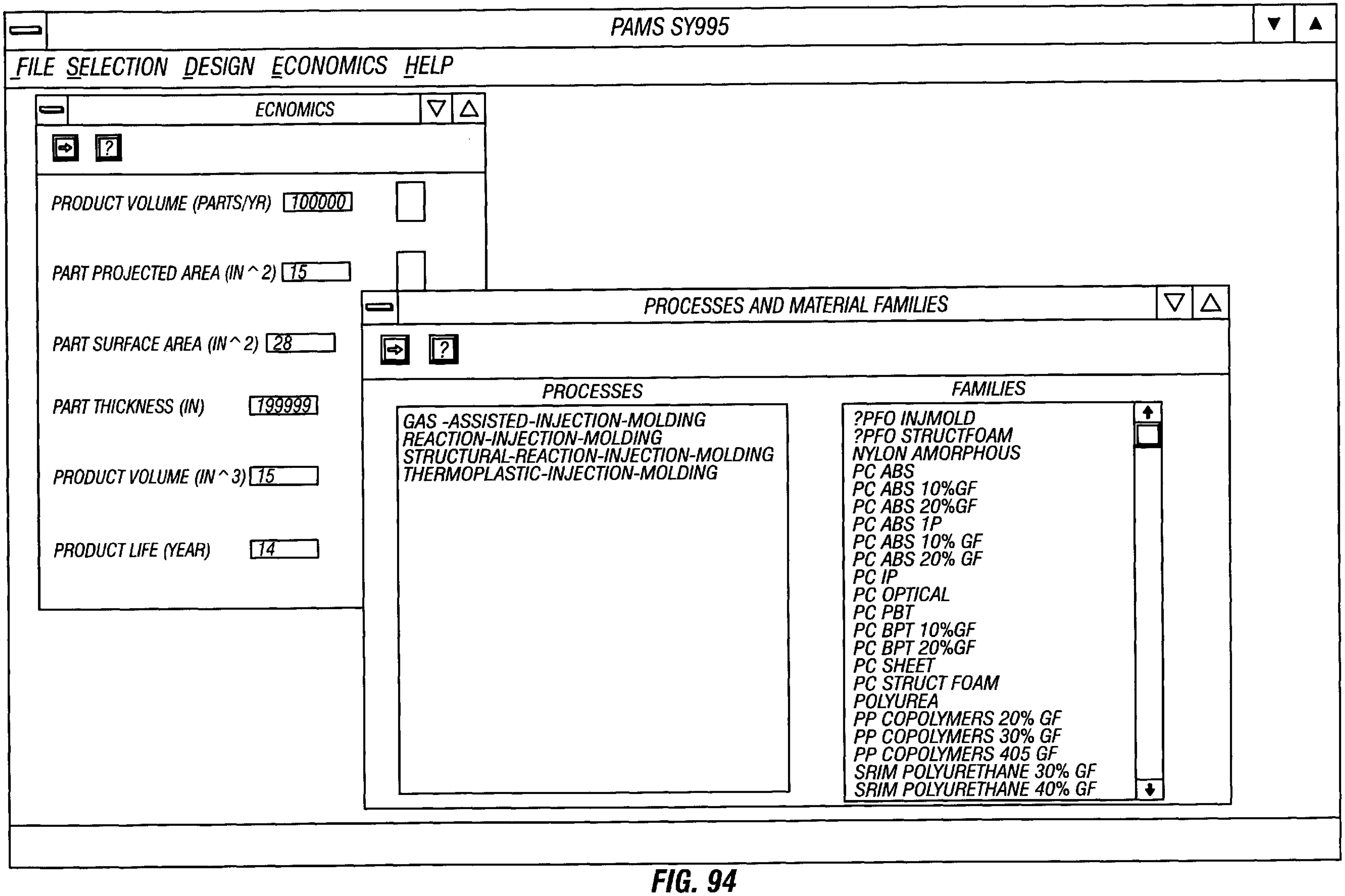
Figure 95:
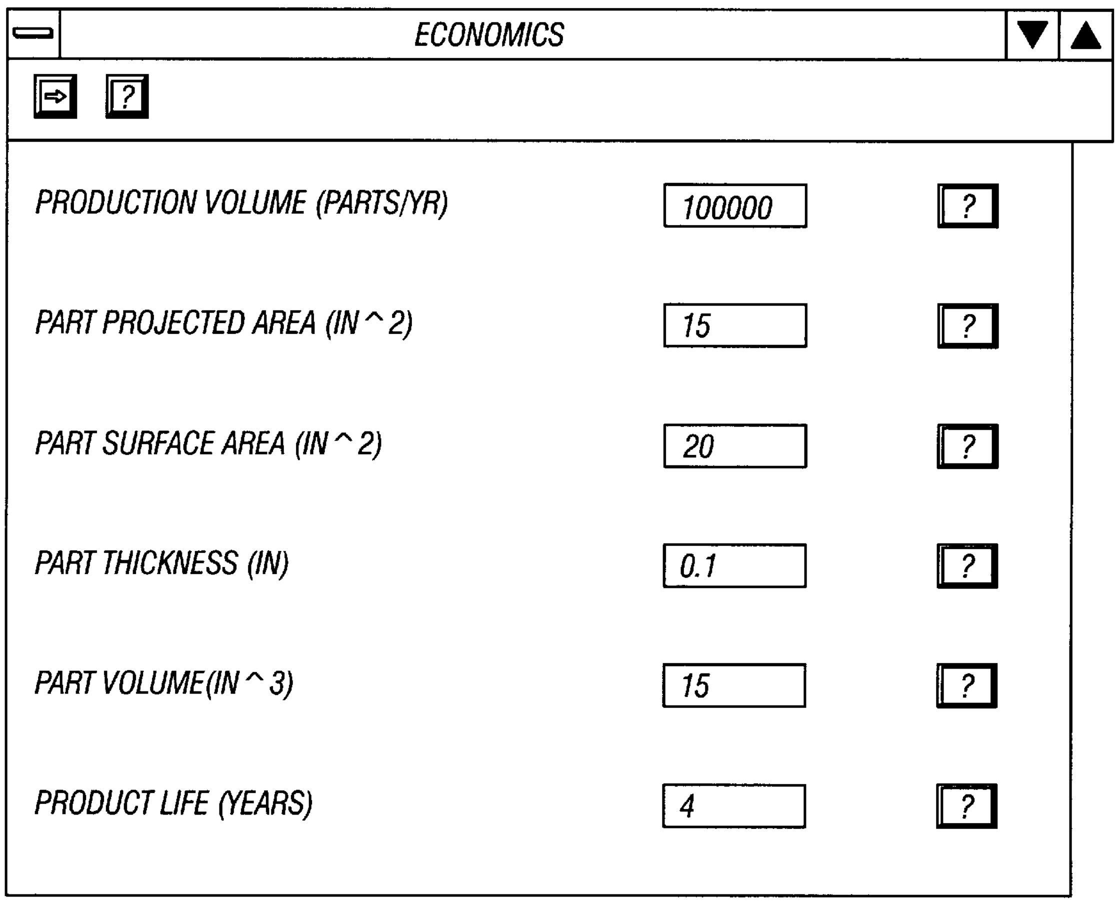
Figure 96:
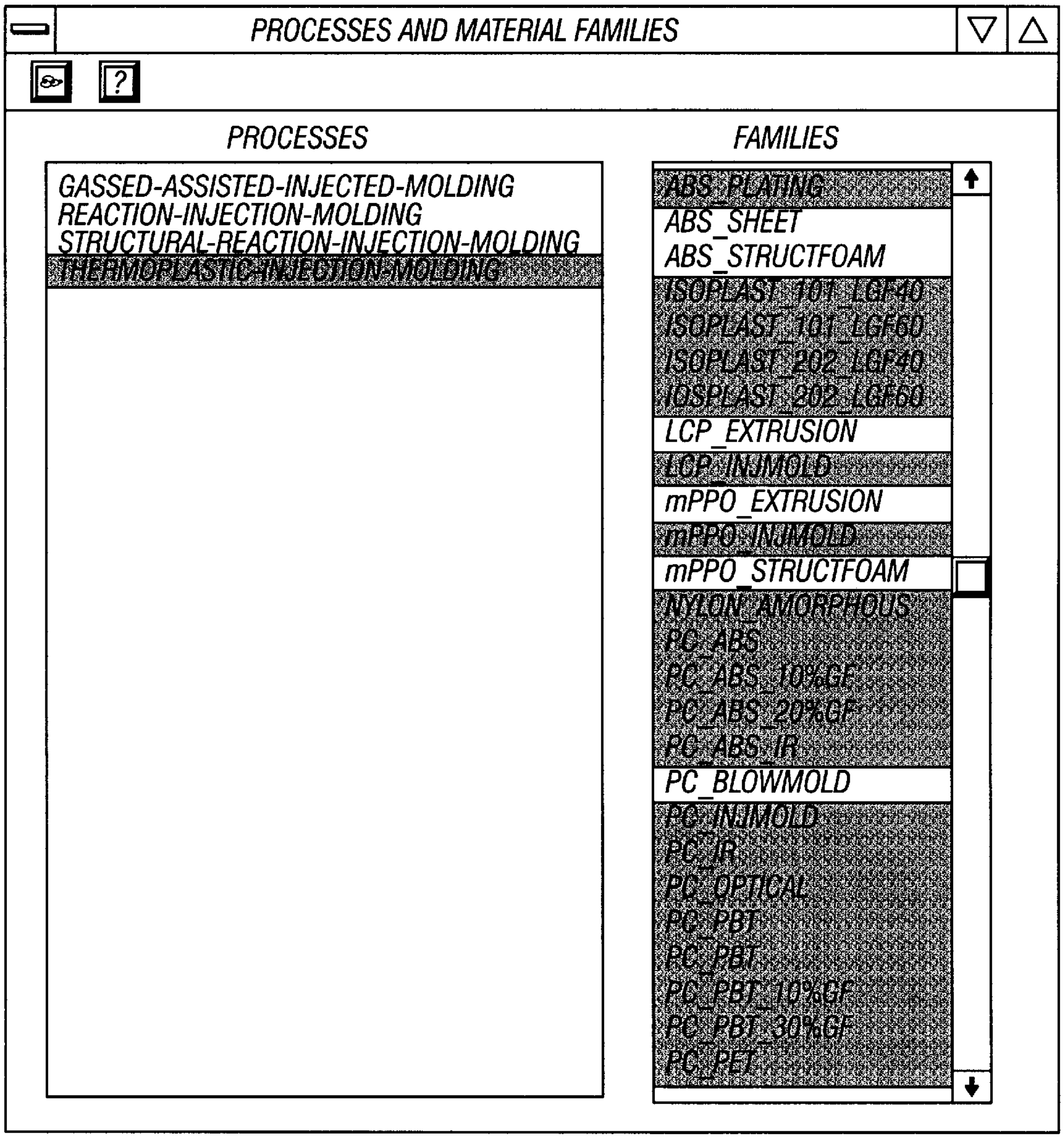
Figure 97:
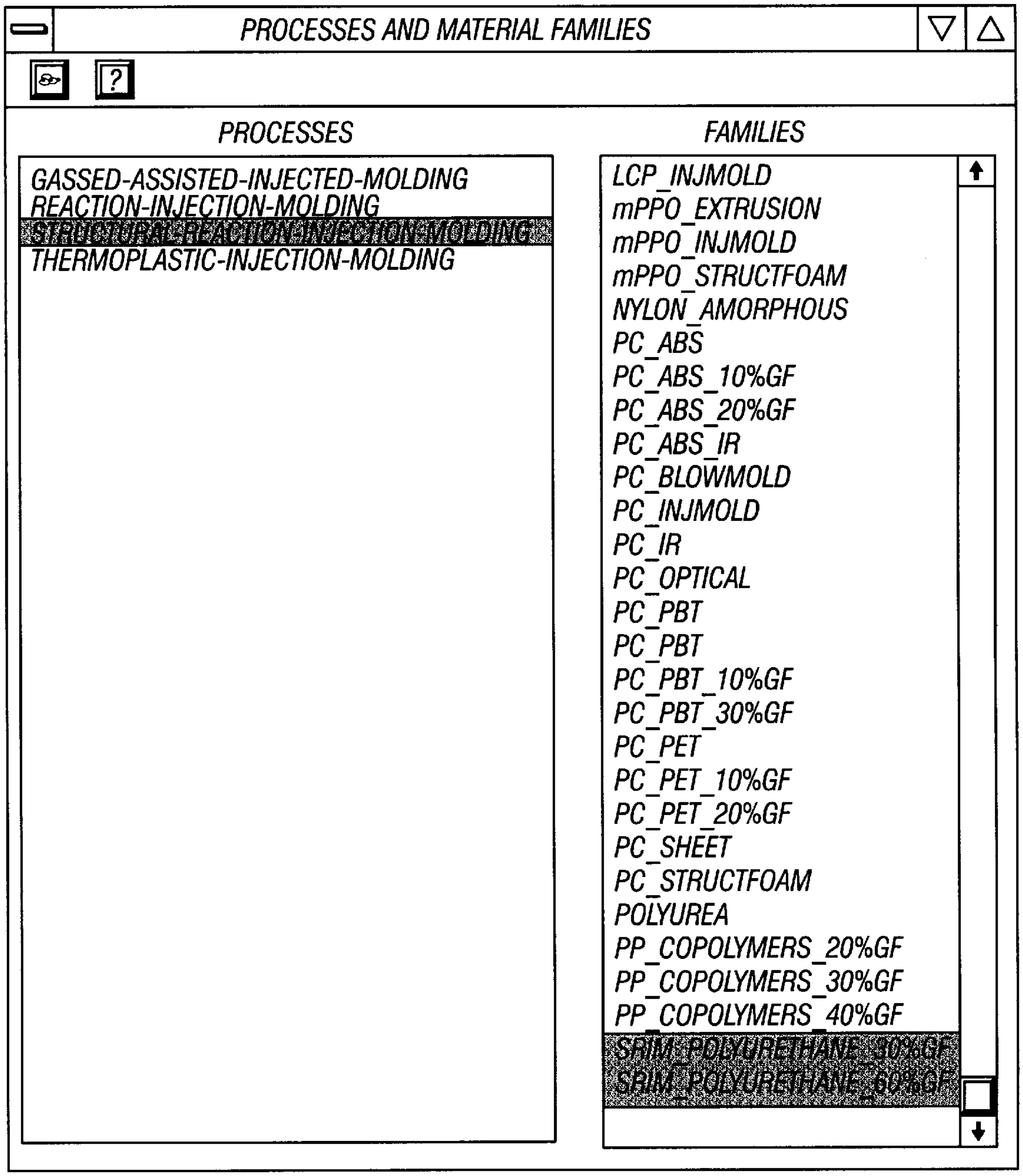
Figure 98:
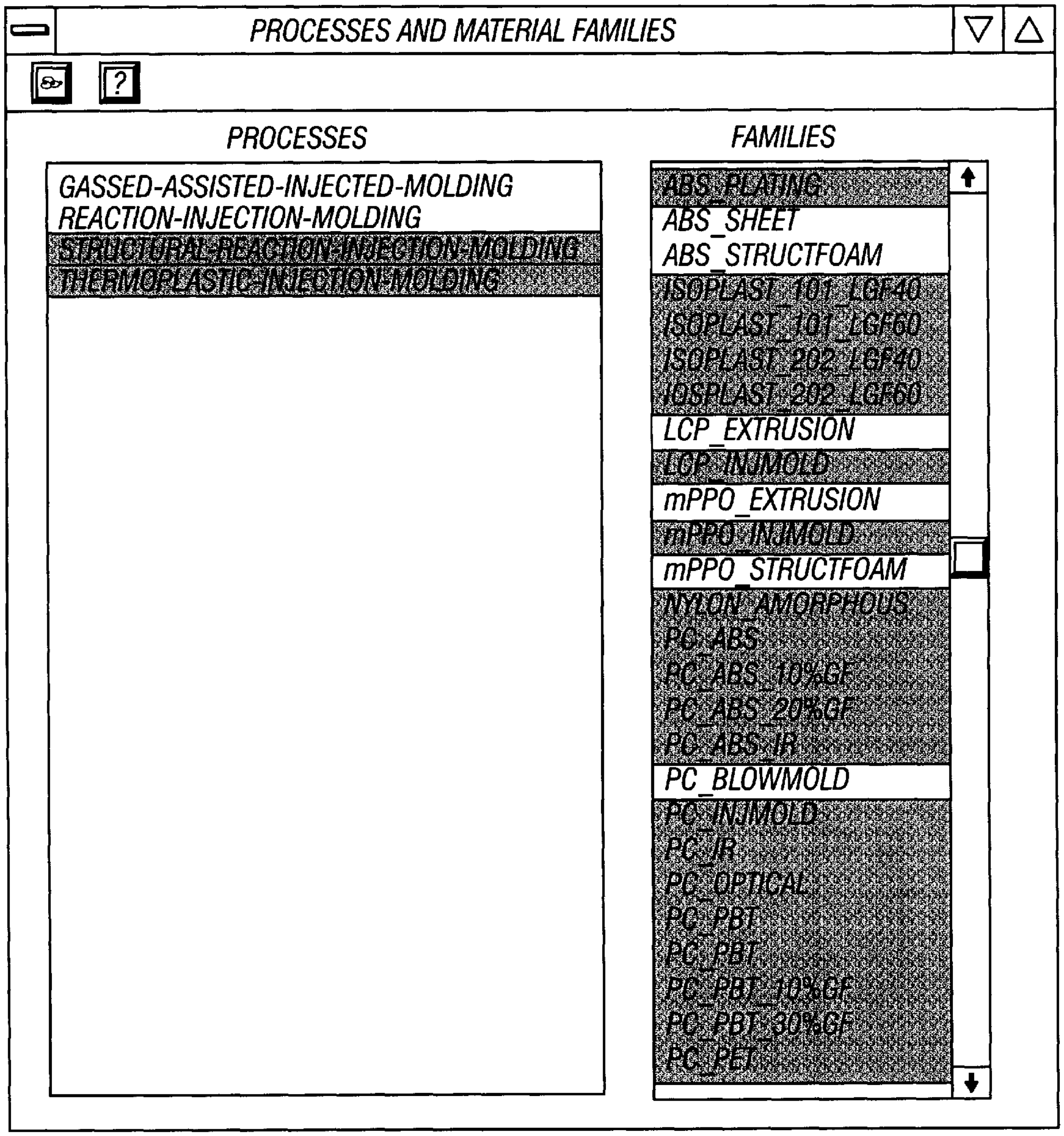
Figure 99:
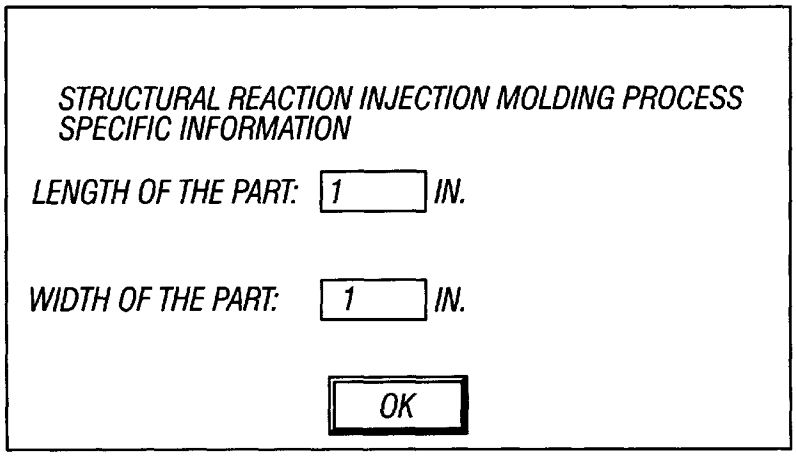
Figure 100:
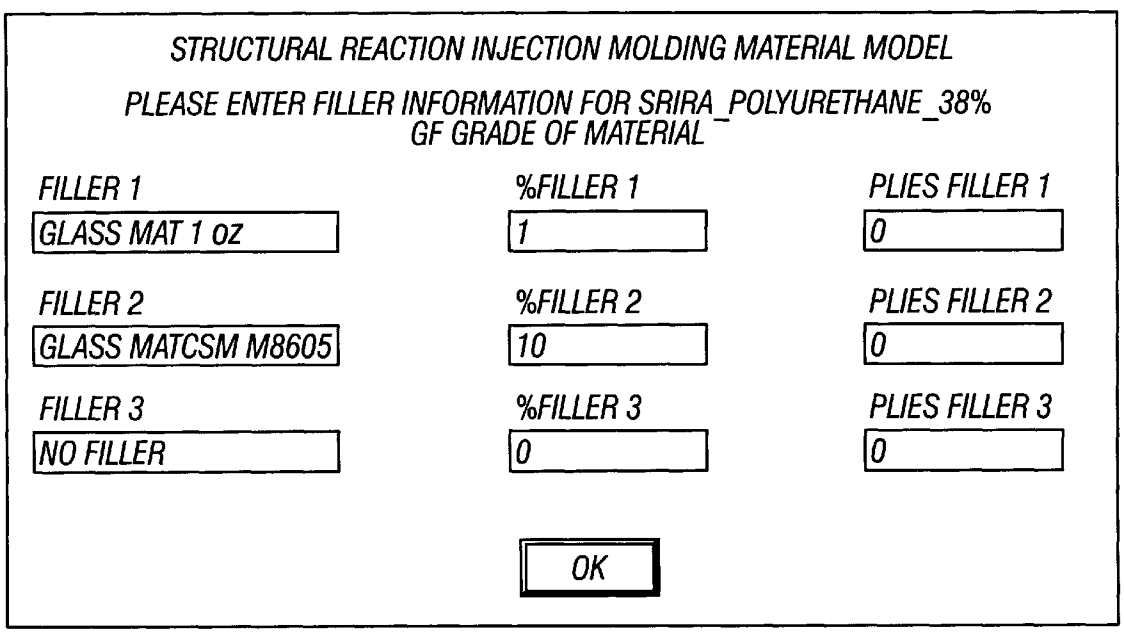
Figure 102:
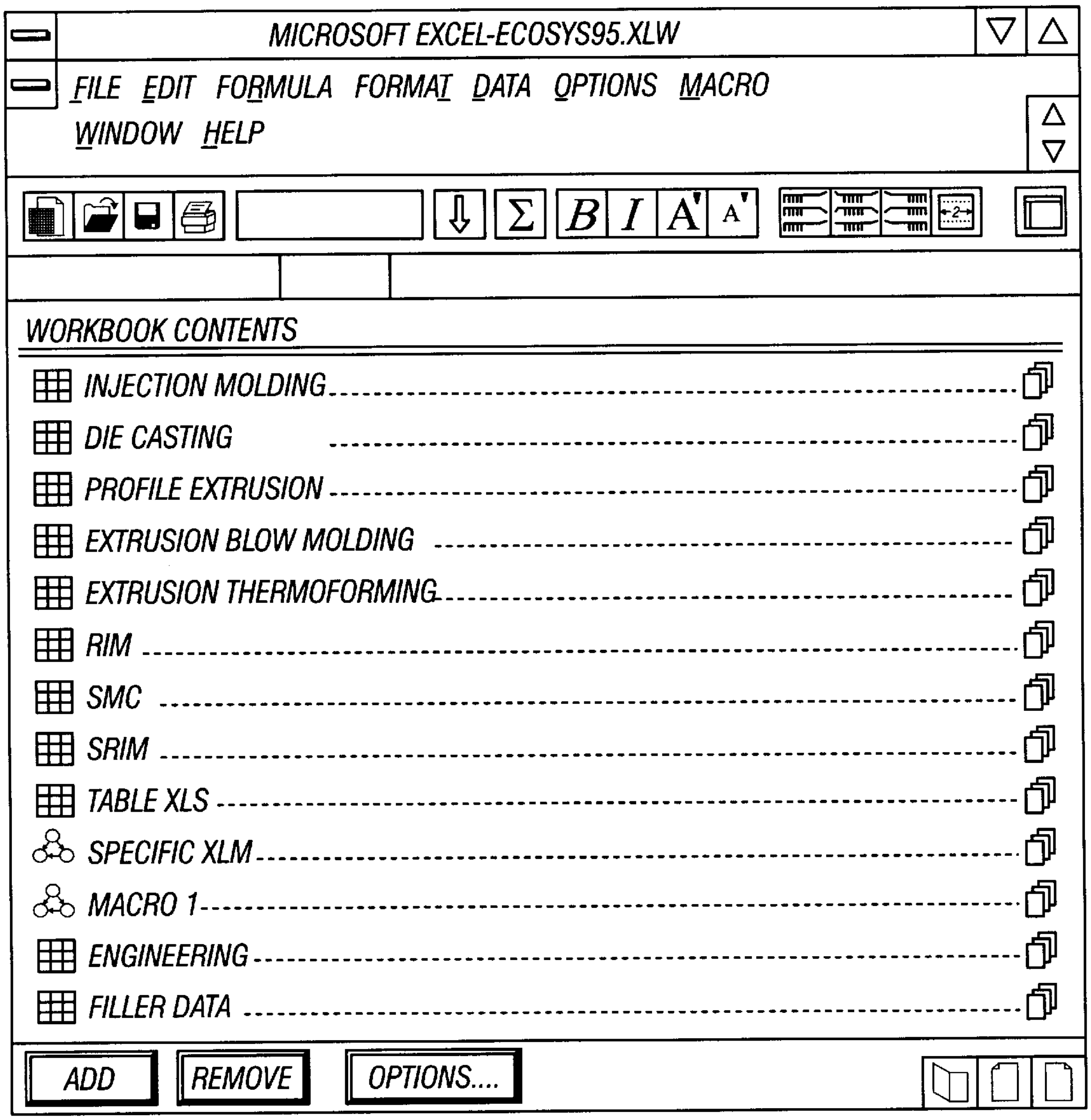
Figure 103:
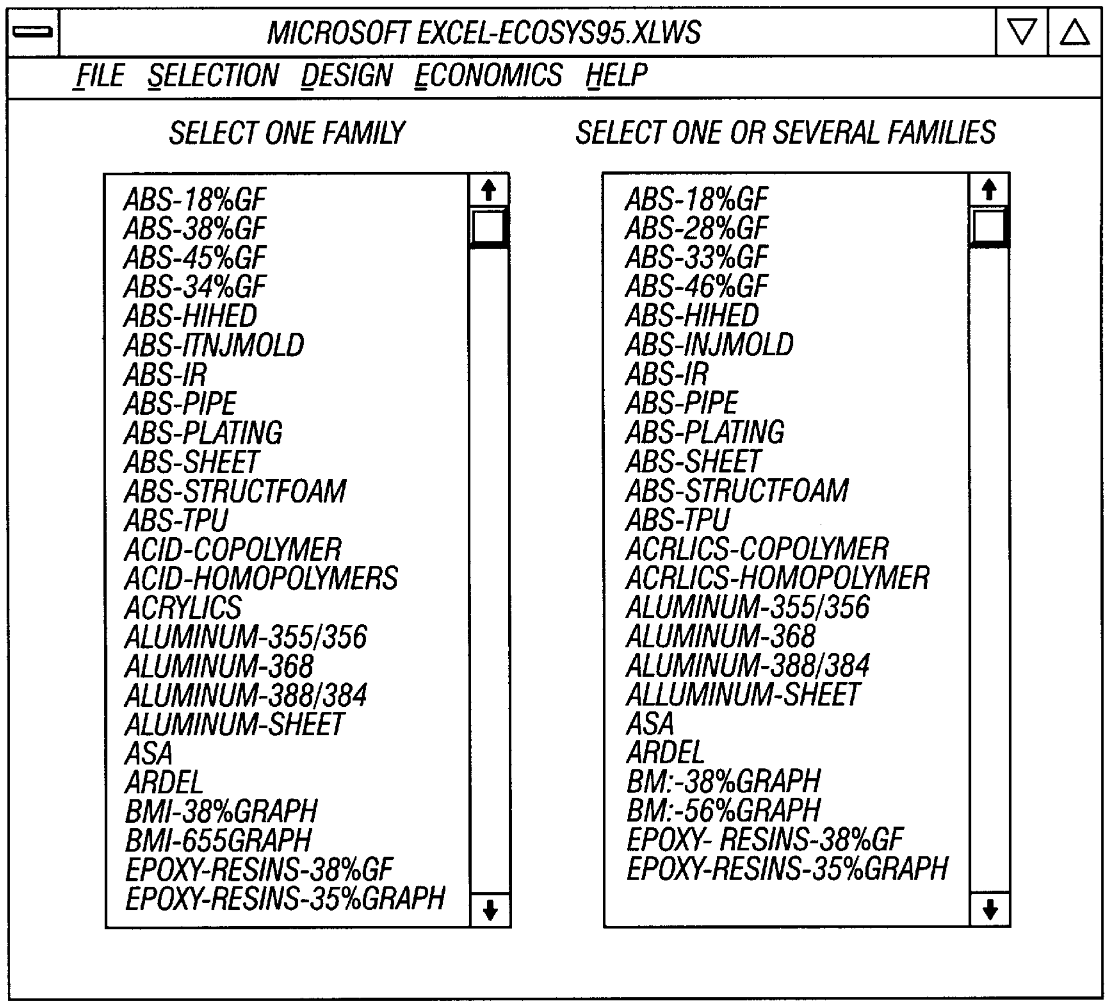
Figure 104:
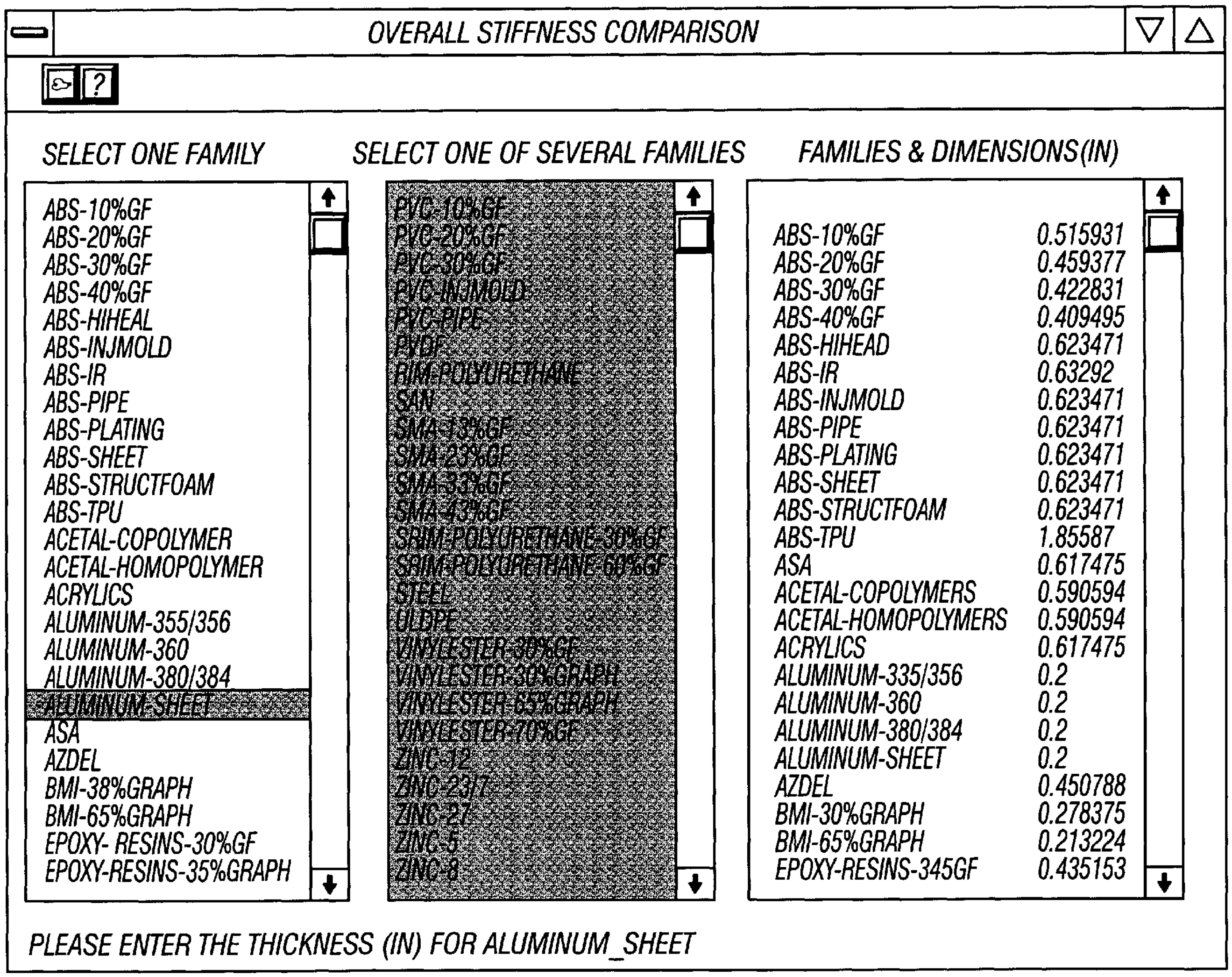
Figure 105:
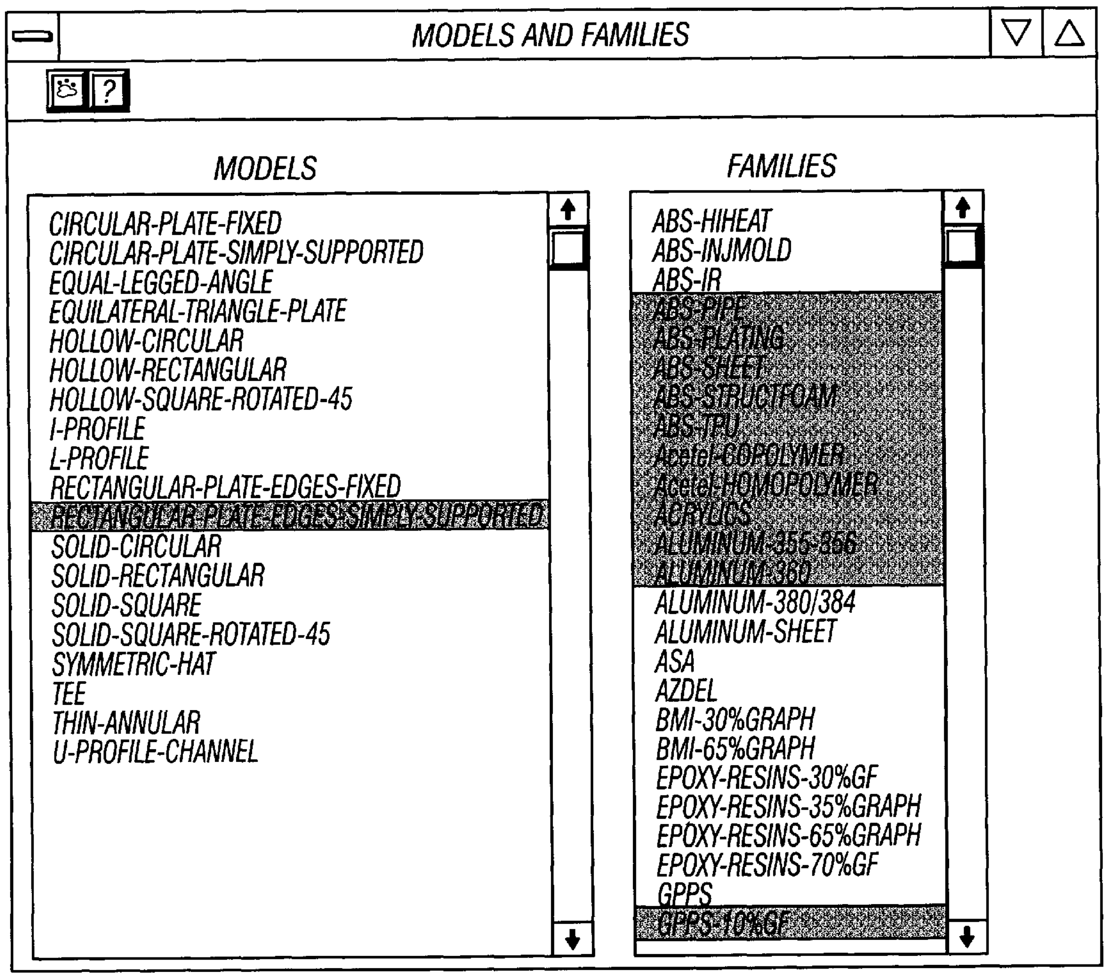
Figure 106:
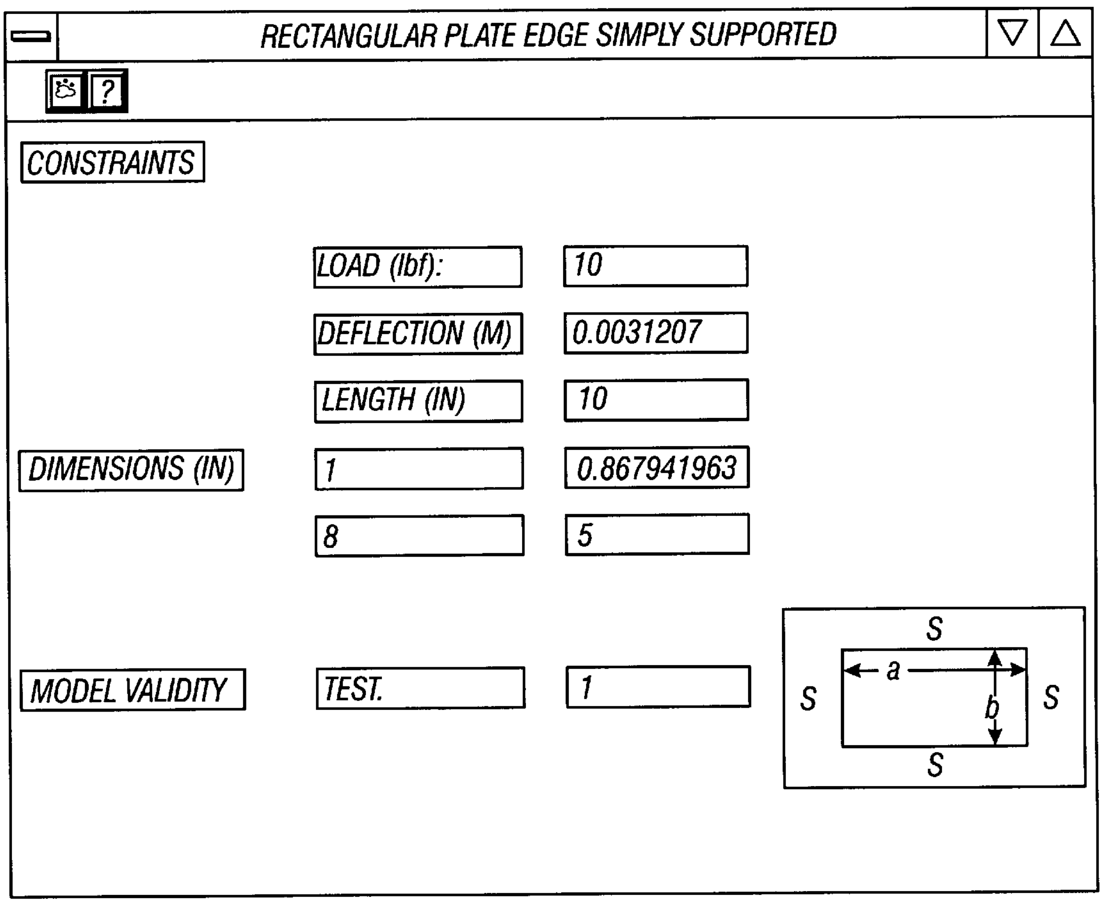
Figure 107:
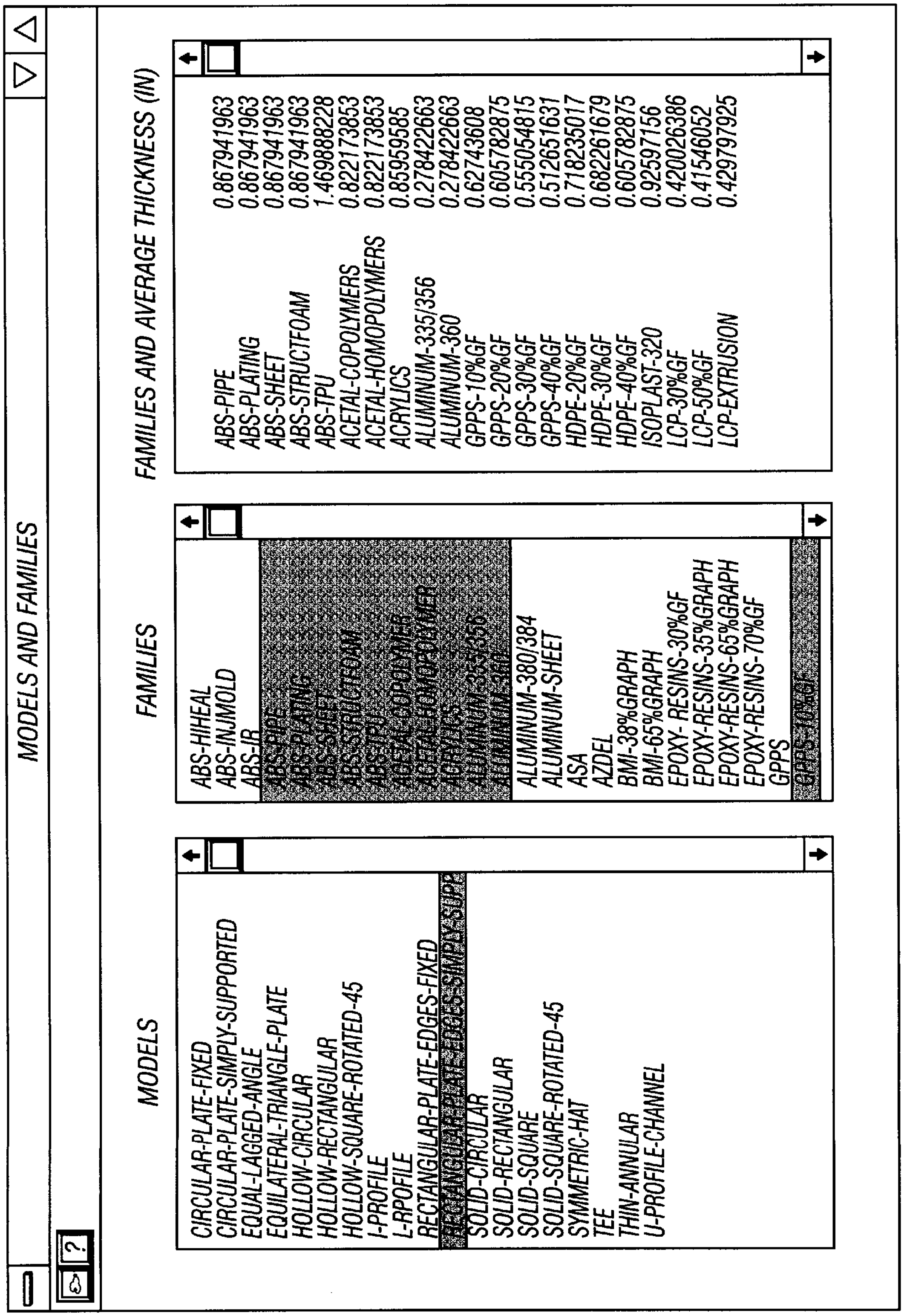
Figure 108:
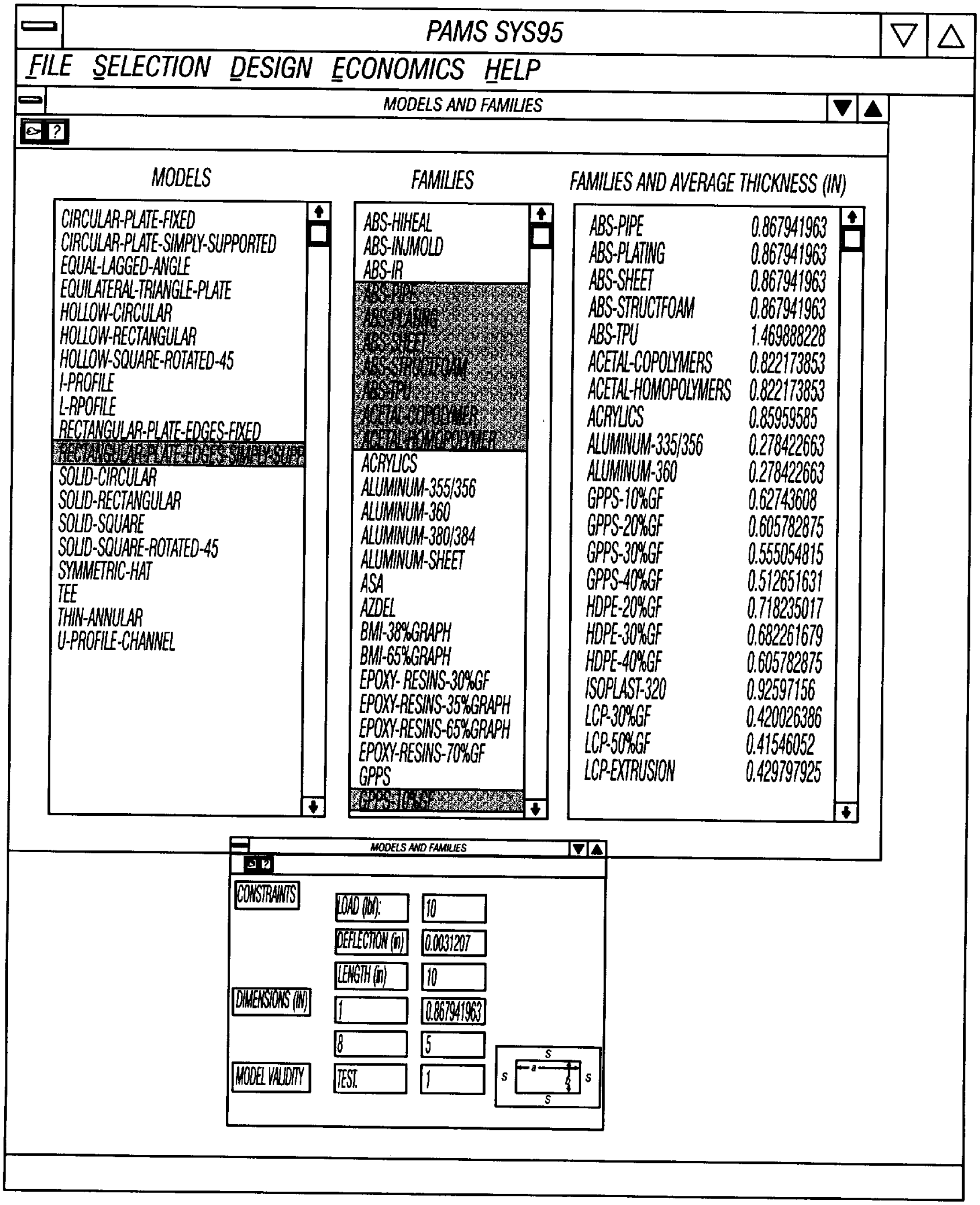
Figure 109:
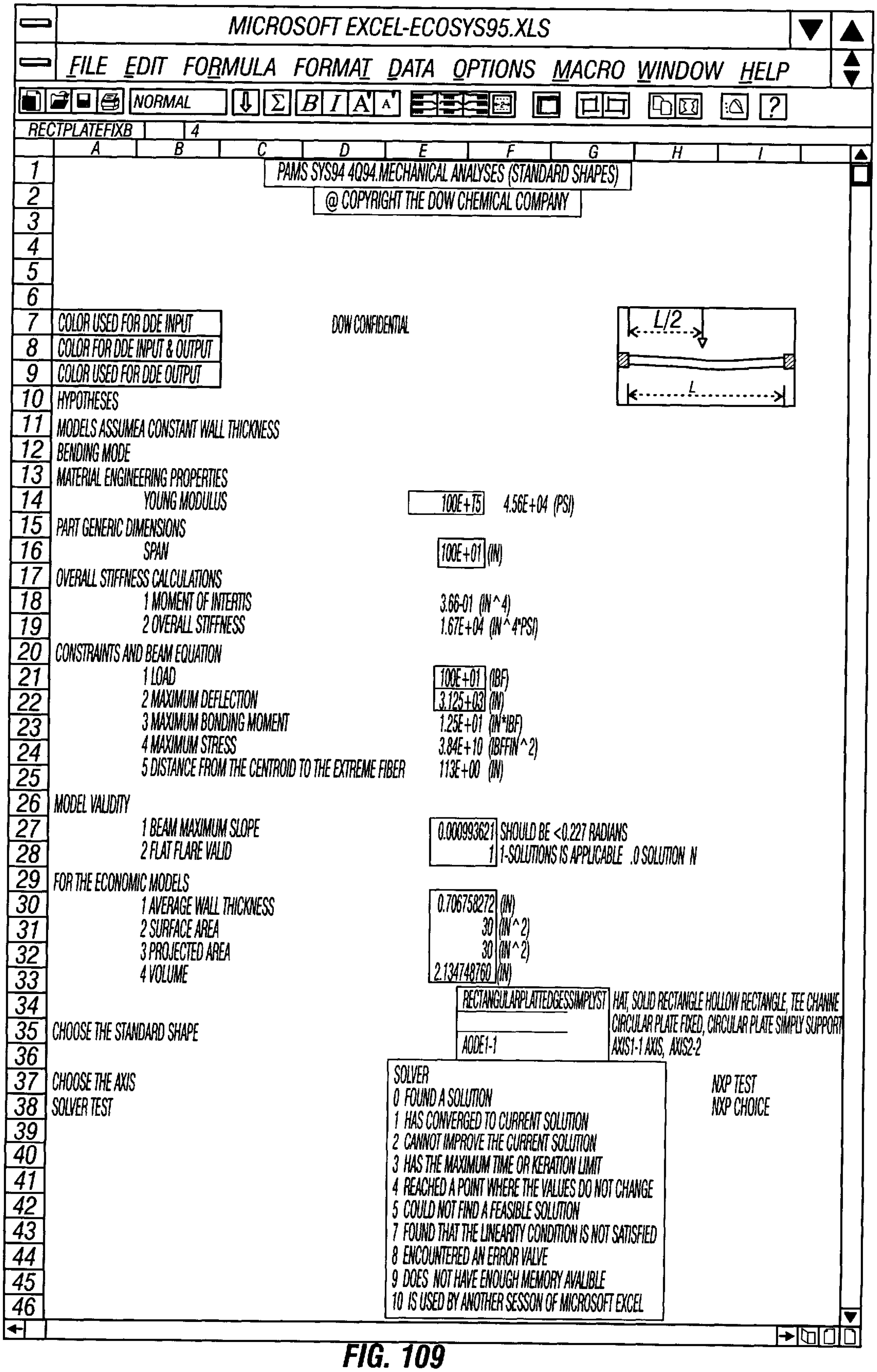

Tables 42 to 48 provide the Overall Shape Relations 1 to 56 which are utilized in the shape selection protocol of this invention. Table 49 provides the Additions Relations 1 to 19, which determine the necessary additions needed to fit the criteria for the selected application domain. Tables 50 to 58 provide the Shape Decomposition Relations 1 to 23 utilized to decompose the shape. FIGS. 76 and 81 illustrate the screen triggered from menu item "overall shape". FIG. 77 illustrates the screen triggered from menu item "additions". FIG. 78 shows GUI input dynamics logic. FIG. 79 shows the shape selection/decomposition screen output, with legend provided in FIG. 80.

The shape selection/decomposition protocol of the present invention is an innovative set of rules for defining and characterizing the overall shape relationships of the selected durable goods application. Once the use inputs the information to this module, the SYS2 PAMS system utilizes the input information to generate possible new solutions to the durable goods application of interest or for analyzing the possibility to new solutions in a given durable goods application domain. The rules and their interdependencies for the shape selection/decomposition protocol are summarized and set forth in Tables 42–58.

TABLE 42

Relations<br>From Idea to Overall Shape & Additions<br>Overall Shape<br>Opened or Closed?<br>Based on Functions

| | |
|---|---|
| Overall Shape Relation 1 | |
| ∃ object(s) inside object(s) need to be accessed | → access(es) become necessary |
| Overall Shape Relation 2 | |
| ∃ object(s) go in/out | → access(es) become necessary |
| Overall Shape Relation 3 | |
| NO objects inside at any time | → access(es) NOT necessary |
| Overall Shape Relation 4 | |
| ∀ object(s) inside object(s) do NOT need to be accessed | → access(es) NOT necessary |
| Overall Shape Relation 5 | |
| NO objects go in/out | → access(es) NOT necessary |
| Overall Shape Relation 6 | |
| access(es) necessary during-use | → opening(s) need to be considered |
| Overall Shape Relation 7 | |
| access(es) necessary during-use overal shape is is closed | → decomposition into opened shapes needs to be considered |

| | |
|---|---|
| Overall Shape Relation 8 | |
| access(es) NOT necessary during-use | → opening(s) are NOT necessary |
| Overall Shape Relation 9 | |
| opening(s) necessary<br>MAX(order of magnitude of size of all openings) < order of magnitude of longer dimension of part in a plane perpendicular to the axis of the opening | → overall shape is closed |
| Overall Shape Relation 10 | |
| opening(s) necessary<br>MAX(order of magnitude of size of at least one opening) ≅ order of magnitude of longer dimension of part in a plane perpendicular to the axis of the opening | → overall shape is opened |
| Overall Shape Relation 11 | |
| opening(s) NOT necessary | → overall shape could be closed |
| Overall Shape Relation 12 | |
| part partially encloses objects | → overall shape is opened |
| Overall Shape Relation 13 | |
| ∃ object(s) inside | → overall shape hollow |
| Overall Shape Relation 14 | |
| ∃ object(s) go in/out | → overall shape hollow |
| Overall Shape Relation 15 | |
| part partially encloses objects | → overall shape hollow |
| Overall Shape Relation 16 | |
| part is in contact with a solid supporting surface<br>part shape provides orientation with respect to the supporting surface | → opening(s) could be necessary ( . . . to provide orientation with the supporting surface . . . ) |

TABLE 43

| Based on geometry<br>2-D or 3-D?<br>Based on Functions | |
|---|---|
| Overall Shape Relation 17 | |
| load is imporant<br>aesthetics is NOT a factor | → overall shape could be 2-D |
| Overall Shape Relation 18 | |
| aesthetics is a factor | → overall shape could be 3-D |
| Overall Shape Relation 19 | |
| aesthetics is important | → overall shape is 3-D |

TABLE 44

| Based on Geometry | |
|---|---|
| Overall Shape Relation 20 | |
| part lies approximately in one plane (i.e. approximately flat)<br>part is NOT hollow | → overall shape is 2-D |
| Overall Shape Relation 21 | |
| can find a direction about which the cross-section is constant<br>part does NOT have a surface approximately perpendicular to the direction | → overall shape is 2-D |
| Overall Shape Relation 22 | |
| opened-shape cross-section about the longer direction<br>canNOT find a direction about which the cross-section is constant<br>part does NOT have a surface approximately perpendicular to the longer direction | → overall shape is 2-D |
| Overall Shape Relation 23 | |
| opened-shape cross-section about the longer direction<br>canNOT find a direction about which the cross-section is constant<br>part has at least one surface approximately perpendicular to the direction | → overall shape is 3-D |
| Overall Shape Relation 24 | |
| closed-shape cross-section<br>canNOT find a direction about which the cross-section is constant | → overall shape is 3-D |
| Overall Shape Relation 25 | |
| can find a direction about which the cross-section is constant<br>part has at least one surface approximately perpendicular to the direction | → overall shape is 3-D |
| Overall Shape Relation 26 | |
| overall shape is closed<br>has a direction about which the cross-section varies simply | → closed-shape cross-section |

TABLE 45

| Symmetry, Planes, Curvatures, Cross-sections, and Profiles?<br>Based on Functions | |
|---|---|
| Overall Shape Relation 27 | |
| part movement is rotation | → part has symmetry of revolution |

TABLE 45-continued

| Symmetry, Planes, Curvatures, Cross-sections, and Profiles? Based on Functions | | |
|---|---|---|
| during-use | | |
| Overall Shape Relation 28 | | |
| part is in contact with a solid supporting surface<br>part shape provides orientation with respect to the supporting surface | → | part surface could include approximately flat portions |
| Overall Shape Relation 29 | | |
| ∃ objects inside<br>part shape provides orientation for the objects | → | part surface could include approximately flat portions |
| Overall Shape Relation 30 | | |
| load direction is torsion | → | cross-section is approximately thin-walled circular (100), rectangular (93), or thick-walled circular (41) |
| Overall Shape Relation 31 | | |
| load direction is compression | → | cross-section is approximately thin-walled circular (100), rectangular (93), or thick-walled circular (41) |
| Overall Shape Relation 32 | | |
| load direction Is bending only | → | cross-section is approximately I-profile (100), U-profile (81), wide I-profile (58), or rectangular (57) |
| Overall Shape Relation 33 | | |
| load direction is bending and compression | → | cross-section is approximately I-profile (100), U-profile (81), wide I-profile (58), or rectangular (57) |

TABLE 46

| | | |
|---|---|---|
| Overall Shape Relation 34 | | |
| load direction is bending and torsion | → | cross-section is approximately rectangular or thin-walled circular |
| Overall Shape Relation 35 | | |
| load direction is pressure only | → | overal shape approximates body-of-revolution (e.g., sphere or cylinder) |
| Overall Shape Relation 36 | | |
| load direction is pressure and bending | → | cross-section approximates circular or hollow rectangular |
| Overall Shape Relation 37 | | |
| aesthetics is a factor | → | simple variation of standard cross-section profile made up of straight lines and simple curves |
| Overall Shape Relation 38 | | |
| aesthetics is important | → | complex variation of approximation of standard cross-section<br>profile made up of free-from curves |
| Overall Shape Relation 39 | | |
| aesthetics NOT important | → | could be standard cross-section<br>could be constant cross-section (i.e., profile is a straight line) |

TABLE 47

| Based on Geometry | | |
|---|---|---|
| Overall Shape Relation 40 | | |
| basic shape of the part has symmetry of revolution | → | overall shape is body-of-revolution |
| Overall Shape Relation 41 | | |
| part surfaoe has several different portions approximately flat<br>part does NOT lie approximately in one plane or is NOT approximately flat | → | overall shape is folded-plate |
| Overall Shape Relation 42 | | |
| basic shape of the part has symmetry of revolution<br>basic shape of the profile about the axis of revolution is curved | → | overall shape is double-curvature |
| Overall Shape Relation 43 | | |
| cross-section includes curves<br>profile is curved in locations where the cross-section is curved | → | overall shape is double-curvature |
| Overall Shape Relation 44 | | |
| canNOT find a direction about which the cross-section varies simply | → | overall shape is double-curvature |

TABLE 48

| Combinations | | |
|---|---|---|
| Overall Shape Relation 45 | | |
| overall shape 2-D<br>overall shape opened | → | overall shape is 2-D opened cross-section |
| Overall Shape Relation 46 | | |
| overall shape 2-D<br>overall shape closed | → | overall shape is 2-D closed cross-section |
| Overall Shape Relation 47 | | |
| overall shape 3-D<br>overall shape opened | → | overall shape is 3-D opened |
| Overall Shape Relation 48 | | |
| overall shape 3-D<br>overall shape closed | → | overall shape is 3-D closed |
| Overall Shape Relation 49 | | |
| overall shape 3-D closed<br>overall shape folded-plate | → | overall shape is 3-D closed folded-plate |
| Overall Shape Relation 50 | | |
| overall shape 3-D closed<br>overall shape double-curvature | → | overall shape is 3-D closed double-curvature |
| Overall Shape Relation 51 | | |
| overall shape 3-D closed<br>overall shape body-of-revolution | → | overall shape is 3-D closed body-of-revolution |
| Overall Shape Relation 52 | | |
| overall shape 3-D-opened<br>overall shape folded-plate | → | overall shape is 3-D-opened folded-plate |
| Overall Shape Relation 53 | | |
| overall shape 3-D- opened<br>overall shape double-curvature | → | overall shape is 3-D-opened double-curvature |
| Overall Shape Relation 54 | | |
| overall shape 3-D- opened<br>overall shape body-of-revolution | → | overall shape is 3-D-opened body-of-revolution |
| Overall Shape Relation 55 | | |
| overall shape body-of-revolution<br>part includes flat surfaces | → | flat surfaces are perpendicular to the axis of revolution |
| Overall Shape Relation 56 | | |
| x could be a<br>x is b | → | (destroy "x could be a") |

TABLE 49

| Additions | |
|---|---|
| Additions Relation 1 | |
| opening(s) necessary<br>∃ opening(s) to be protected, closed, or covered | → additions necessary: panels, attachments (bosses, inserts, snap fits . . . ) |
| Additions Relation 2 | |
| opening(s) necessary<br>overall shape is closed | → additions necessary: holes, slots |
| Additions Relation 3 | |
| ∃ objects inside<br>objects need to be separated | → additions necessary: inside projections (walls) |
| Additions Relation 4 | |
| ∃ objects inside<br>objects need to be located | → additions necessary: inside projections (walls) OR inside attachements OR holes |
| Additions Relation 5 | |
| ∃ objects outside<br>objects need to be separated | → additions necessary: outside projections (walls) |
| Additions Relation 6 | |
| ∃ objects outside<br>objects need to be located | → additions necessary: outside projections (walls) OR outside attachements OR holes |
| Additions Relation 7 | |
| part is 3-D<br>dividing sections are necessary | → additions necessary: inside projections (walls) |
| Additions Relation 8 | |
| inside surface must be completly smooth | → NO additions inside except holes |
| Additions Relation 9 | |
| NO additions inside except holes<br>additions necessary: inside projections (walls) OR inside attachements OR holes | → additions necessary: holes only |
| Additions Relation 10 | |
| outside surface must be completely smooth | → NO additions outside except holes |
| Additions Relation 11 | |
| NO additions outside except holes<br>additions necessary: outside projections (walls) OR outside attachements OR holes | → additions necessary: holes only |
| Additions Relation 12 | |
| ∃ objects inside<br>objects need to be attached | → additions necessary: inside attachments |
| Additions Relation 13 | |
| ∃ objects inside<br>objects need to be attached | → additions necessary: outside attachments |
| Additions Relation 14 | |
| ∃ objects outside<br>objects handle or manipulate the part | → additions necessary: outside attachments or external projections (e.g., handle) |
| Additions Relation 15 | |
| part is in contact with a supporting solid surface<br>orientation with respect to the supporting surface is required<br>part shape does NOT provide the orientation with respect to the supporting surface | → additions necessary: ouside attachments OR exterior projections (e.g. legs) |
| Additions Relation 16 | |
| part is in contact with a supporting solid surface<br>part provides the gap between the part and the supporting surface | → additions necessary: exterior projections (e.g., legs) |

TABLE 49-continued

| Additions | |
|---|---|
| Additions Relation 17 | |
| load magnitude is large<br>cross-section is simple variation of standard cross-section | → additions may be necessary: ribs |
| Additions Relation 18 | |
| load magnitude is large or medium<br>cross-section is complex variation of approximation of standard cross-section | → additions may be necessary: ribs |
| Additions Relation 19 | |
| ribs are necessary<br>outside aesthetics is a factor or important | → ribs are internal |

TABLE 50

| Shape Decomposition From a Manufacturing Standpoint | |
|---|---|
| Shape Decomposition Relation 1 | |
| overall shape is 3-D-closed<br>∃ objects inside | → decompose into 2 or more 3-D-opened |
| Shape Decomposition Relation 2 | |
| overall shape is 3-D-closed<br>inside additions (except holes) required | → decompose into 2 or more 3-D-opened |

TABLE 50-continued

| Shape Decomposition From a Manufacturing Standpoint | |
|---|---|
| Shape Decomposition Relation 3 | |
| a shape is double-curvature | → canNOT be decomposed into 2-D |

TABLE 51

| From a Shape Standpoint Only 2-D | |
|---|---|
| Shape Decomposition Relation 4 | |
| overall shape is 2-D | → can be decomposed into a series of FLAT 2-D |

TABLE 52

| 3-D-opened Folded-plate | |
|---|---|
| Shape Decomposition Relation 5 | |
| overall shape is folded-plate | → can be decomposed into series of 3-D-opened folded-plate |
| Shape Decomposition Relation 6 | |
| overall shape is folded-plate | → orientation of cutting planes is: any planes OR preferably contains the plates |
| Shape Decomposition Relation 7 | |
| overall shape is folded-plate | → 3-D-opened folded-plates can be decomposed into a series of 2-D shapes |

TABLE 53

| 3-D-opened Body-of-revolution | |
|---|---|
| Shape Decomposition Relation 8 | |
| overall shape is 3-D-opened body-of-revolution only | → orientation of cutting planes is: contains the axis of revolution OR perpendicular to the axis of revolution |

TABLE 53-continued

| 3-D-opened Body-of-revolution | | |
|---|---|---|
| Shape Decomposition Relation 9 | | |
| overall shape is 3-D-opened body-of-revolution | → | can be decomposed into 2 or more 3-D-opened shapes |
| Shape Decomposition Relation 10 | | |
| overall shape is 3-D-opened body-of-revolution | → | 3-D-opened shapes can be further decomposed into a series of 2-D, each corresponding to a straight line segment |
| profile includes straight line segments | | |
| Shape Decomposition Relation 11 | | |
| overall shape is 3-D-opened body-of-revolution profile includes curves | → | the 3-D-opened shapes corresponding to the curves are 3-D-opened double-curvature |
| Shape Decomposition Relation 12 | | |
| overall shape is 3-D-opened body-of-revolution | → | orientation of cutting planes is:<br>1. contains the axis of revolution OR<br>2. perpendicuiar to the axis of revolution<br>3. do not matter once shape decomposed by 1 & 2 |
| overall shape is 3-D-opened double-curvature | | |

TABLE 54

| 3-D-opened Double-curvature | | |
|---|---|---|
| Shape Decomposition Relation 13 | | |
| overall shape is 3-D-opened double-curvature only | → | orientation of cutting planes: do not matter |
| Shape Decomposition Relation 14 | | |
| overall shape is 3-D-opened double-curvature | → | can be decomposed into a series of 3-D-opened double-curvature shapes |

TABLE 55

| 3-D-closed Folded-plate | | |
|---|---|---|
| Shape Decomposition Relation 15 | | |
| overall shape is 3-D-closed folded-plate | → | orientation of cutting planes:<br>does not matter OR<br>contains a plate |
| Shape Decomposition Relation 16 | | |
| overall shape is 3-D-closed folded-plate | → | can be decomposed into a 2-D and a 3-D-opened folded-plate |
| orientation of cutting plane contains a plate | | |
| Shape Decomposition Relation 17 | | |
| overall shape is 3-D-closed folded-plate | → | can be decomposed into 2 or more 3-D-opened folded-plate |
| orientation of cutting plane does not matter | | |

TABLE 56

| 3-D-closed Body-of-revolution | | |
|---|---|---|
| Shape Decomposition Relation 18 | | |
| overall shape is 3-D-closed body-of-revolution | → | orientation of cutting planes:<br>contains the axis of revolution OR<br>perpendicular to the axis of revolution |

TABLE 56-continued

| 3-D-closed Body-of-revolution | | |
|---|---|---|
| Shape Decomposition Relation 19 | | |
| overall shape is 3-D-closed body-of-revolution<br>orientation of cutting plane contains the axis of revolution | → | decomposition is the same as a 3-D-opened body-of-revolution |
| Shape Decomposition Relation 20 | | |
| overall shape is 3-D-closed body-of-revolution<br>orientation of cutting planes is perpendicular to the axis of revolution | → | could be decomposed into 2 or more 3-D-closed body-of-revolution AND/OR 3-D-opened body-of-revolution |
| Shape Decomposition Relation 21 | | |
| overall shape is 3-D-closed body-of-revolution | → | orientation of cutting planes is: contains the axis of revolution OR perpendicular to the axis of revolution |
| overall shape is 3-D-closed double-curvature | | |

TABLE 57

| 3-D-closed Double-curvature | | |
|---|---|---|
| Shape Decomposition Relation 22 | | |
| overall shape is 3-D-closed double-curvature only | → | orientation of cutting planes: do not matter |

TABLE 58

| | | |
|---|---|---|
| Shape Decomposition Relation 23 | | |
| overall shape is 3-D-closed double-curvature | → | can be decomposed into a series of 3-D-opened double-curvature shapes |

Figure 110:
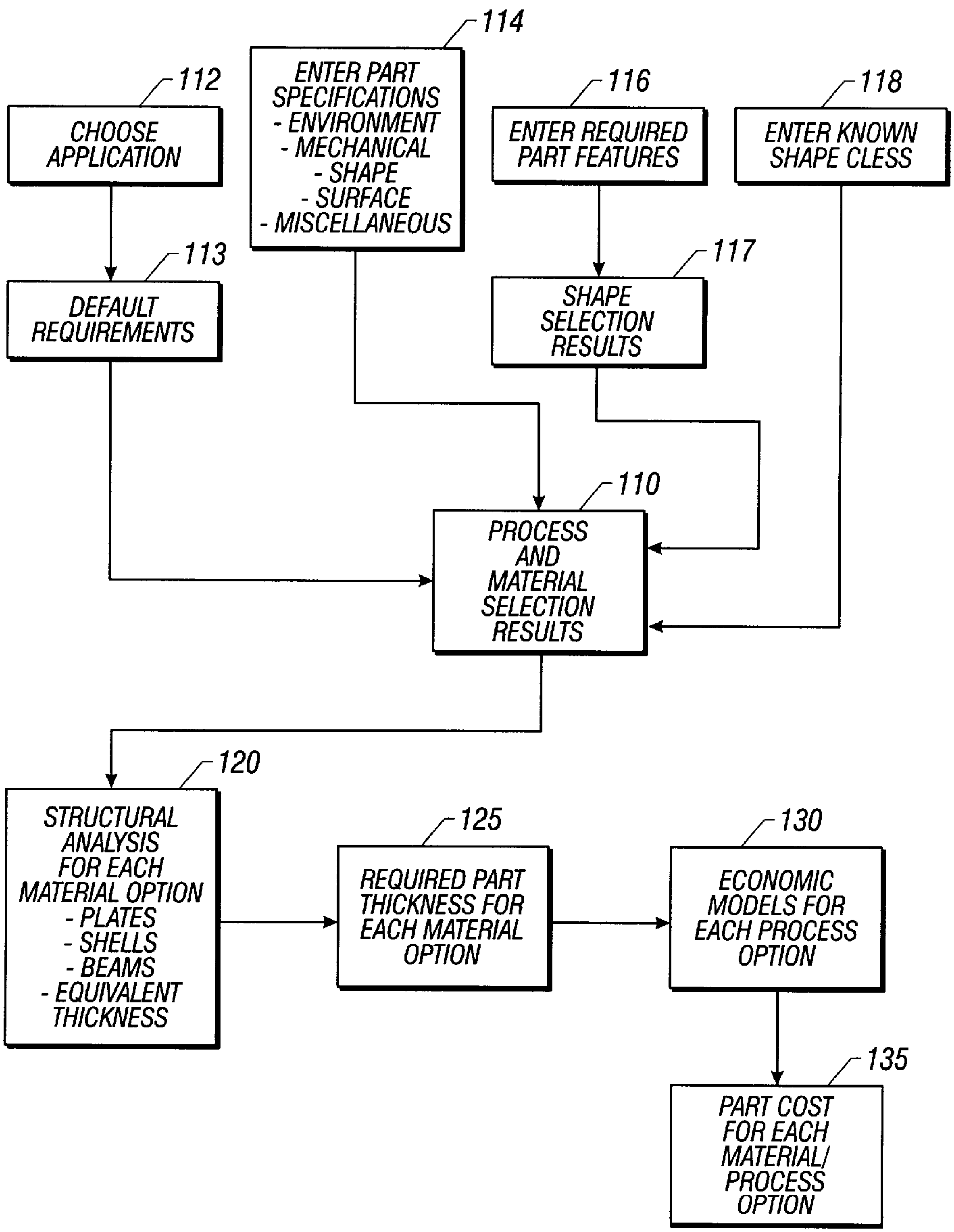
FIG. 110 is a flowchart of the macro view of the operation of the present invention.
Figure 111:
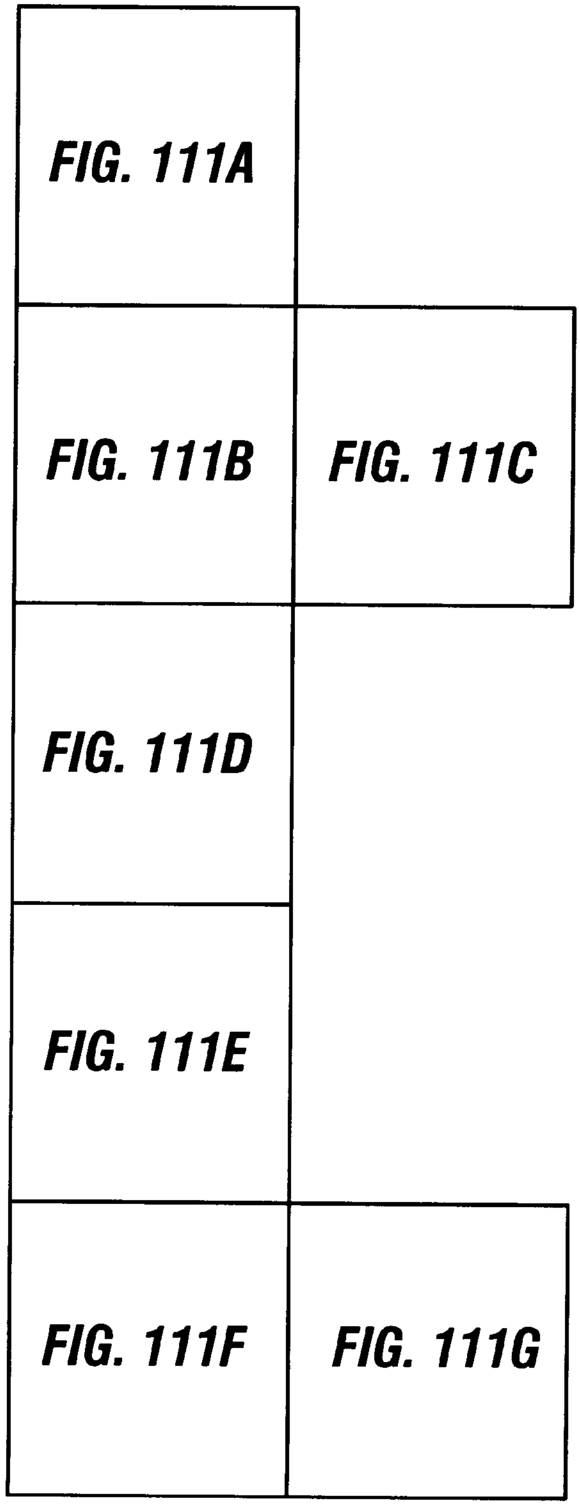
FIGS. 111A–111G are a flowchart of the operation of the PAMS system of the present invention showing more detail than FIG. 110.
Figure 111A:
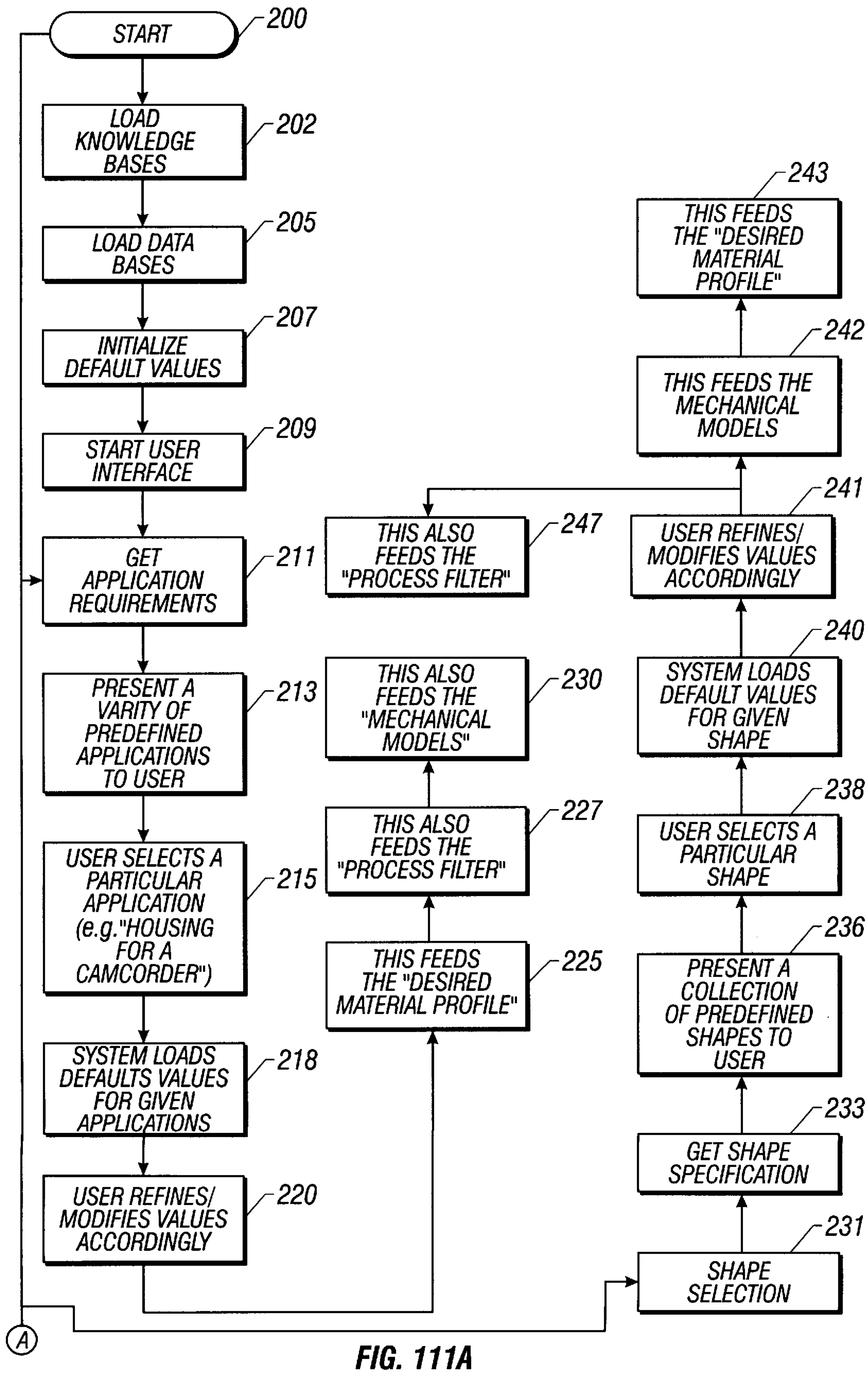
Figure 111B:
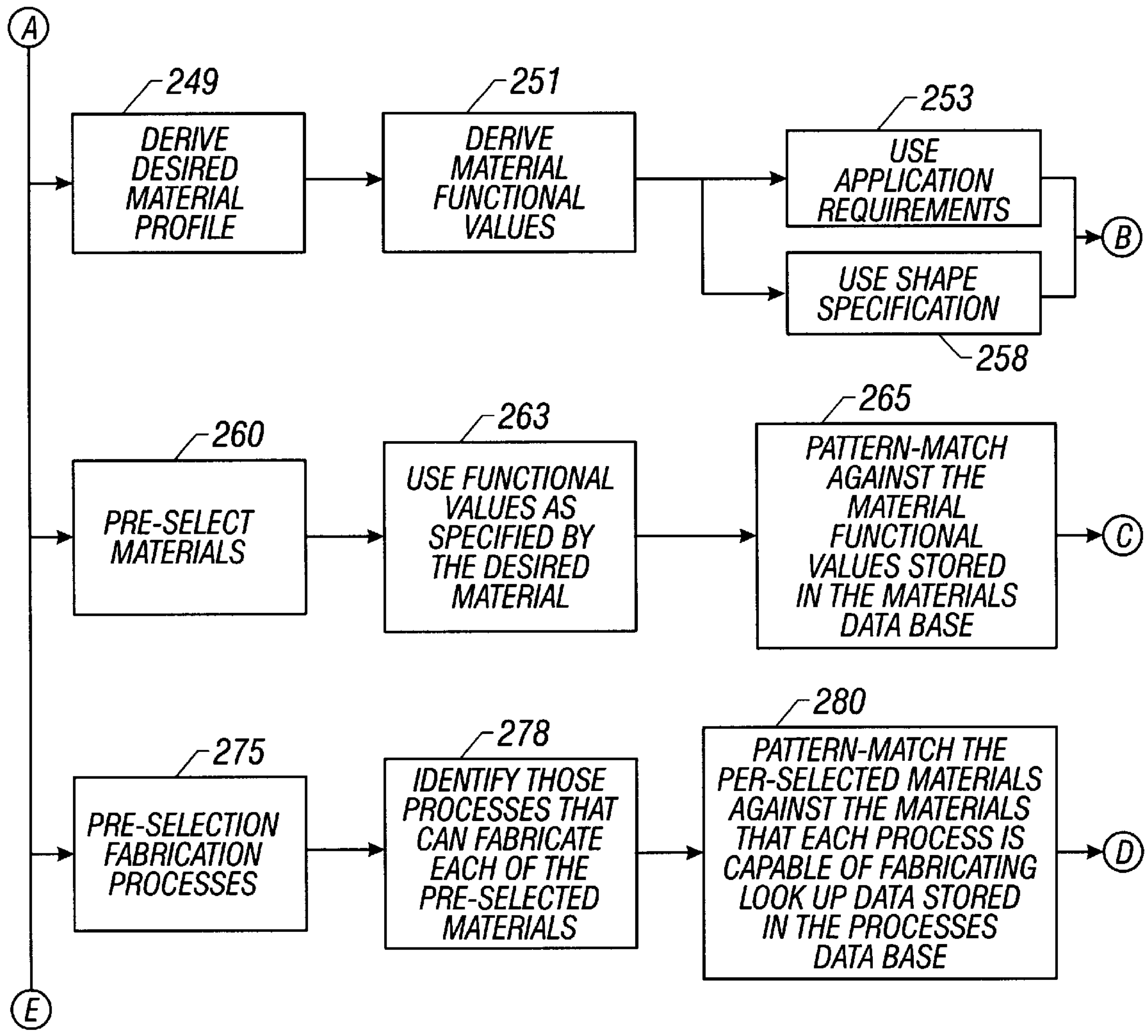
Figure 111C:
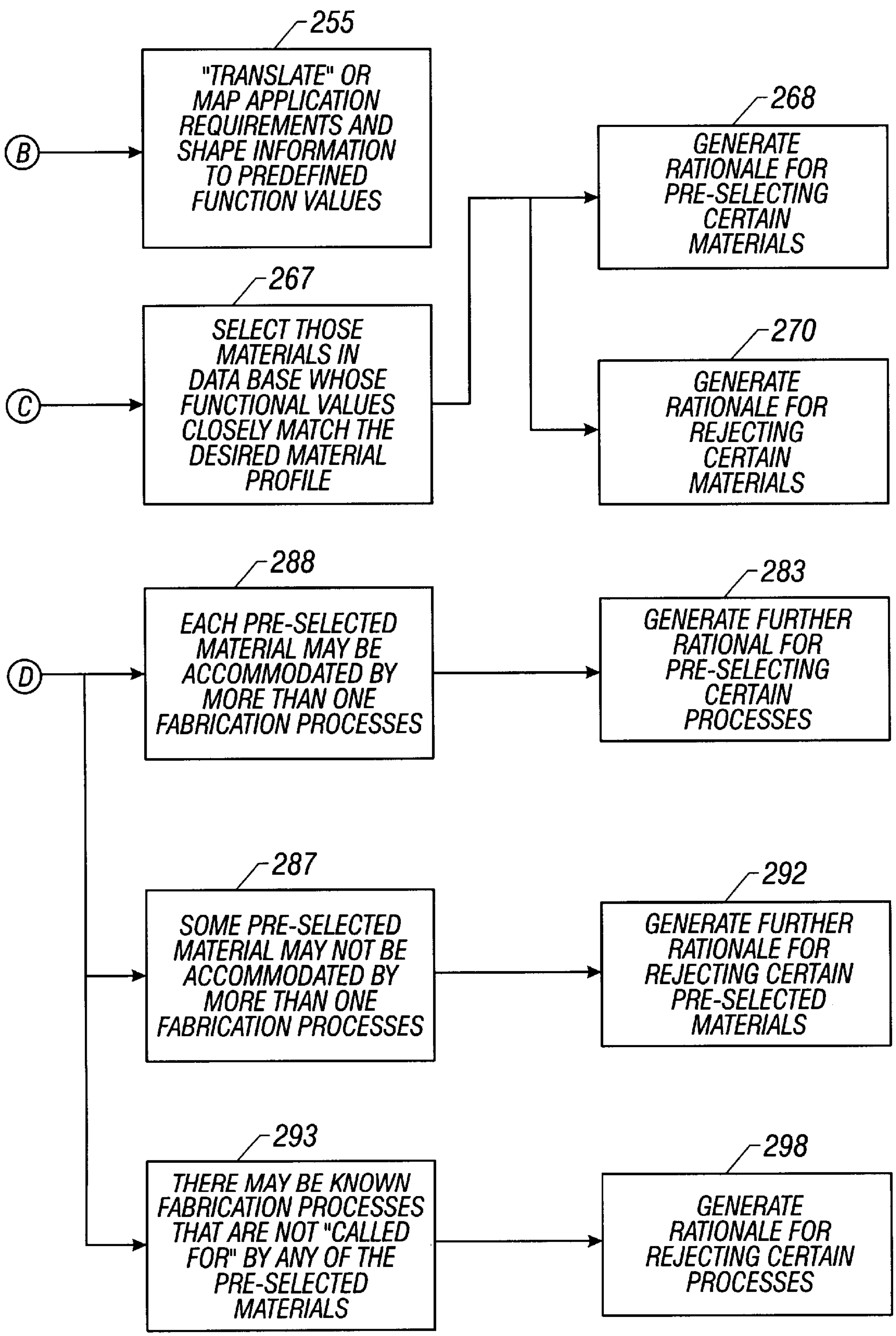
Figure 111D:
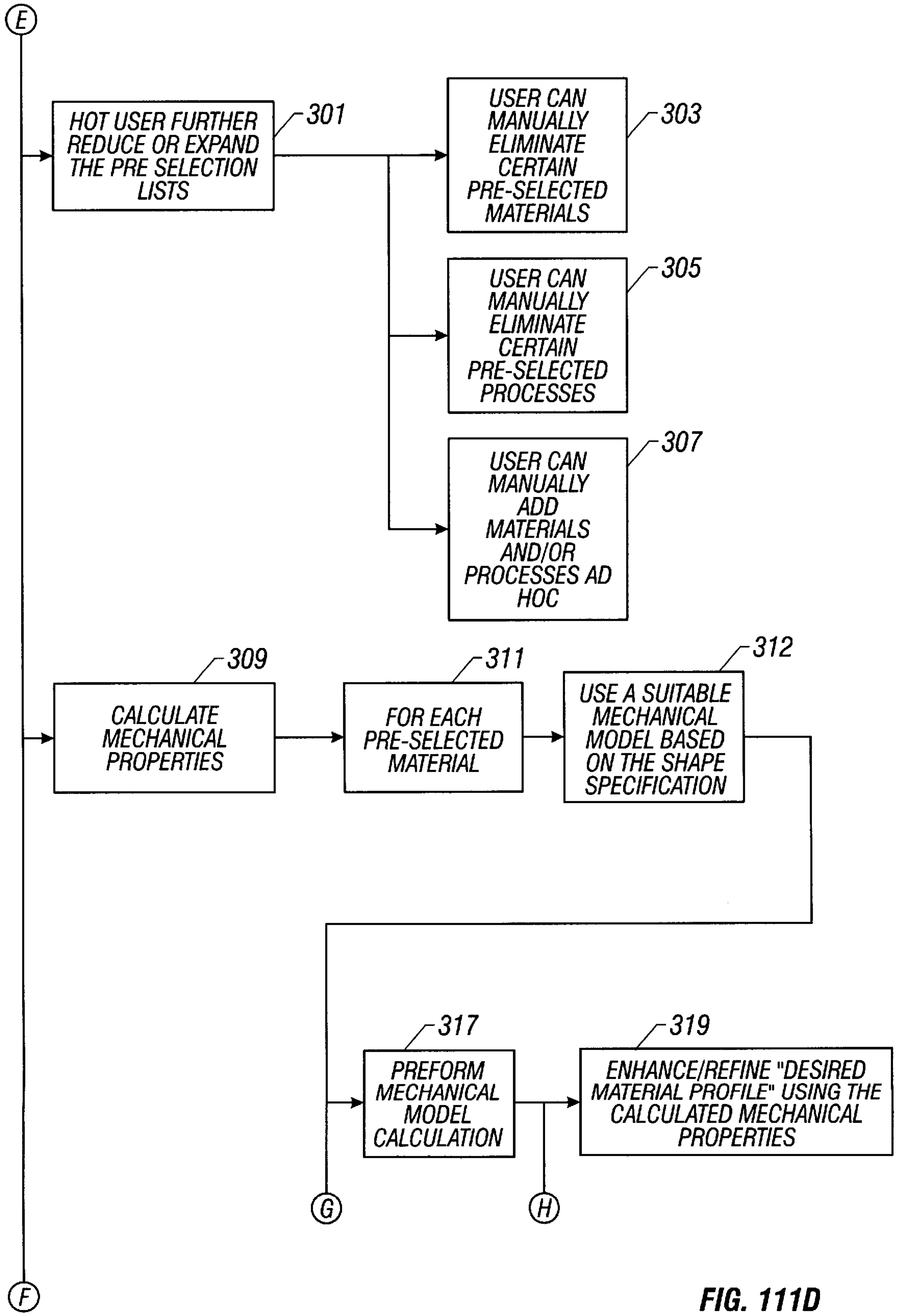
Figure 111E:
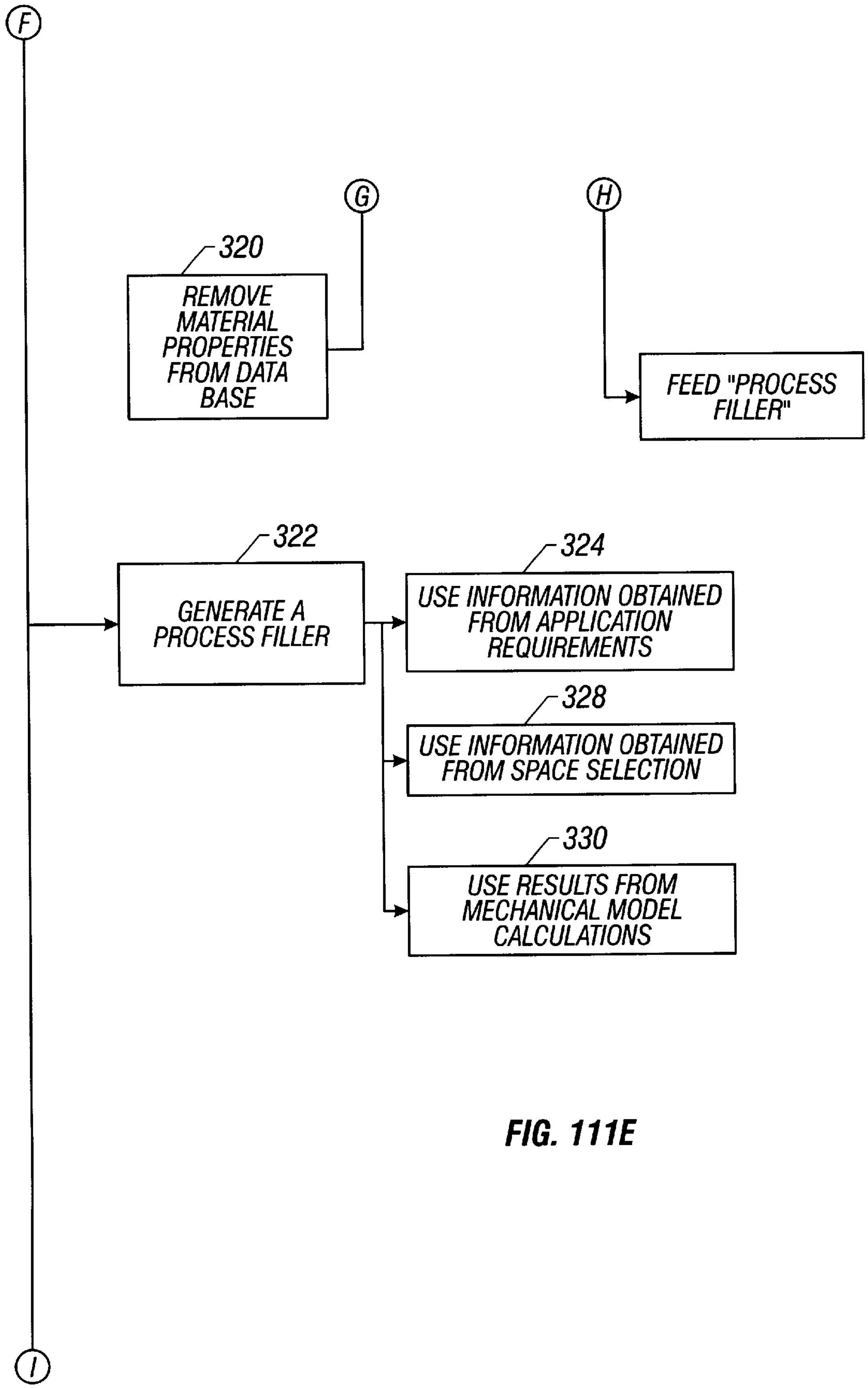
Figure 111F:
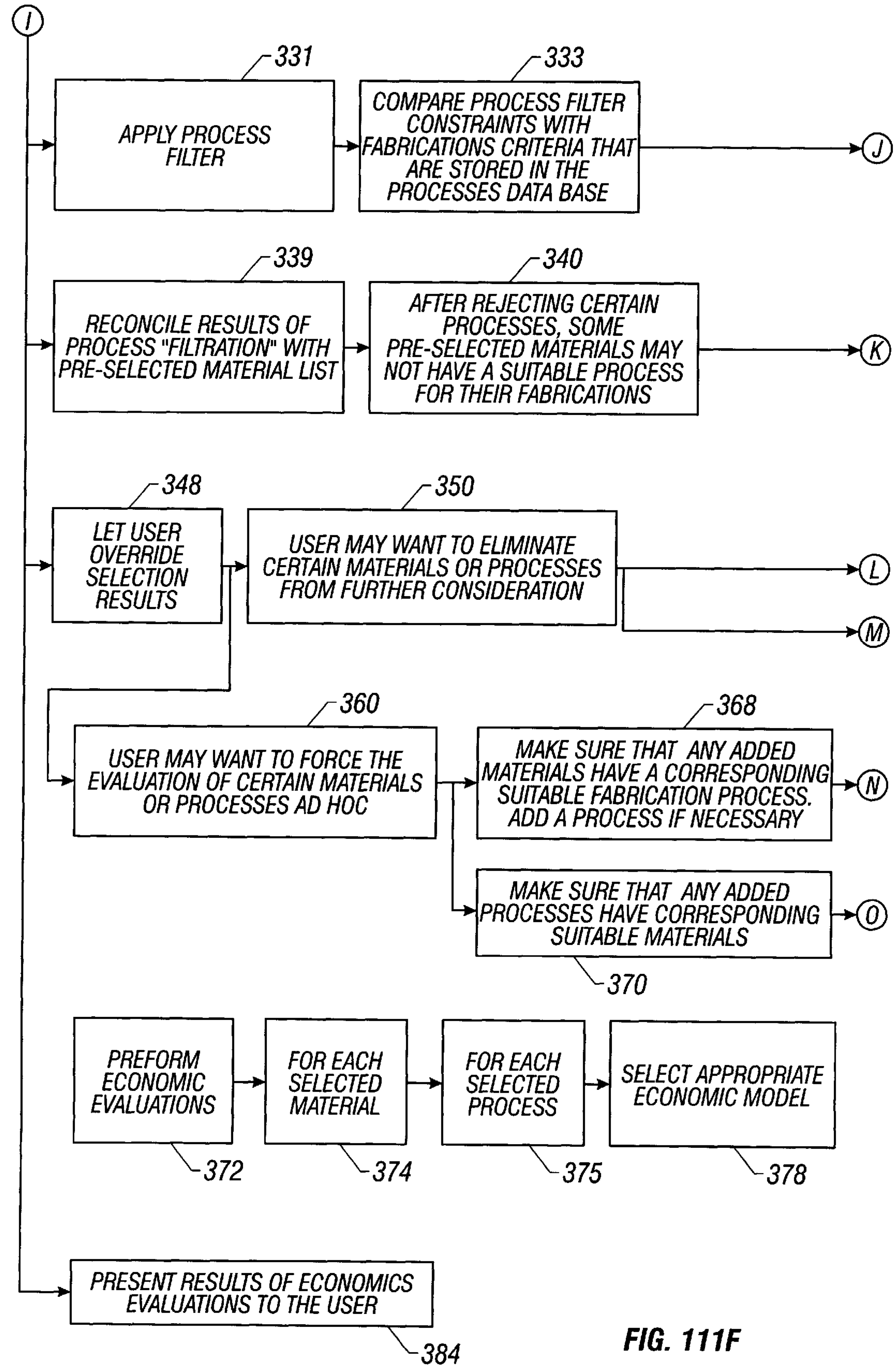
Figure 111G:
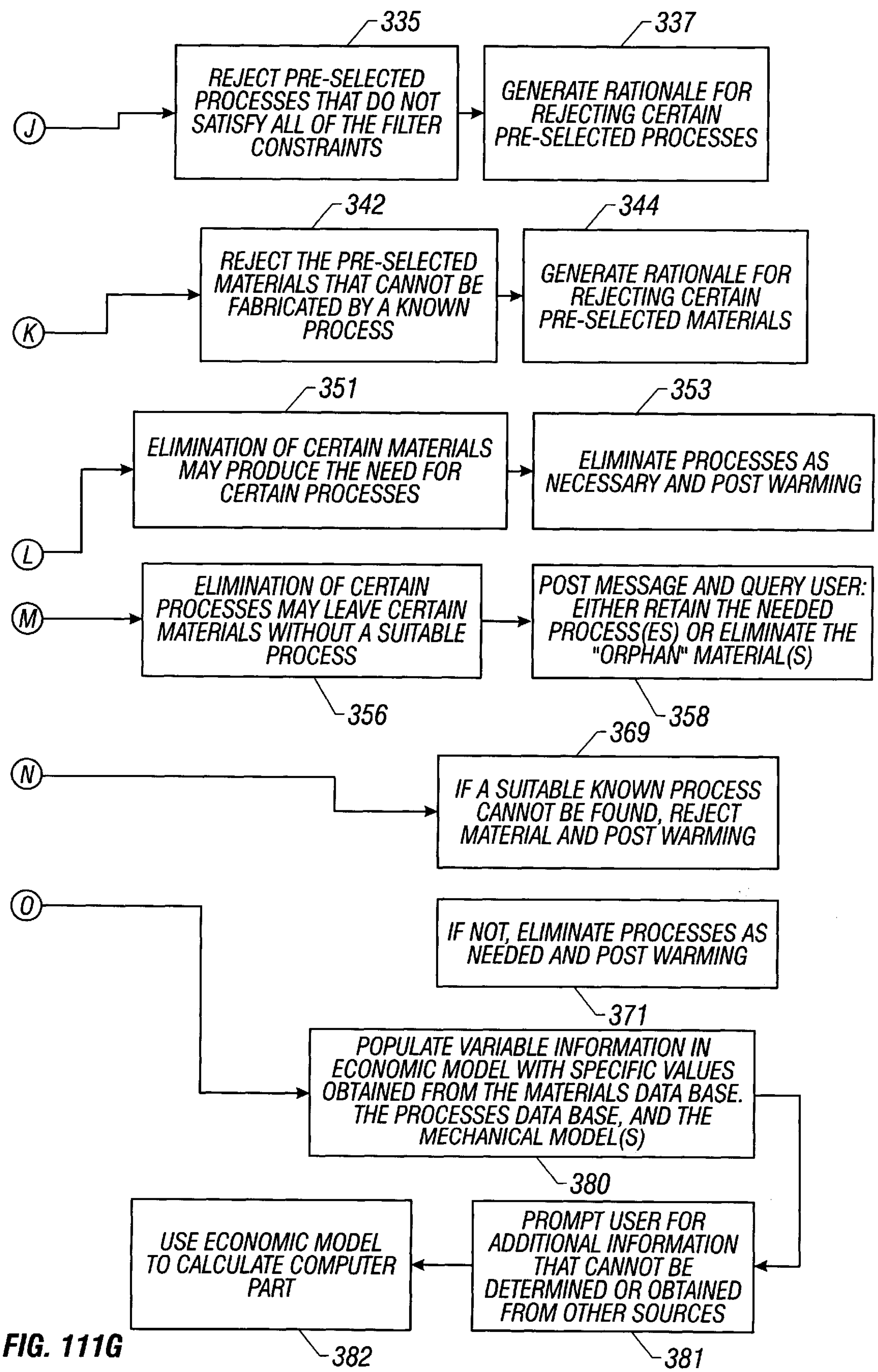

Referring now to FIG. 110 there is shown a flowchart showing a macro view of the operation of the present invention. As shown in FIG. 110, the PAMS system 110 of the present invention can be accessed by several avenues depending on when the user chooses the application 112, enters criteria 114, enters required part features 116, or enters a known shape class 118.

Where an application is chosen, default parameters 113 are utilized. Where part features 116 are selected, a shape selection is made by the system. All of these various avenues feed the PAMS system 110. From all of the input, calculated, assumed, and defaulted information, the PAMS system 110 determines the structural analysis for each material option. Once this is known, the part thickness can be determined. From the part thickness, economic models are executed, resulting in a part cost for each option.

Referring now to FIGS. 111A–111G, there is shown a detailed flowchart of the present invention. Boxes 200, 202, 205, 207 and 209 relate to the initialization of the program in which the programs, data, and default values are loaded, and the GUI is started. It must be understood that this flowchart does not have to be linearly followed, and the user can jump from point to point at the user's desire. For example, the user can next enter application requirements at 211, enter shape selection at 231, expand or reduce selection lists at 301.

Referring now to the application requirements box 211, the user is presented with a variety of predefined applications in Box 213, and if application(s) is(are) selected in Box 215, the system will load default values at 218. Box 220 shows that the user can refine or modify the default values. The system now utilizes the values for the selected application and feeds the desired material profile, the process filter and the mechanical models into Boxes 225, 227, and 230.

Referring now to the shape selection boxes 231, 233, 236, 238, 240, 241, 243, 245 and 247, it can be seen that the user selects shapes and can modify default values, as with the application section.

Boxes 249, 251, 253, 255 and 258 are for deriving a desired material profile.

Boxes 260, 263, 265, 267, 268 and 270 relate to selecting materials.

Boxes 275, 278, 280, 281, 283, 287, 290, 293 and 298 relate to selecting fabrication processes.

At Boxes 301, 303, 305, and 307, the user may reduce or expand the pre-selection lists.

Boxes 309, 311, 312, 315, 317, 319 and 320 relate to mechanical properties, selection and analysis.

Boxes 322, 324, 328, and 330 relate to generating a process filter using information from the application requirements, from the shape selection and from the mechanical model calculations.

Boxes 331, 333, 335 and 337 relate to the process filter defined in the previous set of boxes.

Boxes 339, 340, 342, 344 are utilized to reconcile results of the filtration process, the pre-selected list of materials and process and eliminating process and materials without corresponding materials or processes, respectively.

With Boxes 348, 350, 351, 353, 356, 358, 360, 368, 369, 370 and 371, the user can override the system forcing certain selections by eliminating or retaining processes or materials with the process filter being applied to warn the user of processes without materials and visa-versa.

Boxes 372, 374, 375, 378, 380 381 and 382 relate to economics.

Box 384 relates to the presentation of the economic evaluation results for the materials and processes that survived the requirements of the chosen durable goods application.

EXAMPLES

The following examples are provided merely to illustrate this invention and are not to limit the claims of this invention. These examples were obtained utilizing the PAMS-SYS1 software developed by the inventors.

Example 1

Opportunity Identification

In this example expert knowledge is utilized to process the information, explore alternatives, weigh importance, make judgments, and reach conclusions regarding opportunity identification.

Figure 42:
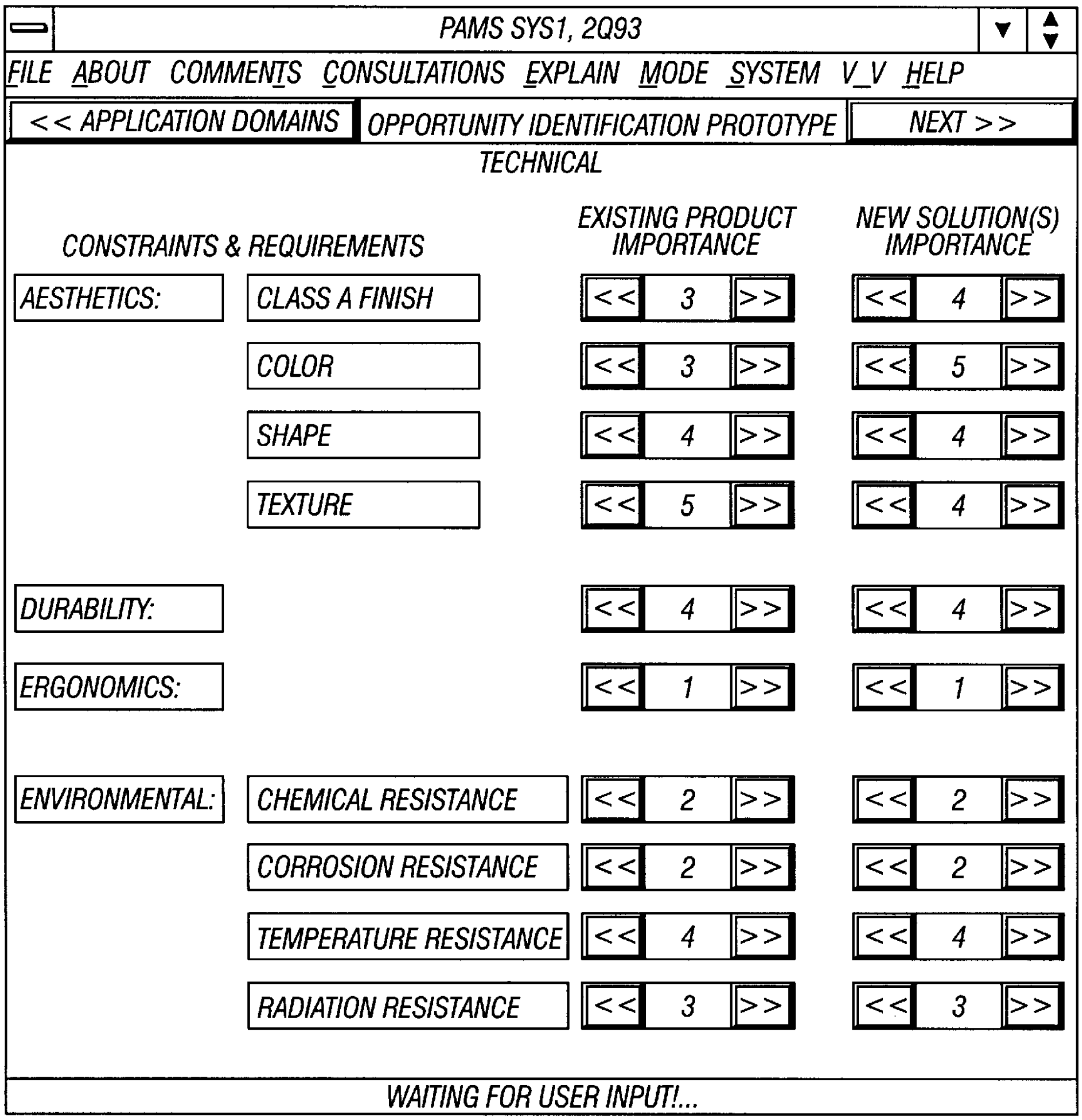
FIGS. 42 and 43 show the input screens for inputting technical constraints and requirements for data relating to aesthetics, durability, ergonomics, environmental, mechanical, reliability and weight.
Figure 43:
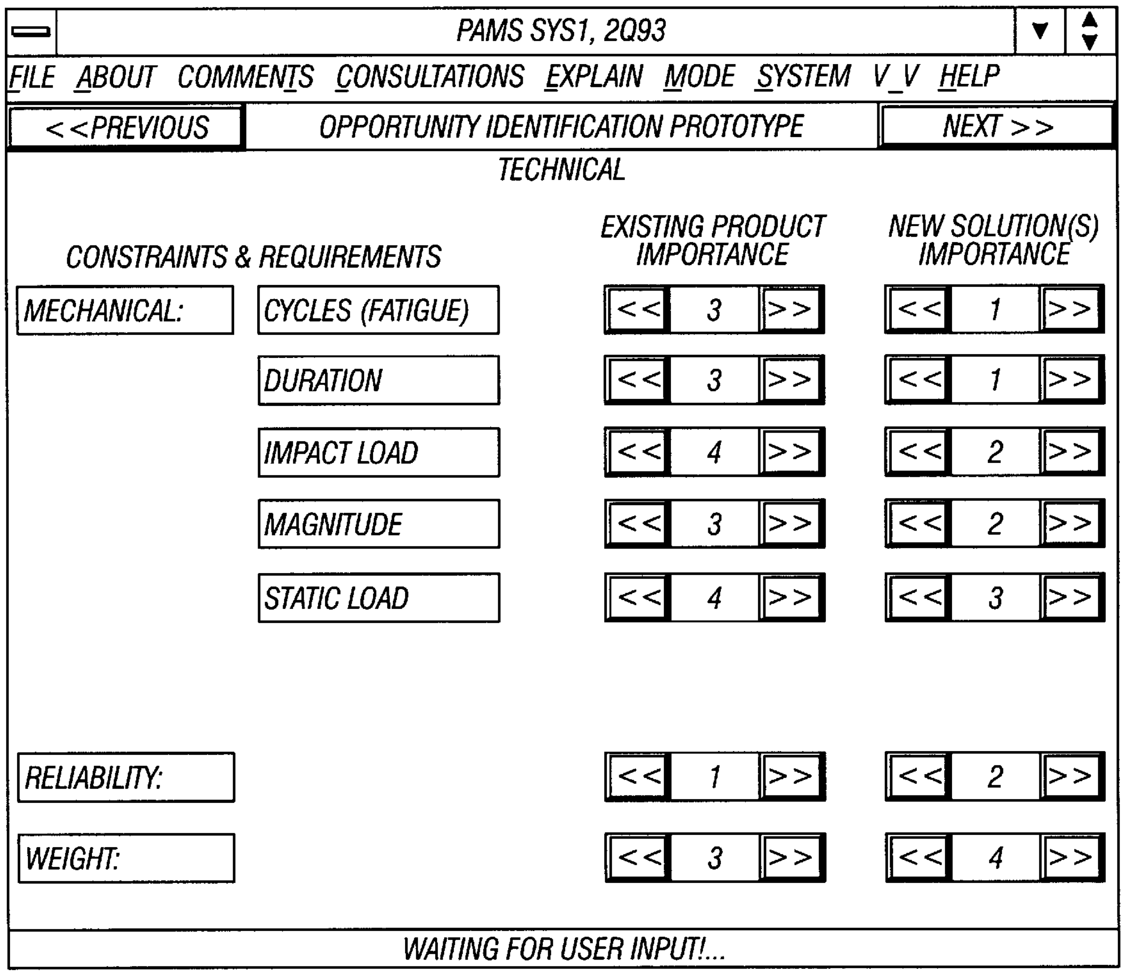

FIGS. 42 and 43 show the input screens for inputting technical constraints and requirements. Data relating to aesthetics, durability, ergonomics, environmental, mechanical, reliability and weight are input. Data values have been input as shown in FIGS. 42 and 43. The screen is further explained in Tables 22 and 23 above.

Figure 44:
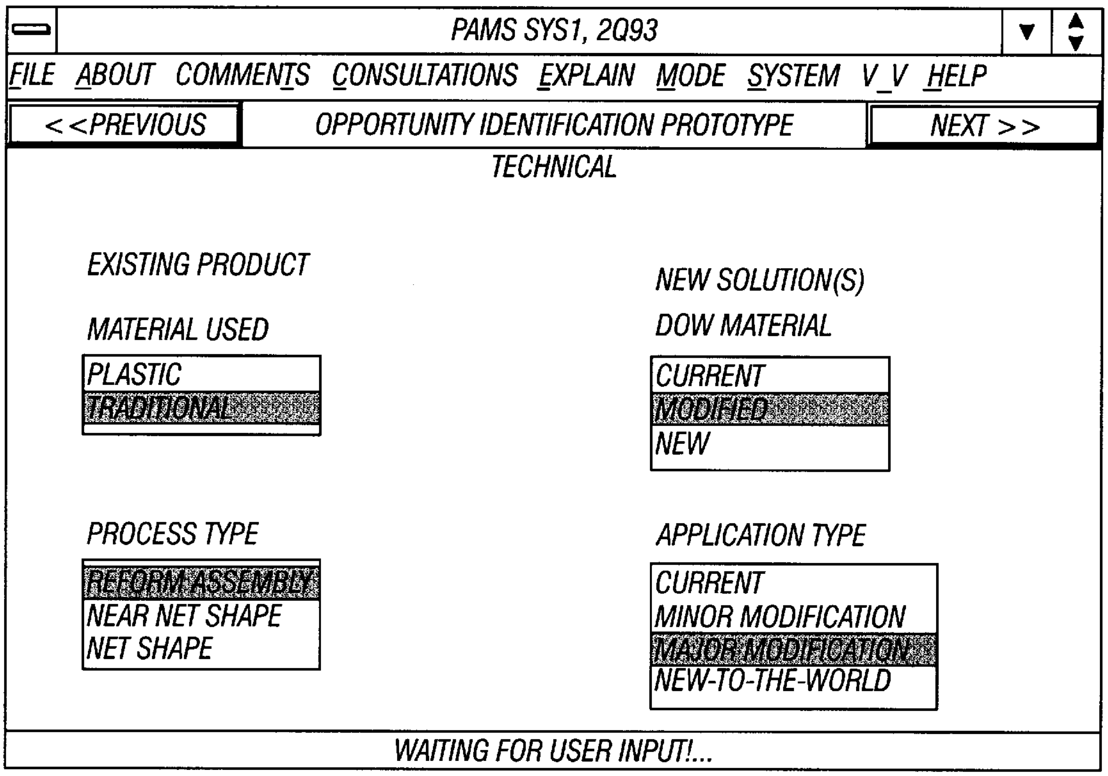
FIG. 44 shows the input screen for data relating to comparing existing versus new products, with existing product data including material used and process types, and new solution data including the users material and application type.

FIG. 44 shows the input screen for data relating to comparing existing versus new products. Data input for existing product includes material used and process types, and data input for the new solutions includes the users material and application type. Data values have been input as shown in FIG. 44. The screen is further explained in Table 24 above.

Figure 45:
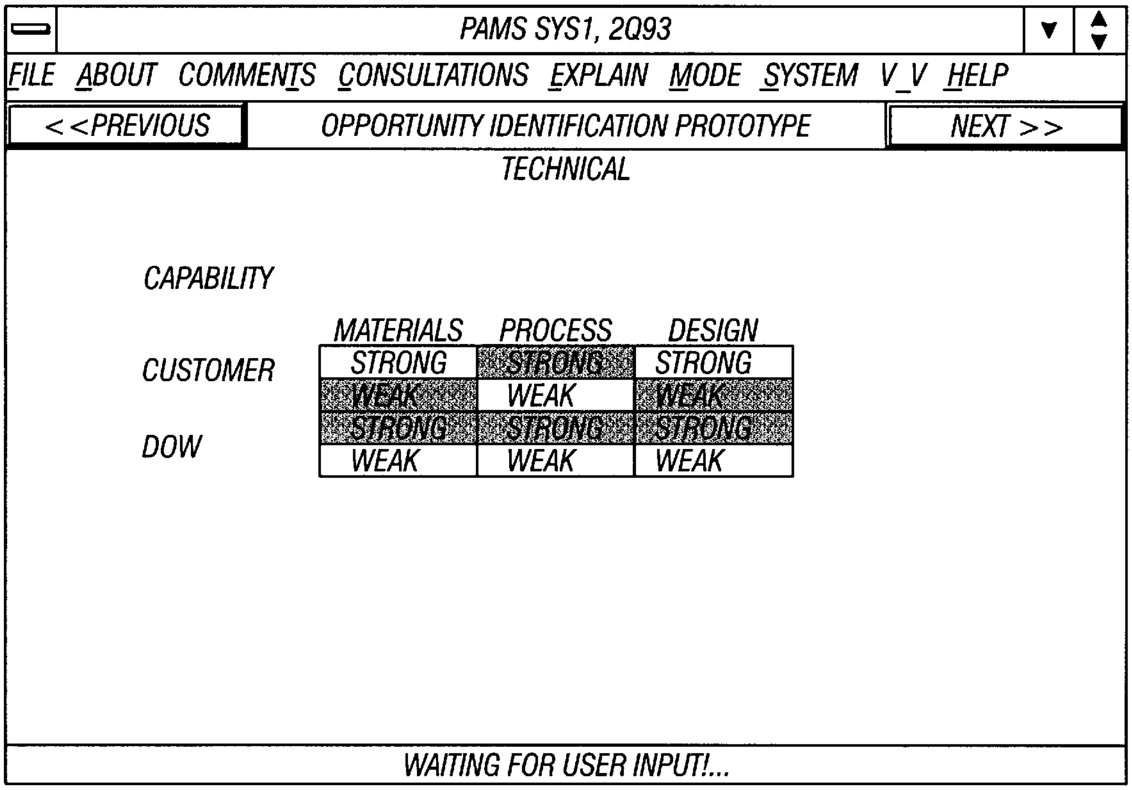
FIG. 45 shows the input screen for data relating to technical capacity, which data includes material, process and design analysis data, for both the customer and the user.

FIG. 45 shows the input screen for data relating to technical capacity, which data includes material, process and design analysis data. Data in each category is input for both the customer and the user. Data values have been input as shown in FIG. 45. The screen is further explained in Table 25.

Figure 46:
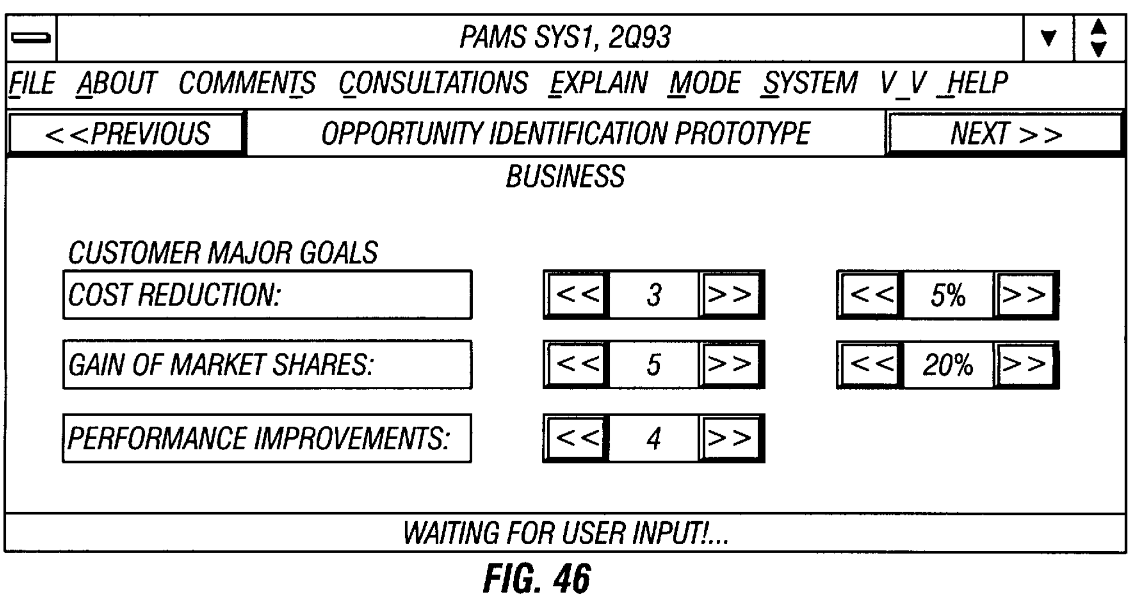
FIG. 46 shows the input screen for data relating to the business customer's major goals, with data including percentage of cost reduction value, importance of cost reduction, percent gain of market share, importance of market share gain, and performance improvement.

FIG. 46 shows the input screen for data relating to the business customer's major goals. Major goal data includes percentage of cost reduction value, importance of cost reduction, percent gain of market share, importance of market share gain, and performance improvement. Data values have been input as shown in FIG. 46. The screen is further explained in Table 26 above.

Figure 47:
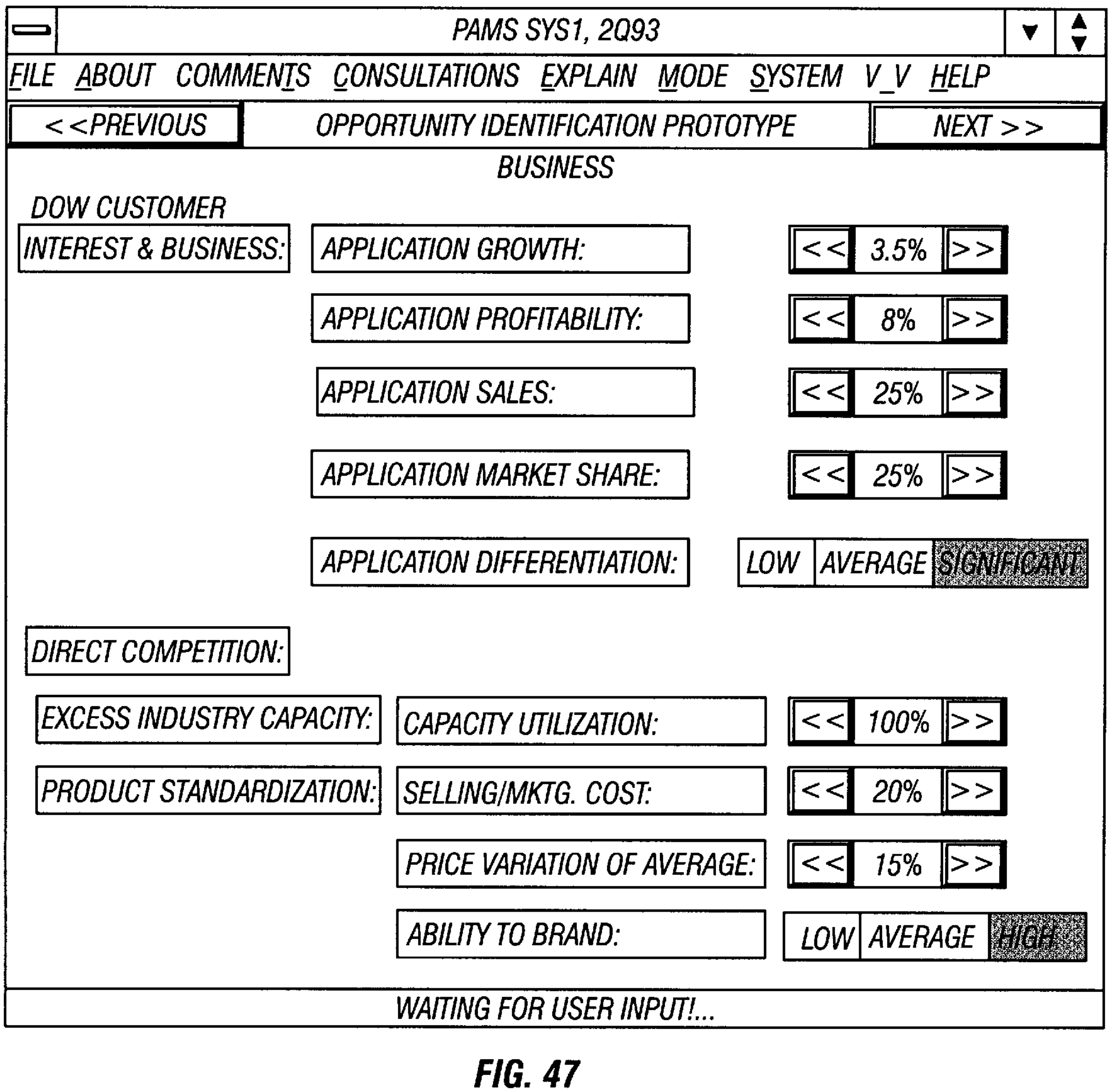
FIG. 47 shows the input screen for data relating to customer interest and business, with input variables including application growth, profitability, sales, market share, potential for product differentiation, capacity utilization, selling/marketing cost, price variation, and ability to brand.

FIG. 47 shows the input screen for data relating to customer interest and business. Input variables include application growth, profitability, sales, market share, potential for product differentiation, capacity utilization, selling/marketing cost, price variation, and ability to brand. Data values have been input as shown in FIG. 47. The screen is further explained in Tables 27 and 28 above.

Figure 48:
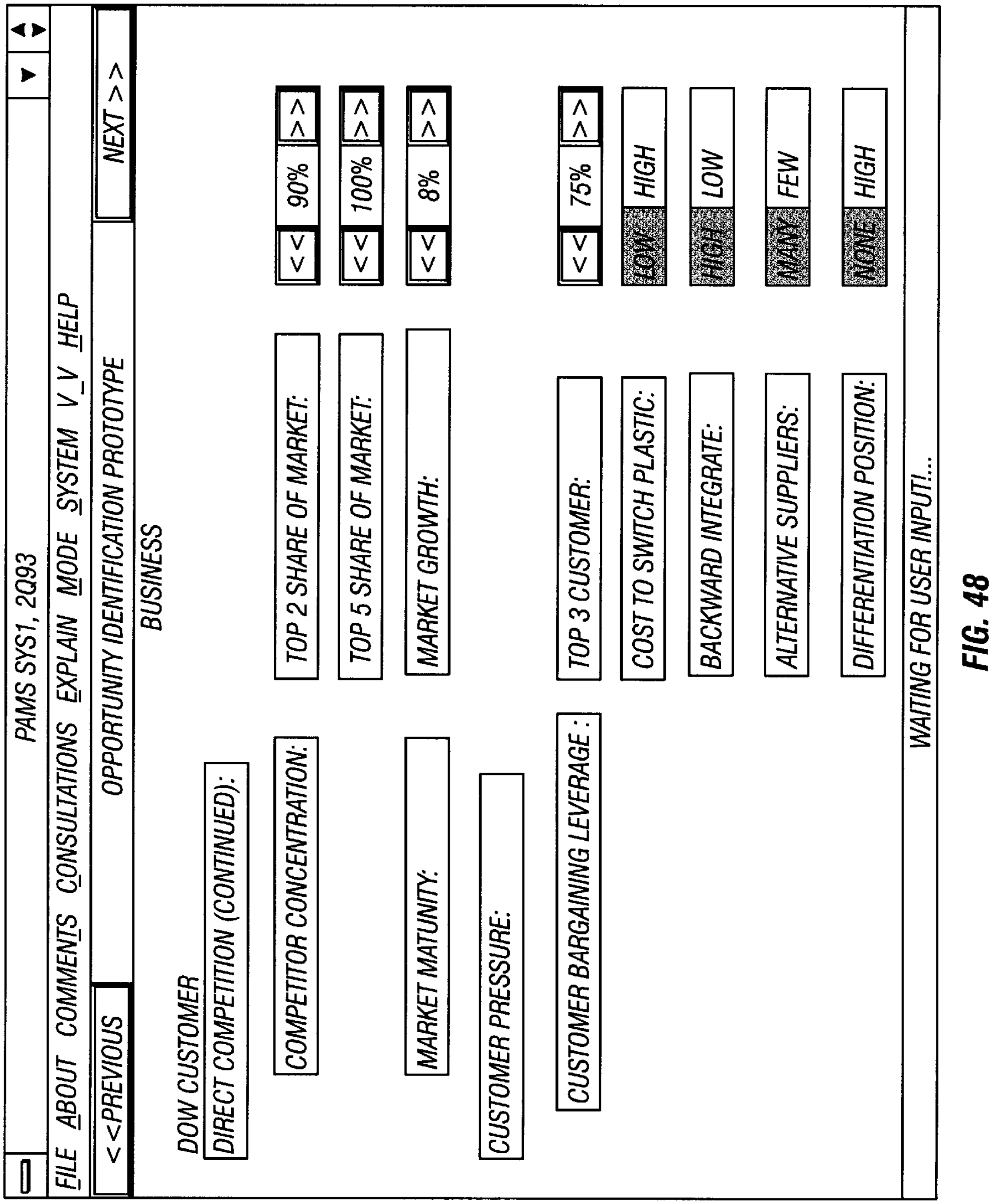
FIG. 48 shows the input screen for data relating to customer direct competition and pressure, with input variables including: top 2 and 5 share of market for competitor concentration analysis; market growth for market maturity analysis; and top 3 customers, cost to switch, backward integrate, alternative suppliers; and differentiation position for the customer bargaining leverage analysis.

FIG. 48 shows the input screen for data relating to customer direct competition and pressure. Input variables include: top 2 and 5 share of market for competitor concentration analysis; market growth for market maturity analysis; and top 3 customers, cost to switch, backward integrate, alternative suppliers; and differentiation position for the customer bargaining leverage analysis. Data values have been input as shown in FIG. 48. The screen is further explained in Table 29 above.

Figure 49:
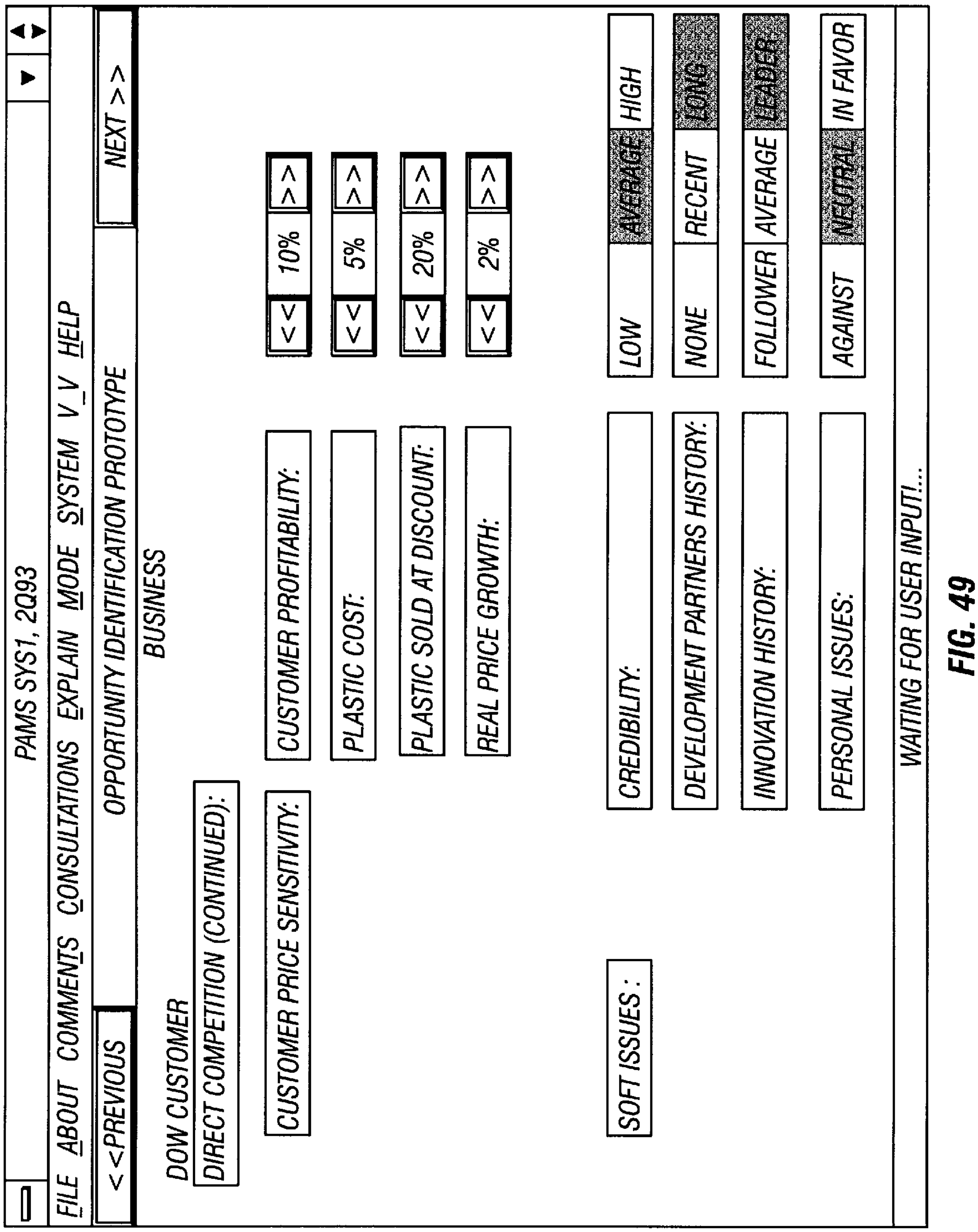
FIG. 49 shows the input screen for data relating to customer pressure and soft issues, with input data including customer price sensitivity of customer profitability, plastic cost, discount cost, real price growth, and also including "soft issues" such as credibility of customer, history of customer to develop products, innovation history of customer, and any personal issues.

FIG. 49 shows the input screen for data relating to customer pressure and soft issues. Input data includes customer price sensitivity of customer profitability, plastic cost, discount cost, real price growth. Input data also includes soft issues such as credibility of customer, history of customer to develop products, innovation history of customer, and any personal issues. Data values have been input as shown in FIG. 49. The input screen is further explained in Tables 30–31 above.

Figure 50:
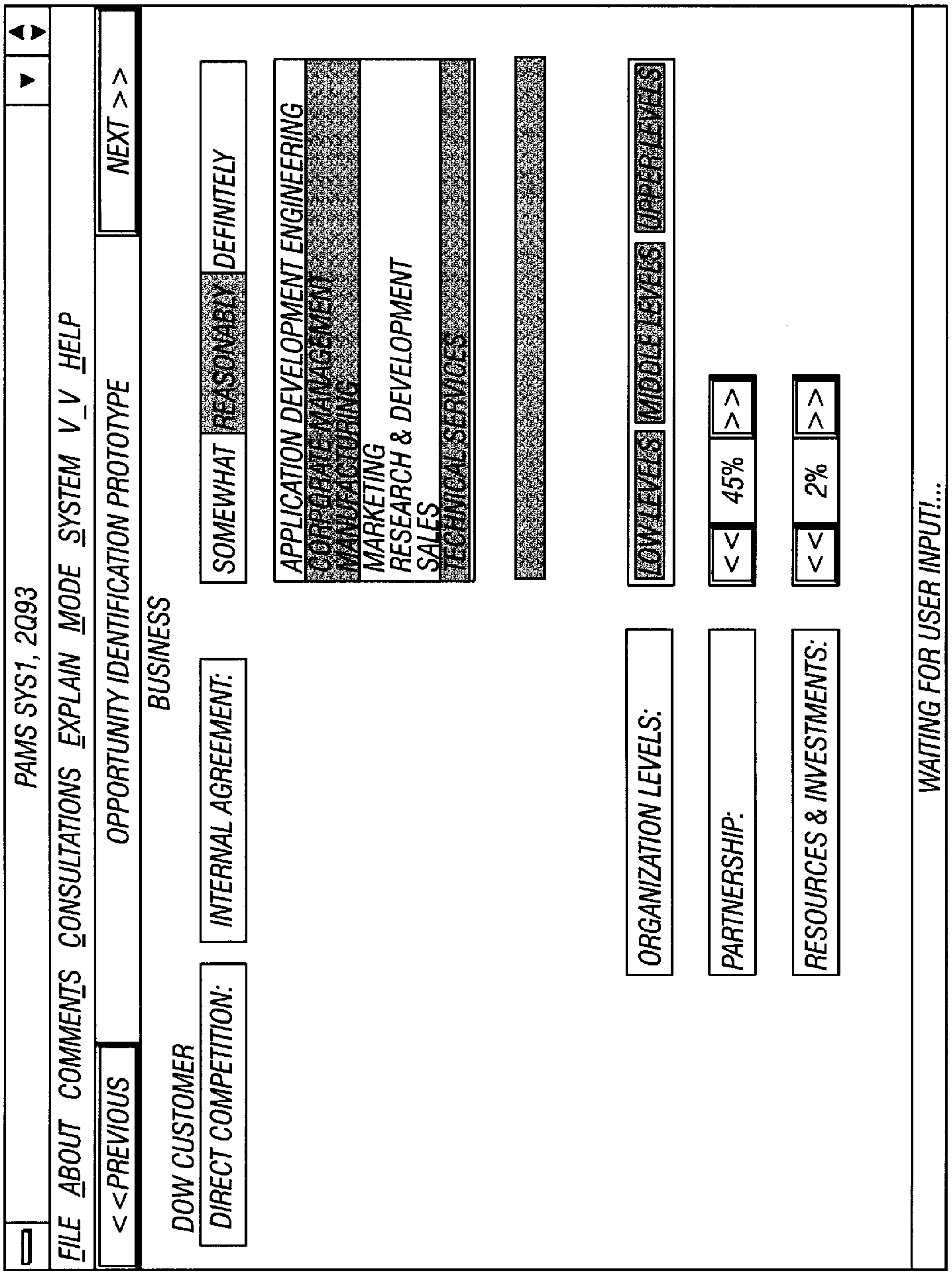
FIG. 50 shows the input screen relating to customer support and commitment, including input variables relating to internal agreement, organization functions and levels, partnership, and resources and investments.

FIG. 50 shows the input screen relating to customer support and commitment, including input variables relating to internal agreement, organization functions and levels, partnership, and resources and investments. Data values have been input as shown in FIG. 50. The input screen is further explained in Table 32 above.

Figure 51:
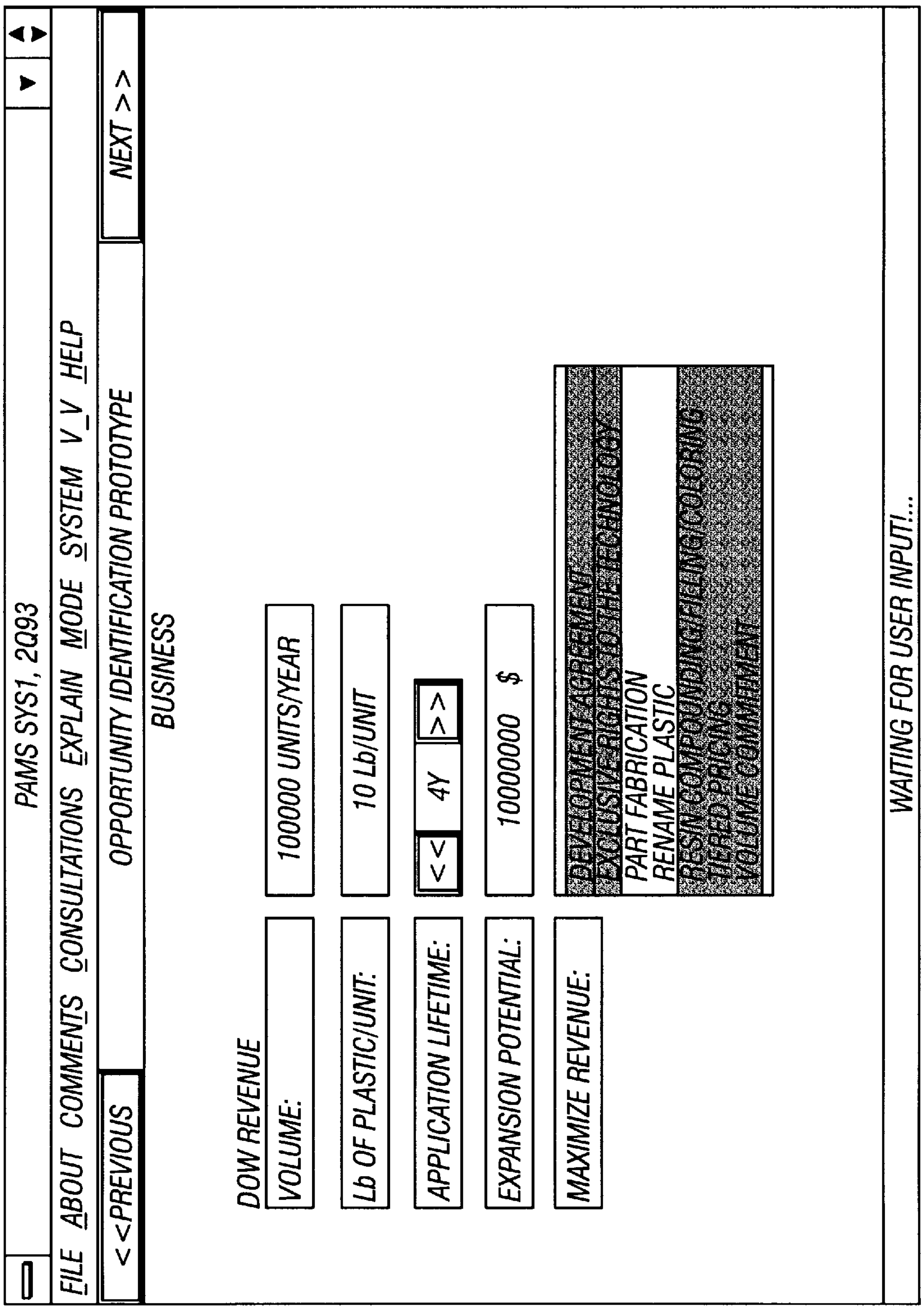
FIG. 51 shows the input screen relating to the user's revenue, with input variables relating to volume of units, plastic per unit, expansion potential, and options to maximize revenue.

FIG. 51 shows the input screen relating to the User's (illustrated as Dow in the figure) revenue. Input variables relate to volume of units, plastic per unit, expansion potential, and options to maximize revenue. Data values have been input as shown in FIG. 51. The input screen is further explained in Table 33 above.

Figure 52:
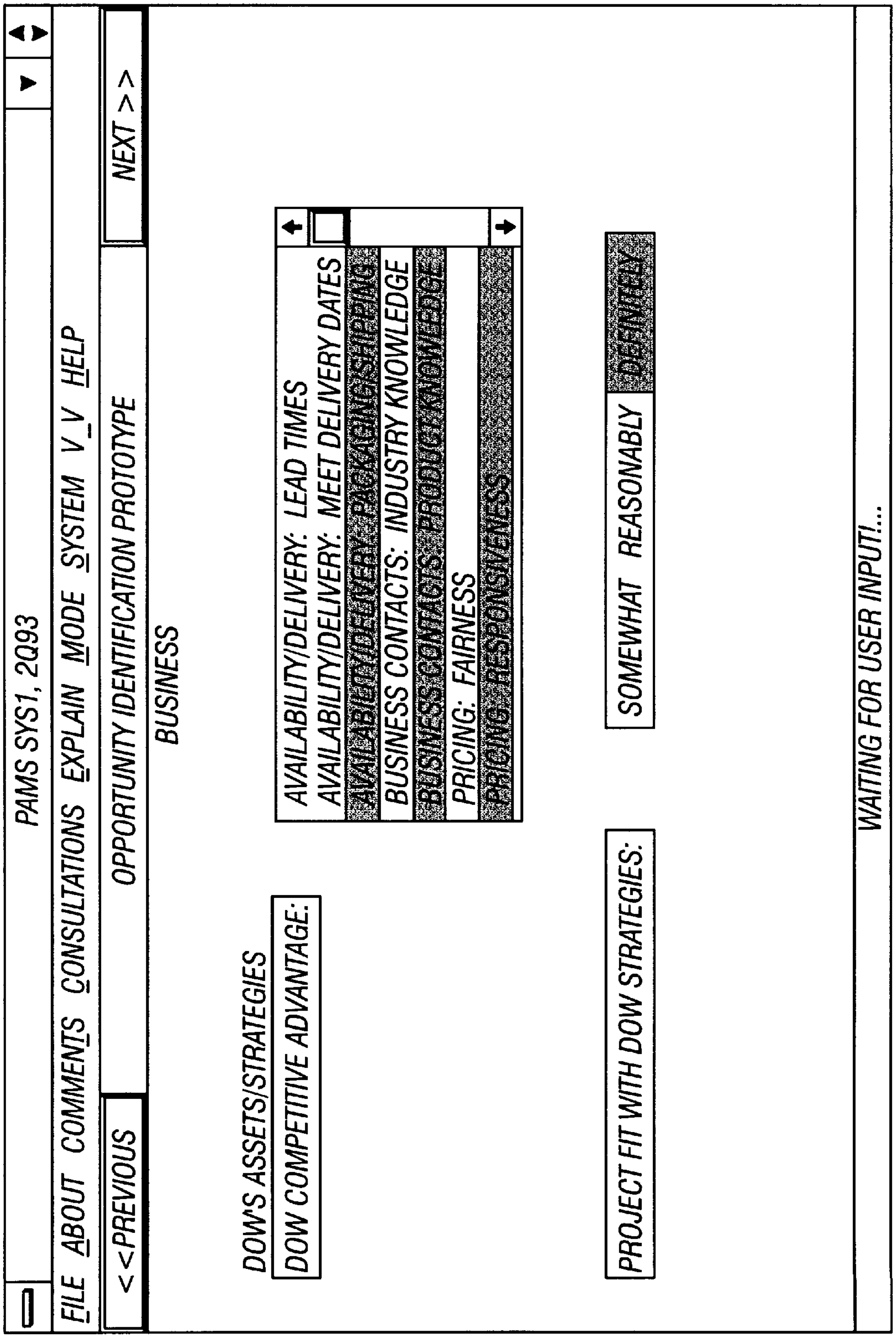
FIG. 52 shows the input screen for data relating to the user's assets/strategies, with input variables relating to the user's competitive advantage and whether the project fits with the user's strategy.

FIG. 52 shows the input screen for data relating to the User's (illustrated as Dow in the figure) assets/strategies. Input variables relate to the user's competitive advantage and whether the project fits with the user's strategy. Data values have been input as shown in FIG. 52. The input screen is further explained in Table 34 above.

Figure 53:
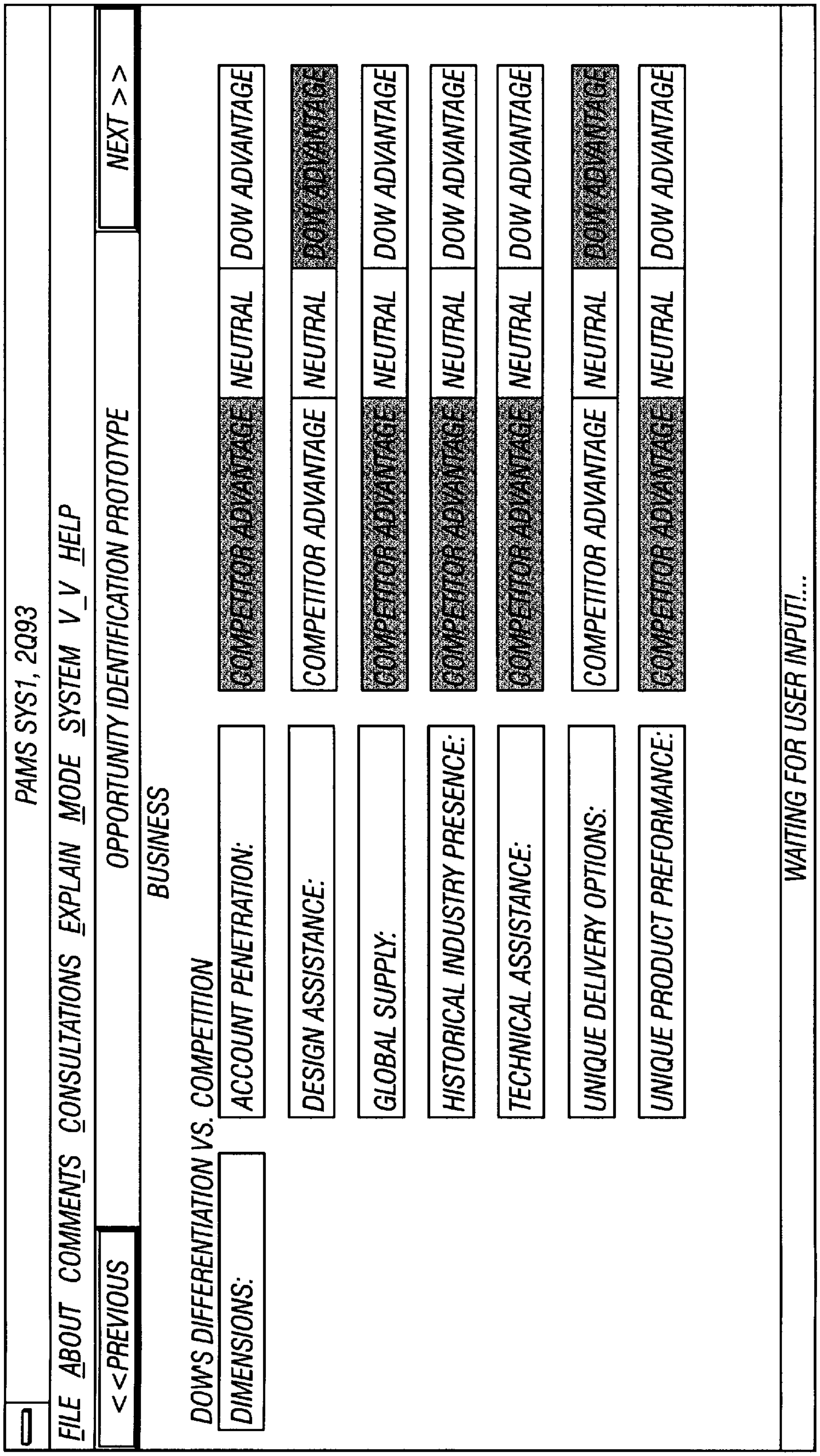
FIG. 53 shows the input screen for data relating to the user's differentiation, with input variables relating to account penetration, design assistance, global supply, historical industry presence, technical assistance, unique delivery options, and unique product performance.

FIG. 53 shows the input screen for data relating to the User's (illustrated as Dow in the figure) differentiation. Input variables relate to account penetration, design assistance, global supply, historical industry presence, technical assistance, unique delivery options, and unique product performance. Data values have been input as shown in FIG. 53. The input screen is further explained in Table 35 above.

Figure 54:
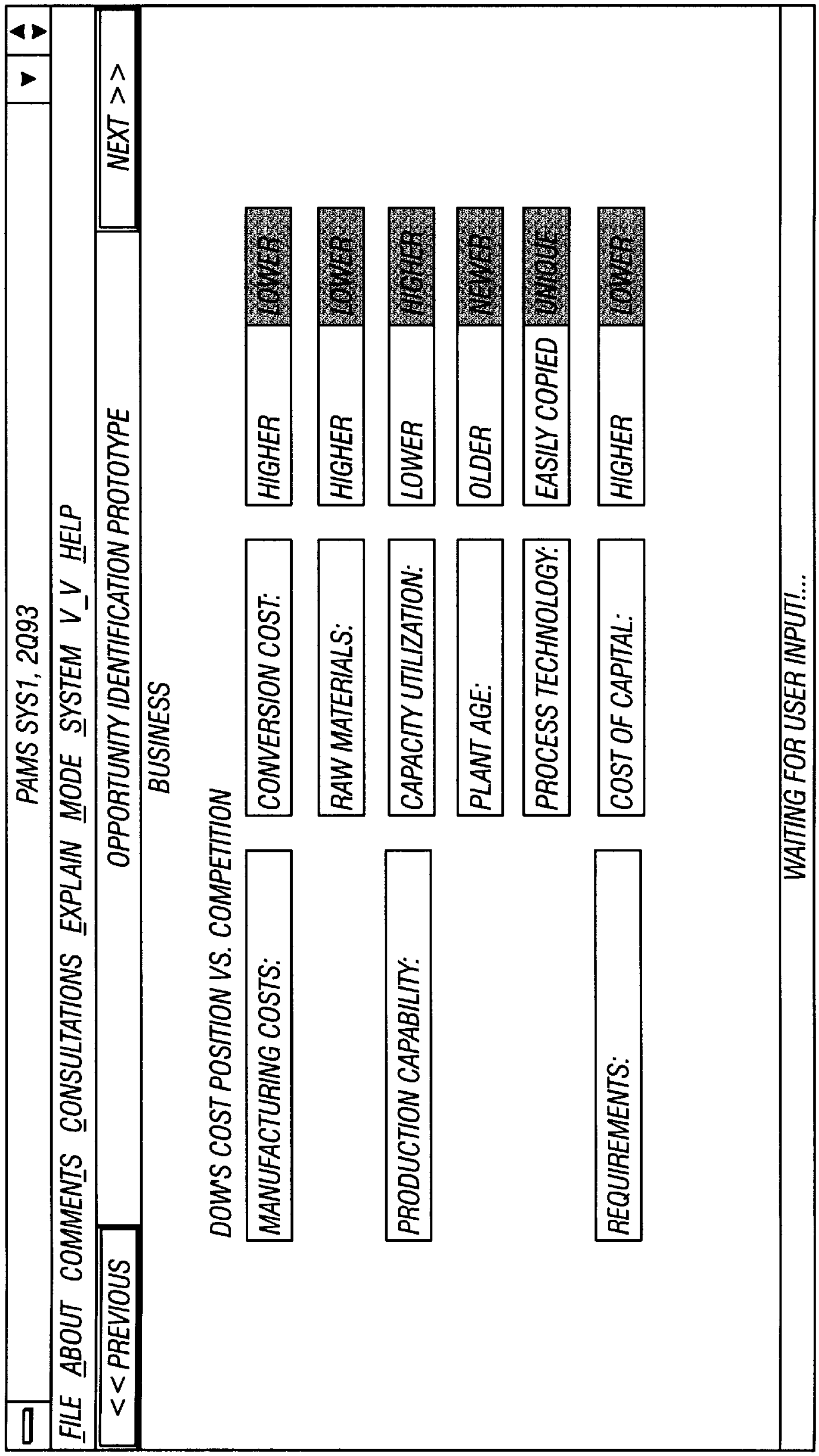
FIG. 54 shows the input screen data relating to the user's cost position, with input variables including conversion costs, raw materials, capacity utilization, plant age, process technology, and cost of capital.
Figure 55:
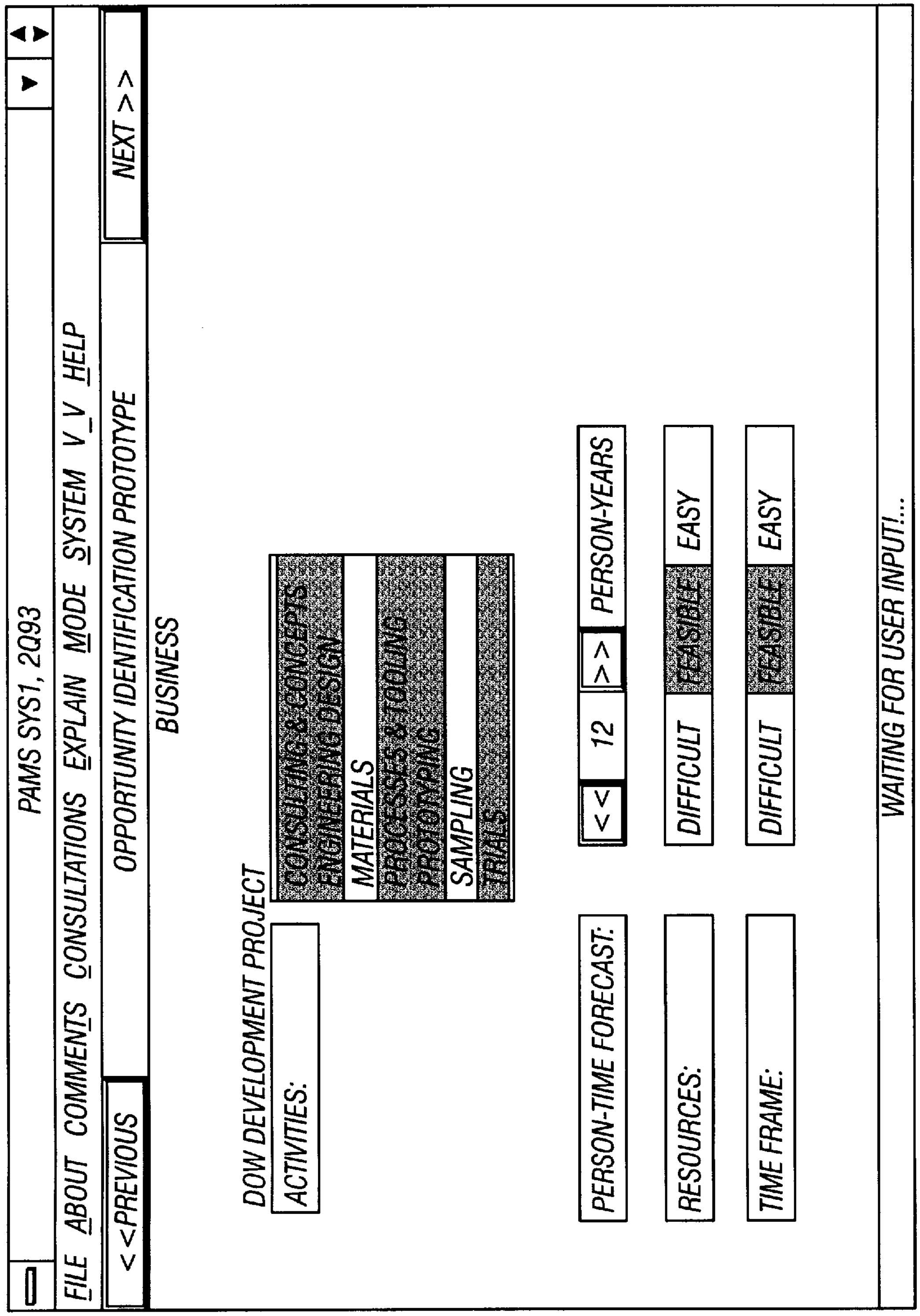
FIG. 55 shows input screens data relating to the user's development project, with input variables including activities, person-time forecast, resources, and time frame.

FIG. 54 shows the input screen data relating to the User's (illustrated as Dow in the figure) cost position. Input variables include conversion costs, raw materials, capacity utilization, plant age, process technology, and cost of capital. Data values have been input as shown in FIG. 55. The input screen is further explained in Table 36 above.

FIG. 55 shows input screens data relating to the User's (illustrated as Dow in the figure) development project. Input variables include activities, person-time forecast, resources, and time frame. Data values have been input as shown in FIG. 55. The input screen is further explained in Table 37 above.

Figure 56:
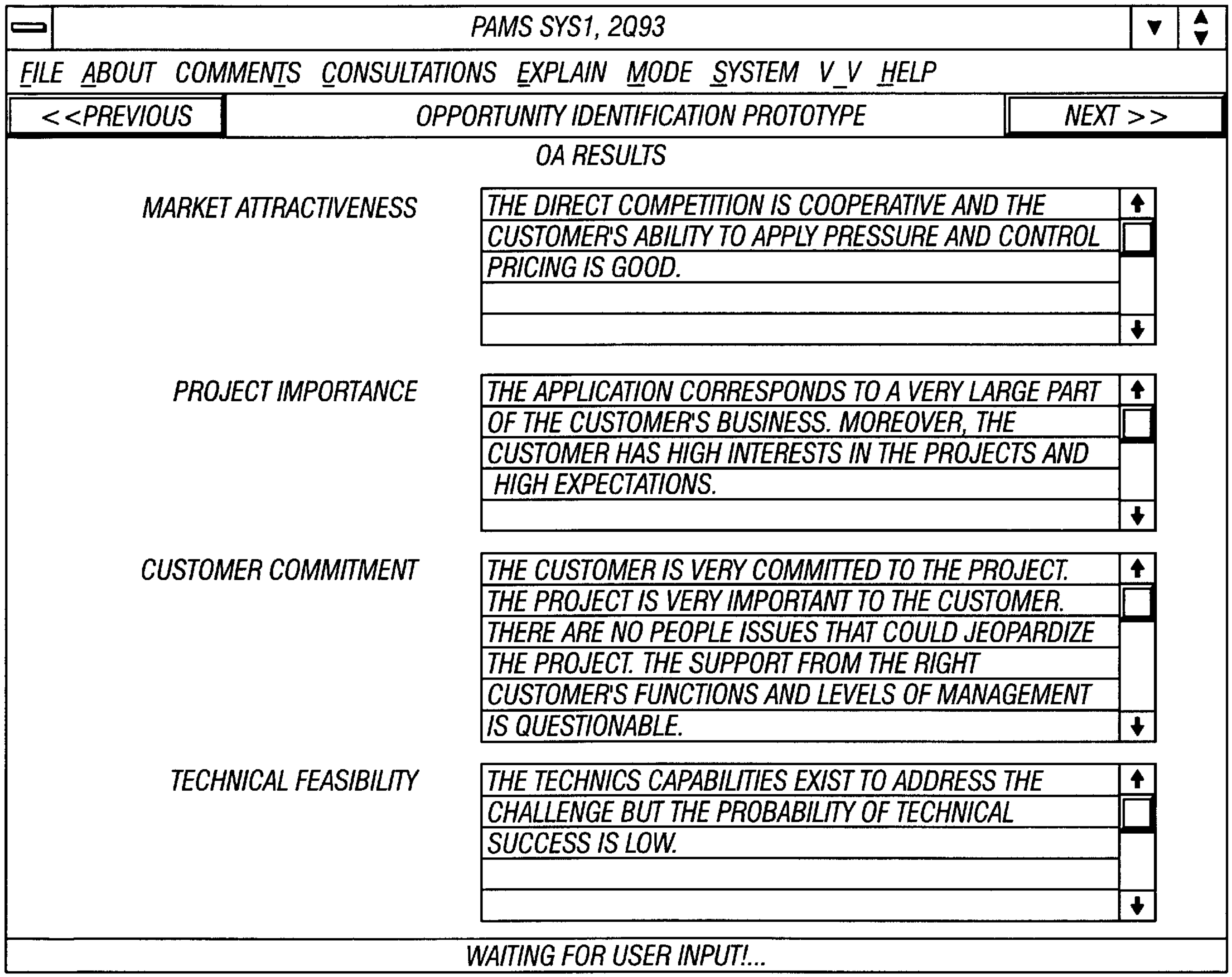
FIG. 56 shows an output screen with information relating to opportunity analysis (OA) results for understanding the customer. Output variables include market attractiveness, project importance, customer commitment, and technical feasibility.
Figure 57:
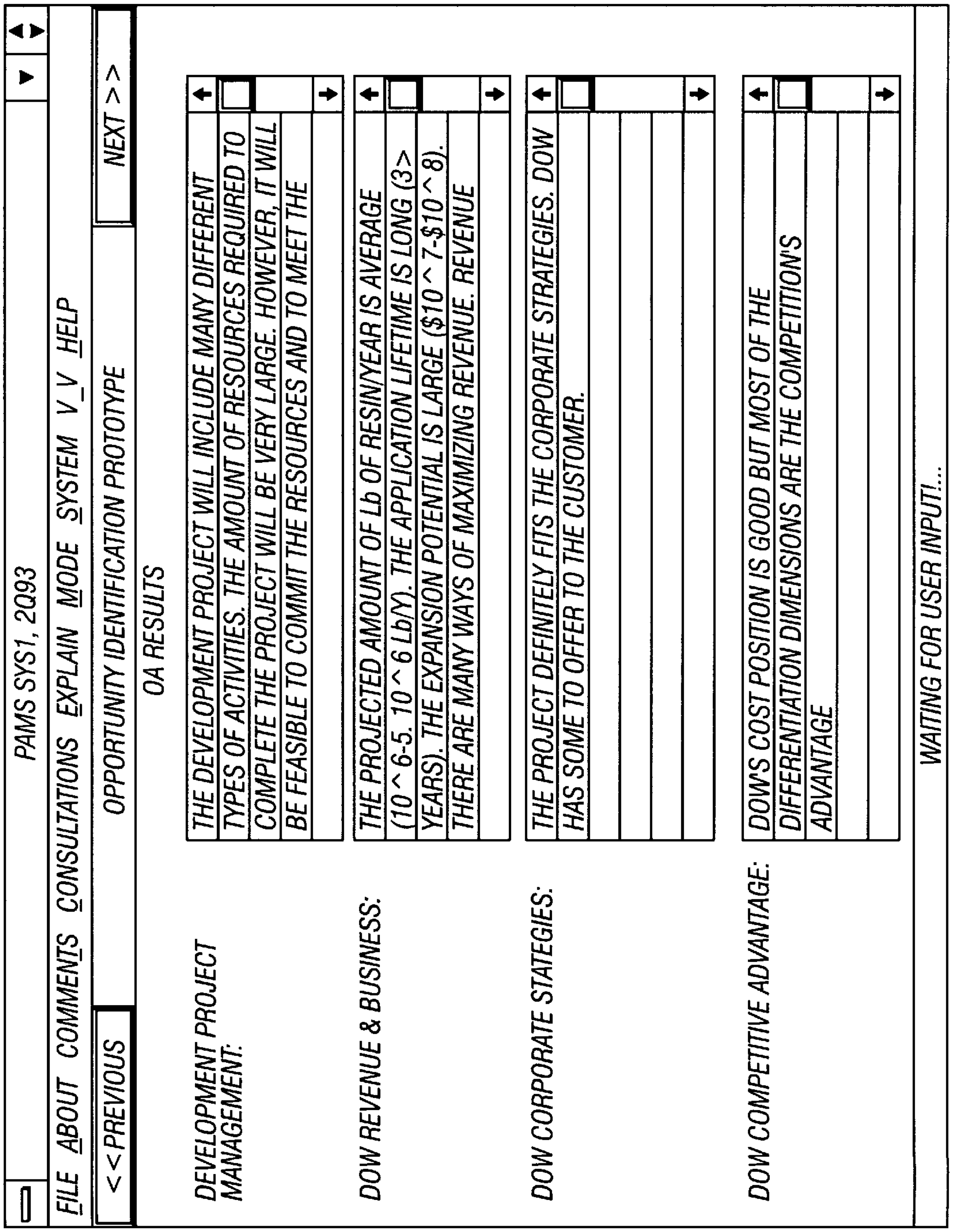
FIG. 57 shows an output screen with information relating to opportunity analysis (OA) results for the user's (illustrated as Dow in the figure) business.
Figure 58:
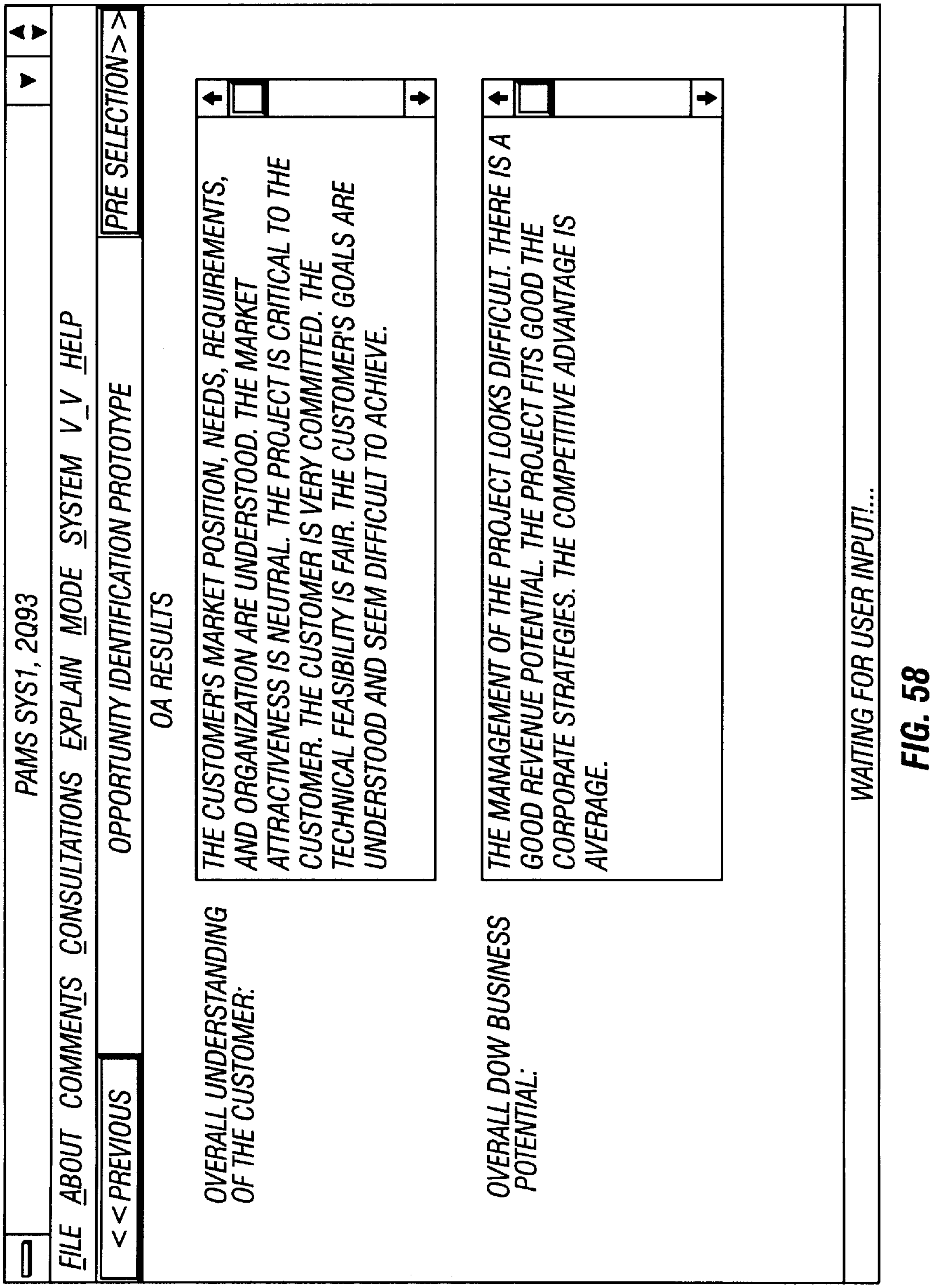
FIG. 58 shows an output screen with information relating to the overall opportunity analysis (OA) results.

The results for this example are presented in output screens shown in FIGS. 56, 57, 58.

FIG. 56 shows an output screen with information relating to opportunity analysis (OA) results for understanding the customer. Output variables include market attractiveness, project importance, customer commitment, and technical feasibility. Output values are as shown in FIG. 56. This output screen is further explained in Table 38 above.

FIG. 57 shows an output screen with information relating to opportunity analysis (OA) results for the user's (illustrated as Dow in the table) business. Output variables include development and project management, revenue and business, corporate strategies, and competitive advantage. Output values are as shown in FIG. 57. The input screen is further explained in Table 39 above.

FIG. 58 shows an output screen with information relating to the overall opportunity analysis (OA) results. Output variables include understanding of the customer, and user business potential. Output values are as shown in FIG. 58. The input screen is further explained in Table 40 above.

Example 2

Processes and Materials Selection—"Carpet Cleaner"

In this example experts' knowledge is utilized to process the information, explore alternatives, weigh importance, make judgments, and reach conclusions regarding a "carpet cleaner" application.

Figure 59:
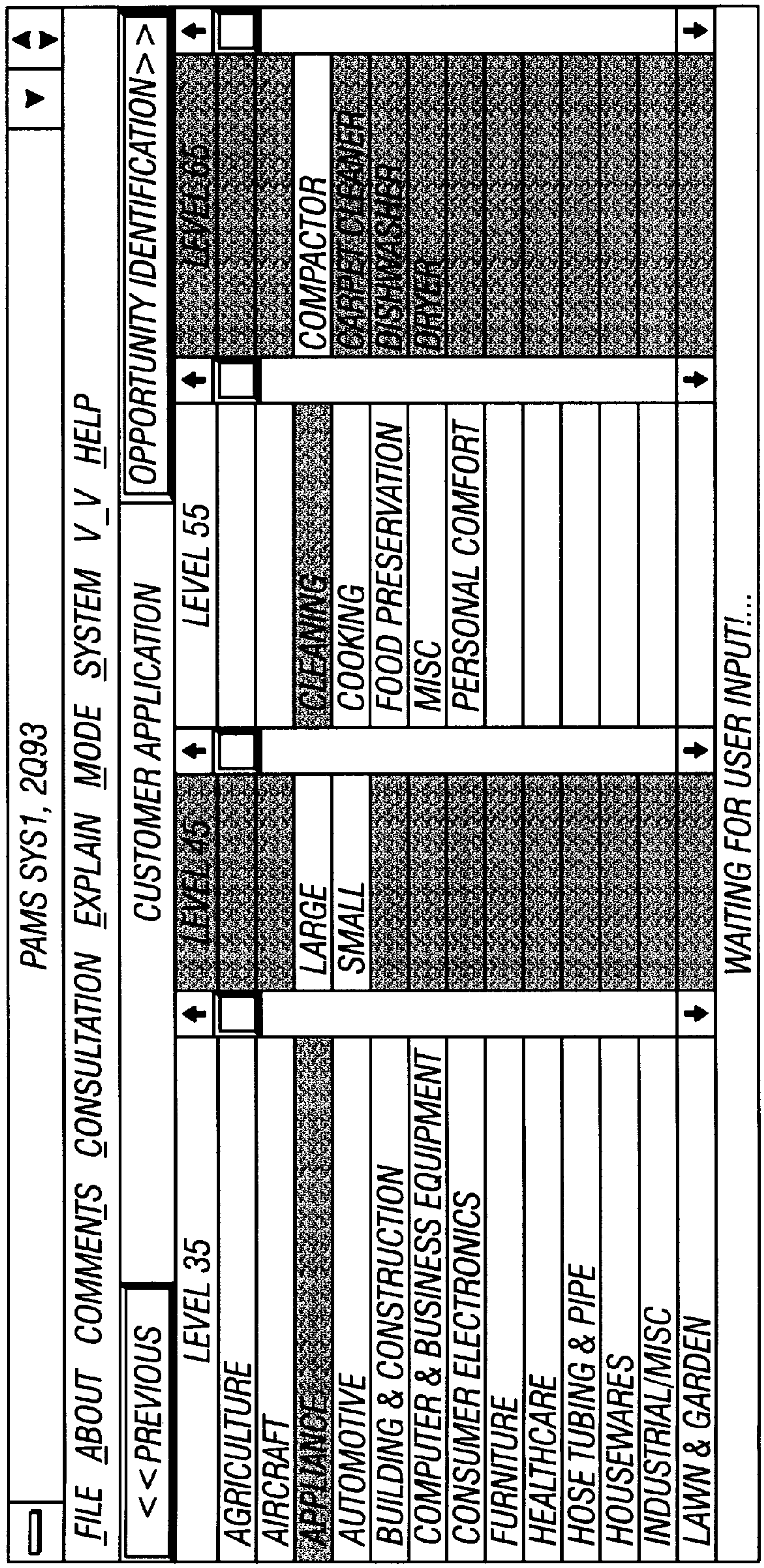
FIG. 59 shows an input screen for selecting the type of application, with selection to be made according to various levels "35", "45", "55" and "65", with the specificity of the levels increasing with the designation number.

Referring now to FIG. 59 there is shown an input screen for selecting the type of application. Selection may be made according to various levels "35", "45", "55" and "65", with the specificity of the levels increasing with the designation number.

The customer application selection is very important, as the information displayed and the questions asked to the user during the rest of the consultation depend on the particular customer application selected. Specifically, functional values do not appear on the screens and are not asked to the user because they are not relevant to the selected customer application. For example, "Weatherability" and "Transparency" listed in Table 16, for the "Carpet Cleaner" application.

Additionally, some functional values do not appear on the screens but are requested from the user because they are judged relevant but may be not as important or at a more detailed level for the selected customer application. For example, "Wear/Abrasion" as shown in Table 18 for the "Carpet Cleaner" application.

Figure 60:
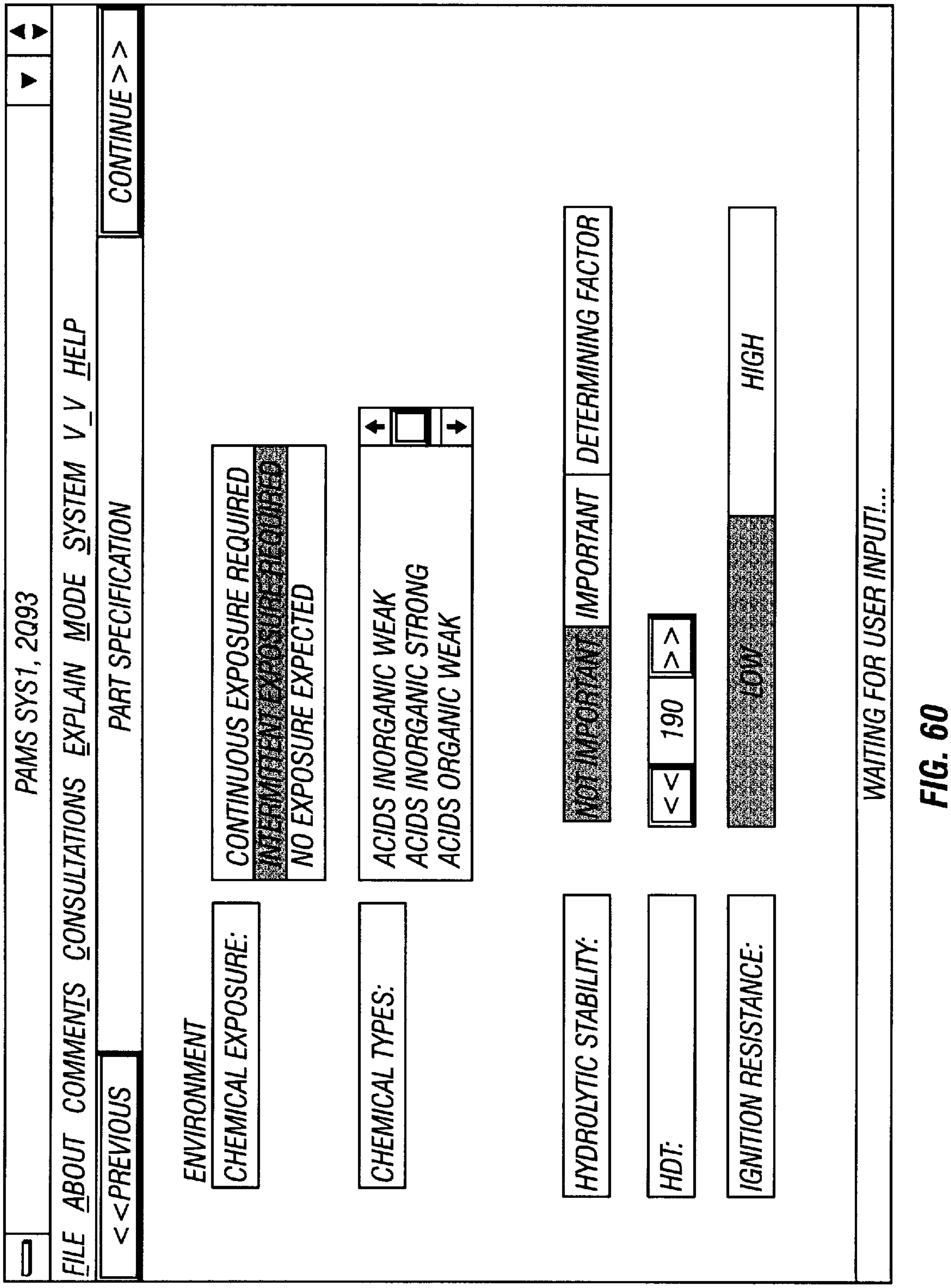
FIG. 60 shows an the input screen for the part specification environment, with input data including chemical exposure, chemical types, hydrolytic stability, HDT, and ignition resistance.

Referring now to FIG. 60 there is shown the input screen for the part specification environment. More detail regarding this screen may be found in Table 16 above. Input data for the "carpet cleaning" application includes chemical exposure, chemical types, hydrolytic stability, HDT, and ignition resistance. Input data is as shown on the screen.

Figure 61:
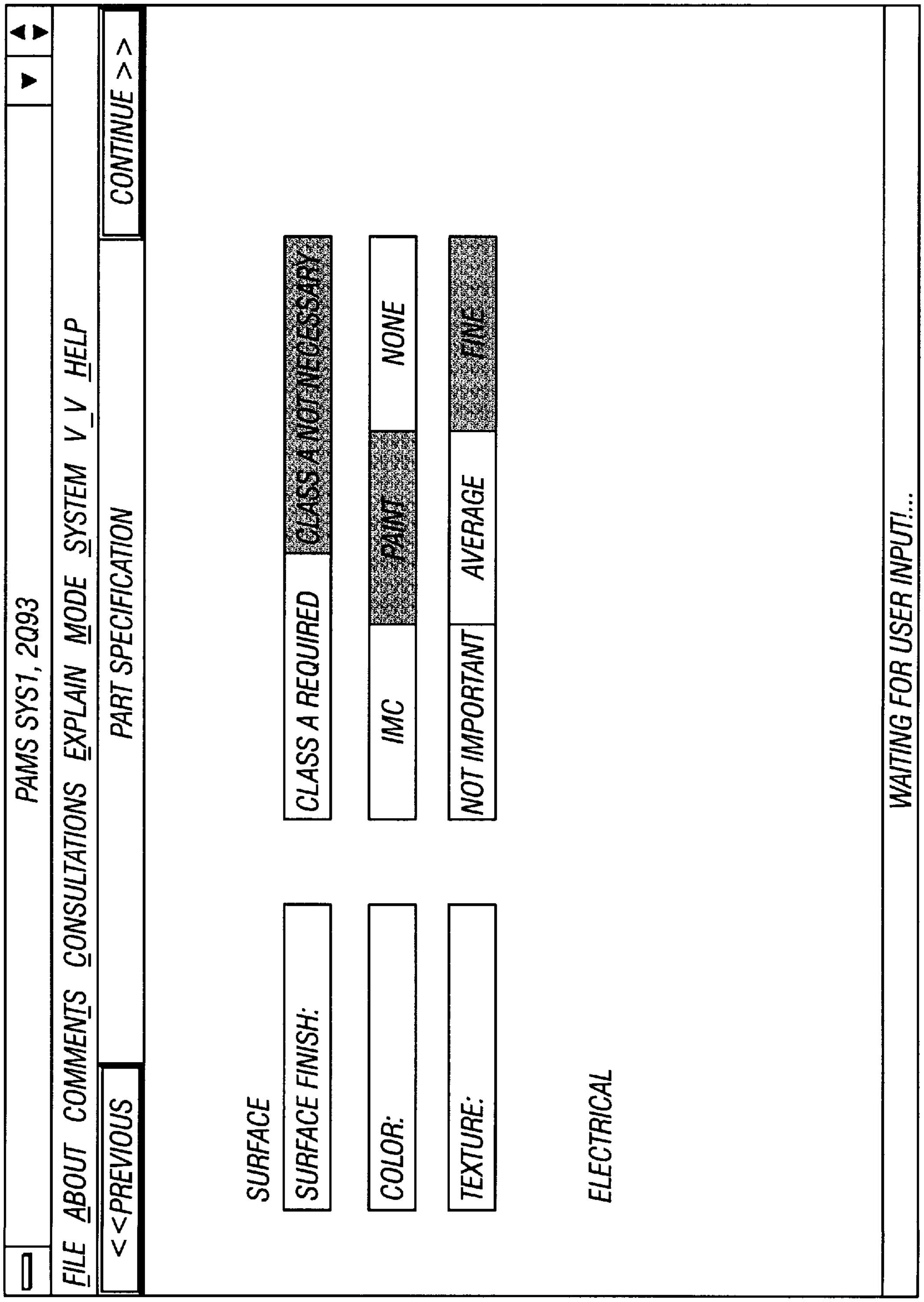
FIG. 61 shows an input screen for part specifications surface and electrical, with input data including surface finish, color and texture.

Referring now to FIG. 61 there is shown the input screen for part specifications surface and electrical. More detail regarding this screen may be found in Table 17 above. Input data for the "carpet cleaning" application includes surface finish, color and texture. Input data is as shown on the screen.

Figure 62:
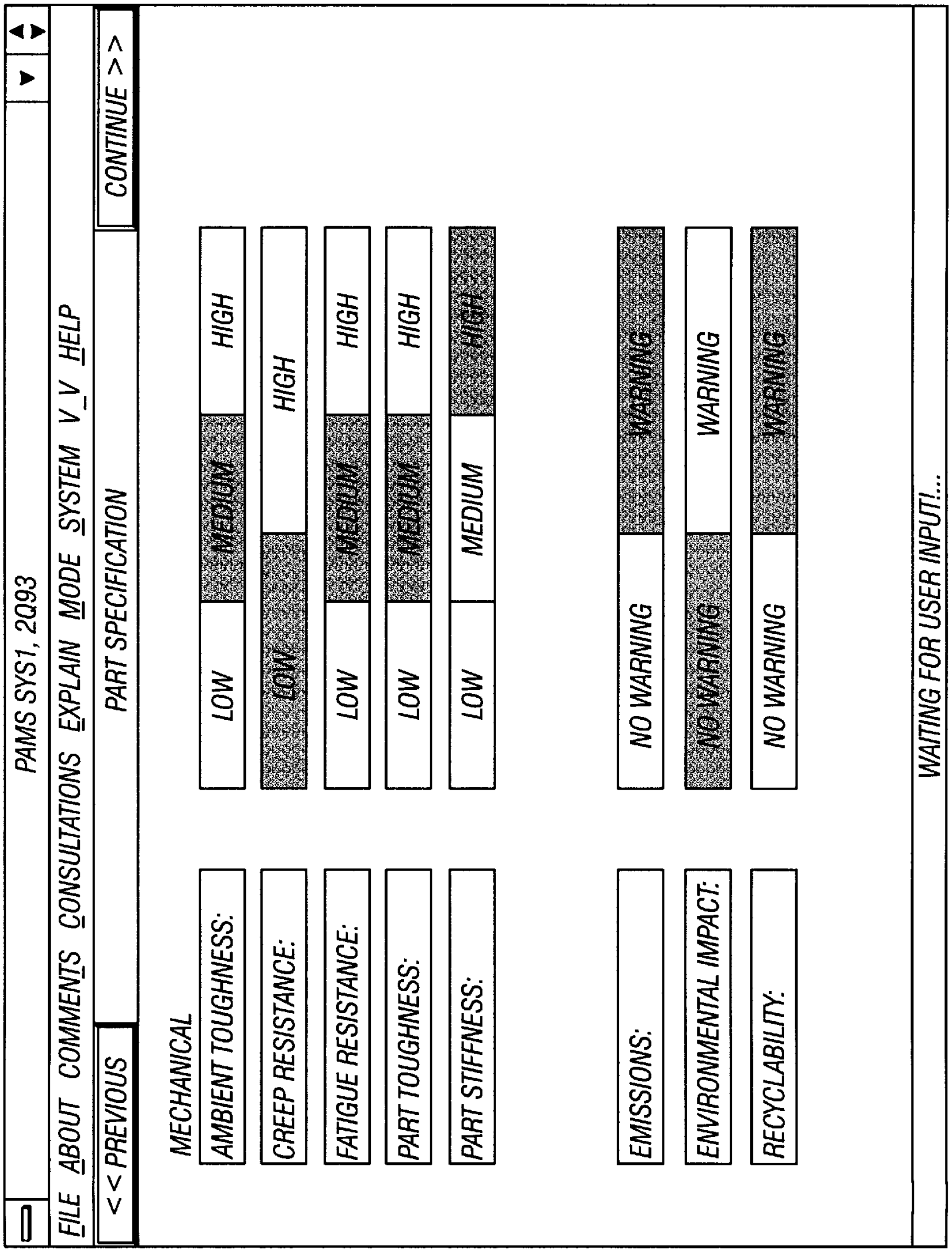
FIG. 62 shows an input screen for mechanical and environmental and legal, with input data including ambient toughness, creep resistance, fatigue resistance, part toughness, part stiffness, emissions, environmental impact, recyclability. Input data is as shown on the screen.

Referring now to FIG. 62 there is shown the input screen for mechanical and environmental and legal. More detail regarding this screen may be found in Table 18 above. Input data for the "carpet cleaning" application includes ambient toughness, creep resistance, fatigue resistance, part toughness, part stiffness, emissions, environmental impact, recyclability. Input data is as shown on the screen.

Figure 63:
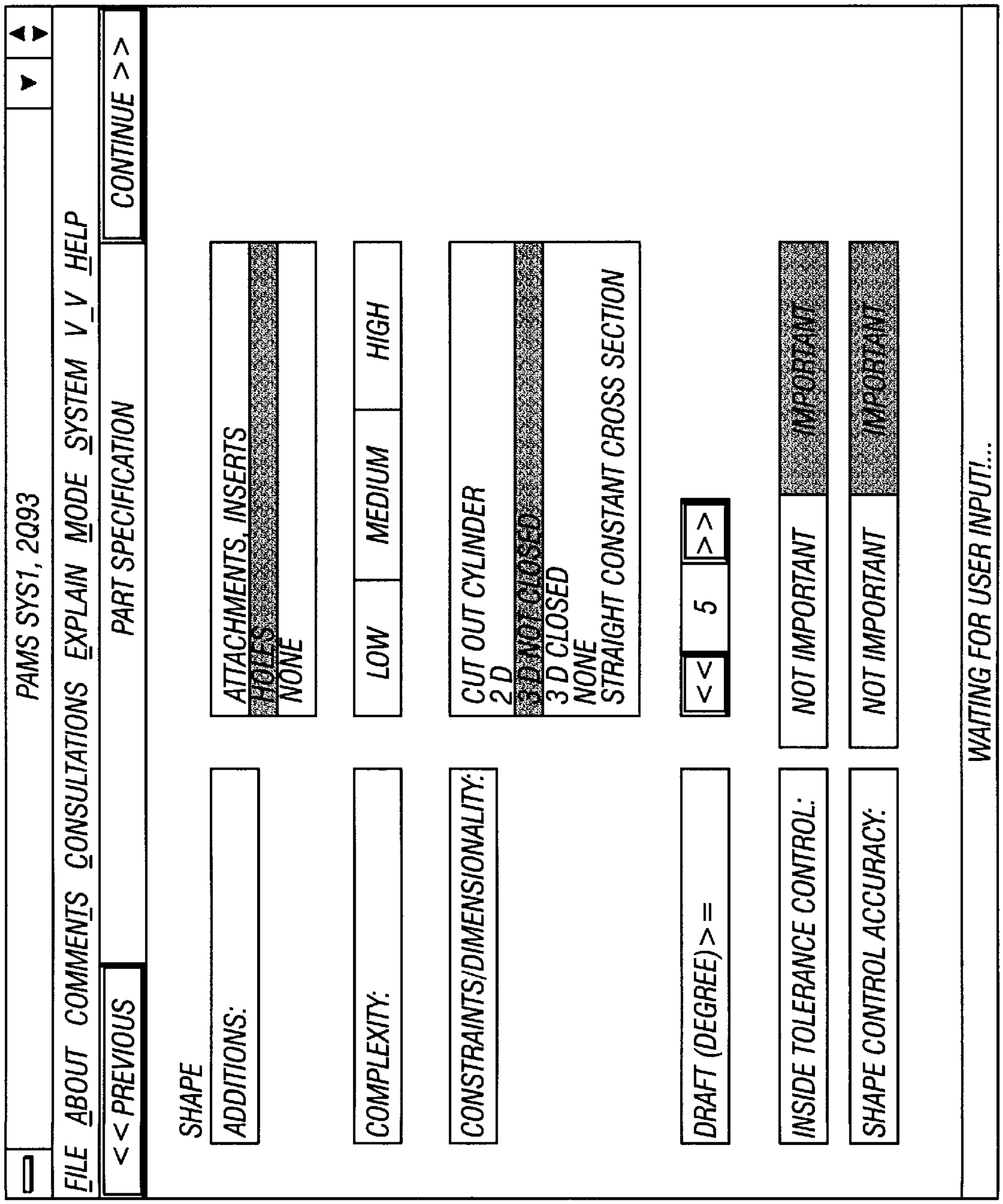
FIG. 63 shows an input screen for part specifications shape, with input data including additions, complexity, constraints/dimensionality, degrees of draft, inside tolerances control, and shape control accuracy.

Referring now to FIG. 63 there is shown the input screen for part specifications shape. More detail regarding this screen may be found in Table 19 above. Input data for the "carpet cleaning" application includes additions, complexity, constraints/dimensionality, degrees of draft, inside tolerances control, and shape control accuracy. Input data is as shown on the screen.

Figure 64:
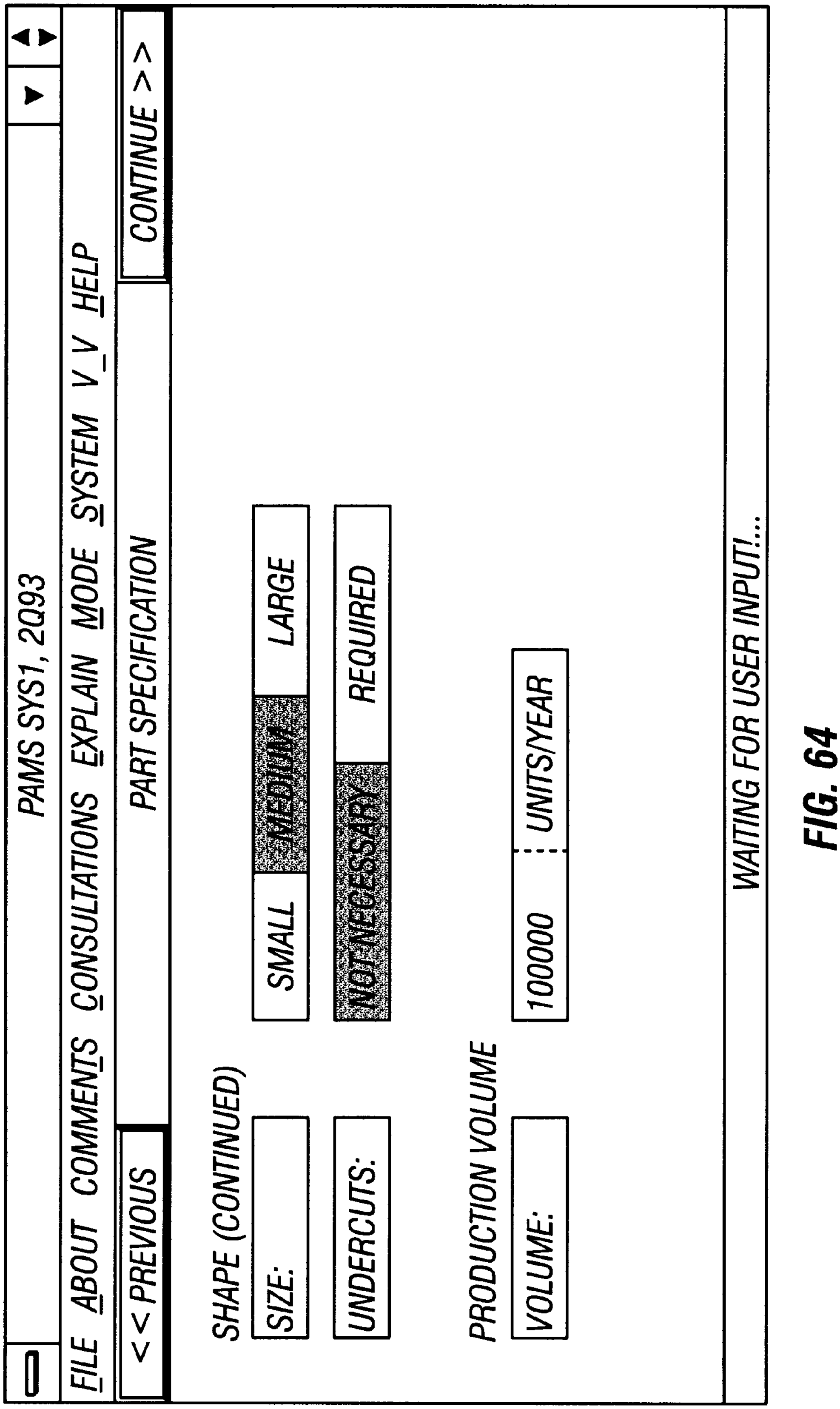
FIG. 64 shows an input screen for shape (continued) and production volume, with input data including size, undercuts and volume.

Referring now to FIG. 64 there is shown the input screen for shape (continued) and production volume. More detail regarding this screen may be found in Table 20 above. Input data for the "carpet cleaning" application includes size, undercuts and volume. Input data is as shown on the screen.

Figure 65:
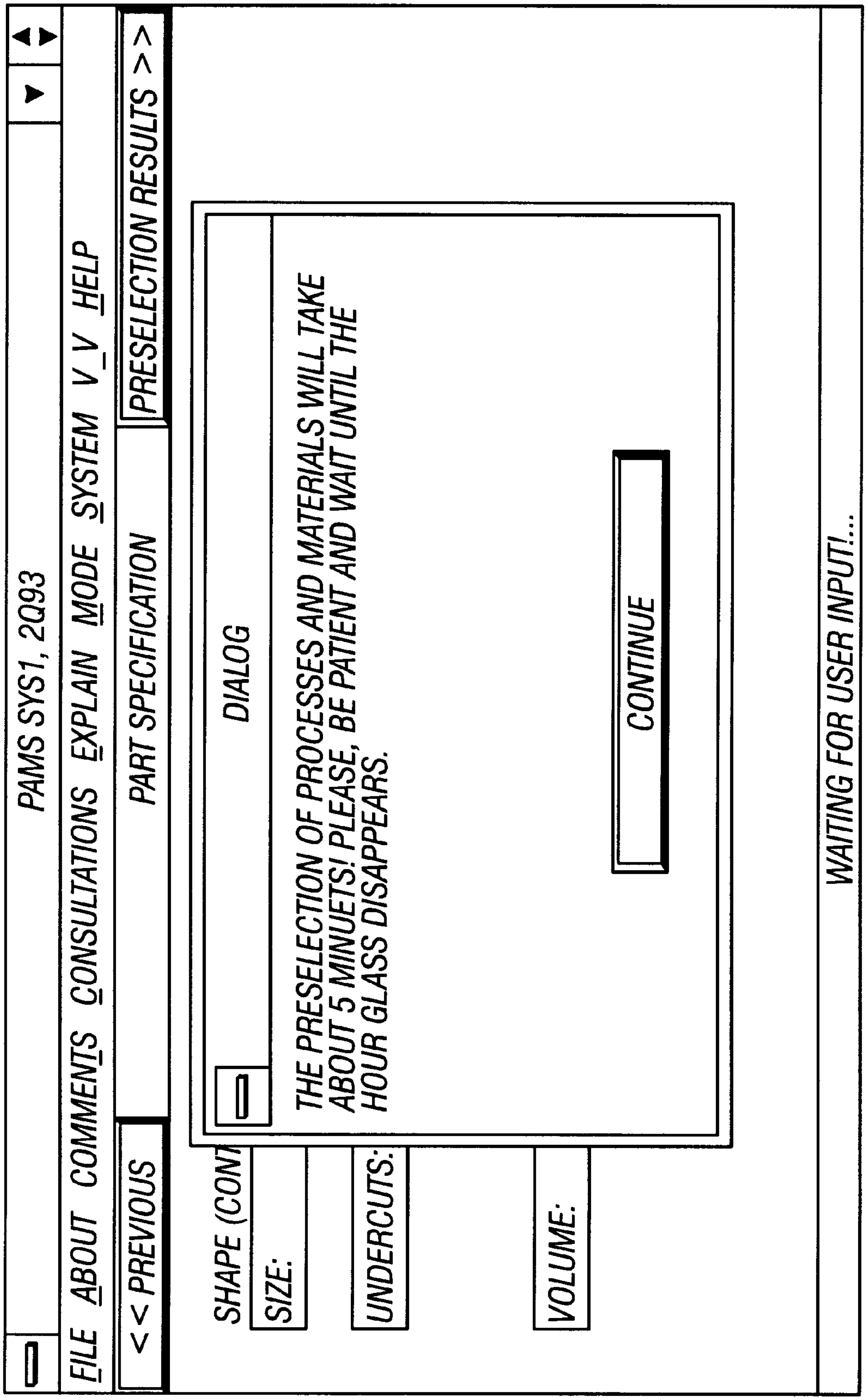
FIG. 65 shows the Pre-Selection Dialog Box in which the system informs the user that it will take some time to process the information that has been provided.

Referring now to FIG. 65, there is shown the Pre-Selection Dialog Box in which the system informs the user that it will take some time to process the information that has been provided.

Figure 66:
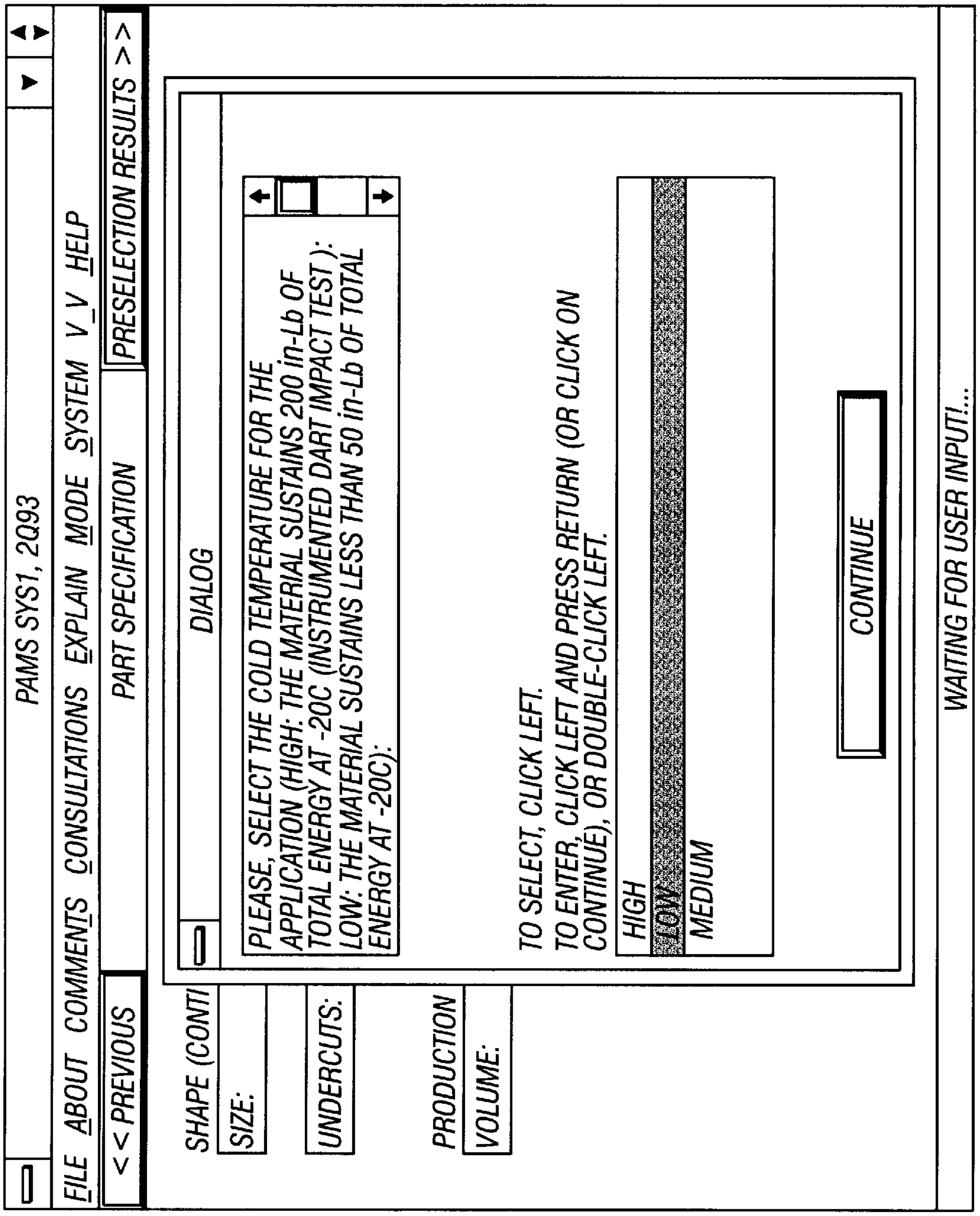
FIG. 66 shows the Cold Temperature Toughness Dialog Box in which the system requests more information from the user.

Referring now to FIG. 66, there is shown the Cold Temperature Toughness Dialog Box in which the system requests more information from the user.

Figure 67:
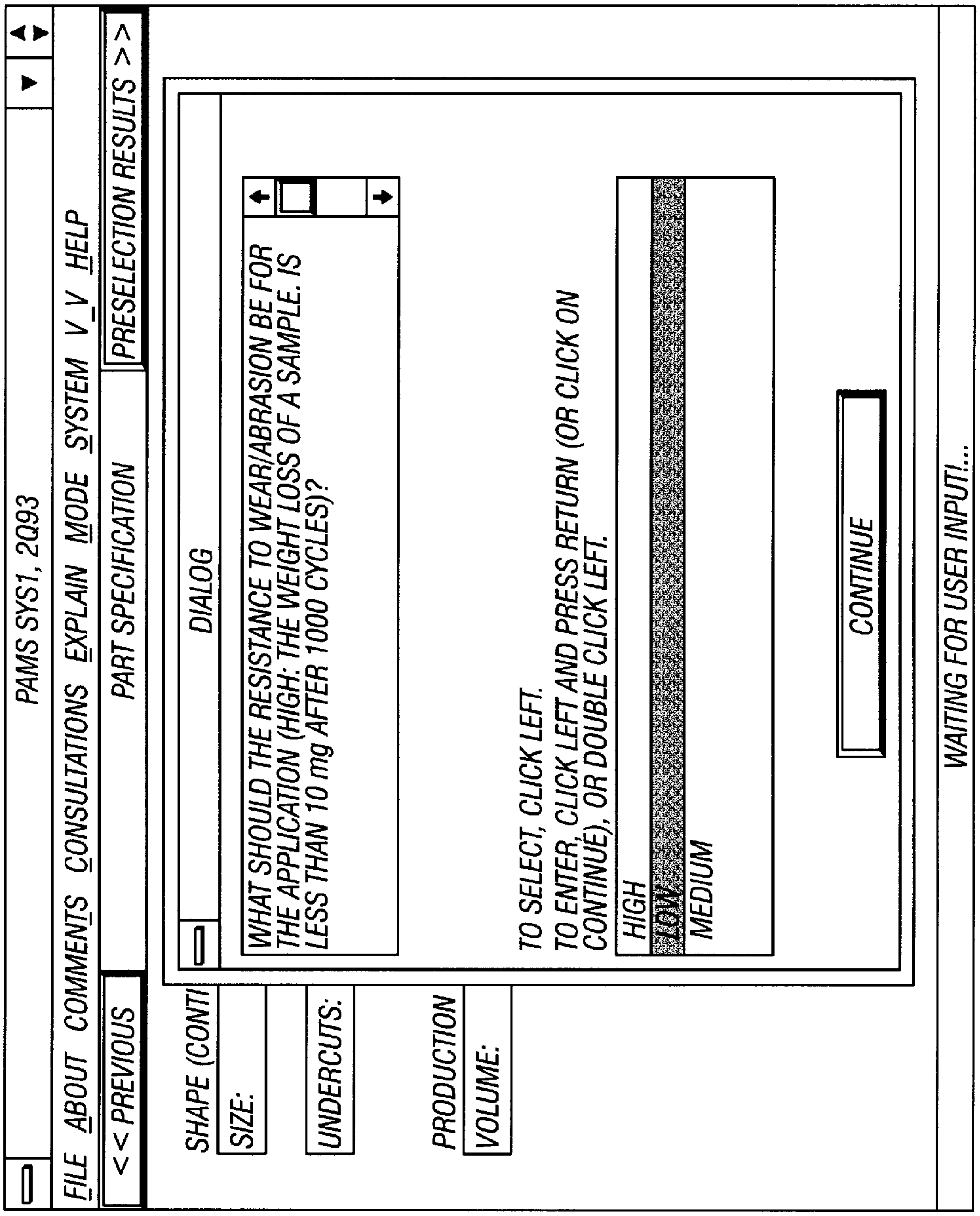
FIG. 67 shows the Wear/Abrasion Dialog Box in which the system requests more information from the user.

Referring now to FIG. 67, there is shown the Wear/Abrasion Dialog Box in which the system requests more information from the user.

Figure 68:
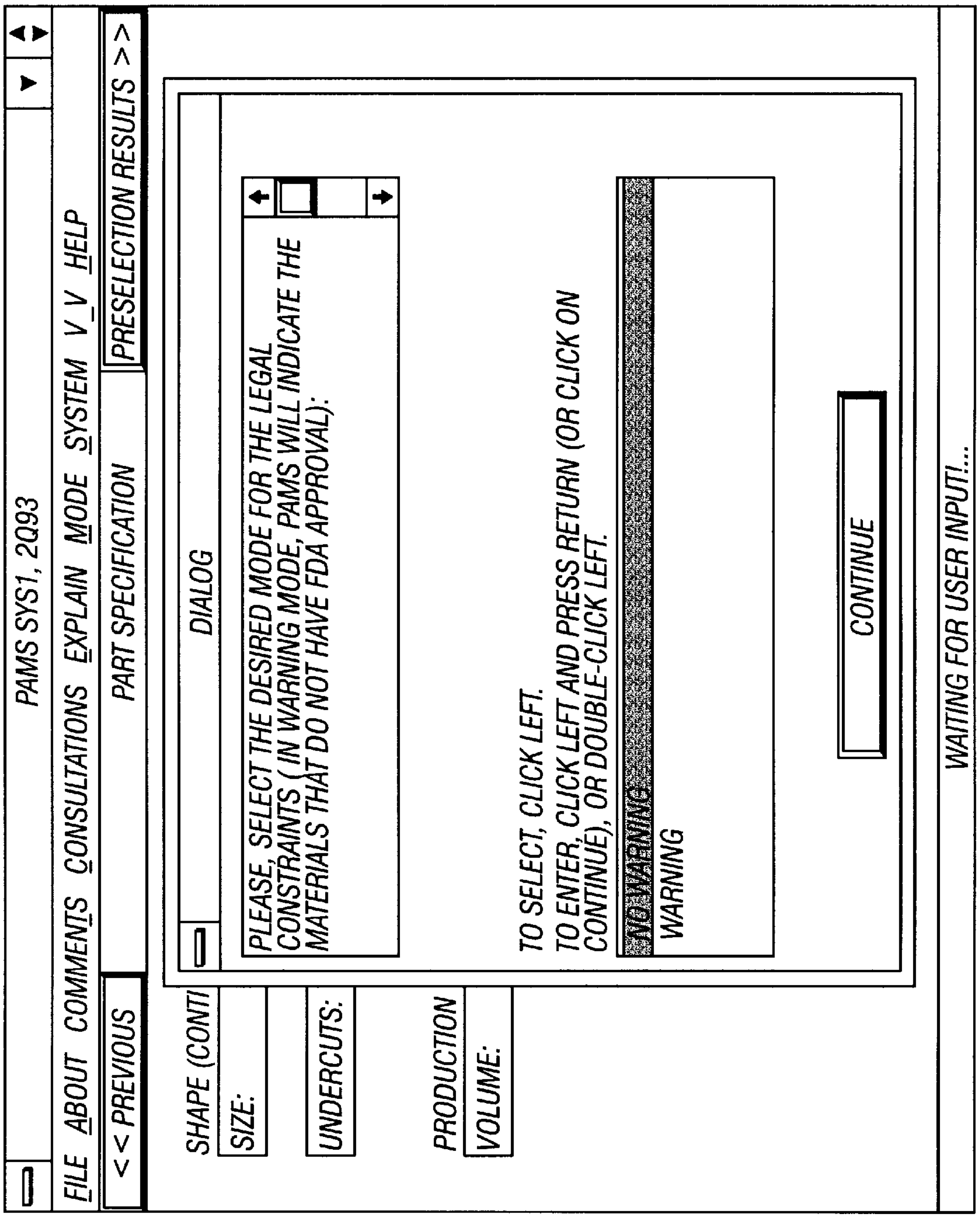
FIG. 68 shows the Legal Constraints Dialog Box in which the system requests more information from the user.
Figure 69:
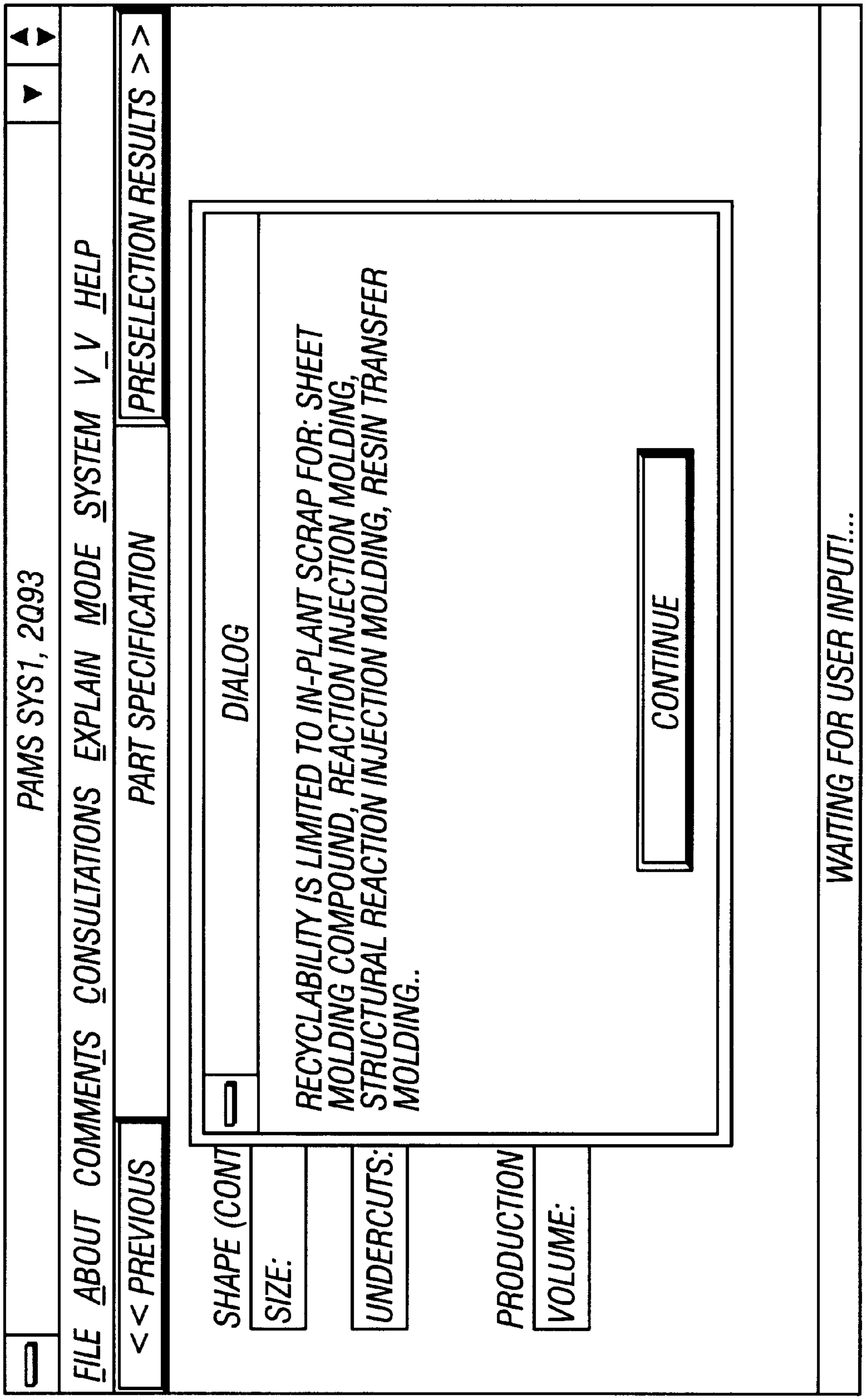
FIGS. 69, 70, 71, 72 and 73, show dialog screens for Recyclability, Sheet Molding Compound (SMC), Reaction Injection Molding (RIM), Structural Reaction Injection Molding (SRIM) and Resin Transfer Molding (RTM), respectively.
Figure 70:
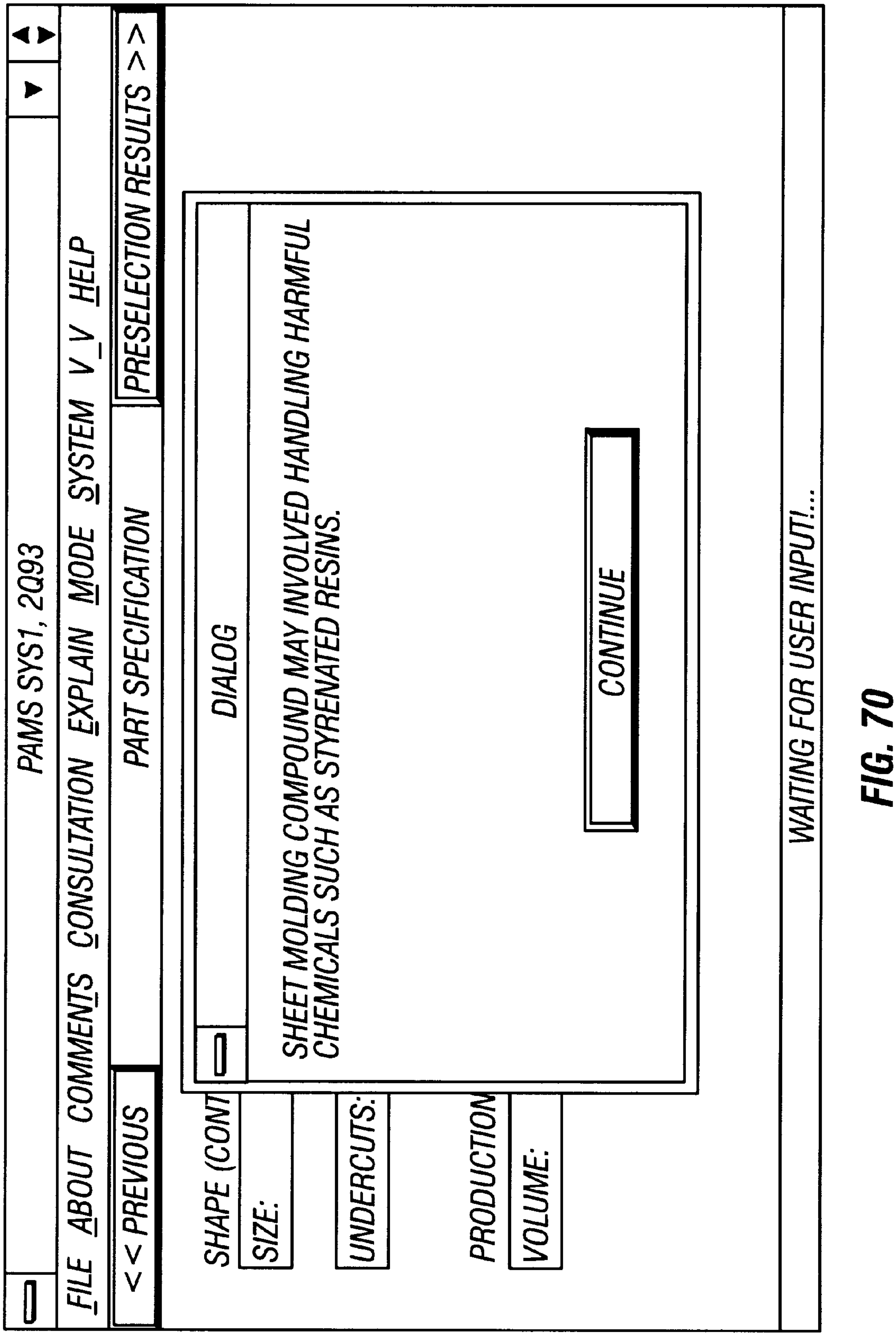
Figure 71:
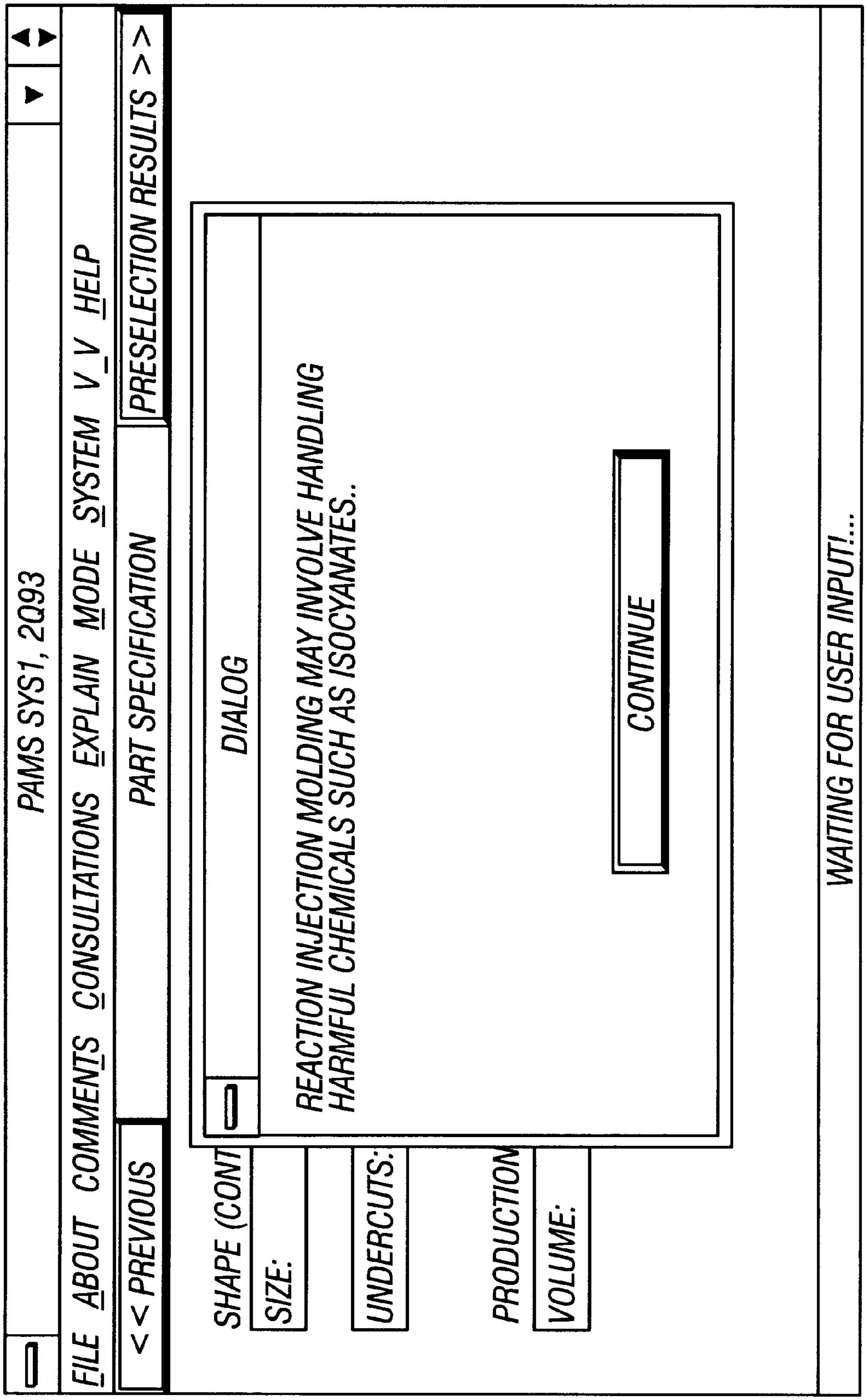
Figure 72:
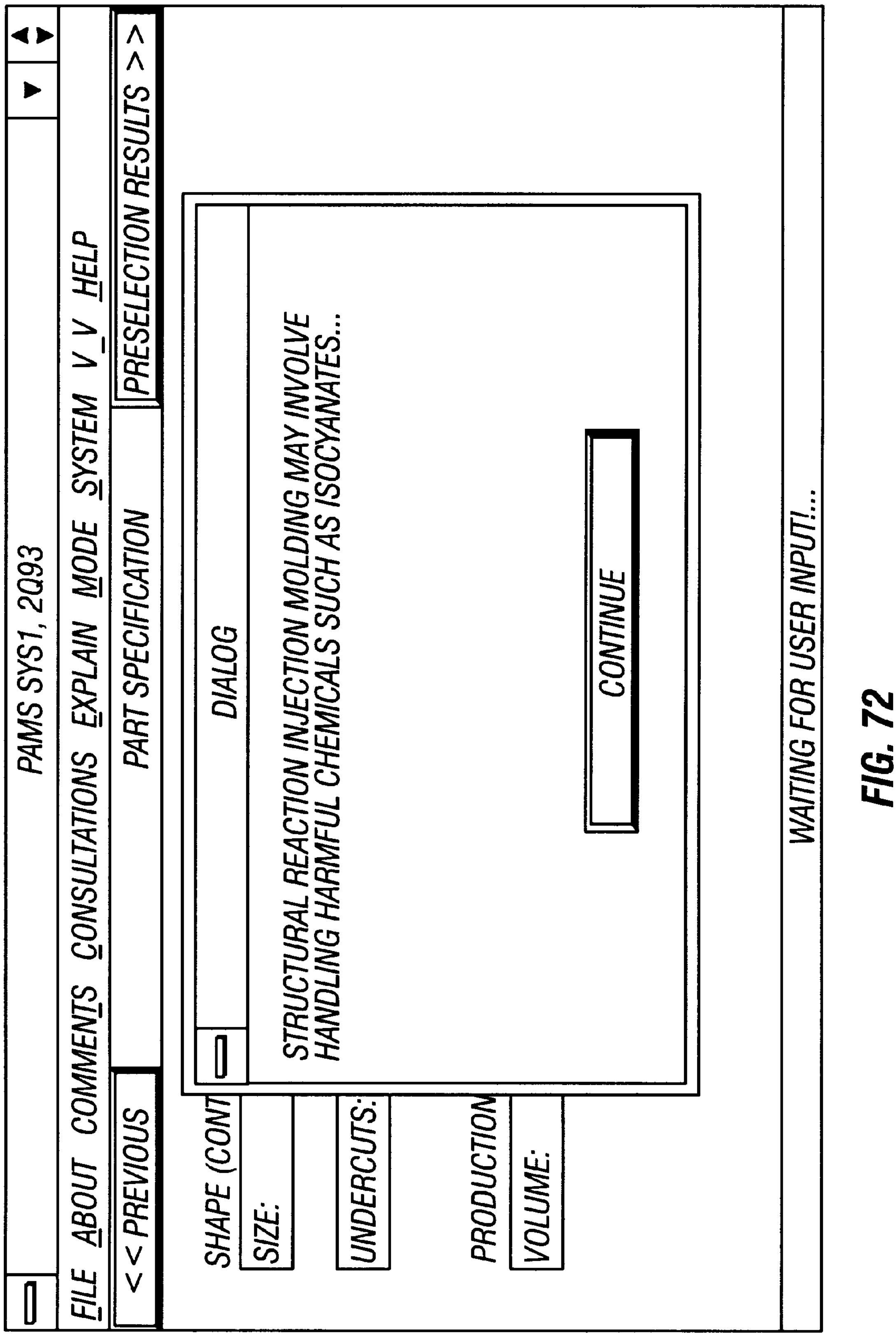
Figure 73:
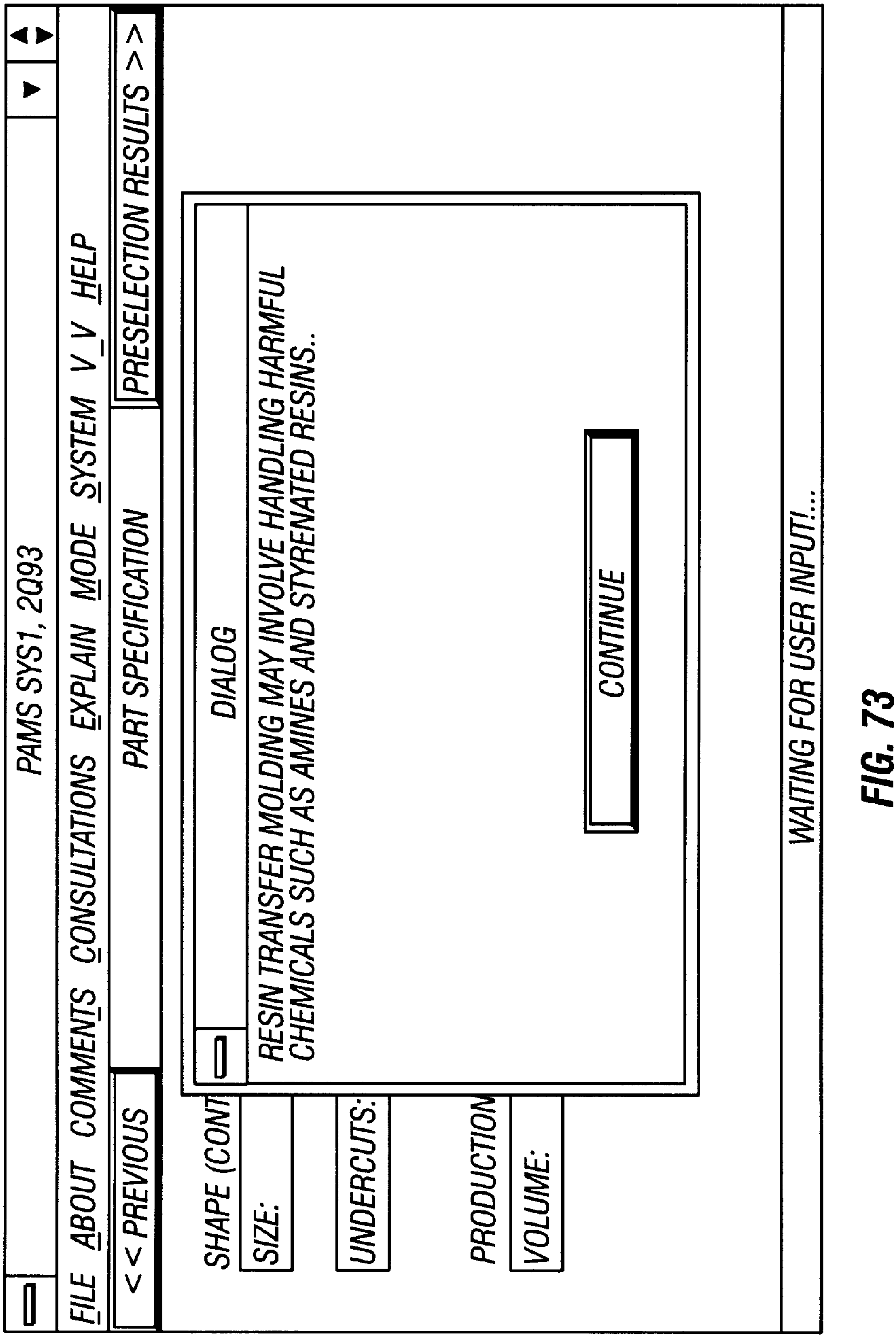

Referring now to FIG. 68, there is shown the Legal Constraints Dialog Box in which the system requests more information from the user.

Before providing the final output of the selection in terms of selected or rejected materials and processes, the PAMS system informs the user about sensitive issues such as process recyclability, harmful chemical handling, material environmental impact, and FDA approval. Referring now to FIGS. 69, 70, 71, 72 and 73, there are shown dialog screens for Recyclability, Sheet Molding Compound (SMC), Reaction Injection Molding (RIM), Structural Reaction Injection Molding (SRIM) and Resin Transfer Molding (RTM).

Figure 74:
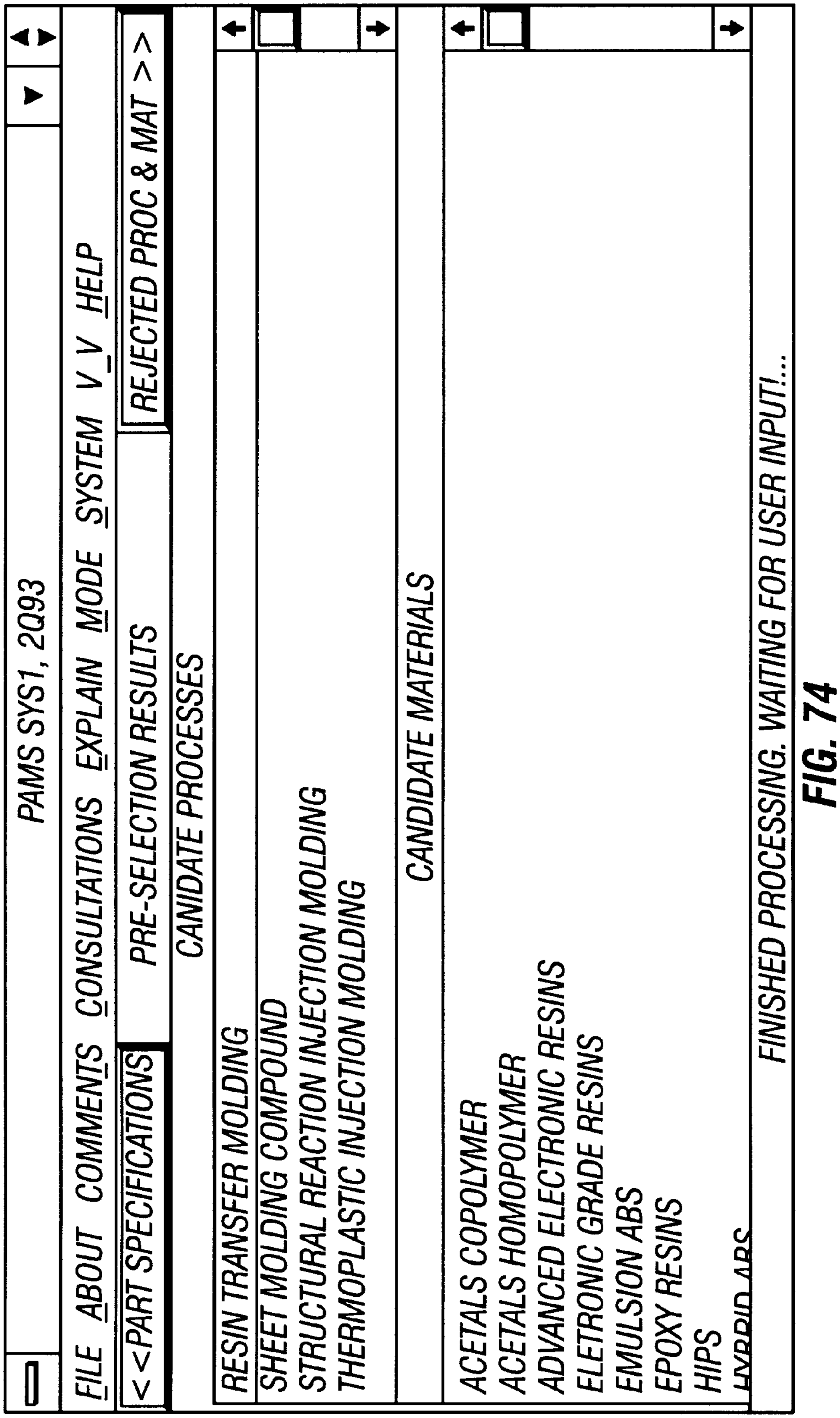
FIGS. 74 and 75 show the results from the processes and materials selection expressed in terms of lists of appropriate or rejected processes and materials, and explanations on how the conclusions were reached.
Figure 75:
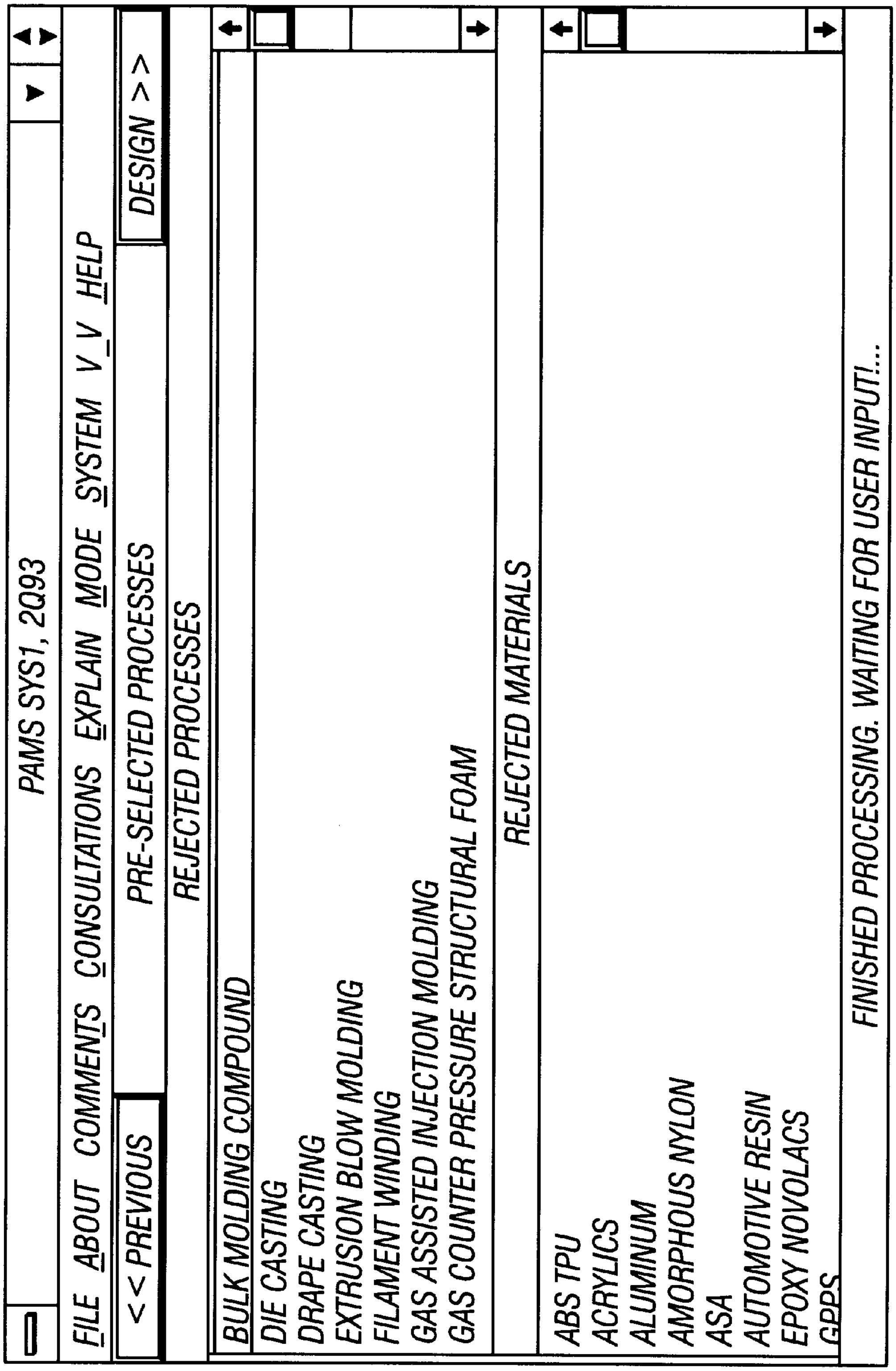

The results from the processes and materials selection are expressed in terms of lists of appropriate or rejected processes and materials, and explanations on how the conclusions were reached. The output screens are shown in FIGS. 74 and 75, respectively. The detailed explanation of the reasoning is provided not only in terms of the main elements of the selection but also for each individual process and material. The user is given the opportunity to overwrite the results. Further detail regarding FIGS. 74 and 75, is provided in Table 21 above.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which this invention pertains.

We claim:

1. A process implemented on a computer comprising:

a) providing the computer with a database of physical data relating to materials, processes, shapes and applications;

b) providing the computer with physical models designed to operate on the physical data;

c) interacting with the computer to describe a desired durable good from the physical data contained in the database comprising the steps of:

1) selecting a durable goods application domain which includes the desired durable good;

2) specifying material characteristics associated with the desired good;

3) specifying process characteristics associated with the desired good;

4) specifying shape characteristics associated with the desired good; and d) generating a set of application solutions derived from the physical models acting on the specified material, process and shape characteristics.

2. The process of claim 1, further comprising:

e) providing the computer with a database of economic data relating to materials, processes, shapes and applications and economic models designed to operate on the economic data; and f) generating a cost factor for each solution derived from the economic models acting on the economic data associated with each solution.

3. The process of claim 2, further comprising:

G) discriminating between the solutions based on the cost factor, materials and processes associated with each solution.

4. The process of claim 1, wherein the shape characteristics are specified using a shape classification and decomposition module.

5. The process of claim 1, wherein the specifying shape step includes the step of determining an overall shape of the desired durable good.

6. The process of claim 5, wherein the determining step includes the steps of:

executing at least one rule from a set of shape function rules;

executing at least one rule from a set of addition selection rules; and executing at least one rule from a set of manufacturing selection rules.

7. A system implemented on a computer comprising:

A) a graphics user interface (GUI);

B) a database comprising materials, processes, shapes, and durable goods applications data;

C) a spreadsheet for performing numeric calculations; and

D) an expert system for performing knowledge based calculations; and where the expert system, the spreadsheet and the GUI communicate with each other using dynamic linked libraries, dynamic data exchange procedures or mixtures thereof and where a user interacts with the GUI to specify characteristics of a desired durable good and the system generates durable good solutions based on the desired durable good, its specified characteristics and data associated therewith or derived therefrom.

8. The system of claim 7, further comprising:

E) a shape classification and decomposition module where the user interacts with the module through the GUI to specify an overall shape of the desired durable good and to identify possible simpler shapes into which the desired durable good can be decomposed.

9. The system of claim 7, wherein the experts system includes:

1) a knowledge engine module and 2) a domain expert module including a hierarchal classification of durable goods applications designed to enhance the performance of the expert system; and where the knowledge engine determines possible materials or processes based on the durable good, its characteristics and data associated therewith or derived therefrom.

10. The system of claim 7, further comprising:

F) a economics module where the economic module generates a cost factor for each solution.

11. The system of claim 10, wherein the economic module includes an opportunity identification module for determining the economic viability for each durable good solution generated by the system.

12. An apparatus comprising a computer including a memory, a display, a processing unit, a windowing operating system, and a direct access memory device, where the computer has implemented therein a system for selecting and analyzing new durable goods solutions, the system comprising:

A) a graphics user interface (GUI);

B) a database comprising materials, processes, shapes, and durable goods applications data;

C) a spreadsheet for performing numeric calculations; and

D) an expert system for performing knowledge based calculations; and where the expert system, the spreadsheet and the GUI communicate with each other using dynamic linked libraries, dynamic data exchange procedures or mixtures thereof and where a user interacts with the GUI to specify characteristics of a desired durable good and the system generates durable good solutions based on the desired durable good, its specified characteristics and data associated therewith or derived therefrom.

13. The apparatus of claim 12, further comprising:

E) a shape classification and decomposition module where the user interacts with the module through the GUI to specify an overall shape of the desired durable good and to identify possible simpler shapes into which the desired durable good can be decomposed.

14. The apparatus of claim 12, wherein the experts system includes:

1) a knowledge engine module and 2) a domain expert module including a hierarchal classification of durable goods applications designed to enhance the performance of the expert system; and where the knowledge engine determines possible materials or processes based on the durable good, its characteristics and data associated therewith or derived therefrom.

15. The apparatus of claim 12, further comprising:

E) a economics module where the economic module generates a cost factor for each solution.

16. The apparatus of claim 15, wherein the economic module includes an opportunity identification module for determining the economic viability for each solution generated by the system.

17. A process for specifying characteristics of an overall shape of a durable good implemented on a computer comprising the step of:

A) executing at least one rule from a set of shape function rules comprising:

1) the overall shape requires object(s) inside and objects need to be accessed, then an access(es) becomes necessary;

2) the overall shape requires object(s) go in and out, then an access(es) is necessary;

3) the overall shape requires no object(s) inside at any time, then an access(es) becomes not necessary;

4) the overall shape requires objects(s) inside and object(s) do not need to be accessed, then an access (es) is not necessary;

5) the overall shape requires no object(s) goes in and out, then an access(es) is not necessary;

6) an access(es) into the overall shape is necessary during use, then an opening(s) need to be considered;

7) an access(es) into the overall shape is necessary during use and overall shape is closed, then decomposition into opened shapes needs to be considered;

8) an access(es) into the overall shape is not necessary during use, then an opening(s) are not necessary;

9) an opening(s) into the overall shape is necessary and MAX(an order of magnitude of size of at least on opening) is less than an order of magnitude of longer dimension of part in a plane perpendicular to the axis of the opening, then the overall shape is closed;

10) an opening(s) into the overall shape is necessary and MAX(an order of magnitude of size of at least on opening) is approximately equal to an order of magnitude of longer dimension of part in a plane perpendicular to the axis of the opening, then the overall shape is opened;

11) an opening(s) into the overall shape is not necessary, then the overall shape could be closed;

12) a part partially encloses an object(s) within the overall shape, then the overall shape is opened;

13) an object(s) inside, then the overall shape is hollow;

14) an object(s) goes in and out, then overall shape is hollow;

15) a part partially encloses an object(s), then overall shape is hollow;
16) a part is in contact with a solid supporting surface and part shape provides orientation with respect to the supporting surface;
17) the overall shape is under a load and load is important and aesthetics of the overall shape is not a factor, then overall shape could be 2D;
18) aesthetics of the overall shape is a factor, then overall shape could be 3D;
19) aesthetics of the overall shape is important, then overall shape is 3D;
20) a part lies approximately in one plane and part is not hollow; then overall shape is 2D;
21) the overall shape has a direction about which a cross-section is constant and part does not have a surface approximately perpendicular to the direction, then an overall shape is 2D;
22) the overall shape has an opened-shape cross-section about a longer direction, cannot find a direction about which the cross-section is constant, and part does not have a surface approximately perpendicular to the longer direction, then the overall shape is 2D;
23) the overall shape has an opened-shape cross-section about a longer direction, cannot find a direction about which the cross-section is constant, and part has at least one surface approximately perpendicular to the direction, then overall shape is 3D;
24) the overall shape has an closed-shape cross-section and cannot find a direction about which the cross-section is constant, then overall shape is 3D;
25) the overall shape has a direction about which the cross-section is constant and part has at least one surface approximately perpendicular to the direction, then overall shape is 3D;
26) the overall shape is closed and has a direction about which the cross-section varies simply, then the overall shape has a closed-shape cross-section;
27) the overall shape has a part that rotates during use, then the part has a symmetry of revolution;
28) the overall shape has a part in contact with a solid support surface and part shape provides orientation with respect to the supporting surface, then the part surface could include approximately flat portions;
29) the overall shape has an object(s) inside and a part of the shape provides orientation for the object(s), then a part surface could include approximately flat portions;
30) the overall shape is under a load and a load direction is torsion, then a cross-section is approximately thin-walled circular, rectangular or thick-walled circular;
31) the overall shape is under a load and a load direction is compression, then a cross-section is approximately thin-walled circular, rectangular or thick-walled circular;
32) the overall shape is under a load and a load direction is bending only, then a cross-section is approximately an I-profile, a U-profile, a wide I-profile or rectangular;
33) the overall shape is under a load and a load direction is bending and compression, then a cross-section is approximately an I-profile, a U-profile, a wide I-profile or rectangular;
34) the overall shape is under a load and a load direction is bending and torsion, then a cross-section is approximately rectangular of thin-walled circular;
35) the overall shape is under a load and a load direction is pressure only, then an overall shape approximates a body-of-revolution;
36) the overall shape is under a load and a load direction is pressure and bending, then a cross-section is approximates circular or hollow rectangular;
37) aesthetics of the overall shape is a factor, then simple variation of a standard cross-section with a profile made up of straight lines and simple curves;
38) aesthetics of the overall shape is a important, then complex variation of approximation of a standard cross-section with a profile made up of free-form curves;
39) aesthetics of the overall shape is not important; then could be a standard cross-section and the cross-section could be a constant;
40) a basic shape of a part of the overall shape has symmetry of revolution, then an overall shape is a body-of-revolution;
41) a part surface of the overall shape has several different portions approximately flat and the part does not lie approximately in one plane or is not approximately flat, then an overall shape is a folded-plate;
42) a basic shape of a part of the overall shape has symmetry of revolution and the basic shape of a profile of the part about the axis of revolution is curved, then an overall shape is a double-curvature;
43) a cross-section of the overall shape includes curves and a profile is curved in locations where the cross-section is curved, then an overall shape is a double-curvature;
44) the overall shape does not have a direction about which a cross-section varies simply, then an overall shape is a double-curvature;
45) the overall shape is 2D and the overall shape is opened, then the overall shape has a 2D opened cross-section;
46) the overall shape is 2D and the overall shape is closed, then the overall shape has a 2D closed cross-section;
47) the overall shape is 3D and the overall shape is opened, then the overall shape has a 3D opened cross-section;
48) the overall shape is 3D and the overall shape is closed, then the overall shape has a 3D closed cross-section;
49) the overall shape is 3D closed and the overall shape is a folded-plate, then the overall shape is 3D closed folded-plate;
50) the overall shape is 3D closed and the overall shape is double-curvature, then the overall shape is 3D closed double-curvature;
51) the overall shape is 3D closed and the overall shape is body-of-revolution, then the overall shape is 3D closed body-of-revolution;
52) the overall shape is 3D opened and the overall shape is a folded-plate, then the overall shape is 3D opened folded-plate;
53) the overall shape is 3D opened and the overall shape is double-curvature, then the overall shape is 3D opened double-curvature;
54) the overall shape is 3D opened and the overall shape is body-of-revolution, then the overall shape is 3D opened body-of-revolution;
55) the overall shape is a body-of-revolution and part includes flat surfaces, then the flat surfaces are perpendicular to the axis of revolution; or 56) X could be a and x is b, then destroy "x could be a" and x is b;

B) executing at least one rule from a set of addition selection rules; and

C) executing at least one rule from a set of manufacturing selection rules.

18. A process for specifying characteristics of an overall shape of a durable good implemented on a computer comprising the step of:

A) executing at least one rule from a set of shape function rules;

B) executing at least one rule from a set of addition selection rules comprising:

1) an opening(s) in the overall shape is necessary and the opening(s) is to be protected, closed or covered, then an addition(s) is necessary;

2) an opening(s) in the overall shape is necessary and an overall shape is closed, then an addition(s) is necessary;

3) an object(s) inside the overall shape needs to be separated, then an addition(s) is necessary;

4) an object(s) inside the overall shape needs to be located, then an addition(s) is necessary;

5) an object(s) outside the overall shape needs to be separated, then an addition(s) is necessary;

6) an object(s) outside the overall shape needs to be located, then an addition(s) is necessary;

7) the overall shape has a part that is 3D and divided sections are necessary, then an addition(s) is necessary;

8) an inside surface of the overall shape must be completely smooth, then no addition(s) inside except holes;

9) the overall shape needs no additions inside except holes and an addition(s) is necessary, then a hole(s) is necessary;

10) an outside surface of the overall shape must be completely smooth, then no addition(s) inside except holes;

11) the overall shape needs no additions outside except holes and an addition(s) is necessary, then a hole(s) is necessary;

12) an object(s) inside the overall shape needs to be attached, then an addition(s) is necessary;

13) an object(s) outside the overall shape needs to be attached, then an addition(s) is necessary;

14) an object(s) outside the overall shape handles or manipulates a part of the overall shape, then an addition(s) is necessary;

15) a part of the overall shape is in contact with a solid supporting surface and an orientation with respect to the supporting surface is required and a part shape does not provide the orientation with respect to the supporting surface, then an addition(s) is necessary;

16) a part of the overall shape is in contact with a solid supporting surface and the part provides a gap between the part and the supporting surface, then an addition(s) is necessary;

17) the overall shape is under a load and a load magnitude is large and a cross-section of the overall shape is a simple variation of a standard cross-section, then an addition(s) may be necessary;

18) the overall shape is under a load and a load magnitude is large or medium and a cross-section of the overall shape is a complex variation of an approximation of a standard cross-section, then an addition(s) may be necessary; or 19) the overall shape needs ribs and an outside aesthetics of the overall shape is a factor or important, then the ribs are internal; and C) executing at least one rule from a set of manufacturing selection rules.

19. A process for specifying characteristics of an overall shape of a durable good implemented on a computer comprising the step of:

A) executing at least one rule from a set of shape function rules;

B) executing at least one rule from a set of addition selection rules; and

C) executing at least one rule from a set of manufacturing selection rules comprising:

1) the overall shape is 3D closed with an object(s) inside, then decompose the shape into at least two 3D opened shapes;

2) the overall shape is 3D closed with inside additions, except holes, required, then decompose the shape into at least two 3D opened shapes;

3) the overall shape is double-curvature, then the shape cannot be decomposed into 2D shapes;

4) the overall shape is 2D, then the overall shape can be decomposed into a series of flat 2D shapes;

5) the overall shape is a folded-plate, then the overall shape can be decomposed into a series of 3D opened folded-plates;

6) the overall shape is a folded-plate, then an orientation of a cutting plane(s) is any plane;

7) the overall shape is a folded-plate, then if the overall shape is a 3D opened folded-plate then it can be decomposed into a series of 2D shapes;

8) the overall shape is a 3D opened body-of-revolution only, then an orientation of a cutting plane(s) contains an axis of revolution or is perpendicular to the axis of revolution;

9) the overall shape is a 3D opened body-of-revolution, then the overall shape can be decomposed into at least two 3D opened shapes;

10) the overall shape is a 3D opened body-of-revolution and a profile of the shape includes a straight line segment, then the overall shape can be decomposed into at least two 3D opened shapes and the 3D opened shapes can be further decomposed into a series of 2D shapes, each 2D shape corresponding to one of the straight line segments;

11) the overall shape is a 3D opened body-of-revolution and a profile of the shape includes curves, then the overall shape can be decomposed into at least two 3D opened shapes and the 3D opened shapes corresponding to the curves are 3D opened double-curvature shaped;

12) the overall shape is a 3D opened body-of-revolution and the overall shape is 3D opened double-curvature, then an orientation of a cutting plane(s) contains an axis of revolution or is perpendicular to the axis of revolution and does not matter once shape decomposition is performed by the cutting plane(s);

13) the overall shape is a 3D opened double-curvature only, then an orientation of a cutting plane(s) does not matter;

14) the overall shape is a 3D opened double-curvature, then the shape can be decomposed into a series of 3D opened double-curvature shapes;

15) the overall shape is a 3D closed folded-plate, then an orientation of a cutting plane(s) does not matter or contains a plate;

16) the overall shape is a 3D closed folded-plate and an orientation of a cutting plane contains a plate, then the shape can be decomposed into a 2D and a 3D opened folded-plate shapes;

17) the overall shape is a 3D closed folded-plate and an orientation of a cutting plane does not matter, then the shape can be decomposed into at least two 3D opened folded-plate shapes;

18) the overall shape is a 3D closed body-of-revolution, then an orientation of a cutting plane(s) contains an axis of revolution or is perpendicular to the axis of revolution;

19) the overall shape is a 3D closed body-of-revolution and an orientation of a cutting plane contains an axis of revolution, then the overall shape can be decomposed into at least two 3D opened shapes;

20) the overall shape is a 3D closed body-of-revolution and an orientation of a cutting plane(s) is perpendicular to an axis of revolution, then the overall shape could be decomposed into at least two 3D closed body-of-revolution shapes, 3D opened body-of-revolution shapes or mixtures thereof;

21) the overall shape is a 3D closed body-of-revolution and the overall shape is a 3D closed double-curvature, then an orientation of a cutting plane(s) contains an axis of revolution or is perpendicular to the axis of revolution;

22) the overall shape is a 3D closed double-curvature only, then an orientation of a cutting plane(s) does not matter; or 23) the overall shape is a 3D closed double-curvature, then the shape can be decomposed into a series of 3D opened double-curvature shapes.

* * * * *